United States Patent
Dirac et al.

(10) Patent No.: US 10,963,810 B2
(45) Date of Patent: Mar. 30, 2021

(54) EFFICIENT DUPLICATE DETECTION FOR MACHINE LEARNING DATA SETS

(71) Applicant: Amazon Technologies, Inc., Reno, NV (US)

(72) Inventors: Leo Parker Dirac, Seattle, WA (US); Aleksandr Mikhaylovich Ingerman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1237 days.

(21) Appl. No.: 14/569,458

(22) Filed: Dec. 12, 2014

(65) Prior Publication Data

US 2015/0379430 A1     Dec. 31, 2015

Related U.S. Application Data

(63) Continuation-in-part of application No. 14/319,902, filed on Jun. 30, 2014, now Pat. No. 10,102,480.

(51) Int. Cl.
  *G06N 20/00* (2019.01)
(52) U.S. Cl.
  CPC .................. *G06N 20/00* (2019.01)
(58) Field of Classification Search
  CPC ..................................................... G06N 20/00
  USPC ......................................................... 706/12
  See application file for complete search history.

(56) References Cited

U.S. PATENT DOCUMENTS

| | | | |
|---|---|---|---|
| 4,821,333 A | 4/1989 | Gillies | |
| 6,230,131 B1 | 5/2001 | Kuhn et al. | |
| 6,408,290 B1 | 6/2002 | Thiesson et al. | |
| 6,615,209 B1 * | 9/2003 | Gomes | G06F 17/30696 |
| 6,658,423 B1 * | 12/2003 | Pugh | G06F 17/3071 |
| 6,681,383 B1 | 1/2004 | Pastor et al. | |
| 6,804,691 B2 | 10/2004 | Coha et al. | |
| 7,328,218 B2 | 2/2008 | Steinberg et al. | |
| 7,366,718 B1 * | 4/2008 | Pugh | G06F 17/3071 |
| 7,392,262 B1 * | 6/2008 | Alspector | G06F 17/30011 |

(Continued)

FOREIGN PATENT DOCUMENTS

| | | |
|---|---|---|
| CN | 102622441 | 8/2012 |
| CN | 104123192 | 10/2014 |

(Continued)

OTHER PUBLICATIONS

Jain et al. "Using Bloom Filters to Refine Web Search Results", Jun. 2005, WebDB. (Year: 2005).*

(Continued)

*Primary Examiner* — Hien D Khuu
(74) *Attorney, Agent, or Firm* — Robert C. Kowert; Kowert, Hood, Munyon, Rankin & Goetzel, P.C.

(57) ABSTRACT

At a machine learning service, a determination is made that an analysis to detect whether at least a portion of contents of one or more observation records of a first data set are duplicated in a second set of observation records is to be performed. A duplication metric is obtained, indicative of a non-zero probability that one or more observation records of the second set are duplicates of respective observation records of the first set. In response to determining that the duplication metric meets a threshold criterion, one or more responsive actions are initiated, such as the transmission of a notification to a client of the service.

20 Claims, 78 Drawing Sheets

(56) References Cited

U.S. PATENT DOCUMENTS

| | | | | |
|---|---|---|---|---|
| 7,460,735 | B1* | 12/2008 | Rowley | G06F 17/30256 |
| | | | | 382/305 |
| 7,624,274 | B1* | 11/2009 | Alspector | H04L 51/12 |
| | | | | 380/59 |
| 7,725,475 | B1* | 5/2010 | Alspector | H04L 51/12 |
| | | | | 707/758 |
| 7,743,003 | B1 | 6/2010 | Tong et al. | |
| 7,809,695 | B2* | 10/2010 | Conrad | G06F 17/30864 |
| | | | | 707/692 |
| 8,046,372 | B1* | 10/2011 | Thirumalai | G06F 17/30616 |
| | | | | 707/749 |
| 8,078,556 | B2 | 12/2011 | Adi et al. | |
| 8,229,864 | B1* | 7/2012 | Lin | G06N 99/005 |
| | | | | 706/11 |
| 8,370,280 | B1* | 2/2013 | Lin | G06N 99/005 |
| | | | | 706/12 |
| 8,429,103 | B1 | 4/2013 | Aradhye et al. | |
| 8,463,071 | B2 | 6/2013 | Snavely et al. | |
| 8,499,010 | B2 | 7/2013 | Gracie et al. | |
| 8,510,238 | B1 | 8/2013 | Aradhye et al. | |
| 8,606,730 | B1 | 12/2013 | Tong et al. | |
| 8,682,814 | B2 | 3/2014 | DiCorpo et al. | |
| 8,832,034 | B1* | 9/2014 | Ramarao | G06F 17/30156 |
| | | | | 707/664 |
| 8,886,576 | B1 | 11/2014 | Sanketi et al. | |
| 9,020,861 | B2 | 4/2015 | Lin et al. | |
| 9,069,737 | B1 | 6/2015 | Kimotho et al. | |
| 9,081,817 | B2* | 7/2015 | Arasu | G06F 16/24564 |
| 9,380,032 | B2 | 6/2016 | Resch et al. | |
| 9,672,474 | B2* | 6/2017 | Dirac | G06N 99/005 |
| 9,697,248 | B1* | 7/2017 | Ahire | G06N 20/00 |
| 2005/0097068 | A1 | 5/2005 | Graepel et al. | |
| 2005/0105712 | A1 | 5/2005 | Williams et al. | |
| 2005/0119999 | A1 | 6/2005 | Zait et al. | |
| 2006/0179016 | A1 | 8/2006 | Forman et al. | |
| 2007/0005556 | A1* | 1/2007 | Ganti | G06F 17/30575 |
| 2007/0185896 | A1 | 8/2007 | Jagannath et al. | |
| 2008/0027916 | A1* | 1/2008 | Asai | G06F 17/30303 |
| 2008/0033900 | A1 | 2/2008 | Zhang et al. | |
| 2009/0024586 | A1* | 1/2009 | Zhou | G06F 17/30958 |
| 2010/0100416 | A1 | 4/2010 | Herbrich et al. | |
| 2010/0114561 | A1* | 5/2010 | Yasin | G06F 40/216 |
| | | | | 704/9 |
| 2010/0223211 | A1 | 9/2010 | Johnson et al. | |
| 2010/0262568 | A1 | 10/2010 | Schwaighofer et al. | |
| 2010/0306249 | A1* | 12/2010 | Hill | G06F 17/30867 |
| | | | | 707/769 |
| 2011/0185230 | A1 | 7/2011 | Agrawal et al. | |
| 2011/0313953 | A1* | 12/2011 | Lane | G06N 99/005 |
| | | | | 706/12 |
| 2011/0320767 | A1 | 12/2011 | Eren et al. | |
| 2012/0054658 | A1* | 3/2012 | Chuat | G06F 17/30247 |
| | | | | 715/771 |
| 2012/0089446 | A1 | 4/2012 | Gupta et al. | |
| 2012/0158791 | A1 | 6/2012 | Kasneci et al. | |
| 2012/0191631 | A1 | 7/2012 | Breckenridge et al. | |
| 2012/0253927 | A1 | 10/2012 | Qin et al. | |
| 2012/0316421 | A1* | 12/2012 | Kumar | A61B 1/00009 |
| | | | | 600/407 |
| 2013/0318240 | A1 | 11/2013 | Hebert et al. | |
| 2013/0346347 | A1 | 12/2013 | Patterson et al. | |
| 2014/0046879 | A1 | 2/2014 | MacLennan et al. | |
| 2014/0122381 | A1 | 5/2014 | Nowozin | |
| 2014/0188919 | A1* | 7/2014 | Huffman | G06F 16/951 |
| | | | | 707/758 |
| 2014/0297267 | A1* | 10/2014 | Spencer | G06F 40/274 |
| | | | | 704/9 |
| 2014/0304238 | A1* | 10/2014 | Halla-Aho | H04L 51/12 |
| | | | | 707/692 |
| 2014/0365450 | A1* | 12/2014 | Trimble | G06F 17/30156 |
| | | | | 707/692 |
| 2015/0016461 | A1* | 1/2015 | Qiang | H04L 45/74 |
| | | | | 370/392 |
| 2015/0280959 | A1* | 10/2015 | Vincent | H04L 67/1097 |
| | | | | 709/203 |
| 2015/0379072 | A1 | 12/2015 | Dirac et al. | |
| 2015/0379423 | A1 | 12/2015 | Dirac et al. | |
| 2015/0379424 | A1* | 12/2015 | Dirac | G06N 99/005 |
| | | | | 706/12 |
| 2015/0379425 | A1 | 12/2015 | Dirac et al. | |
| 2015/0379426 | A1 | 12/2015 | Steele et al. | |
| 2015/0379427 | A1 | 12/2015 | Dirac et al. | |
| 2015/0379428 | A1 | 12/2015 | Dirac et al. | |
| 2015/0379429 | A1 | 12/2015 | Lee et al. | |
| 2015/0379430 | A1* | 12/2015 | Dirac | G06N 99/005 |
| | | | | 706/12 |
| 2016/0026720 | A1 | 1/2016 | Lehrer et al. | |

FOREIGN PATENT DOCUMENTS

| | | | | |
|---|---|---|---|---|
| CN | | 104536902 | | 4/2015 |
| EP | | 2393043 | | 7/2011 |
| JP | | 2009282577 | | 12/2009 |
| WO | | 2012151198 | | 11/2012 |
| WO | WO 2012151198 | A1 * | 11/2012 | G06N 99/005 |

OTHER PUBLICATIONS

U.S. Appl. No. 14/538,723, filed Nov. 11, 2014, Polly Po Yee Lee, et al.

U.S. Appl. No. 14/923,237, filed Oct. 26, 2015, Leo Parker Dirac, et al.

U.S. Appl. No. 15/060,439, filed Mar. 3, 2016, Saman Zarandioon, et al.

U.S. Appl. No. 15/132,959, filed Apr. 19, 2016, Pooja Ashok Kumar, et al.

Soren Sonnenburg, et al., "The Shogun Maching Learning Toolbox," Journal of Machine Learning Research, Jan. 1, 2010, pp. 1799-1802, XP055216366, retrieved from http://www.jmlr.org/papers/volume11/sonnenburg10a/sonnenburg10a.pdf., pp. 1-4.

Anonymous: "GSoC 2014 Ideas," Internet Citation, Jun. 28, 2014, XP882745876, Retrieved from http://web.archive.org/web/20140628051115/http://shogun-toolbox.org/page/Events/gsoc2014ideas [retrieved on Sep. 25, 2015] Section "Shogun cloud extensions"; pp. 1-5.

Anonymous: "Blog Aug. 21, 2013", The Shogun Machine Learning Toolbox, Aug. 21, 2013, XP002745300, Retrieved from http://shogun-toolbox.org/page/contact/irclog/2013-08-21/, [retrieved on 2815-18-81], pp. 1-5.

Pyrathon D.: "Shogun as a SaaS", Shogun Machine Learning Toolbox Mailing List Archive, Mar. 4, 2014, XP882745382, Retrieved from http://comments.gmane.org/gmane.comp.ai.machine-learning.shogun/4359, [retrieved on 2815-18-81], pp. 1-3.

Yu, H-F, et al., "Large linear classification when data cannot fit in memory", ACM Trans. on Knowledge Discovery from Data (TKDD), vol. 5, No. 4, 2012, 23 Pages.

Soroush, E. et al., "ArrayStore: a store manager for complex parallel array processing", Proc. of the 2011 ACM SIGMOD Intrl. Conf. on Management of Data, ACM, pp. 253-264.

Esposito, et al., "A Comparative Analysis of Methods for Pruning Decision Trees", 1997, IEEE, 0162-8828/97, pp. 476-491.

Golbandi, et al., "Adaptive Bootstrapping of Recommender Systems Using Decision Trees", 2011, WSDM, pp. 595-604.

Goldstein, et al., Penalized Split Criteria for Interpretable Trees, The Wharton School, University of Pennsylvania, 2013, pp. 1-25.

Zhan, et al., The State Problem for Test Generation in Si mu link, GECC0'06, Jul. 8-12, 2006, pp. 1941-1948.

The MathWorks, Inc., Simulink Projects Source Control Adapter Software Development Kit, SOK Version 1.2 for R2013b, Mar. 2013, pp. 1-9.

Eric Brochu, et al., "A Tutorial on Bayesian Optimization of Expensive Cost Functions, with Application to Active User Modeling and Hierarchical Reinforcement Learning", arX1v:1012.2599v1, Dec. 14, 2010, pp. 1-49.

Jasper Snoek, et al., "Practical Bayesian Optimization of Machine Learning Algorithms", arXiv:1206.2944v2 [stat.ML] Aug. 29, 2012, pp. 1-12.

(56) References Cited

OTHER PUBLICATIONS

AWS, "Amazon Machine Learning Developer Guide", 2015, pp. 1-133.
Michael A. Osborne, et al., "Gaussian Processes for Global Optimization", Published in the 3rd International Conference on Learning and Intelligent Optimization, 2009, pp. 1-15.
Wikipedia, "Multilayer perception", Retrieved from URL: https://en.wikipedia.org/wiki/Multilayer_perceptron on Jan. 21, 2016, pp. 1-5.
Spark, "Spark Programming Guide—Spark 1.2.0 Documentation", Retrieved from URL: https://spark.apache.org/docs/1.2.0/programmingguide.html on Jan. 15, 2016, pp. 1-18.
Wikipedia, "Stochastic gradient descent", Retrieved from URL: https://en.wikipedia.org/wiki/Stochastic_gradient_descent on Jan. 21, 2016, pp. 1-9.
Adomavicius et al., "Context-Aware Recommender Systems", AI Magazine, Fall 2011, pp. 67-80.
Beach, et al., "Fusing Mobile, Sensor, and Social Data to Fully Enable Context-Aware Computing", Hotmobile 2010, ACM, pp. 1-6.
Baltrunas, et al., "Context Relevance Assessment for Recommender Systems", IUI "11, Feb. 13-16, 2011, ACM, pp. 1-4.
"API Reference", Google Prediction API, Jun. 12, 2013, 1 page.
"Google Prediction API", Google developers, Jun. 9, 2014, 1 page.
U.S. Appl. No. 14/319,902, filed Jun. 30, 2014, Leo Parker Dirac.
U.S. Appl. No. 14/319,880, filed Jun. 30, 2014, Leo Parker Dirac.
U.S. Appl. No. 14/460,314, filed Aug. 14, 2014, Leo Parker Dirac.
U.S. Appl. No. 14/460,312, filed Aug. 14, 2014, Leo Parker Dirac.
U.S. Appl. No. 14/463,434, filed Aug. 19, 2014, Robert Mattihias Steele.
U.S. Appl. No. 14/460,163, filed Aug. 14, 2014, Zuohua Zhang.
U.S. Appl. No. 14/463,434, filed Aug. 19, 2014, Robert Matthias Steele.
U.S. Appl. No. 14/484,201, filed Sep. 11, 2014, Michael Brueckner.
U.S. Appl. No. 14/489,448, filed Sep. 17, 2014, Leo Parker Dirac.
U.S. Appl. No. 14/489,449, filed Sep. 17, 2014, Leo Parker Dirac.
International Search Report and Written Opinion from PCT/US2015/038610, dated Sep. 25, 2015, Amazon Technologies, Inc., pp. 1-12.
Kolo, B., "Binary and Multiclass Classification, Passage", Binary and Multiclass Classification, XP002744526, Aug. 12, 2010, pp. 78-80.
Gamma, E., et al., "Design Patterns, Passage", XP002286644, Jan. 1, 1995, pp. 293-294; 297, 300-301.
International Search Report and Written Opinion from PCT/US2015/038589, dated Sep. 23, 2015, Amazon Technologies, Inc., pp. 1-12.

\* cited by examiner

Grammar 1320 for recipe expressions

```
grammar MLS-Recipe;
expr
    : BAREID
    | QUOTEDID
    | NUMBER
    | functioncall
    ;
functioncall
    : BAREID '('
        functionparams?
      ')'
    ;
functionparams
    : expr ( ',' expr )*
    ;
BAREID : [A-Za-z][a-zA-Z0-9_]* ;
QUOTEDID : '\'' ('\\''|.)*? '\'' ;
NUMBER
    : '-'? INT '.' INT EXP? // 1.35, 1.35E-9, 0.3, -4.5
    | '-'? INT EXP // 1e10 -3e4
    | '-'? INT // -3, 45
    ;
fragment INT : '0' | [1-9] [0-9]* ; // no leading zeros
fragment EXP : [Ee] [+\-]? INT ;
WHITESPACE : [ \t\r\n]+ -> skip ; // skip spaces, tabs, newlines
COMMENT : '//' (~[\r\n])* -> skip ;
```

FIG. 13

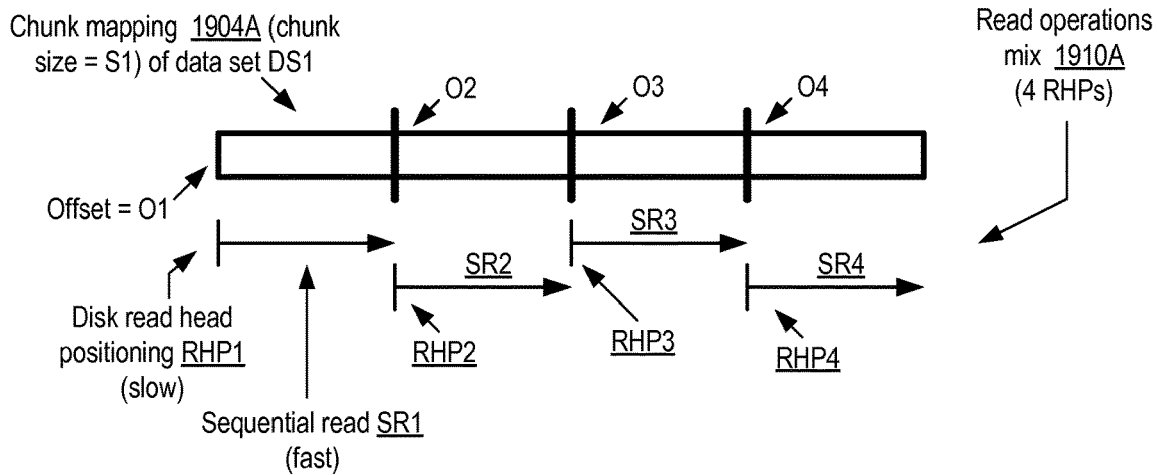
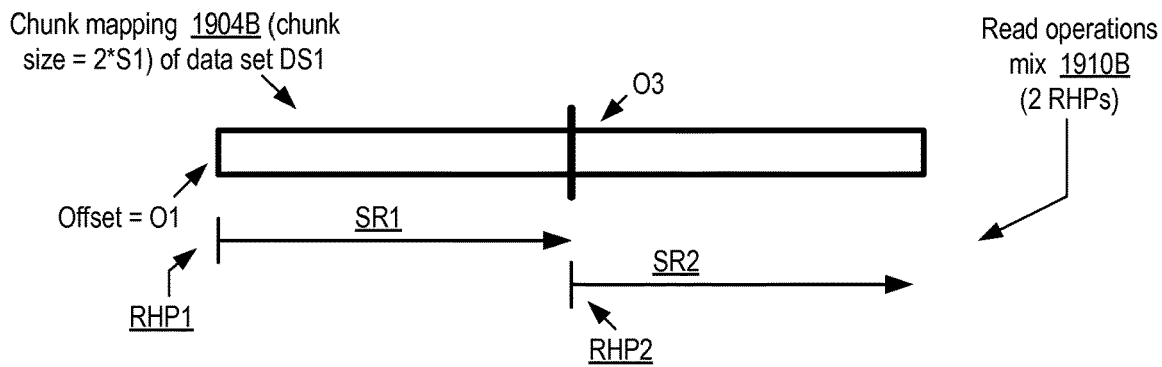
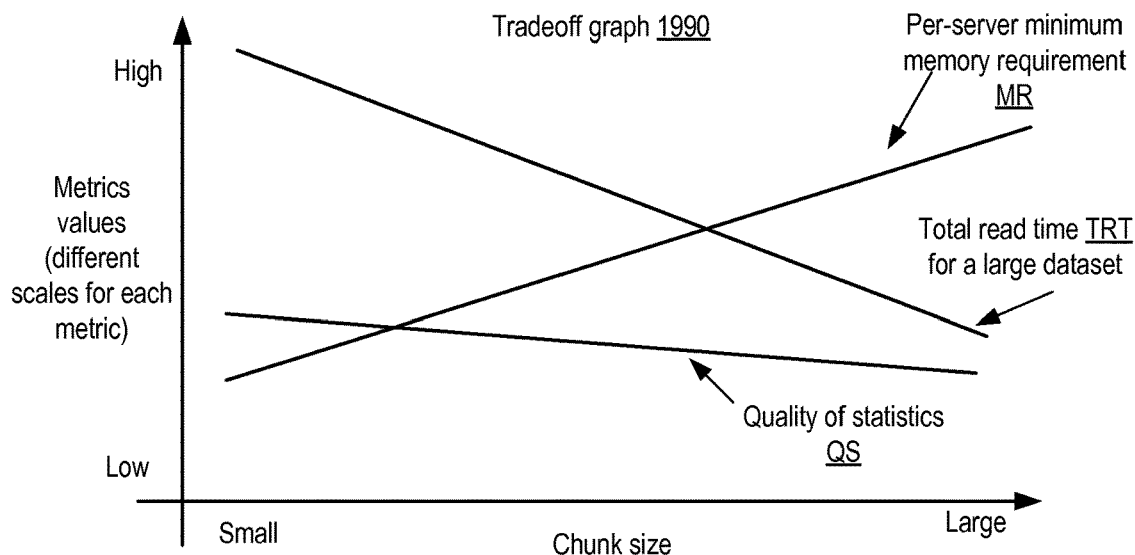
FIG. 19

Recipe 5902A

```
...
"outputs": [
    "quantile_bin('NIV1', 10)",
    "quantile_bin('NIV1', 100)",
    "quantile_bin('NIV1', 1000)",
    "quantile_bin('NIV2', 20)",
    "quantile_bin('NIV2', 40)",
    "quantile_bin('NIV2', 80)",
    "quantile_bin('NIV2', 160)",
    "quantile_bin('NIV3', 5)",
    "quantile_bin('NIV3', 25)",
    "quantile_bin('NIV3', 625)",
]
```

Recipe 5902B

```
...
"outputs": [
    "MV_quantile_bin('NIV1','NIV2', 10X10)",
    "MV_quantile_bin('NIV1','NIV2', 100X100)",
    "MV_quantile_bin('NIV1', 'NIV3', 100X20)",
]
```

FIG. 59

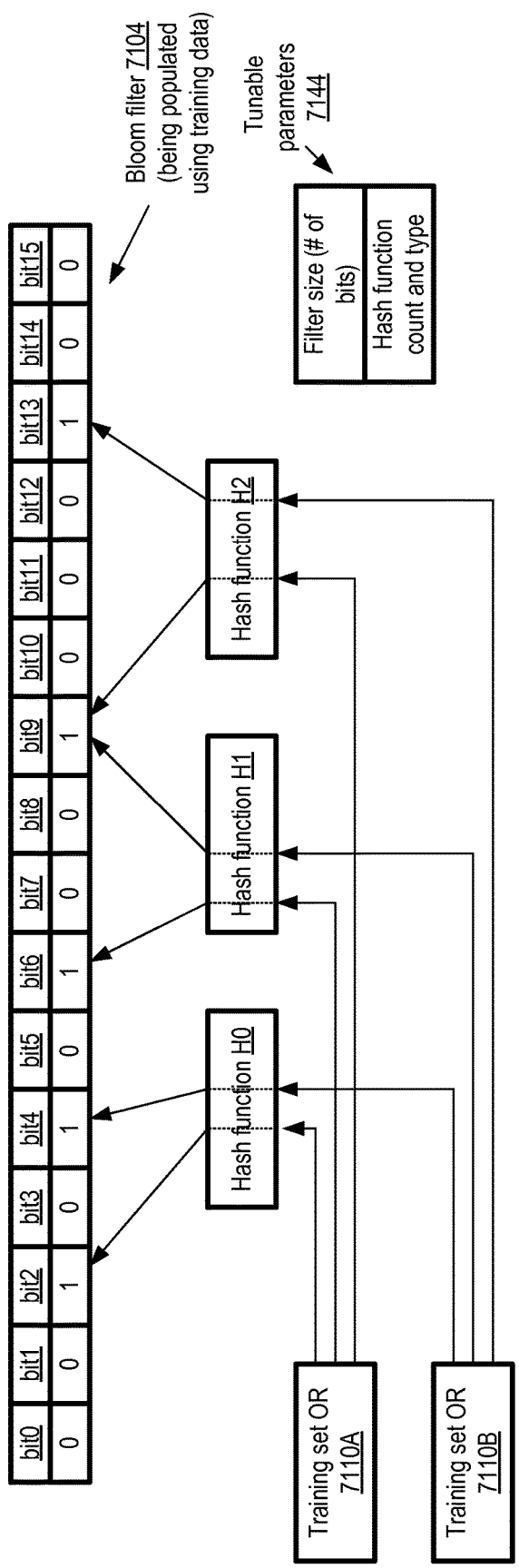
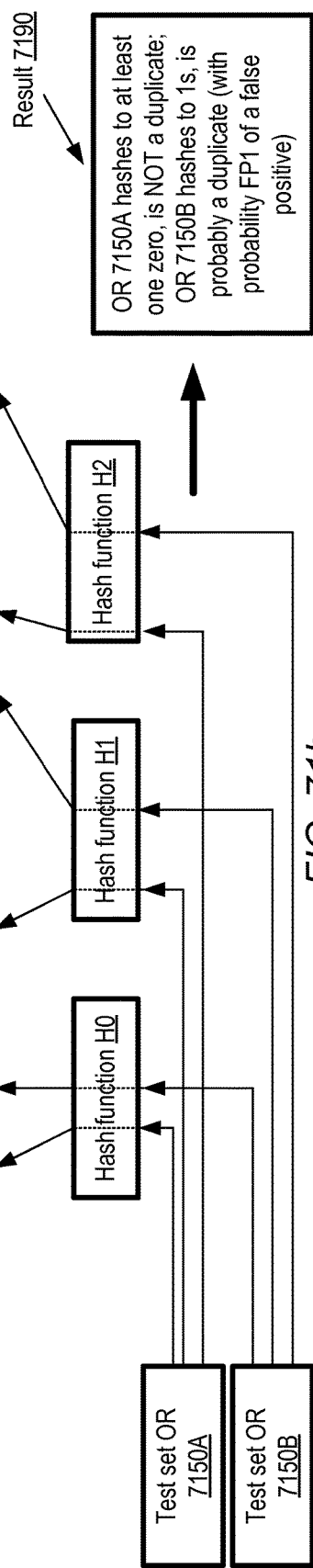
FIG. 71a
FIG. 71b

US 10,963,810 B2

EFFICIENT DUPLICATE DETECTION FOR MACHINE LEARNING DATA SETS

This application is a Continuation-In-Part of U.S. patent application Ser. No. 14/319,902 titled "MACHINE LEARNING SERVICE," filed Jun. 30, 2014, whose inventors are Leo Parker Dirac, Nicolle M. Correa, Aleksandr Mikhaylovich Ingerman, Sriram Krishnan, Jin Li, Sudhakar Rao Puvvadi, and Saman Zarandioon, and which is herein incorporated by reference in its entirety.

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Traditionally, expertise in statistics and in artificial intelligence has been a prerequisite for developing and using machine learning models. For many business analysts and even for highly qualified subject matter experts, the difficulty of acquiring such expertise is sometimes too high a barrier to be able to take full advantage of the large amounts of data potentially available to make improved business predictions and decisions. Furthermore, many machine learning techniques can be computationally intensive, and in at least some cases it can be hard to predict exactly how much computing power may be required for various phases of the techniques. Given such unpredictability, it may not always be advisable or viable for business organizations to build out their own machine learning computational facilities.

The quality of the results obtained from machine learning algorithms may depend on how well the empirical data used for training the models captures key relationships among different variables represented in the data, and on how effectively and efficiently these relationships can be identified. Depending on the nature of the problem that is to be solved using machine learning, very large data sets may have to be analyzed in order to be able to make accurate predictions, especially predictions of relatively infrequent but significant events. For example, in financial fraud detection applications, where the number of fraudulent transactions is typically a very small fraction of the total number of transactions, identifying factors that can be used to label a transaction as fraudulent may potentially require analysis of millions of transaction records, each representing dozens or even hundreds of variables. Constraints on raw input data set size, cleansing or normalizing large numbers of potentially incomplete or error-containing records, and/or on the ability to extract representative subsets of the raw data also represent barriers that are not easy to overcome for many potential beneficiaries of machine learning techniques. For many machine learning problems, transformations may have to be applied on various input data variables before the data can be used effectively to train models. In some traditional machine learning environments, the mechanisms available to apply such transformations may be less than optimal—e.g., similar transformations may sometimes have to be applied one by one to many different variables of a data set, potentially requiring a lot of tedious and error-prone work.

BRIEF DESCRIPTION OF DRAWINGS

FIG. 13 illustrates an example grammar that may be used to define recipe syntax, according to at least some embodiments.

FIG. 19 illustrates tradeoffs associated with varying the chunk size used for filtering operation sequences on machine learning data sets, according to at least some embodiments.

FIG. 59 illustrates examples of recipes that may be used for representing concurrent binning operations at a machine learning service, according to at least some embodiments.

FIGS. 71*a* and 71*b* collectively illustrate an example of a use of a Bloom filter for probabilistic detection of duplicate observation records at a machine learning service, according to at least some embodiments.

Figure 1:
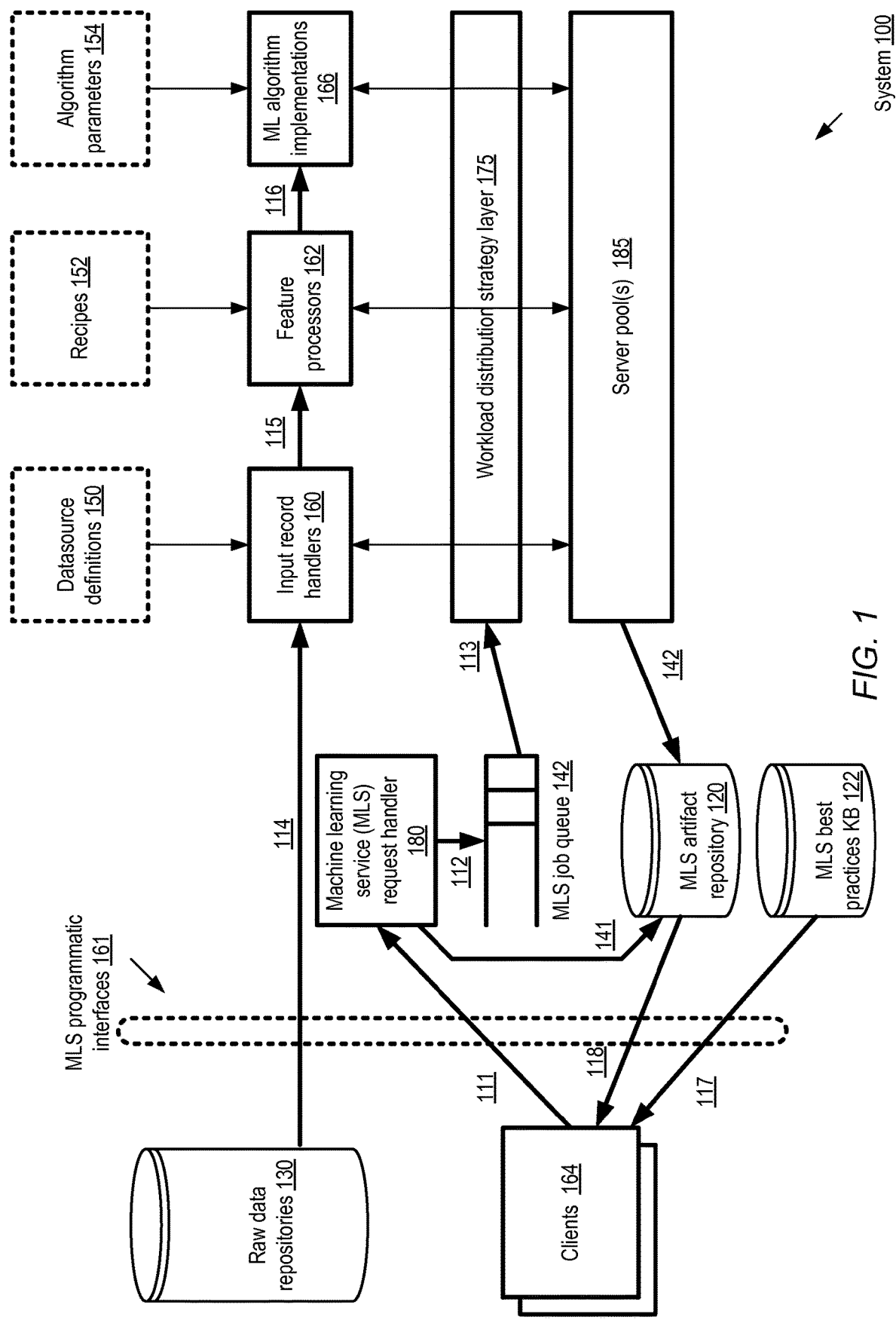
FIG. 1 illustrates an example system environment in which various components of a machine learning service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a customizable, easy-to-use machine learning service (MLS) designed to support large numbers of users and a wide variety of algorithms and problem sizes are described. In one embodiment, a number of MLS programmatic interfaces (such as application programming interfaces (APIs)) may be defined by the service, which guide non-expert users to start using machine learning best practices relatively quickly, without the users having to expend a lot of time and effort on tuning models, or on learning advanced statistics or artificial intelligence techniques. The interfaces may, for example, allow non-experts to rely on default settings or parameters for various aspects of the procedures used for building, training and using machine learning models, where the defaults are derived from the accumulated experience of other practitioners addressing similar types of machine learning problems. At the same time, expert users may customize the parameters or settings they wish to use for various types of machine learning tasks, such as input record handling, feature processing, model building, execution and evaluation. In at least some embodiments, in addition to or instead of using pre-defined libraries implementing various types of machine learning tasks, MLS clients may be able to extend the built-in capabilities of the service, e.g., by registering their own customized functions with the service. Depending on the business needs or goals of the clients that implement such customized modules or functions, the modules may in some cases be shared with other users of the service, while in other cases the use of the customized modules may be restricted to their implementers/owners.

In some embodiments, a relatively straightforward recipe language may be supported, allowing MLS users to indicate various feature processing steps that they wish to have applied on data sets. Such recipes may be specified in text format, and then compiled into executable formats that can be re-used with different data sets on different resource sets as needed. In at least some embodiments, the MLS may be implemented at a provider network that comprises numerous data centers with hundreds of thousands of computing and storage devices distributed around the world, allowing machine learning problems with terabyte-scale or petabyte-scale data sets and correspondingly large compute requirements to be addressed in a relatively transparent fashion while still ensuring high levels of isolation and security for sensitive data. Pre-existing services of the provider network, such as storage services that support arbitrarily large data objects accessible via web service interfaces, database services, virtual computing services, parallel-computing services, high-performance computing services, load-balancing services, and the like may be used for various machine learning tasks in at least some embodiments. For MLS clients that have high availability and data durability requirements, machine learning data (e.g., raw input data, transformed/manipulated input data, intermediate results, or final results) and/or models may be replicated across different geographical locations or availability containers as described below. To meet an MLS client's data security needs, selected data sets, models or code implementing user-defined functions or third-party functions may be restricted to security containers defined by the provider network in some embodiments, in which for example the client's machine learning tasks are executed in an isolated, single-tenant fashion instead of the multi-tenant approach that may typically be used for some of the provider network's services. The term "MLS control plane" may be used herein to refer to a collection of hardware and/or software entities that are responsible for implementing various types of machine learning functionality on behalf of clients of the MLS, and for administrative tasks not necessarily visible to external MLS clients, such as ensuring that an adequate set of resources is provisioned to meet client demands, detecting and recovering from failures, generating bills, and so on. The term "MLS data plane" may refer to the pathways and resources used for the processing, transfer, and storage of the input data used for client-requested operations, as well as the processing, transfer and storage of output data produced as a result of client-requested operations.

According to some embodiments, a number of different types of entities related to machine learning tasks may be generated, modified, read, executed, and/or queried/searched via MLS programmatic interfaces. Supported entity types in one embodiment may include, among others, data sources (e.g., descriptors of locations or objects from which input records for machine learning can be obtained), sets of statistics generated by analyzing the input data, recipes (e.g., descriptors of feature processing transformations to be applied to input data for training models), processing plans (e.g., templates for executing various machine learning tasks), models (which may also be referred to as predictors), parameter sets to be used for recipes and/or models, model execution results such as predictions or evaluations, online access points for models that are to be used on streaming or real-time data, and/or aliases (e.g., pointers to model versions that have been "published" for use as described below). Instances of these entity types may be referred to as machine learning artifacts herein—for example, a specific recipe or a specific model may each be considered an artifact. Each of the entity types is discussed in further detail below.

The MLS programmatic interfaces may enable users to submit respective requests for several related tasks of a given machine learning workflow, such as tasks for extracting records from data sources, generating statistics on the records, feature processing, model training, prediction, and so on. A given invocation of a programmatic interface (such as an API) may correspond to a request for one or more operations or tasks on one or more instances of a supported type of entity. Some tasks (and the corresponding APIs) may involve multiple different entity types—e.g., an API requesting a creation of a data source may result in the generation of a data source entity instance as well as a statistics entity instance. Some of the tasks of a given workflow may be dependent on the results of other tasks. Depending on the amount of data, and/or on the nature of the processing to be performed, some tasks may take hours or even days to complete. In at least some embodiments, an asynchronous approach may be taken to scheduling the tasks, in which MLS clients can submit additional tasks that depend on the output of earlier-submitted tasks without waiting for the earlier-submitted tasks to complete. For example, a client may submit respective requests for tasks T2 and T3 before an earlier-submitted task T1 completes, even though the execution of T2 depends at least partly on the results of T1, and the execution of T3 depends at least partly on the results of T2. In such embodiments, the MLS may take care of ensuring that a given task is scheduled for execution only when its dependencies (if any dependencies exist) have been met.

A queue or collection of job objects may be used for storing internal representations of requested tasks in some implementations. The term "task", as used herein, refers to a set of logical operations corresponding to a given request from a client, while the term "job" refers to the internal representation of a task within the MLS. In some embodiments, a given job object may represent the operations to be performed as a result of a client's invocation of a particular programmatic interface, as well as dependencies on other jobs. The MLS may be responsible for ensuring that the dependencies of a given job have been met before the corresponding operations are initiated. The MLS may also be responsible in such embodiments for generating a processing plan for each job, identifying the appropriate set of resources (e.g., CPUs/cores, storage or memory) for the plan, scheduling the execution of the plan, gathering results, providing/saving the results in an appropriate destination, and at least in some cases for providing status updates or responses to the requesting clients. The MLS may also be responsible in some embodiments for ensuring that the execution of one client's jobs do not affect or interfere with the execution of other clients' jobs. In some embodiments, partial dependencies among tasks may be supported—e.g., in a sequence of tasks (T1, T2, T3), T2 may depend on partial completion of T1, and T2 may therefore be scheduled before T1 completes. For example, T1 may comprise two phases or passes P1 and P2 of statistics calculations, and T2 may be able to proceed as soon as phase P1 is completed, without waiting for phase P2 to complete. Partial results of T1 (e.g., at least some statistics computed during phase P1) may be provided to the requesting client as soon as they become available in some cases, instead of waiting for the entire task to be completed. A single shared queue that includes jobs corresponding to requests from a plurality of clients of the MLS may be used in some implementations, while in other implementations respective queues may be used for different clients. In some implementations, lists or other data structures that can be used to model object collections may be used as containers of to-be-scheduled jobs instead of or in addition to queues. In some embodiments, a single API request from a client may lead to the generation of several different job objects by the MLS. In at least one embodiment, not all client API requests may be implemented using jobs—e.g., a relatively short or lightweight task may be performed synchronously with respect to the corresponding request, without incurring the overhead of job creation and asynchronous job scheduling.

The APIs implemented by the MLS may in some embodiments allow clients to submit requests to create, query the attributes of, read, update/modify, search, or delete an instance of at least some of the various entity types supported. For example, for the entity type "DataSource", respective APIs similar to "createDataSource", "describeDataSource" (to obtain the values of attributes of the data source), "updateDataSource", "searchForDataSource", and "deleteDataSource" may be supported by the MLS. A similar set of APIs may be supported for recipes, models, and so on. Some entity types may also have APIs for executing or running the entities, such as "executeModel" or "executeRecipe" in various embodiments. The APIs may be designed to be largely easy to learn and self-documenting (e.g., such that the correct way to use a given API is obvious to non-experts), with an emphasis on making it simple to perform the most common tasks without making it too hard to perform more complex tasks. In at least some embodiments multiple versions of the APIs may be supported: e.g., one version for a wire protocol (at the application level of a networking stack), another version as a Java™ library or SDK (software development kit), another version as a Python library, and so on. API requests may be submitted by clients using HTTP (Hypertext Transfer Protocol), HTTPS (secure HTTP), Javascript, XML, or the like in various implementations.

In some embodiments, some machine learning models may be created and trained, e.g., by a group of model developers or data scientists using the MLS APIs, and then published for use by another community of users. In order to facilitate publishing of models for use by a wider audience than just the creators of the model, while preventing potentially unsuitable modifications to the models by unskilled members of the wider audience, the "alias" entity type may be supported in such embodiments. In one embodiment, an alias may comprise an immutable name (e.g., "SentimentAnalysisModel1") and a pointer to a model that has already been created and stored in an MLS artifact repository (e.g., "samModel-23adf-2013-12-13-08-06-01", an internal identifier generated for the model by the MLS). Different sets of permissions on aliases may be granted to model developers than are granted to the users to whom the aliases are being made available for execution. For example, in one implementation, members of a business analyst group may be allowed to run the model using its alias name, but may not be allowed to change the pointer, while model developers may be allowed to modify the pointer and/or modify the underlying model. For the business analysts, the machine learning model exposed via the alias may represent a "black box" tool, already validated by experts, which is expected to provide useful predictions for various input data sets. The business analysts may not be particularly concerned about the internal working of such a model. The model developers may continue to experiment with various algorithms, parameters and/or input data sets to obtain improved versions of the underlying model, and may be able to change the pointer to point to an enhanced version to improve the quality of predictions obtained by the business analysts. In at least some embodiments, to isolate alias users from changes to the underlying models, the MLS may guarantee that (a) an alias can only point to a model that has been successfully trained and (b) when an alias pointer is changed, both the original model and the new model (i.e., the respective models being pointed to by the old pointer and the new pointer) consume the same type of input and provide the same type of prediction (e.g., binary classification, multi-class classification or regression). In some implementations, a given model may itself be designated as un-modifiable if an alias is created for it—e.g., the model referred to by the pointer "samModel-23adf-2013-12-13-08-06-01" may no longer be modified even by its developers after the alias is created in such an implementation. Such clean separation of roles and capabilities with respect to model development and use may allow larger audiences within a business organization to benefit from machine learning models than simply those skilled enough to develop the models.

A number of choices may be available with respect to the manner in which the operations corresponding to a given job are mapped to MLS servers. For example, it may be possible to partition the work required for a given job among many different servers to achieve better performance. As part of developing the processing plan for a job, the MLS may select a workload distribution strategy for the job in some embodiments. The parameters determined for workload distribution in various embodiments may differ based on the nature of the job. Such factors may include, for example, (a) determining a number of passes of processing, (b) determining a parallelization level (e.g., the number of "mappers" and "reducers" in the case of a job that is to be implemented using the Map-Reduce technique), (c) determining a convergence criterion to be used to terminate the job, (d) determining a target durability level for intermediate data produced during the job, or (e) determining a resource capacity limit for the job (e.g., a maximum number of servers that can be assigned to the job based on the number of servers available in MLS server pools, or on the client's budget limit). After the workload strategy is selected, the actual set of resources to be used may be identified in accordance with the strategy, and the job's operations may be scheduled on the identified resources. In some embodiments, a pool of compute servers and/or storage servers may be pre-configured for the MLS, and the resources for a given job may be selected from such a pool. In other embodiments, the resources may be selected from a pool assigned to the client on whose behalf the job is to be executed—e.g., the client may acquire resources from a computing service of the provider network prior to submitting API requests, and may provide an indication of the acquired resources to the MLS for job scheduling. If client-provided code (e.g., code that has not necessarily been thoroughly tested by the MLS, and/or is not included in the MLS's libraries) is being used for a given job, in some embodiments the client may be required to acquire the resources to be used for the job, so that any side effects of running the client-provided code may be restricted to the client's own resources instead of potentially affecting other clients.

Example System Environments

FIG. 1 illustrates an example system environment in which various components of a machine learning service (MLS) may be implemented, according to at least some embodiments. In system 100, the MLS may implement a set of programmatic interfaces 161 (e.g., APIs, command-line tools, web pages, or standalone GUIs) that can be used by clients 164 (e.g., hardware or software entities owned by or assigned to customers of the MLS) to submit requests 111 for a variety of machine learning tasks or operations. The administrative or control plane portion of the MLS may include MLS request handler 180, which accepts the client requests 111 and inserts corresponding job objects into MLS job queue 142, as indicated by arrow 112. In general, the control plane of the MLS may comprise a plurality of components (including the request handler, workload distribution strategy selectors, one or more job schedulers, metrics collectors, and modules that act as interfaces with other services) which may also be referred to collectively as the MLS manager. The data plane of the MLS may include, for example, at least a subset of the servers of pool(s) 185, storage devices that are used to store input data sets, intermediate results or final results (some of which may be part of the MLS artifact repository), and the network pathways used for transferring client input data and results.

As mentioned earlier, each job object may indicate one or more operations that are to be performed as a result of the invocation of a programmatic interface 161, and the scheduling of a given job may in some cases depend upon the successful completion of at least a subset of the operations of an earlier-generated job. In at least some implementations, job queue 142 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 111, the next job whose dependency requirements have been met may be removed from job queue 142 in the depicted embodiment, as indicated by arrow 113, and a processing plan comprising a workload distribution strategy may be identified for it. The workload distribution strategy layer 175, which may also be a component of the MLS control plane as mentioned earlier, may determine the manner in which the lower level operations of the job are to be distributed among one or more compute servers (e.g., servers selected from pool 185), and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs may be stored as MLS artifacts within repository 120 in some embodiments, as indicated by arrow 142.

In at least one embodiment, some relatively simple types of client requests 111 may result in the immediate generation, retrieval, storage, or modification of corresponding artifacts within MLS artifact repository 120 by the MLS request handler 180 (as indicated by arrow 141). Thus, the insertion of a job object in job queue 142 may not be required for all types of client requests. For example, a creation or removal of an alias for an existing model may not require the creation of a new job in such embodiments. In the embodiment shown in FIG. 1, clients 164 may be able to view at least a subset of the artifacts stored in repository 120, e.g., by issuing read requests 118 via programmatic interfaces 161.

A client request 111 may indicate one or more parameters that may be used by the MLS to perform the operations, such as a data source definition 150, a feature processing transformation recipe 152, or parameters 154 to be used for a particular machine learning algorithm. In some embodiments, artifacts respectively representing the parameters may also be stored in repository 120. Some machine learning workflows, which may correspond to a sequence of API requests from a client 164, may include the extraction and cleansing of input data records from raw data repositories 130 (e.g., repositories indicated in data source definitions 150) by input record handlers 160 of the MLS, as indicated by arrow 114. This first portion of the workflow may be initiated in response to a particular API invocation from a client 164, and may be executed using a first set of resources from pool 185. The input record handlers may, for example, perform such tasks as splitting the data records, sampling the data records, and so on, in accordance with a set of functions defined in an I/O (input/output) library of the MLS. The input data may comprise data records that include variables of any of a variety of data types, such as, for example text, a numeric data type (e.g., real or integer), Boolean, a binary data type, a categorical data type, an image processing data type, an audio processing data type, a bioinformatics data type, a structured data type such as a data type compliant with the Unstructured Information Management Architecture (UIMA), and so on. In at least some embodiments, the input data reaching the MLS may be encrypted or compressed, and the MLS input data handling machinery may have to perform decryption or decompression before the input data records can be used for machine learning tasks. In some embodiments in which encryption is used, MLS clients may have to provide decryption metadata (e.g., keys, passwords, or other credentials) to the MLS to allow the MLS to decrypt data records. Similarly, an indication of the compression technique used may be provided by the clients in some implementations to enable the MLS to decompress the input data records appropriately. The output produced by the input record handlers may be fed to feature processors 162 (as indicated by arrow 115), where a set of transformation operations may be performed 162 in accordance with recipes 152 using another set of resources from pool 185. Any of a variety of feature processing approaches may be used depending on the problem domain: e.g., the recipes typically used for computer vision problems may differ from those used for voice recognition problems, natural language processing, and so on. The output 116 of the feature processing transformations may in turn be used as input for a selected machine learning algorithm 166, which may be executed in accordance with algorithm parameters 154 using yet another set of resources from pool 185. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS. In some embodiments, some of the intermediate results (e.g., summarized statistics produced by the input record handlers) of a machine learning workflow may be stored in MLS artifact repository 120.

In the embodiment depicted in FIG. 1, the MLS may maintain knowledge base 122 containing information on best practices for various machine learning tasks. Entries may be added into the best practices KB 122 by various control-plane components of the MLS, e.g., based on metrics collected from server pools 185, feedback provided by clients 164, and so on. Clients 164 may be able to search for and retrieve KB entries via programmatic interfaces 161, as indicated by arrow 117, and may use the information contained in the entries to select parameters (such as specific recipes or algorithms to be used) for their request submissions. In at least some embodiments, new APIs may be implemented (or default values for API parameters may be selected) by the MLS on the basis of best practices identified over time for various types of machine learning practices.

Figure 2:
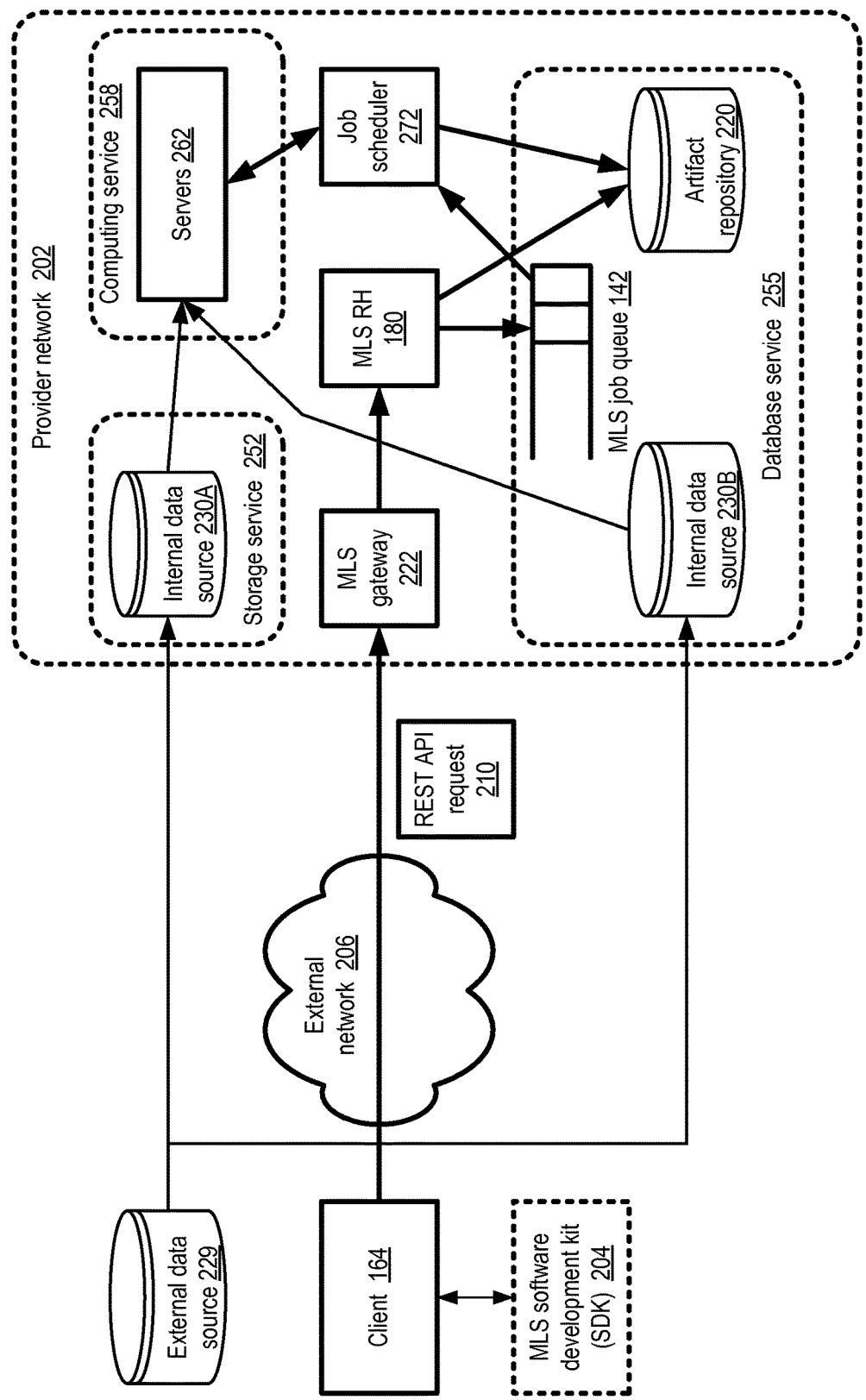
FIG. 2 illustrates an example of a machine learning service implemented using a plurality of network-accessible services of a provider network, according to at least some embodiments.

FIG. 2 illustrates an example of a machine learning service implemented using a plurality of network-accessible services of a provider network, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. A given provider network may include numerous data centers hosting various resource pools, such as collections of physical and/or virtualized computer servers, storage devices, networking equipment and the like, needed to implement, configure and distribute the infrastructure and services offered by the provider. At least some provider networks and the corresponding network-accessible services may be referred to as "public clouds" and "public cloud services" respectively. Within large provider networks, some data centers may be located in different cities, states or countries than others, and in some embodiments the resources allocated to a given service such as the MLS may be distributed among several such locations to achieve desired levels of availability, fault-resilience and performance, as described below in greater detail with reference to FIG. 3.

In the embodiment shown in FIG. 2, the MLS utilizes storage service 202, computing service 258, and database service 255 of provider network 202. At least some of these services may also be used concurrently by other customers (e.g., other services implemented at the provider network, and/or external customers outside the provider network) in the depicted embodiment, i.e., the services may not be restricted to MLS use. MLS gateway 222 may be established to receive client requests 210 submitted over external network 206 (such as portions of the Internet) by clients 164. MLS gateway 222 may, for example, be configured with a set of publicly accessible IP (Internet Protocol) addresses that can be used to access the MLS. The client requests may be formatted in accordance with a representational state transfer (REST) API implemented by the MLS in some embodiments. In one embodiment, MLS customers may be provided an SDK (software development kit) 204 for local installation at client computing devices, and the requests 210 may be submitted from within programs written in conformance with the SDK. A client may also or instead access MLS functions from a compute server 262 of computing service 262 that has been allocated to the client in various embodiments.

Storage service 252 may, for example, implement a web services interface that can be used to create and manipulate unstructured data objects of arbitrary size. Database service 255 may implement either relational or non-relational databases. The storage service 252 and/or the database service 255 may play a variety of roles with respect to the MLS in the depicted embodiment. The MLS may require clients 164 to define data sources within the provider network boundary for their machine learning tasks in some embodiments. In such a scenario, clients may first transfer data from external data sources 229 into internal data sources within the provider network, such as internal data source 230A managed by storage service 252, or internal data source 230B managed by database service 255. In some cases, the clients of the MLS may already be using the provider network services for other applications, and some of the output of those applications (e.g., web server logs or video files), saved at the storage service 252 or the database service 255, may serve as the data sources for MLS workflows.

In response to at least some client requests 210, the MLS request handler 180 may generate and store corresponding job objects within a job queue 142, as discussed above. In the embodiment depicted in FIG. 2, the job queue 142 may itself be represented by a database object (e.g., a table) stored at database service 255. A job scheduler 272 may retrieve a job from queue 142, e.g., after checking that the job's dependency requirements have been met, and identify one or more servers 262 from computing service 258 to execute the job's computational operations. Input data for the computations may be read from the internal or external data sources by the servers 262. The MLS artifact repository 220 may be implemented within the database service 255 (and/or within the storage service 252) in various embodiments. In some embodiments, intermediate or final results of various machine learning tasks may also be stored within the storage service 252 and/or the database service 255.

Other services of the provider network, e.g., including load balancing services, parallel computing services, automated scaling services, and/or identity management services, may also be used by the MLS in some embodiments. A load balancing service may, for example, be used to automatically distribute computational load among a set of servers 262. A parallel computing service that implements the Map-reduce programming model may be used for some types of machine learning tasks. Automated scaling services may be used to add or remove servers assigned to a particular long-lasting machine learning task. Authorization and authentication of client requests may be performed with the help of an identity management service of the provider network in some embodiments.

In some embodiments a provider network may be organized into a plurality of geographical regions, and each region may include one or more availability containers, which may also be termed "availability zones". An availability container in turn may comprise portions or all of one or more distinct physical premises or data centers, engineered in such a way (e.g., with independent infrastructure components such as power-related equipment, cooling equipment, and/or physical security components) that the resources in a given availability container are insulated from failures in other availability containers. A failure in one availability container may not be expected to result in a failure in any other availability container; thus, the availability profile of a given physical host or server is intended to be independent of the availability profile of other hosts or servers in a different availability container.

In addition to their distribution among different availability containers, provider network resources may also be partitioned into distinct security containers in some embodiments. For example, while in general various types of servers of the provider network may be shared among different customers' applications, some resources may be restricted for use by a single customer. A security policy may be defined to ensure that specified group of resources (which may include resources managed by several different provider network services, such as a computing service, a storage service, or a database service, for example) are only used by a specified customer or a specified set of clients. Such a group of resources may be referred to as "security containers" or "security groups" herein.

Figure 3:
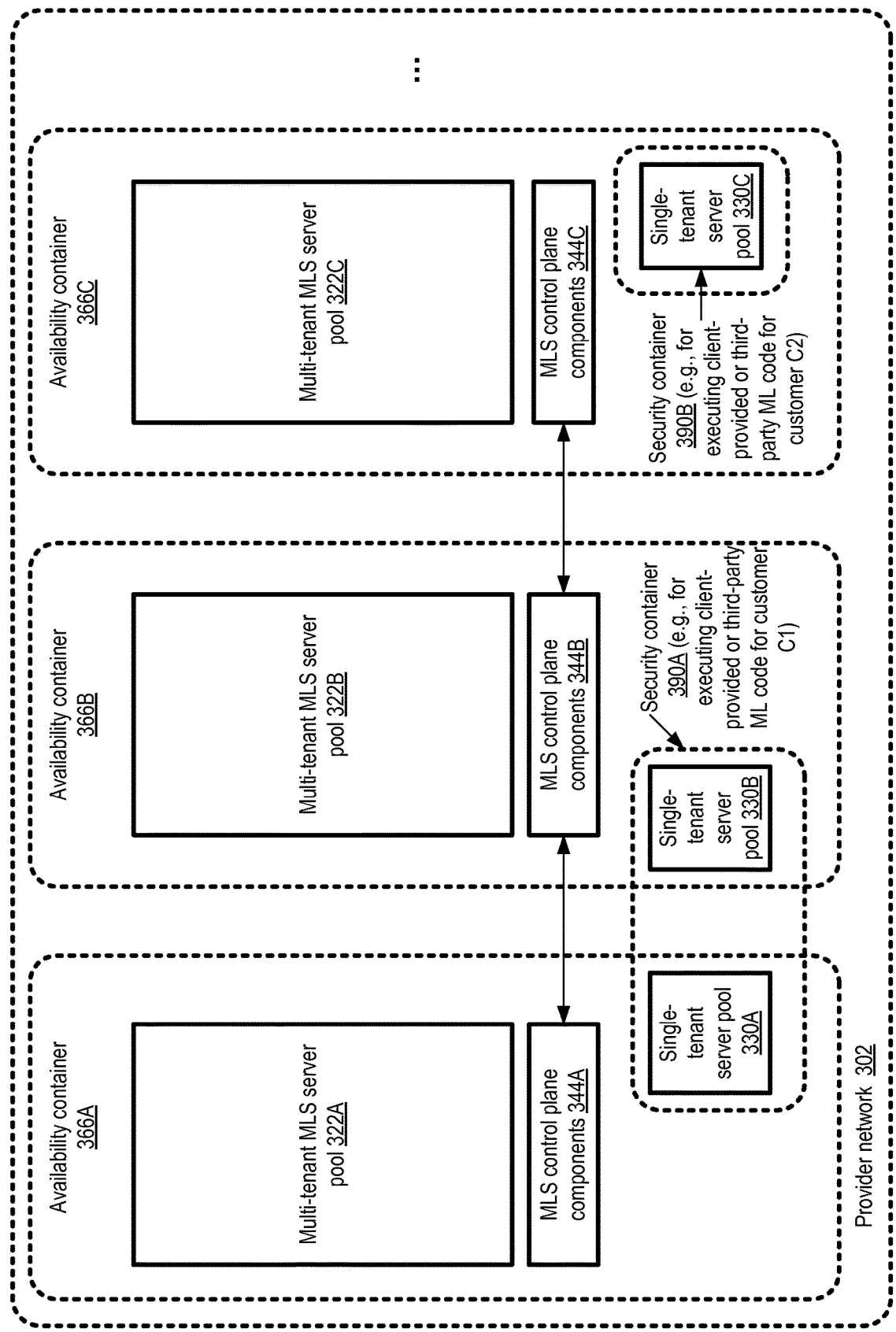
FIG. 3 illustrates an example of the use of a plurality of availability containers and security containers of a provider network for a machine learning service, according to at least some embodiments.

FIG. 3 illustrates an example of the use of a plurality of availability containers and security containers of a provider network for a machine learning service, according to at least some embodiments. In the depicted embodiment, provider network 302 comprises availability containers 366A, 366B and 366C, each of which may comprise portions or all of one or more data centers. Each availability container 366 has its own set of MLS control-plane components 344: e.g., control plane components 344A-344C in availability containers 366A-366C respectively. The control plane components in a given availability container may include, for example, an instance of an MLS request handler, one or more MLS job queues, a job scheduler, workload distribution components, and so on. The control plane components in different availability containers may communicate with each other as needed, e.g., to coordinate tasks that utilize resources at more than one data center. Each availability container 366 has a respective pool 322 (e.g., 322A-322C) of MLS servers to be used in a multi-tenant fashion. The servers of the pools 322 may each be used to perform a variety of MLS operations, potentially for different MLS clients concurrently. In contrast, for executing MLS tasks that require a higher level of security or isolation, single-tenant server pools that are designated for only a single client's workload may be used, such as single tenant server pools 330A, 330B and 330C. Pools 330A and 330B belong to security container 390A, while pool 330C is part of security container 390B. Security container 390A may be used exclusively for a customer C1 (e.g., to run customer-provided machine learning modules, or third-party modules specified by the customer), while security container 390B may be used exclusively for a different customer C2 in the depicted example.

In some embodiments, at least some of the resources used by the MLS may be arranged in redundancy groups that cross availability container boundaries, such that MLS tasks can continue despite a failure that affects MLS resources of a given availability container. For example, in one embodiment, a redundancy group RG1 comprising at least one server S1 in availability container 366A, and at least one server S2 in availability container 366B may be established, such that S1's MLS-related workload may be failed over to S2 (or vice versa). For long-lasting MLS tasks (such as tasks that involve terabyte or petabyte-scale data sets), the state of a given MLS job may be check-pointed to persistent storage (e.g., at a storage service or a database service of the provider network that is also designed to withstand single-availability-container failures) periodically, so that a failover server can resume a partially-completed task from the most recent checkpoint instead of having to start over from the beginning. The storage service and/or the database service of the provider network may inherently provide very high levels of data durability, e.g., using erasure coding or other replication techniques, so the data sets may not necessarily have to be copied in the event of a failure. In some embodiments, clients of the MLS may be able to specify the levels of data durability desired for their input data sets, intermediate data sets, artifacts, and the like, as well as the level of compute server availability desired. The MLS control plane may determine, based on the client requirements, whether resources in multiple availability containers should be used for a given task or a given client. The billing amounts that the clients have to pay for various MLS tasks may be based at least in part on their durability and availability requirements. In some embodiments, some clients may indicate to the MLS control-plane that they only wish to use resources within a given availability container or a given security container. For certain types of tasks, the costs of transmitting data sets and/or results over long distances may be so high, or the time required for the transmissions may so long, that the MLS may restrict the tasks to within a single geographical region of the provider network (or even within a single data center).

Processing Plans

Figure 4:
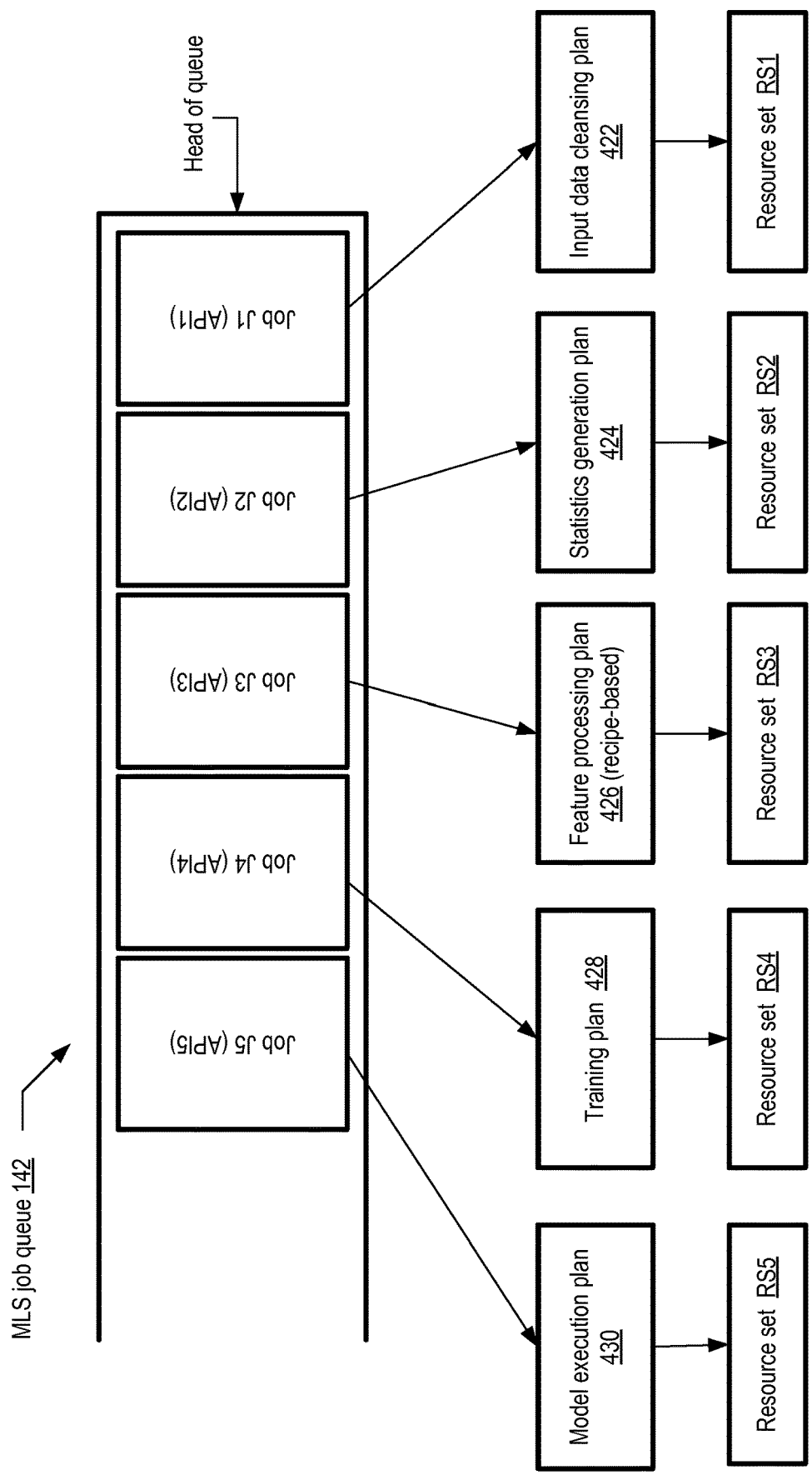
FIG. 4 illustrates examples of a plurality of processing plans and corresponding resource sets that may be generated at a machine learning service, according to at least some embodiments.

As mentioned earlier, the MLS control plane may be responsible for generating processing plans corresponding to each of the job objects generated in response to client requests in at least some embodiments. For each processing plan, a corresponding set of resources may then have to be identified to execute the plan, e.g., based on the workload distribution strategy selected for the plan, the available resources, and so on. FIG. 4 illustrates examples of various types of processing plans and corresponding resource sets that may be generated at a machine learning service, according to at least some embodiments.

In the illustrated scenario, MLS job queue 142 comprises five jobs, each corresponding to the invocation of a respective API by a client. Job J1 (shown at the head of the queue) was created in response to an invocation of API1. Jobs J2 through J5 were created respectively in response to invocations of API2 through API5. Corresponding to job J1, an input data cleansing plan 422 may be generated, and the plan may be executed using resource set RS1. The input data cleansing plan may include operations to read and validate the contents of a specified data source, fill in missing values, identify and discard (or otherwise respond to) input records containing errors, and so on. In some cases the input data may also have to be decompressed, decrypted, or otherwise manipulated before it can be read for cleansing purposes. Corresponding to job J2, a statistics generation plan 424 may be generated, and subsequently executed on resource set RS2. The types of statistics to be generated for each data attribute (e.g., mean, minimum, maximum, standard deviation, quantile binning, and so on for numeric attributes) and the manner in which the statistics are to be generated (e.g., whether all the records generated by the data cleansing plan 422 are to be used for the statistics, or a sub-sample is to be used) may be indicated in the statistics generation plan. The execution of job J2 may be dependent on the completion of job J1 in the depicted embodiment, although the client request that led to the generation of job J2 may have been submitted well before J1 is completed.

A recipe-based feature processing plan 426 corresponding to job J3 (and API3) may be generated, and executed on resource set RS3. Further details regarding the syntax and management of recipes are provided below. Job J4 may result in the generation of a model training plan 428 (which may in turn involve several iterations of training, e.g., with different sets of parameters). The model training may be performed using resource set RS4. Model execution plan 430 may correspond to job J5 (resulting from the client's invocation of API5), and the model may eventually be executed using resource set RS5. In some embodiments, the same set of resources (or an overlapping set of resources) may be used for performing several or all of a client's jobs—e.g., the resource sets RS1-RS5 may not necessarily differ from one another. In at least one embodiment, a client may indicate, e.g., via parameters included in an API call, various elements or properties of a desired processing plan, and the MLS may take such client preferences into account. For example, for a particular statistics generation job, a client may indicate that a randomly-selected sample of 25% of the cleansed input records may be used, and the MLS may generate a statistics generation plan that includes a step of generating a random sample of 25% of the data accordingly. In other cases, the MLS control plane may be given more freedom to decide exactly how a particular job is to be implemented, and it may consult its knowledge base of best practices to select the parameters to be used.

Job Scheduling

Figure 5:
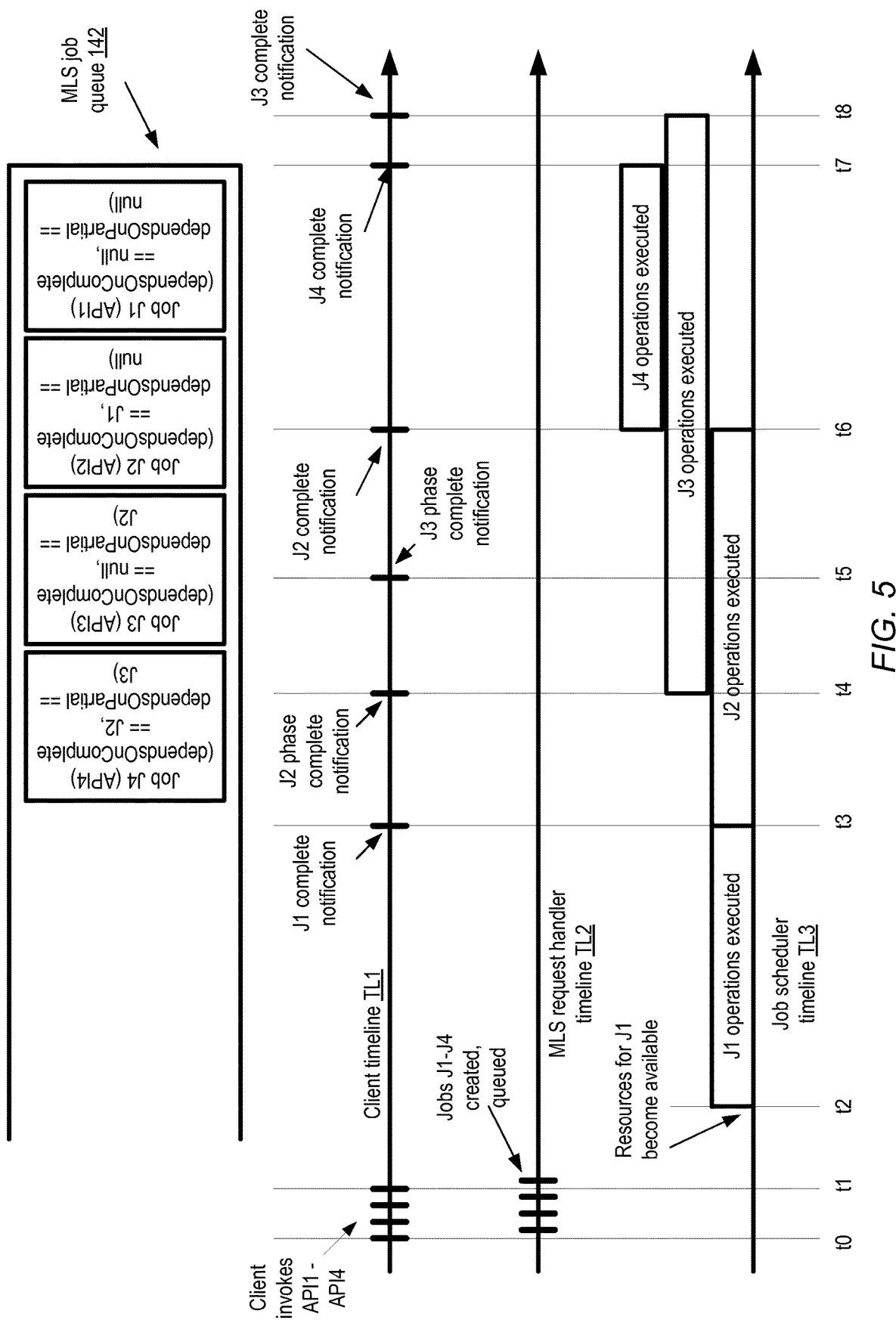
FIG. 5 illustrates an example of asynchronous scheduling of jobs at a machine learning service, according to at least some embodiments.

FIG. 5 illustrates an example of asynchronous scheduling of jobs at a machine learning service, according to at least some embodiments. In the depicted example, a client has invoked four MLS APIs, API1 through API4, and four corresponding job objects J1 through J4 are created and placed in job queue 142. Timelines TL1, TL2, and TL3 show the sequence of events from the perspective of the client that invokes the APIs, the request handler that creates and inserts the jobs in queue 142, and a job scheduler that removes the jobs from the queue and schedules the jobs at selected resources.

In the depicted embodiment, in addition to the base case of no dependency on other jobs, two types of inter-job dependencies may be supported. In one case, termed "completion dependency", the execution of one job Jp cannot be started until another job Jq is completed successfully (e.g., because the final output of Jq is required as input for Jp). Full dependency is indicated in FIG. 5 by the parameter "dependsOnComplete" shown in the job objects—e.g., J2 is dependent on J1 completing execution, and J4 is dependent on J2 completing successfully. In the other type of dependency, the execution of one job Jp may be started as soon as some specified phase of another job Jq is completed. This latter type of dependency may be termed a "partial dependency", and is indicated in FIG. 5 by the "dependsOnPartial" parameter. For example, J3 depends on the partial completion of J2, and J4 depends on the partial completion of J3. It is noted that in some embodiments, to simplify the scheduling, such phase-based dependencies may be handled by splitting a job with N phases into N smaller jobs, thereby converting partial dependencies into full dependencies. J1 has no dependencies of either type in the depicted example.

As indicated on client timeline TL1, API1 through API4 may be invoked within the time period t0 to t1. Even though some of the operations requested by the client depend on the completion of operations corresponding to earlier-invoked APIs, the MLS may allow the client to submit the dependent operation requests much earlier than the processing of the earlier-invoked APIs' jobs in the depicted embodiment. In at least some embodiments, parameters specified by the client in the API calls may indicate the inter job dependencies. For example, in one implementation, in response to API1, the client may be provided with a job identifier for J1, and that job identifier may be included as a parameter in API2 to indicate that the results of API1 are required to perform the operations corresponding to API2. As indicated by the request handler's timeline TL2, the jobs corresponding to each API call may be created and queued shortly after the API is invoked. Thus, all four jobs have been generated and placed within the job queue 142 by a short time after t1.

As shown in the job scheduler timeline TL3, job J1 may be scheduled for execution at time t2. The delay between the insertion of J1 in queue 142 (shortly after t0) and the scheduling of J1 may occur for a number of reasons in the depicted embodiment—e.g., because there may have been other jobs ahead of J1 in the queue 142, or because it takes some time to generate a processing plan for J1 and identify the resources to be used for J1, or because enough resources were not available until t2. J1's execution lasts until t3. In the depicted embodiment, when J1 completes, (a) the client is notified and (b) J2 is scheduled for execution. As indicated by J2's dependsOnComplete parameter value, J2 depends on J1's completion, and J2's execution could therefore not have been begun until t3, even if J2's processing plan were ready and J2's resource set had been available prior to t3.

As indicated by J3's "dependsOnPartial" parameter value, J3 can be started when a specified phase or subset of J2's work is complete in the depicted example. The portion of J2 upon which J3 depends completes at time t4 in the illustrated example, and the execution of J3 therefore begins (in parallel with the execution of the remaining portion of J2) at t4. In the depicted example, the client may be notified at time t4 regarding the partial completion of J2 (e.g., the results of the completed phase of J2 may be provided to the client).

At t5, the portion of J3 on which J4 depends may be complete, and the client may be notified accordingly. However, J4 also depends on the completion of J2, so J4 cannot be started until J2 completes at t6. J3 continues execution until t8. J4 completes at t7, earlier than t8. The client is notified regarding the completion of each of the jobs corresponding to the respective API invocations API1-API4 in the depicted example scenario. In some embodiments, partial dependencies between jobs may not be supported—instead, as mentioned earlier, in some cases such dependencies may be converted into full dependencies by splitting multi-phase jobs into smaller jobs. In at least one implementation, instead of or in addition to being notified when the jobs corresponding to the API invocations are complete (or when phases of the jobs are complete), clients may be able to submit queries to the MLS to determine the status (or the extent of completion) of the operations corresponding to various API calls. For example, an MLS job monitoring web page may be implemented, enabling clients to view the progress of their requests (e.g., via a "percent complete" indicator for each job), expected completion times, and so on. In some embodiments, a polling mechanism may be used by clients to determine the progress or completion of the jobs.

MLS Artifacts

Figure 6:
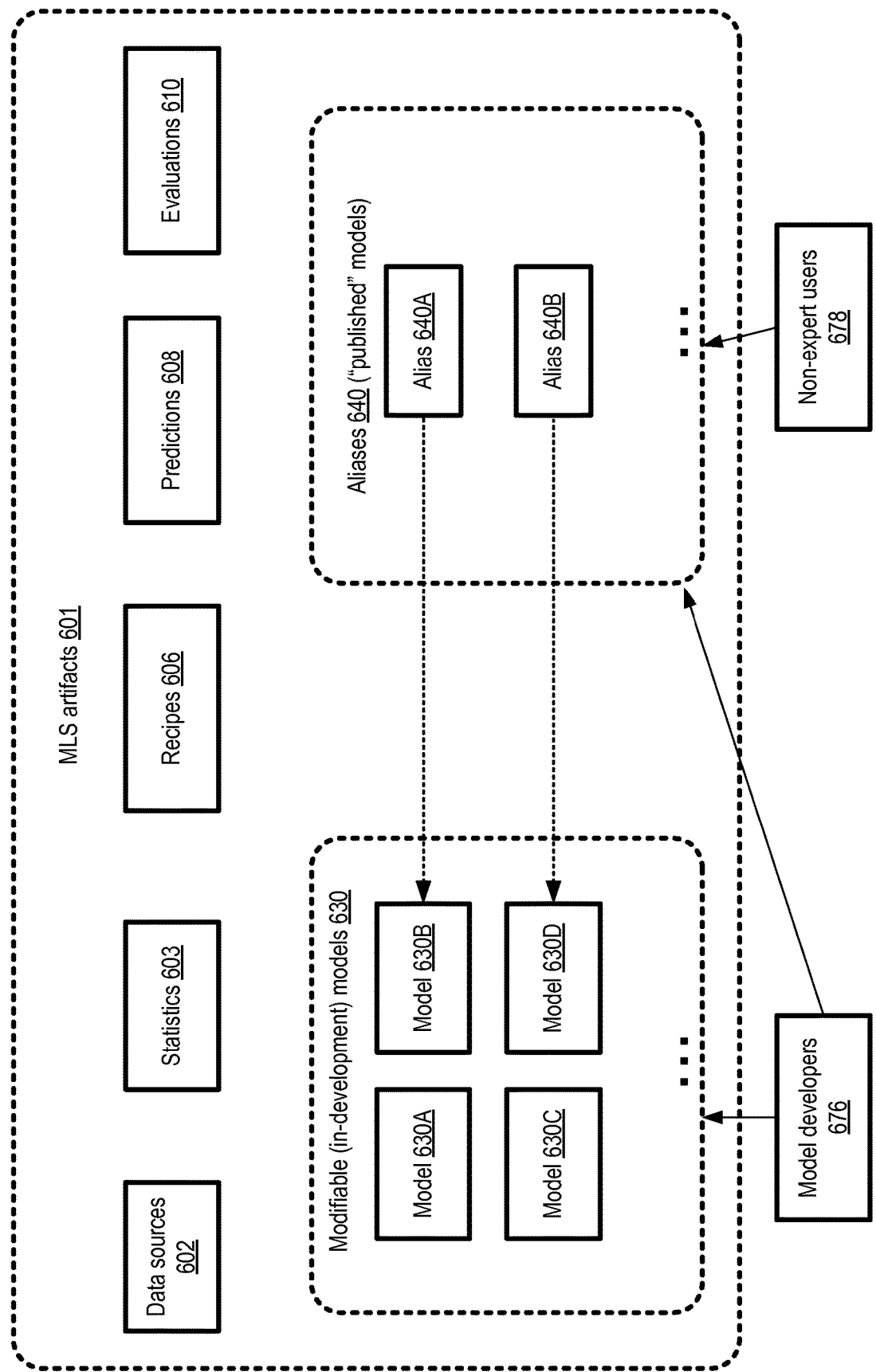
FIG. 6 illustrates example artifacts that may be generated and stored using a machine learning service, according to at least some embodiments.

FIG. 6 illustrates example artifacts that may be generated and stored using a machine learning service, according to at least some embodiments. In general, MLS artifacts may comprise any of the objects that may be stored in a persistent manner as a result of an invocation of an MLS programmatic interface. In some implementations, some API parameters (e.g., text versions of recipes) that are passed to the MLS may be stored as artifacts. As shown, in the depicted embodiment, MLS artifacts 601 may include, among others, data sources 602, statistics 603, feature processing recipes 606, model predictions 608, evaluations 610, modifiable or in-development models 630, and published models or aliases 640. In some implementations the MLS may generate a respective unique identifier for each instance of at least some of the types of artifacts shown and provide the identifiers to the clients. The identifiers may subsequently be used by clients to refer to the artifact (e.g., in subsequent API calls, in status queries, and so on).

A client request to create a data source artifact 602 may include, for example, an indication of an address or location from which data records can be read, and some indication of the format or schema of the data records. For example, an indication of a source URI (universal resource identifier) to which HTTP GET requests can be directed to retrieve the data records, an address of a storage object at a provider network storage service, or a database table identifier may be provided. The format (e.g., the sequence and types of the fields or columns of the data records) may be indicated in some implementations via a separate comma separated variable (csv) file. In some embodiments, the MLS may be able to deduce at least part of the address and/or format information needed to create the data source artifact—e.g., based on the client's identifier, it may be possible to infer the root directory or root URI of the client's data source, and based on an analysis of the first few records, it may be possible to deduce at least the data types of the columns of the schema. In some embodiments, the client request to create a data source may also include a request to re-arrange the raw input data, e.g., by sampling or splitting the data records using an I/O library of the MLS. When requesting a creation of a data source, in some implementations clients may also be required to provide security credentials that can be used by the MLS to access the data records.

Figure 7:
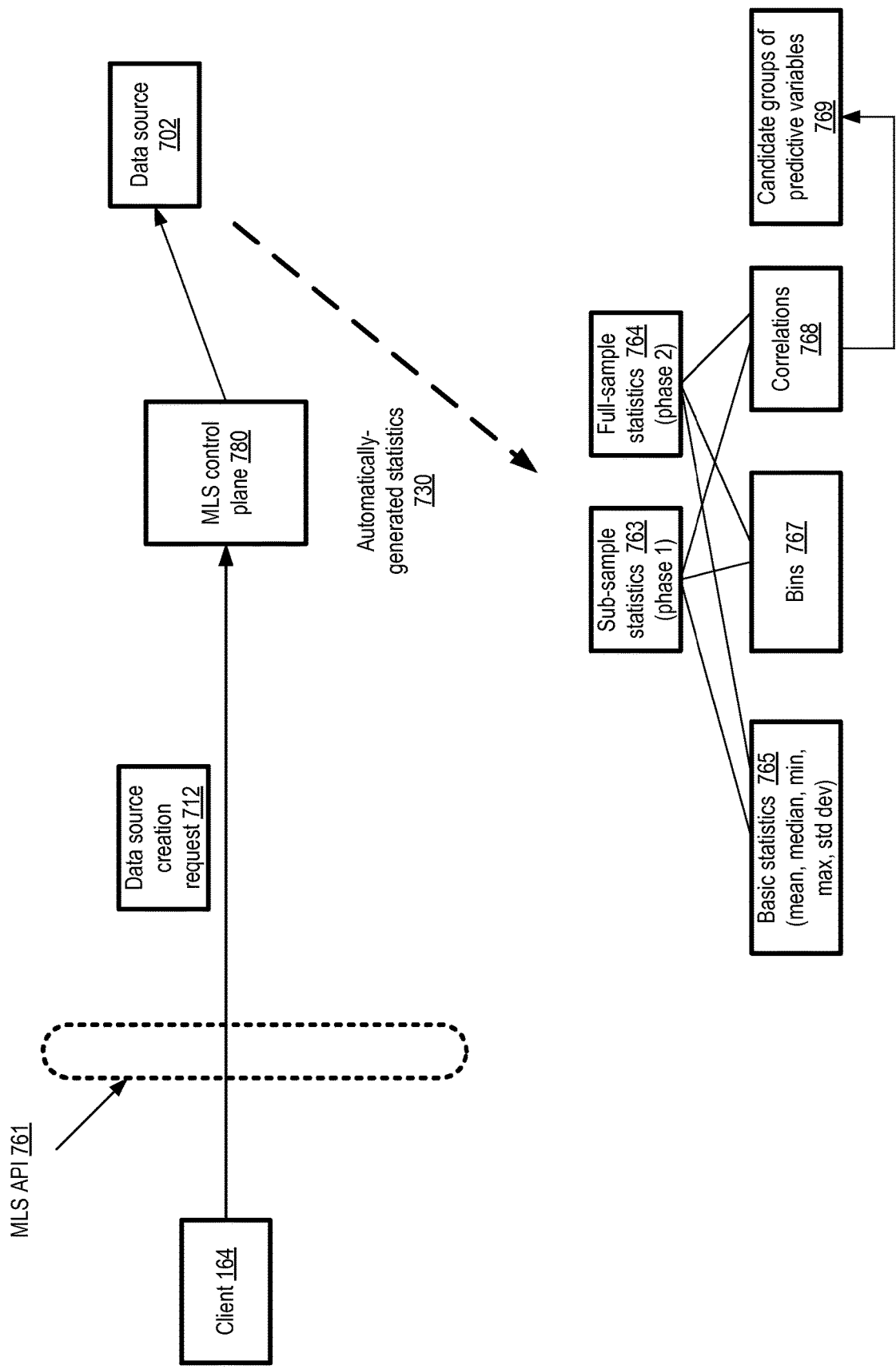
FIG. 7 illustrates an example of automated generation of statistics in response to a client request to instantiate a data source, according to at least some embodiments.

In some embodiments, as described in further detail below with respect to FIG. 7, at least some statistics 603 may be generated automatically for the data records of a data source. In other embodiments, the MLS may also or instead enable clients to explicitly request the generation of various types of statistics, e.g., via the equivalent of a createStatistics (dataSourceID, statisticsDescriptor) request in which the client indicates the types of statistics to be generated for a specified data source. The types of statistics artifacts that are generated may vary based on the data types of the input record variables—e.g., for numeric variables, the mean, median, minimum, maximum, standard deviation, quantile bins, number of nulls or "not-applicable" values and the like may be generated. Cross-variable statistics such as correlations may also be generated, either automatically or on demand, in at least some embodiments.

Recipes 606 comprising feature processing transformation instructions may be provided by a client (or selected from among a set of available recipes accessible from an MLS recipe collection) in some embodiments. A recipe language allowing clients to define groups of variables, assignments, dependencies upon other artifacts such as models, and transformation outputs may be supported by the MLS in such embodiments, as described below in greater detail. Recipes submitted in text form may be compiled into executable versions and re-used on a variety of data sets in some implementations.

At least two types of artifacts representing machine learning models or predictors may be generated and stored in the depicted embodiment. Often, the process of developing and refining a model may take a long time, as the developer may try to improve the accuracy of the predictions using a variety of data sets and a variety of parameters. Some models may be improved over a number of weeks or months, for example. In such scenarios it may be worthwhile to enable other users (e.g., business analysts) to utilize one version of a model, while model developers continue to generate other, improved versions. Accordingly, the artifacts representing models may belong to one of two categories in some embodiments: modifiable models 630, and published models or aliases 640. An alias may comprise an alias name or identifier, and a pointer to a model (e.g., alias 640A points to model 630B, and alias 640B points to model 630D in the depicted embodiment). As used herein, the phrase "publishing a model" refers to making a particular version of a model executable by a set of users by reference to an alias name or identifier. In some cases, at least some of the users of the set may not be permitted to modify the model or the alias. Non-expert users 678 may be granted read and execute permissions to the aliases, while model developers 676 may also be allowed to modify models 630 (and/or the pointers of the aliases 640) in some embodiments. In some embodiments, a set of guarantees may be provided to alias users: e.g., that the format of the input and output of an alias (and the underlying model referred to by the alias) will not change once the alias is published, and that the model developers have thoroughly tested and validated the underlying model pointed to by the alias. In addition, a number of other logical constraints may be enforced with respect to aliases in such embodiments. For example, if the alias is created for a model used in online mode (model usage modes are described in further detail below with respect to FIG. 8), the MLS may guarantee that the model pointed to remains online (i.e., the model cannot be un-mounted). In some implementations a distinction may be drawn between aliases that are currently in production mode and those that are in internal-use or test mode, and the MLS may ensure that the underlying model is not deleted or un-mounted for an alias in production mode. When creating aliases to online-mode models, a minimum throughput rate of predictions/evaluations may be determined for the alias, and the MLS may ensure that the resources assigned to the model can meet the minimum throughput rate in some embodiments. After model developers 676 improve the accuracy and/or performance characteristics of a newer version of a model 630 relative to an older version for which an alias 640 has been created, they may switch the pointer of the alias so that it now points to the improved version. Thus, non-expert users may not have to change anything in the way that they have been using the aliases, while benefiting from the improvements. In some embodiments, alias users may be able to submit a query to learn when the underlying model was last changed, or may be notified when they request an execution of an alias that the underlying model has been changes since the last execution.

Results of model executions, such as predictions 608 (values predicted by a model for a dependent variable in a scenario in which the actual values of the dependent variable are not known) and model evaluations 610 (measures of the accuracy of a model, computed when the predictions of the model can be compared to known values of dependent variables) may also be stored as artifacts by the MLS in some embodiments. It is noted that in the subsequent description, the terms "dependent variable", "output variable" and "target variable" may be used interchangeably, and the terms "independent variable" and "input variable" may be used interchangeably as well. Although dependent variable values may be assumed to depend upon values of one or more independent variables in at least some types of machine learning techniques, this is not meant to imply that any of the independent variables are necessarily statistically independent of any of the other independent variables. In addition to the artifact types illustrated in FIG. 6, other artifact types may also be supported in some embodiments—e.g., objects representing network endpoints that can be used for real-time model execution on streaming data (as opposed to batch-mode execution on a static set of data) may be stored as artifacts in some embodiments, and client session logs (e.g., recordings of all the interactions between a client and the MLS during a given session) may be stored as artifacts in other embodiments.

In some embodiments, the MLS may support recurring scheduling of related jobs. For example, a client may create an artifact such as a model, and may want that same model to be re-trained and/or re-executed for different input data sets (e.g., using the same configuration of resources for each of the training or prediction iterations) at specified points in time. In some cases the points in time may be specified explicitly (e.g., by the client requesting the equivalent of "re-run model M1 on the currently available data set at data source DS1 at 11:00, 15:00 and 19:00 every day"). In other cases the client may indicate the conditions under which the iterations are to be scheduled (e.g., by the client requesting the equivalent of "re-run model M1 whenever the next set of 1000000 new records becomes available from data source DS1"). A respective job may be placed in the MLS job queue for each recurring training or execution iteration. The MLS may implement a set of programmatic interface enabling such scheduled recurring operations in some embodiments. Using such an interface, a client may specify a set of model/alias/recipe artifacts (or respective versions of the same underling artifact) to be used for each of the iterations, and/or the resource configurations to be used. Such programmatic interfaces may be referred to as "pipelining APIs" in some embodiments. In addition to the artifact types shown in FIG. 6, pipeline artifacts may be stored in the MLS artifact repository in some embodiments, with each instance of a pipeline artifact representing a named set of recurring operations requested via such APIs. In one embodiment, a separately-managed data pipelining service implemented at the provider network may be used in conjunction with the MLS for supporting such recurrent operations.

As mentioned above, in some embodiments, the MLS may automatically generate statistics when a data source is created. FIG. 7 illustrates an example of automated generation of statistics in response to a client request to instantiate a data source, according to at least some embodiments. As shown, a client 764 submits a data source creation request 712 to the MLS control plane 780 via an MLS API 761. The creation request may specify an address or location from which data records can be retrieved, and optionally a schema or format document indicating the columns or fields of the data records.

In response to receiving request 712, the MLS control plane 780 may generate and store a data source artifact 702 in the MLS artifact repository. In addition, and depending in some cases on the current availability of resources at the MLS, the MLS may also initiate the generation of one or more statistics objects 730 in the depicted embodiment, even if the client request did not explicitly request such statistics. Any combination of a number of different types of statistics may be generated automatically in one of two modes in various embodiments. For example, for very large data sets, an initial set of statistics 763 based on a sub-sample (e.g., a randomly-selected subset of the large data set) may be obtained in a first phase, while the generation of full-sample statistics 764 derived from the entire data set may be deferred to a second phase. Such a multi-phase approach towards statistics generation may be implemented, for example, to allow the client to get a rough or approximate summary of the data set values fairly rapidly in the first phase, so that the client may begin planning subsequent machine learning workflow steps without waiting for a statistical analysis of the complete data set.

As shown, a variety of different statistics may be obtained in either phase. For numeric variables, basic statistics 765 may include the mean, median, minimum, maximum, and standard deviation. Numeric variables may also be binned (categorized into a set of ranges such as quartiles or quintiles); such bins 767 may be used for the construction of histograms that may be displayed to the client. Depending on the nature of the distribution of the variable, either linear or logarithmic bin boundaries may be selected. In some embodiments, correlations 768 between different variables may be computed as well. In at least one embodiment, the MLS may utilize the automatically generated statistics (such as the correlation values) to identify candidate groups 769 of variables that may have greater predictive power than others. For example, to avoid over-fitting for certain classes of models, only one variable among a set of variables that correlate very strongly with one another may be recommended as a candidate for input to a model. In such scenarios, the client may be able to avoid the time and effort required to explore the significance of other variables. In many problem domains in which a given data record may have hundreds or even thousands of variables, such an automated selection of candidate variables expected to have greater predictive effectiveness may be very valuable to clients of the MLS.

Figure 8:
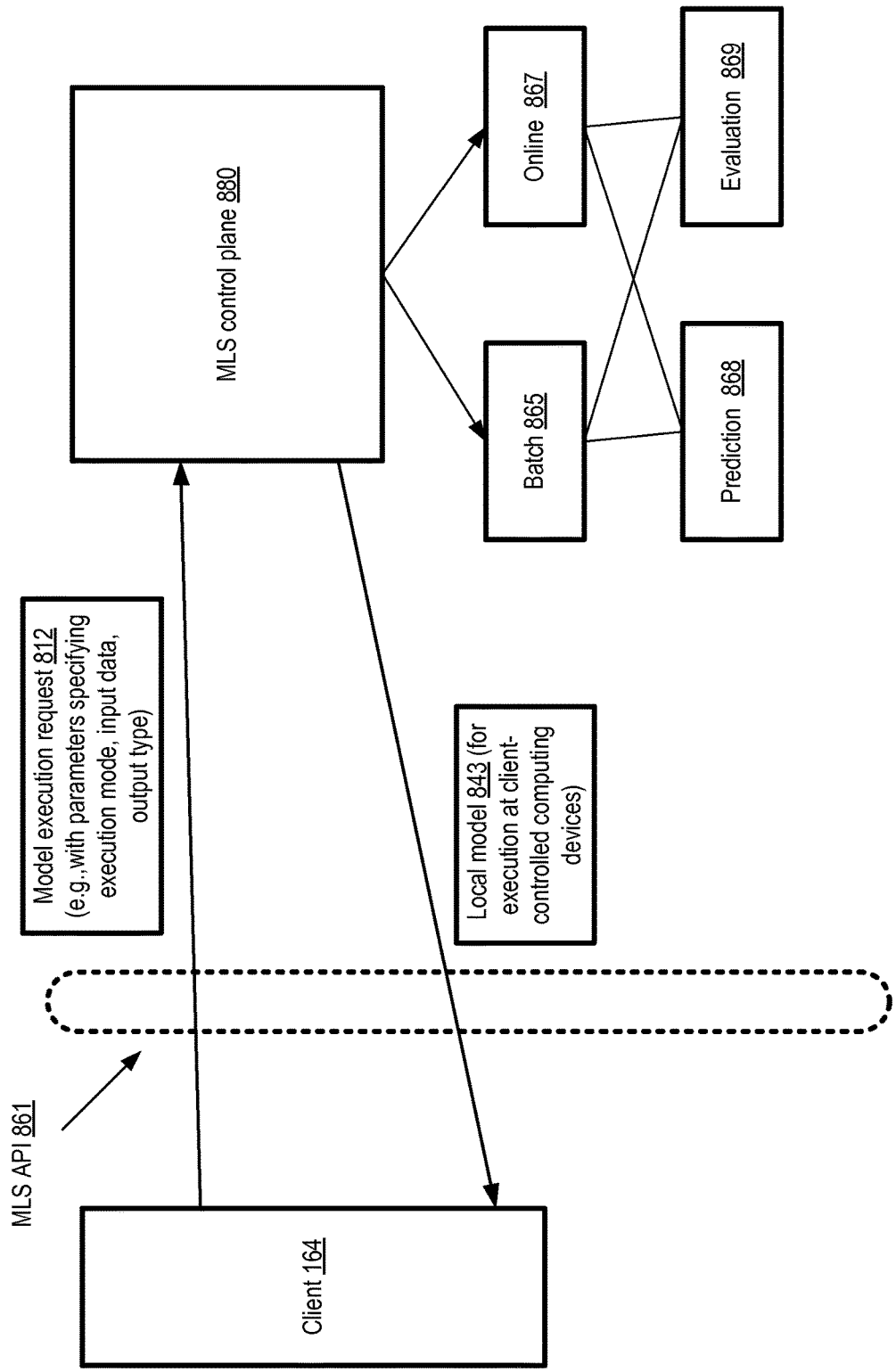
FIG. 8 illustrates several model usage modes that may be supported at a machine learning service, according to at least some embodiments.

FIG. 8 illustrates several model usage modes that may be supported at a machine learning service, according to at least some embodiments. Model usage modes may be broadly classified into three categories: batch mode, online or real-time mode, and local mode. In batch mode, a given model may be run on a static set of data records. In real-time mode, a network endpoint (e.g., an IP address) may be assigned as a destination to which input data records for a specified model are to be submitted, and model predictions may be generated on groups of streaming data records as the records are received. In local mode, clients may receive executable representations of a specified model that has been trained and validated at the MLS, and the clients may run the models on computing devices of their choice (e.g., at devices located in client networks rather than in the provider network where the MLS is implemented).

In the depicted embodiment, a client 164 of the MLS may submit a model execution request 812 to the MLS control plane 180 via a programmatic interface 861. The model execution request may specify the execution mode (batch, online or local), the input data to be used for the model run (which may be produced using a specified data source or recipe in some cases), the type of output (e.g., a prediction or an evaluation) that is desired, and/or optional parameters (such as desired model quality targets, minimum input record group sizes to be used for online predictions, and so on). In response the MLS may generate a plan for model execution and select the appropriate resources to implement the plan. In at least some embodiments, a job object may be generated upon receiving the execution request 812 as described earlier, indicating any dependencies on other jobs (such as the execution of a recipe for feature processing), and the job may be placed in a queue. For batch mode 865, for example, one or more servers may be identified to run the model. For online mode 867, the model may be mounted (e.g., configured with a network address) to which data records may be streamed, and from which results including predictions 868 and/or evaluations 869 can be retrieved. In at least one embodiment, clients may optionally specify expected workload levels for a model that is to be instantiated in online mode, and the set of provider network resources to be deployed for the model may be selected in accordance with the expected workload level. For example, a client may indicate via a parameter of the model execution/creation request that up to 100 prediction requests per day are expected on data sets of 1 million records each, and the servers selected for the model may be chosen to handle the specified request rate. For local mode, the MLS may package up an executable local version 843 of the model (where the details of the type of executable that is to be provided, such as the type of byte code or the hardware architecture on which the model is to be run, may have been specified in the execution request 812) and transmit the local model to the client. In some embodiments, only a subset of the execution modes illustrated may be supported. In some implementations, not all of the combinations of execution modes and output types may be supported—for example, while predictions may be supported for online mode in one implementation, evaluations may not be supported for online mode.

Methods for Implementing MLS Operations

Figure 9B:
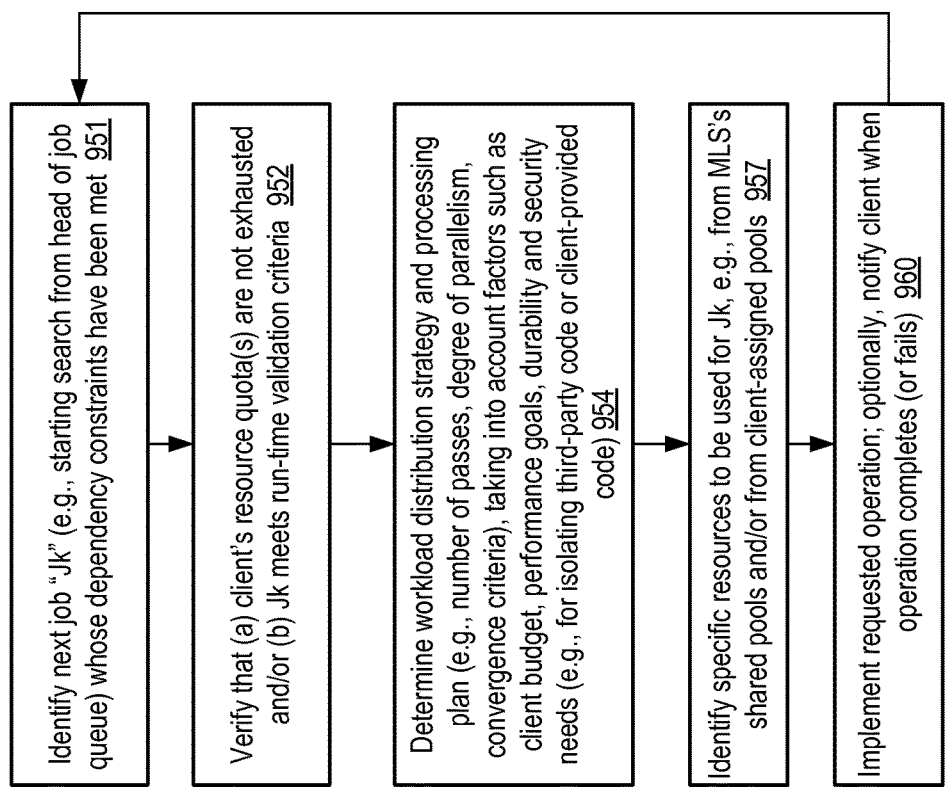
FIGS. 9a and 9b are flow diagrams illustrating aspects of operations that may be performed at a machine learning service that supports asynchronous scheduling of machine learning jobs, according to at least some embodiments.
Figure 9A:
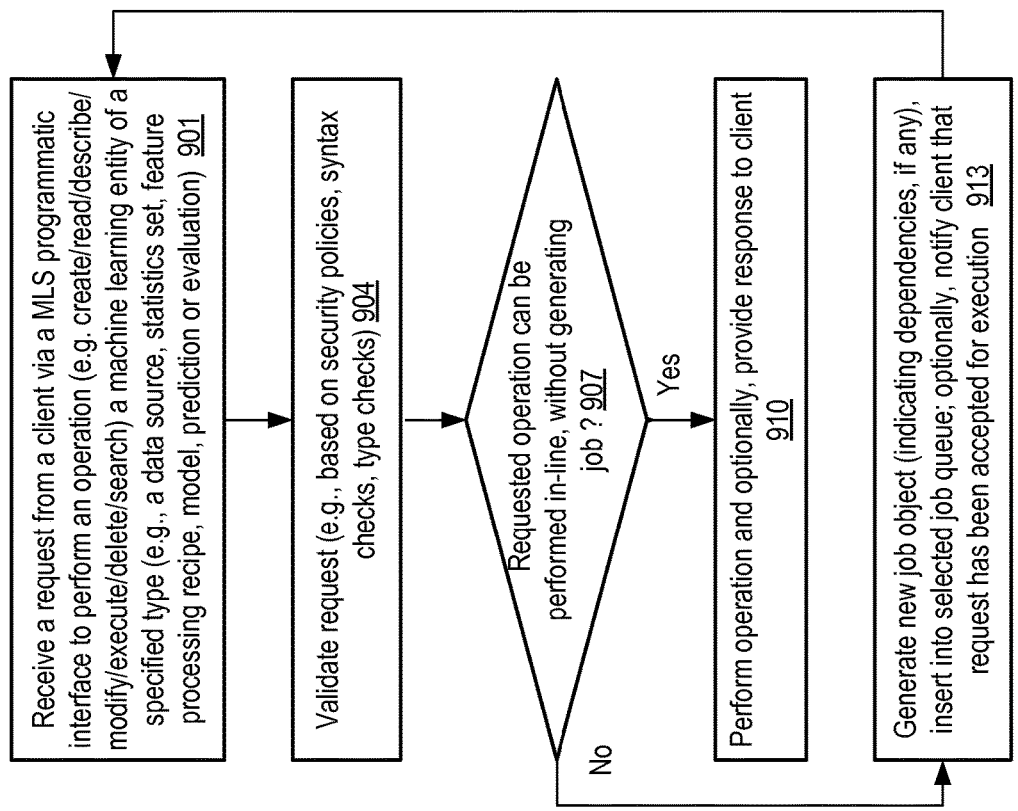

FIGS. 9*a* and 9*b* are flow diagrams illustrating aspects of operations that may be performed at a machine learning service that supports asynchronous scheduling of machine learning jobs, according to at least some embodiments. As shown in element 901 of FIG. 9*a*, the MLS may receive a request from a client via a programmatic interface (such as an API, a command-line tool, a web page, or a custom GUI) to perform a particular operation on an entity belonging to a set of supported entity types of the MLS. The entity types may include, for example, data sources, statistics, feature processing recipes, models, aliases, predictions, and/or evaluations in the depicted embodiment. The operations requested may include, for example, create, read (or describe the attributes of), modify/update attributes, execute, search, or delete operations. Not all the operation types may apply to all the entity types in some embodiments—e.g., it may not be possible to "execute" a data source. In at least some implementations, the request may be encrypted or encapsulated by the client, and the MLS may have to extract the contents of the request using the appropriate keys and/or certificates.

The request may next be validated in accordance with various rules or policies of the MLS (element 904). For example, in accordance with a security policy, the permissions, roles or capabilities granted to the requesting client may be checked to ensure that the client is authorized to have the requested operations performed. The syntax of the request itself, and/or objects such as recipes passed as request parameters may be checked for some types of requests. In some cases, the types of one or more data variables indicated in the request may have to be checked as well.

If the request passes the validation checks, a decision may be made as to whether a job object is to be created for the request. As mentioned earlier, in some cases, the amount of work required may be small enough that the MLS may simply be able to perform the requested operation synchronously or "in-line", instead of creating and inserting a job object into a queue for asynchronous execution (at least in scenarios in which the prerequisites or dependencies of the request have already been met, and sufficient resources are available for the MLS to complete the requested work). If an analysis of the request indicates that a job is required (as detected in element 907), a job object may be generated, indicating the nature of the lower-level operations to be performed at the MLS as well as any dependencies on other jobs, and the job object may be placed in a queue (element 913). In some implementations, the requesting client may be notified that the request has been accepted for execution (e.g., by indicating to the client that a job has been queued for later execution). The client may submit another programmatic request without waiting for the queued job to be completed (or even begun) in some cases. If the job does not have any dependencies that have yet to be met, and meets other criteria for immediate or in-line execution (as also determined in element 907), the requested operation may be performed without creating a job object (element 910) and the results may optionally be provided to the requesting client. Operations corresponding to elements 901-913 may be performed for each request that is received via the MLS programmatic interface. At some point after a particular job Jk is placed in the queue, Jk may be identified (e.g., by a job scheduler component of the MLS control plane) as the next job to be implemented (element 951 of FIG. 9*b*). To identify the next job to be implemented, the scheduler may, for example, start from the head of the queue (the earliest-inserted job that has not yet been executed) and search for jobs whose dependencies (if any are specified) have been met.

In addition to the kinds of validation indicated in element 904 of FIG. 9*a*, the MLS may perform validations at various other stages in some embodiments, e.g., with the general goals of (a) informing clients as soon as possible when a particular request is found to be invalid, and (b) avoiding wastage of MLS resources on requests that are unlikely to succeed. As shown in element 952 of FIG. 9*b*, one or more types of validation checks may be performed on the job Jk identified in element 951. For example, in one embodiment each client may have a quota or limit on the resources that can be applied to their jobs (such as a maximum number of servers that can be used concurrently for all of a given customer's jobs, or for any given job of the customer). In some implementations respective quotas may be set for each of several different resource types—e.g., CPUs/cores, memory, disk, network bandwidth and the like. In such scenarios, the job scheduler may be responsible for verifying that the quota or quotas of the client on whose behalf the job Jk is to be run have not been exhausted. If a quota has been exhausted, the job's execution may be deferred until at least some of the client's resources are released (e.g., as a result of a completion of other jobs performed on the same client's behalf). Such constraint limits may be helpful in limiting the ability of any given client to monopolize shared MLS resources, and also in minimizing the negative consequences of inadvertent errors or malicious code. In addition to quota checks, other types of run-time validations may be required for at least some jobs—e.g., data type checking may have to be performed on the input data set for jobs that involve feature processing, or the MLS may have to verify that the input data set size is within acceptable bounds. Thus, client requests may be validated synchronously (at the time the request is received, as indicated in element 904 of FIG. 9*a*) as well as asynchronously (as indicated in element 952 of FIG. 9*b*) in at least some embodiments. A workload distribution strategy and processing plan may be identified for Jk—e.g., the number of processing passes or phases to be used, the degree of parallelism to be used, an iterative convergence criterion to be used for completing Jk (element 954). A number of additional factors may be taken into account when generating the processing plan in some embodiments, such as client budget constraints (if any), the data durability needs of the client, the performance goals of the client, security needs (such as the need to run third-party code or client-provided code in isolation instead of in multi-tenant mode).

In accordance with the selected distribution strategy and processing plan, a set of resources may be identified for Jk (element 957). The resources (which may include compute servers or clusters, storage devices, and the like) may be selected from the MLS-managed shared pools, for example, and/or from customer-assigned or customer-owned pools. JK's operations may then be performed on the identified resources (element 960), and the client on whose behalf Jk was created may optionally be notified when the operations complete (or in the event of a failure that prevents completion of the operations).

Idempotent Programmatic Interfaces

Some of the types of operations requested by MLS clients may be resource-intensive. For example, ingesting a terabyte-scale data set (e.g., in response to a client request to create a data store) or generating statistics on such a data set may take hours or days, depending on the set of resources deployed and the extent of parallelism used. Given the asynchronous manner in which client requests are handled in at least some embodiments, clients may sometimes end up submitting the same request multiple times. In some cases, such multiple submissions may occur because the client is unaware whether the previous submission was accepted or not (e.g., because the client failed to notice an indication that the previous submission was accepted, or because such an indication was lost). In other cases, a duplicate request may be received because the client has assumed that since the expected results of completing the requested task have not been provided for a long time, the previous request must have failed. If, in response to such a duplicate submission, the MLS actually schedules another potentially large job, resources may be deployed unnecessarily and the client may in some cases be billed twice for a request that was only intended to be serviced once. Accordingly, in order to avoid such problematic scenarios, in at least one embodiment one or more of the programmatic interfaces supported by the MLS may be designed to be idempotent, such that the re-submission of a duplicate request by the same client does not have negative consequences.

Figure 10A:
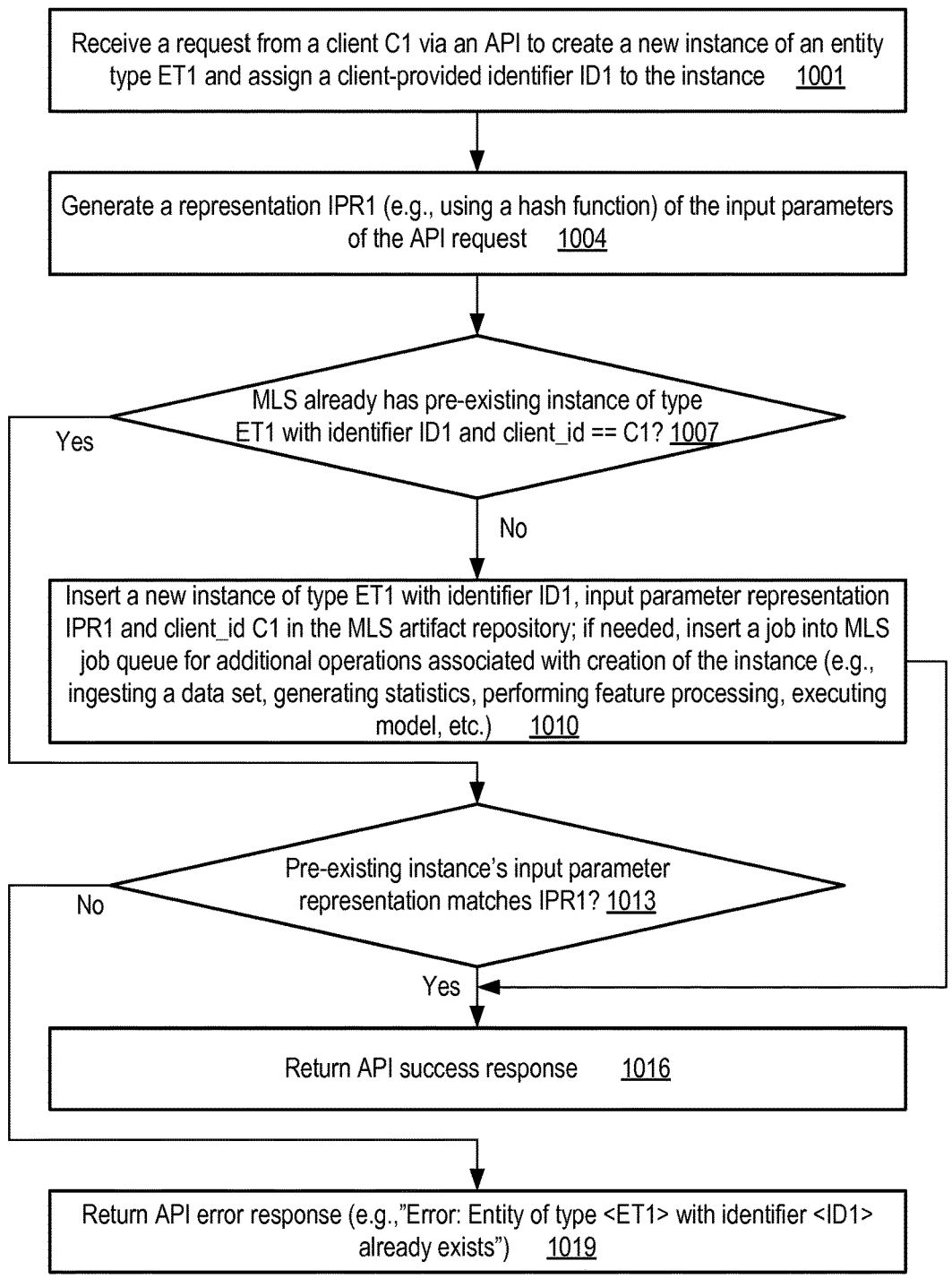
FIG. 10a is a flow diagram illustrating aspects of operations that may be performed at a machine learning service at which a set of idempotent programmatic interfaces are supported, according to at least some embodiments.

FIG. 10*a* is a flow diagram illustrating aspects of operations that may be performed at a machine learning service at which a set of idempotent programmatic interfaces are supported, according to at least some embodiments. In FIG. 10*a*, a creation interface (e.g., an API similar to "createDataSource" or "createModel") is used as an example of an idempotent programmatic interface. Although idempotency may be especially useful for programmatic interfaces that involve creation of artifacts such as data sources and models, idempotent interfaces may also be supported for other types of operations (e.g., deletes or executes) in various embodiments. As shown in element 1001, a request to create a new instance of an entity type ET1 may be received from a client C1 at the MLS via a programmatic interface such as a particular API. The request may indicate an identifier ID1, selected by the client, which is to be used for the new instance. In some implementations, the client may be required to specify the instance identifier, and the identifier may be used as described below to detect duplicate requests. (Allowing the client to select the identifier may have the additional advantage that a client may be able to assign a more meaningful name to entity instances than a name assigned by the MLS.) The MLS may generate a representation IPR1 of the input parameters included in the client's invocation of the programmatic interface (element 1004). For example, the set of input parameters may be supplied as input to a selected hash function, and the output of the hash function may be saved as IPR1.

In the embodiment depicted in FIG. 10*a*, for at least some of the artifacts generated, the MLS repository may store the corresponding instance identifier, input parameter representation, and client identifier (i.e., the identifier of the client that requested the creation of the artifact). The MLS may check, e.g., via a lookup in the artifact repository, whether an instance of entity type ET1, with instance identifier ID1 and client identifier C1 already exists in the repository. If no such instance is found (as detected in element 1007), a new instance of type ET1 with the identifier ID1, input parameter representation IPR1 and client identifier C1 may be inserted into the repository (element 1007). In addition, depending on the type of the instance, a job object may be added to a job queue to perform additional operations corresponding to the client request, such as reading/ingesting a data set, generating a set of statistics, performing feature processing, executing a model, etc. A success response to the client's request (element 1016) may be generated in the depicted embodiment. (It is noted that the success response may be implicit in some implementations—e.g., the absence of an error message may serve as an implicit indicator of success.)

If, in operations corresponding to element 1007, a pre-existing instance with the same instance identifier ID1 and client identifier C1 is found in the repository, the MLS may check whether the input parameter representation of the pre-existing instance also matches IPR1 (element 1013). If the input parameter representations also match, the MLS may assume that the client's request is a (harmless) duplicate, and no new work needs to be performed. Accordingly, the MLS may also indicate success to the client (either explicitly or implicitly) if such a duplicate request is found (element 1016). Thus, if the client had inadvertently resubmitted the same request, the creation of a new job object and the associated resource usage may be avoided. In some implementations, if the client request is found to be an exact duplicate of an earlier request using the methodology described, an indication may be provided to the client that the request, while not being designated as an error, was in fact identified as a duplicate. If the input parameter representation of the pre-existing instance does not match that of the client's request, an error message may be returned to the client (element 1019), e.g., indicating that there is a pre-existing instance of the same entity type ET1 with the same identifier. In some implementations, instead of requiring the client to submit an identifier, a different approach to duplicate detection may be used, such as the use of a persistent log of client requests, or the use of a signature representing the (request, client) combination.

Best Practices

Figure 10B:
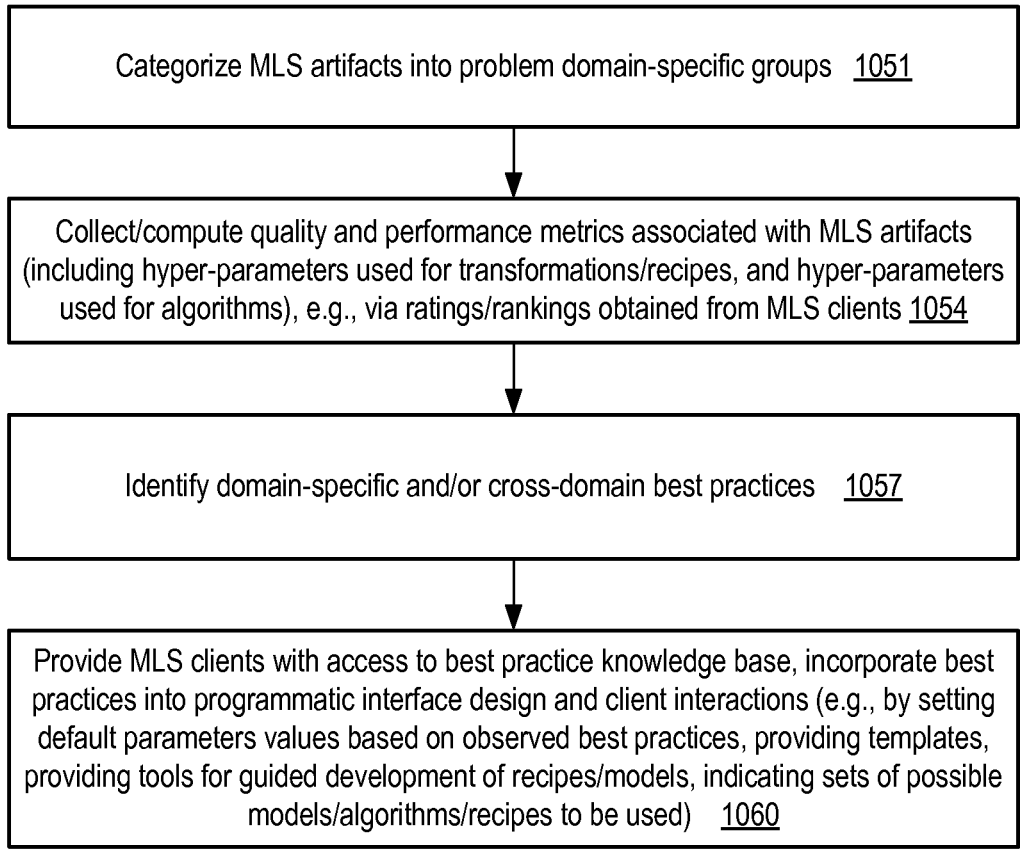
FIG. 10b is a flow diagram illustrating aspects of operations that may be performed at a machine learning service to collect and disseminate information about best practices related to different problem domains, according to at least some embodiments.

One of the advantages of building a machine learning service that may be used by large numbers of customers for a variety of use cases is that it may become possible over time to identify best practices, e.g., with respect to which techniques work best for data cleansing, sampling or sub-set extraction, feature processing, predicting, and so on. FIG. 10b is a flow diagram illustrating aspects of operations that may be performed at a machine learning service to collect and disseminate information about best practices related to different problem domains, according to at least some embodiments. As shown in element 1051, at least some of the artifacts (such as recipes and models) generated at the MLS as a result of client requests may be classified into groups based on problem domains—e.g., some artifacts may be used for financial analysis, others for computer vision applications, others for bioinformatics, and so on. Such classification may be performed based on various factors in different embodiments—e.g. based on the types of algorithms used, the names of input and output variables, customer-provided information, the identities of the customers, and so on.

In some embodiments, the MLS control plane may comprise a set of monitoring agents that collect performance and other metrics from the resources used for the various phases of machine learning operations (element 1054). For example, the amount of processing time it takes to build N trees of a random forest using a server with a CPU rating of C1 and a memory size of M1 may be collected as a metric, or the amount of time it takes to compute a set of statistics as a function of the number of data attributes examined from a data source at a database service may be collected as a metric. The MLS may also collect ratings/rankings or other types of feedback from MLS clients regarding the effectiveness or quality of various approaches or models for the different problem domains. In some embodiments, quantitative measures of model predictive effectiveness such as the area under receiver operating characteristic (ROC) curves for various classifiers may also be collected. In one embodiment, some of the information regarding quality may be deduced or observed implicitly by the MLS instead of being obtained via explicit client feedback, e.g., by keeping track of the set of parameters that are changed during training iterations before a model is finally used for a test data set. In some embodiments, clients may be able to decide whether their interactions with the MLS can be used for best practice knowledge base enhancement or not—e.g., some clients may not wish their customized techniques to become widely used by others, and may therefore opt out of sharing metrics associated with such techniques with the MLS or with other users.

Based on the collected metrics and/or feedback, respective sets of best practices for various phases of machine learning workflows may be identified (element 1057). Some of the best practices may be specific to particular problem domains, while others may be more generally applicable, and may therefore be used across problem domains. Representations or summaries of the best practices identified may be stored in a knowledge base of the MLS. Access (e.g., via a browser or a search tool) to the knowledge base may be provided to MLS users (element 1060). The MLS may also incorporate the best practices into the programmatic interfaces exposed to users—e.g., by introducing new APIs that are more likely to lead users to utilize best practices, by selecting default parameters based on best practices, by changing the order in which parameter choices in a drop-down menu are presented so that the choices associated with best practices become more likely to be selected, and so on. In some embodiments the MLS may provide a variety of tools and/or templates that can help clients to achieve their machine learning goals. For example, a web-based rich text editor or installable integrated development environment (IDE) may be provided by the MLS, which provides templates and development guidance such as automated syntax error correction for recipes, models and the like. In at least one embodiment, the MLS may provide users with candidate models or examples that have proved useful in the past (e.g., for other clients solving similar problems). The MLS may also maintain a history of the operations performed by a client (or by a set of users associated with the same customer account) across multiple interaction sessions in some implementations, enabling a client to easily experiment with or employ artifacts that the same client generated earlier.

Feature Processing Recipes

Figure 11:
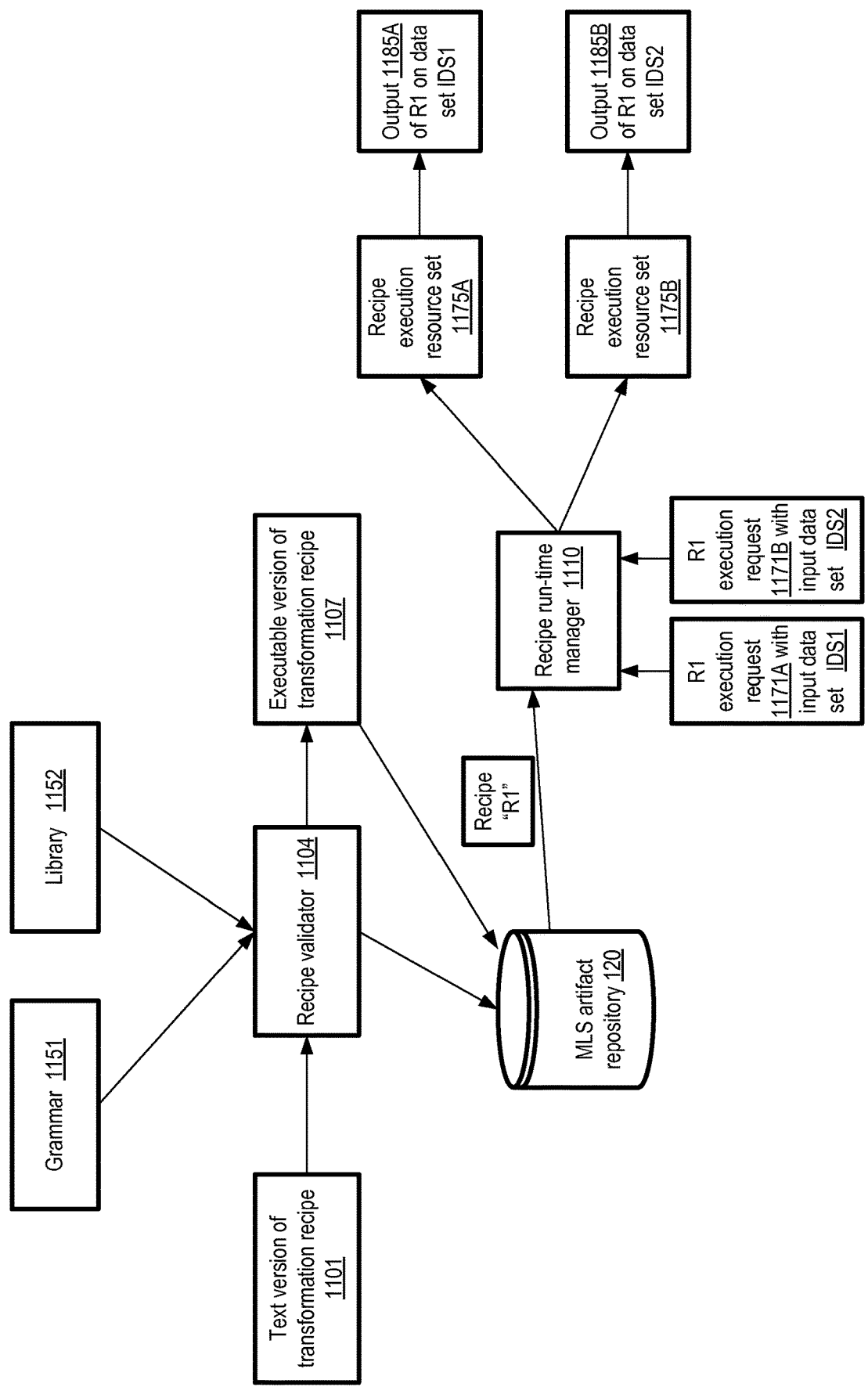
FIG. 11 illustrates examples interactions associated with the use of recipes for data transformations at a machine learning service, according to at least some embodiments.

FIG. 11 illustrates examples interactions associated with the use of recipes for data transformations at a machine learning service, according to at least some embodiments. In the depicted embodiment, a recipe language defined by the MLS enables users to easily and concisely specify transformations to be performed on specified sets of data records to prepare the records for use for model training and prediction. The recipe language may enable users to create customized groups of variables to which one or more transformations are to be applied, define intermediate variables and dependencies upon other artifacts, and so on, as described below in further detail. In one example usage flow, raw data records may first be extracted from a data source (e.g., by input record handlers such as those shown in FIG. 1 with the help of an MLS I/O library), processed in accordance with one or more recipes, and then used as input for training or prediction. In another usage flow, the recipe may itself incorporate the training and/or prediction steps (e.g., a destination model or models may be specified within the recipe). Recipes may be applied either to data records that have already split into training and test subsets, or to the entire data set prior to splitting into training and test subsets. A given recipe may be re-used on several different data sets, potentially for a variety of different machine learning problem domains, in at least some embodiments. The recipe management components of the MLS may enable the generation of easy-to-understand compound models (in which the output of one model may be used as the input for another, or in which iterative predictions can be performed) as well as the sharing and re-use of best practices for data transformations. In at least one embodiment, a pipeline of successive transformations to be performed starting with a given input data set may be indicated within a single recipe. In one embodiment, the MLS may perform parameter optimization for one or more recipes—e.g., the MLS may automatically vary such transformation properties as the sizes of quantile bins or the number of root words to be included in an n-gram in an attempt to identify a more useful set of input variables to be used for a particular machine learning algorithm.

Figure 12:
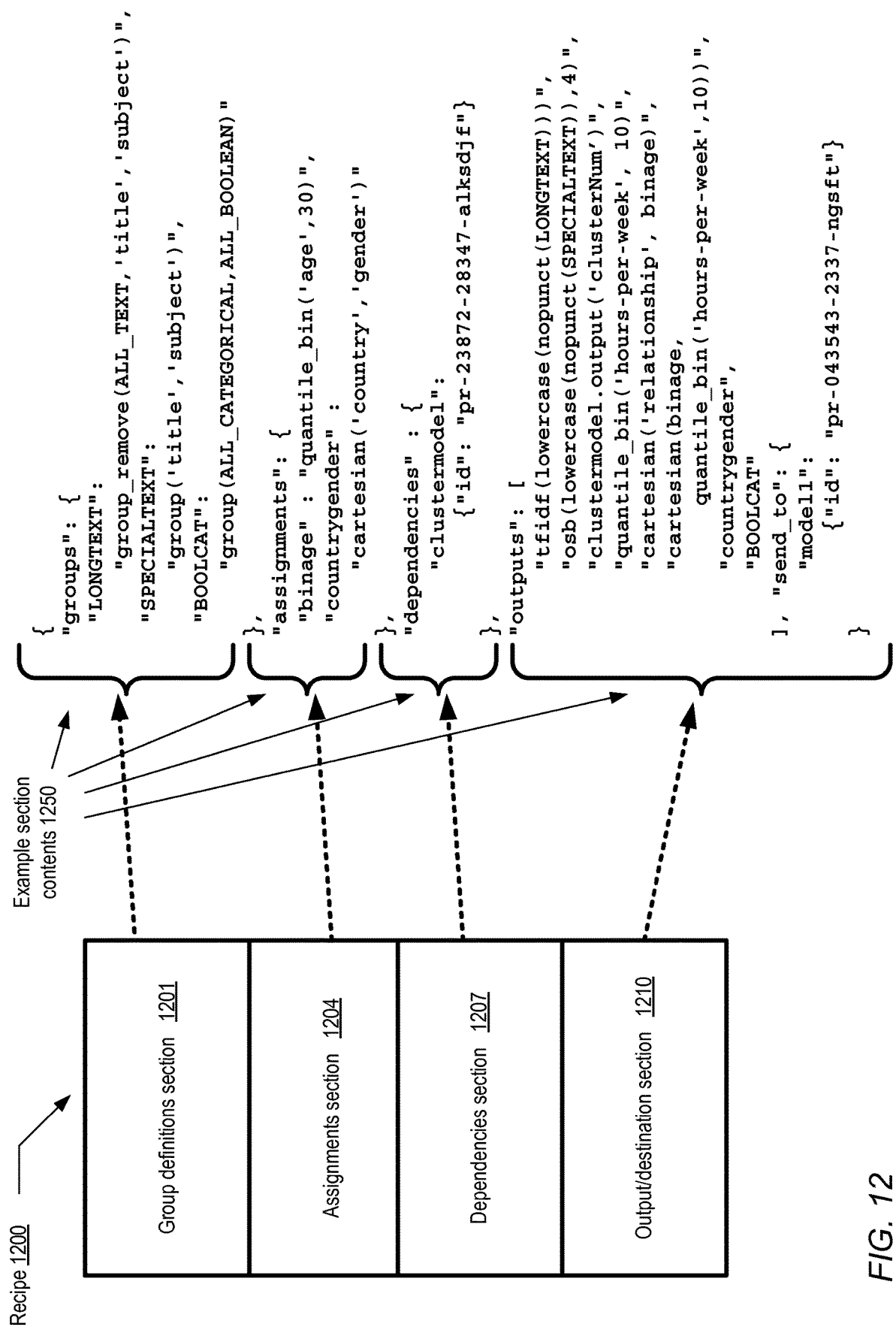
FIG. 12 illustrates example sections of a recipe, according to at least some embodiments.

In some embodiments, a text version 1101 of a transformation recipe may be passed as a parameter in a "createRecipe" MLS API call by a client. As shown, a recipe validator 1104 may check the text version 1101 of the recipe for lexical correctness, e.g., to ensure that it complies with a grammar 1151 defined by the MLS in the depicted embodiment, and that the recipe comprises one or more sections arranged in a predefined order (an example of the expected structure of a recipe is illustrated in FIG. 12 and described below). In at least some embodiments, the version of the recipe received by the MLS need not necessarily be a text version; instead, for example, a pre-processed or partially-combined version (which may in some cases be in a binary format rather than in plain text) may be provided by the client. In one embodiment, the MLS may provide a tool that can be used to prepare recipes—e.g., in the form of a web-based recipe editing tool or a downloadable integrated development environment (IDE). Such a recipe preparation tool may, for example, provide syntax and/or parameter selection guidance, correct syntax errors automatically, and/or perform at least some level of pre-processing on the recipe text on the client side before the recipe (either in text form or binary form) is sent to the MLS service. The recipe may use a number of different transformation functions or methods defined in one or more libraries 1152, such as functions to form Cartesian products of variables, n-grams (for text data), quantile bins (for numeric data variables), and the like. The libraries used for recipe validation may include third-party or client-provided functions or libraries in at least some embodiments, representing custom feature processing extensions that have been incorporated into the MLS to enhance the service's core or natively-supported feature processing capabilities. The recipe validator 1104 may also be responsible for verifying that the functions invoked in the text version 1101 are (a) among the supported functions of the library 1152 and (b) used with the appropriate signatures (e.g., that the input parameters of the functions match the types and sequences of the parameters specified in the library). In some embodiments, MLS customers may register additional functions as part of the library, e.g., so that custom "user-defined functions" (UDFs) can also be included in the recipes. Customers that wish to utilize UDFs may be required to provide an indication of a module that can be used to implement the UDFs (e.g., in the form of source code, executable code, or a reference to a third-party entity from which the source or executable versions of the module can be obtained by the MLS) in some embodiments. A number of different programming languages and/or execution environments may be supported for UDFs in some implementations, e.g., including Java™, Python, and the like. The text version of the recipe may be converted into an executable version 1107 in the depicted embodiment. The recipe validator 1104 may be considered analogous to a compiler for the recipe language, with the text version of the recipe analogous to source code and the executable version analogous to the compiled binary or byte code derived from the source code. The executable version may also be referred to as a feature processing plan in some embodiments. In the depicted embodiment, both the text version 1101 and the executable version 1107 of a recipe may be stored within the MLS artifact repository 120.

A run-time recipe manager 1110 of the MLS may be responsible for the scheduling of recipe executions in some embodiments, e.g., in response to the equivalent of an "executeRecipe" API specifying an input data set. In the depicted embodiment, two execution requests 1171A and 1171B for the same recipe R1 are shown, with respective input data sets IDS1 and IDS2. The input data sets may comprise data records whose variables may include instances of any of a variety of data types, such as, for example text, a numeric data type (e.g., real or integer), Boolean, a binary data type, a categorical data type, an image processing data type, an audio processing data type, a bioinformatics data type, a structured data type such as a particular data type compliant with the Unstructured Information Management Architecture (UIMA), and so on. In each case, the run-time recipe manager 1110 may retrieve (or generate) the executable version of R1, perform a set of run-time validations (e.g., to ensure that the requester is permitted to execute the recipe, that the input data appears to be in the correct or expected format, and so on), and eventually schedule the execution of the transformation operations of R1 at respective resource sets 1175A and 1175B. In at least some cases, the specific libraries or functions to be used for the transformation may be selected based on the data types of the input records—e.g., instances of a particular structured data type may have to be handled using functions or methods of a corresponding library defined for that data type. Respective outputs 1185A and 1185B may be produced by the application of the recipe R1 on IDS1 and IDS2 in the depicted embodiment. Depending on the details of the recipe R1, the outputs 1185A may represent either data that is to be used as input for a model, or a result of a model (such as a prediction or evaluation). In at least some embodiments, a recipe may be applied asynchronously with respect to the execution request—e.g., as described earlier, a job object may be inserted into a job queue in response to the execution request, and the execution may be scheduled later. The execution of a recipe may be dependent on other jobs in some cases—e.g., upon the completion of jobs associated with input record handling (decryption, decompression, splitting of the data set into training and test sets, etc.). In some embodiments, the validation and/or compilation of a text recipe may also or instead be managed using asynchronously-scheduled jobs.

In some embodiments, a client request that specifies a recipe in text format and also includes a request to execute the recipe on a specified data set may be received—that is, the static analysis steps and the execution steps shown in FIG. 11 may not necessarily require separate client requests. In at least some embodiments, a client may simply indicate an existing recipe to be executed on a data set, selected for example from a recipe collection exposed programmatically by the MLS, and may not even have to generate a text version of a recipe. In one embodiment, the recipe management components of the MLS may examine the set of input data variables, and/or the outputs of the transformations indicated in a recipe, automatically identify groups of variables or outputs that may have a higher predictive capability than others, and provide an indication of such groups to the client.

FIG. 12 illustrates example sections of a recipe, according to at least some embodiments. In the depicted embodiment, the text of a recipe 1200 may comprise four separate sections—a group definitions section 1201, an assignments section 1204, a dependencies section 1207, and an output/destination section 1210. In some implementations, only the output/destination section may be mandatory; in other implementations, other combinations of the sections may also or instead be mandatory. In at least one embodiment, if more than one of the four section types shown in FIG. 12 is included in a recipe, the sections may have to be arranged in a specified order. In at least one embodiment, a destination model (i.e., a machine learning model to which the output of the recipe transformations is to be provided) may be indicated in a separate section than the output section.

In the group definitions section 1201, as implied by the name, clients may define groups of input data variables, e.g., to make it easier to indicate further on in the recipe that the same transformation operation is to be applied to all the member variables of a group. In at least some embodiments, the recipe language may define a set of baseline groups, such as ALL_INPUT (comprising all the variables in the input data set), ALL_TEXT (all the text variables in the data set), ALL_NUMERIC (all integer and real valued variables in the data set), ALL_CATEGORICAL (all the categorical variables in the data set) and ALL_BOOLEAN (all the Boolean variables in the data set, e.g., variables that can only have the values "true" or "false" (which may be represented as "1" and "0" respectively in some implementations)). In some embodiments, the recipe language may allow users to change or "cast" the types of some variables when defining groups—e.g., variables that appear to comprise arbitrary text but are only expected to have only a discrete set of values, such as the names of the months of the year, the days of the week, or the states of a country, may be converted to categorical variables instead of being treated as generic text variables. Within the group definitions section, the methods/functions "group" and "group_remove" (or other similar functions representing set operations) may be used to combine or exclude variables when defining new groups. A given group definition may refer to another group definition in at least some embodiments. In the example section contents 1250 shown in FIG. 12, three groups are defined: LONGTEXT, SPECIAL_TEXT and BOOLCAT. LONGTEXT comprises all the text variables in the input data, except for variables called "title" and "subject". SPECIAL_TEXT includes the text variables "subject" and "title". BOOLCAT includes all the Boolean and categorical variables in the input data. It is noted that at least in some embodiments, the example group definitions shown may be applied to any data set, even if the data set does not contain a "subject" variable, a "title" variable, any Boolean variables, any categorical variables, or even any text variables. If there are no text variables in an input data set, for example, both LONGTEXT and SPECIAL_TEXT would be empty groups with no members with respect to that particular input data set in such an embodiment.

Intermediate variables that may be referenced in other sections of the recipe 1200 may be defined in the assignments section 1204. In the example assignments section, a variable called "binage" is defined in terms of a "quantile_bin" function (which is assumed to be included among the pre-defined library functions of the recipe language in the depicted embodiment) applied to an "age" variable in the input data, with a bin count of "30". A variable called "countrygender" is defined as a Cartesian product of two other variables "country" and "gender" of the input data set, with the "cartesian" function assumed to be part of the pre-defined library. In the dependencies section 1207, a user may indicate other artifacts (such as the model referenced as "clustermodel" in the illustrated example, with the MLS artifact identifier "pr-23872-28347-alksdjf") upon which the recipe depends. For example, in some cases, the output of a model that is referenced in the dependencies section of the recipe may be ingested as the input of the recipe, or a portion of the output of the referenced model may be included in the output of the recipe. The dependencies section may, for example, be used by the MLS job scheduler when scheduling recipe-based jobs in the depicted embodiment. Dependencies on any of a variety of artifacts may be indicated in a given recipe in different embodiments, including other recipes, aliases, statistics sets, and so on.

In the example output section 1210, a number of transformations are applied to input data variables, groups of variables, intermediate variables defined in earlier sections of the recipe, or the output of an artifact identified in the dependencies section. The transformed data is provided as input to a different model identified as "model1". A term-frequency-inverse document frequency (tfidf) statistic is obtained for the variables included in the LONGTEXT group, after punctuation is removed (via the "nopunct" function) and the text of the variables is converted to lowercase (by the "lowercase" function). The tfidf measure may be intended to reflect the relative importance of words within a document in a collection or corpus; the tfidf value for a given word typically is proportional to the number of occurrences of the word in a document, offset by the frequency of the word in the collection as a whole. The tfidf, nopunct and lowercase functions are all assumed to be defined in the recipe language's library. Similarly, other transformations indicated in the output section use the osb (orthogonal sparse bigrams) library function, the quantile_bin library function for binning or grouping numeric values, and the Cartesian product function. Some of the outputs indicated in section 1210 may not necessarily involve transformations per se: e.g., the BOOLCAT group's variables in the input data set may simply be included in the output, and the "clusterNum" output variable of "clustermodel" may be included without any change in the output of the recipe as well.

In at least some embodiments, the entries listed in the output section may be used to implicitly discard those input data variables that are not listed. Thus, for example, if the input data set includes a "taxable-income" numeric variable, it may simply be discarded in the illustrated example since it is not directly or indirectly referred to in the output section. The recipe syntax and section-by-section organization shown in FIG. 12 may differ from those of other embodiments. A wide variety of functions and transformation types (at least some of which may differ from the specific examples shown in FIG. 12) may be supported in different embodiments. For example, date/time related functions "dayofweek", "hourofday" "month", etc. may be supported in the recipe language in some embodiments. Mathematical functions such as "sqrt" (square root), "log" (logarithm) and the like may be supported in at least one embodiment. Functions to normalize numeric values (e.g., map values from a range $\{-N1$ to $+N2\}$ into a range $\{0$ to $1\}$), or to fill in missing values (e.g., "replace_missing_with_mean (ALL_NUMERIC)") may be supported in some embodiments. Multiple references within a single expression to one or more previously-defined group variables, intermediate variables, or dependencies may be allowed in one embodiment: e.g., the recipe fragment "replace_missing(ALL_NUMERIC, mean(ALL_NUMERIC))" may be considered valid. Mathematical expressions involving combinations of variables such as "'income'+10*'capital_gains'" may also be permitted within recipes in at least some embodiments. Comments may be indicated by delimiters such as "//" in some recipes.

Recipe Validation

FIG. 13 illustrates an example grammar that may be used to define acceptable recipe syntax, according to at least some embodiments. The grammar shown may be formatted in accordance with the requirements of a parser generator such as a version of ANTLR (ANother Tool for Language Recognition). As shown, the grammar 1320 defines rules for the syntax of expressions used within a recipe. Given a grammar similar to that shown in FIG. 13, a tools such as ANTLR may generate a parser than can build an abstract syntax tree from a text version of a recipe, and the abstract syntax tree may then be converted into a processing plan by the MLS control plane. An example tree generated using the grammar 1320 is shown in FIG. 14.

In the example grammar "MLS-Recipe" shown in FIG. 13, an expression "expr" can be one of a "BAREID", a "QUOTEDID", a "NUMBER" or a "functioncall", with each of the latter four entities defined further down in the grammar. A BAREID starts with an upper case or lower case letter and can include numerals. A QUOTEDID can comprise any text within single quotes. NUMBERs comprise real numeric values with or without exponents, as well as integers. A functioncall must include a function name (a BAREID) followed by zero or more parameters within round brackets. Whitespace and comments are ignored when generating an abstract syntax tree in accordance with the grammar 1320, as indicated by the lines ending in "→skip".

Figure 14:
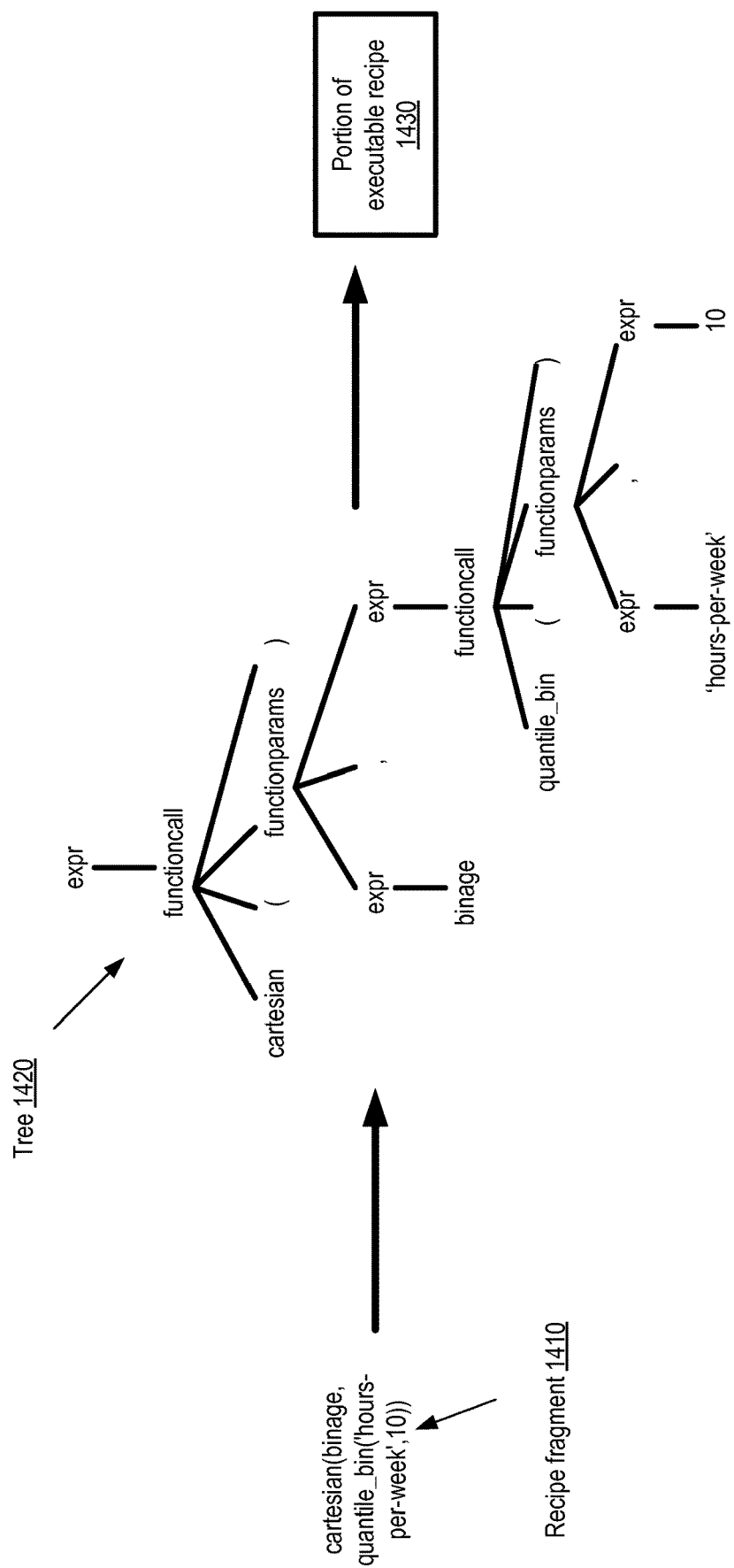
FIG. 14 illustrates an example of an abstract syntax tree that may be generated for a portion of a recipe, according to at least some embodiments.

FIG. 14 illustrates an example of an abstract syntax tree that may be generated for a portion of a recipe, according to at least some embodiments. The example recipe fragment 1410 comprising the text "cartesian(binage, quantile_bin ('hours-per-week', 10))" may be translated into abstract syntax tree 1420 in accordance with grammar 1320 (or some other similar grammar) in the depicted embodiment. As shown, "cartesian" and "quantile_bin" are recognized as function calls, each with two parameters. During the syntax analysis of the illustrated recipe fragment, recipe validator 1104 may ensure that the number and order of the parameters passed to "cartesian" and "quantile_bin" match the definitions of those functions, and that the variables "binage" and "hours_per_week" are defined within the recipe. If any of these conditions are not met, an error message indicating the line number within the recipe at which the "cartesian" fragment is located may be provided to the client that submitted the recipe. Assuming that no validation errors are found in the recipe as a whole, an executable version of the recipe may be generated, of which a portion 1430 may represent the fragment 1410.

Domain-Specific Recipe Collections

Figure 15:
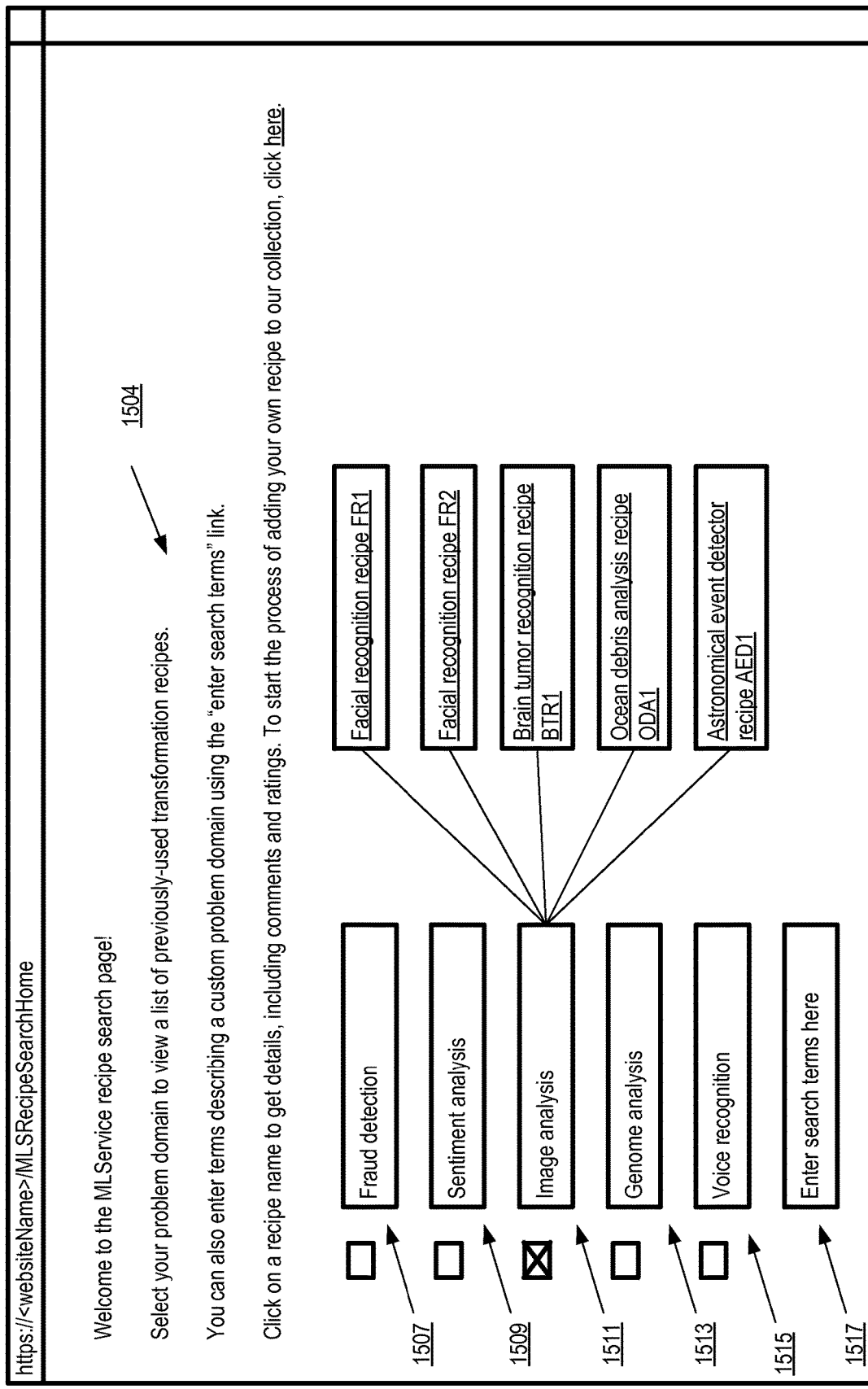
FIG. 15 illustrates an example of a programmatic interface that may be used to search for domain-specific recipes available from a machine learning service, according to at least some embodiments.

In at least some embodiments, some users of the MLS may not be experts at feature processing, at least during a period when they start using the MLS. Accordingly, the MLS may provide users with access to a collection of recipes that have previously been found to be useful in various problem domains. FIG. 15 illustrates an example of a programmatic interface that may be used to search for domain-specific recipes available from a machine learning service, according to at least some embodiments. As shown, a web page 1501 may be implemented for a recipe search, which includes a message area 1504 providing high-level guidance to MLS users, and a number of problem domains for which recipes are available. In the depicted example, a MLS customer can use a check-box to select from among the problem domains fraud detection 1507, sentiment analysis 1509, image analysis 1511, genome analysis 1513, or voice recognition 1515. A user may also search for recipes associated with other problem domains using search term text block 1517 in the depicted web page.

For the selected problem domain (image analysis), links to five example recipes are shown on web page 1501: recipes FR1 and FR2 for facial recognition, BTR1 for brain tumor recognition, ODA1 for ocean debris recognition, and AED1 for astronomical event detection. Additional details regarding a given recipe may be obtained by the user by clicking on the recipe's name: for example, in some embodiments, a description of what the recipe does may be provided, ratings/rankings of the recipe submitted by other users may be provided, comments submitted by other users on the recipes, and so on. If a user finds a recipe that they wish to use (either unchanged or after modifying the recipe), they may be able to download the text version of the recipe, e.g., for inclusion in a subsequent MLS API invocation. As indicated in the message area 1504, users may also be able to submit their own recipes for inclusion in the collection exposed by the MLS in the depicted embodiment. In at least some implementations, the MLS may perform some set of validation steps on a submitted recipe (e.g., by checking that the recipe produces meaningful output for various input data sets) before allowing other users access.

Automated Parameter Tuning for Recipe Transformations

Figure 16:
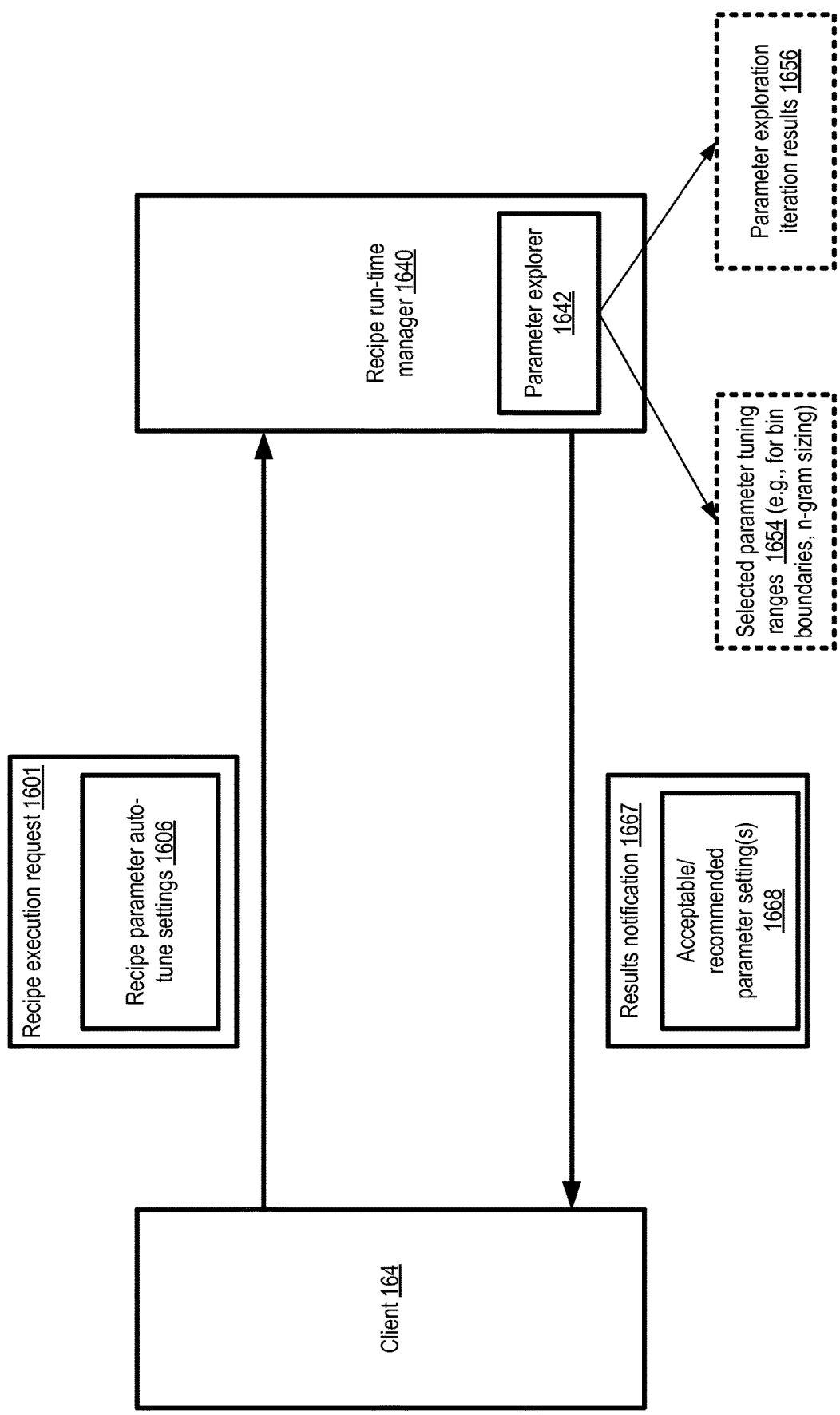
FIG. 16 illustrates an example of a machine learning service that automatically explores a range of parameter settings for recipe transformations on behalf of a client, and selects acceptable or recommended parameter settings based on results of such explorations, according to at least some embodiments.

For many types of feature processing transformation operations, such as creating quantile bins for numeric data attributes, generating ngrams, or removing sparse or infrequent words from documents being analyzed, parameters may typically have to be selected, such as the sizes/boundaries of the bins, the lengths of the ngrams, the removal criteria for sparse words, and so on. The values of such parameters (which may also be referred to as hyper-parameters in some environments) may have a significant impact on the predictions that are made using the recipe outputs. Instead of requiring MLS users to manually submit requests for each parameter setting or each combination of parameter settings, in some embodiments the MLS may support automated parameter exploration. FIG. 16 illustrates an example of a machine learning service that automatically explores a range of parameter settings for recipe transformations on behalf of a client, and selects acceptable or recommended parameter settings based on results of such explorations, according to at least some embodiments.

In the depicted embodiment, an MLS client 164 may submit a recipe execution request 1601 that includes parameter auto-tune settings 1606. For example, the client 164 may indicate that the bin sizes/boundaries for quantile binning of one or more variables in the input data should be chosen by the service, or that the number of words in an n-gram should be chosen by the service. Parameter exploration and/or auto-tuning may be requested for various clustering-related parameters in some embodiments, such as the number of clusters into which a given data set should be classified, the cluster boundary thresholds (e.g., how far apart two geographical locations can be to be considered part of a set of "nearby" locations), and so on. Various types of image processing parameter settings may be candidates for automated tuning in some embodiments, such as the extent to which a given image should be cropped, rotated, or scaled during feature processing. Automated parameter exploration may also be used for selection dimensionality values for a vector representation of a text document (e.g., in accordance with the Latent Dirichlet Allocation (LDA) technique) or other natural language processing techniques. In some cases, the client may also indicate the criteria to be used to terminate exploration of the parameter value space, e.g., to arrive at acceptable parameter values. In at least some embodiments, the client may be given the option of letting the MLS decide the acceptance criteria to be used—such an option may be particularly useful for non-expert users. In one implementation, the client may indicate limits on resources or execution time for parameter exploration. In at least one implementation, the default setting for an auto-tune setting for at least some output transformations may be "true", e.g., a client may have to explicitly indicate that auto-tuning is not to be performed in order to prevent the MLS from exploring the parameter space for the transformations.

In response to a determination that auto-tuning is to be performed for a given transformation operation, the MLS (e.g., a parameter explorer 1642 of the recipe run-time manager 1640) may select a parameter tuning range 1654 for the transformation (e.g., whether the quantile bin counts of 10, 20, 30 and 40 should be explored for a particular numeric variable). The parameter ranges may be selected based on a variety of factors in different embodiments, including best practices known to the MLS for similar transformations, resource constraints, the size of the input data set, and so on. In scenarios in which respective parameters for combinations of several transformation operations are to be tuned (e.g., if quantile binning is being auto-tuned for more than one variable), the parameter explorer 1642 may select a respective set of values for each parameter so as to keep the number of combinations that are to be tried below a threshold. Having determined the range of parameter values, the parameter explorer may execute iterations of transformations for each parameter value or combination, storing the iteration results 1656 in at least some implementations in temporary storage. Based on the result sets generated for the different parameter values and the optimization criteria being used, at least one parameter value may be identified as acceptable for each parameter. In the depicted embodiment, a results notification 1667 may be provided to the client, indicating the accepted or recommended parameter value or values 1668 for the different parameters being auto-tuned. For some parameters, it may not always be straightforward to identify a particular parameter value as being the single best value, e.g., because several different values may lead to similar results. In some embodiments, instead of identifying a single optimal value for such a parameter, the MLS may instead identify a set of candidate values {V1, V2, V3, ..., Vn} for a given parameter P, such that all the values of the set provide results of similar quality. The set of candidate values may be provided to the client, enabling the client to choose the specific parameter value to be used, and the client may notify the MLS regarding the selected parameter value. In one embodiment, the client may only be provided with an indication of the results of the recipe transformations obtained using the accepted/optimized parameter values, without necessarily being informed about the parameter value settings used.

Methods of Supporting Feature Processing Via Re-Usable Recipes

Figure 17:
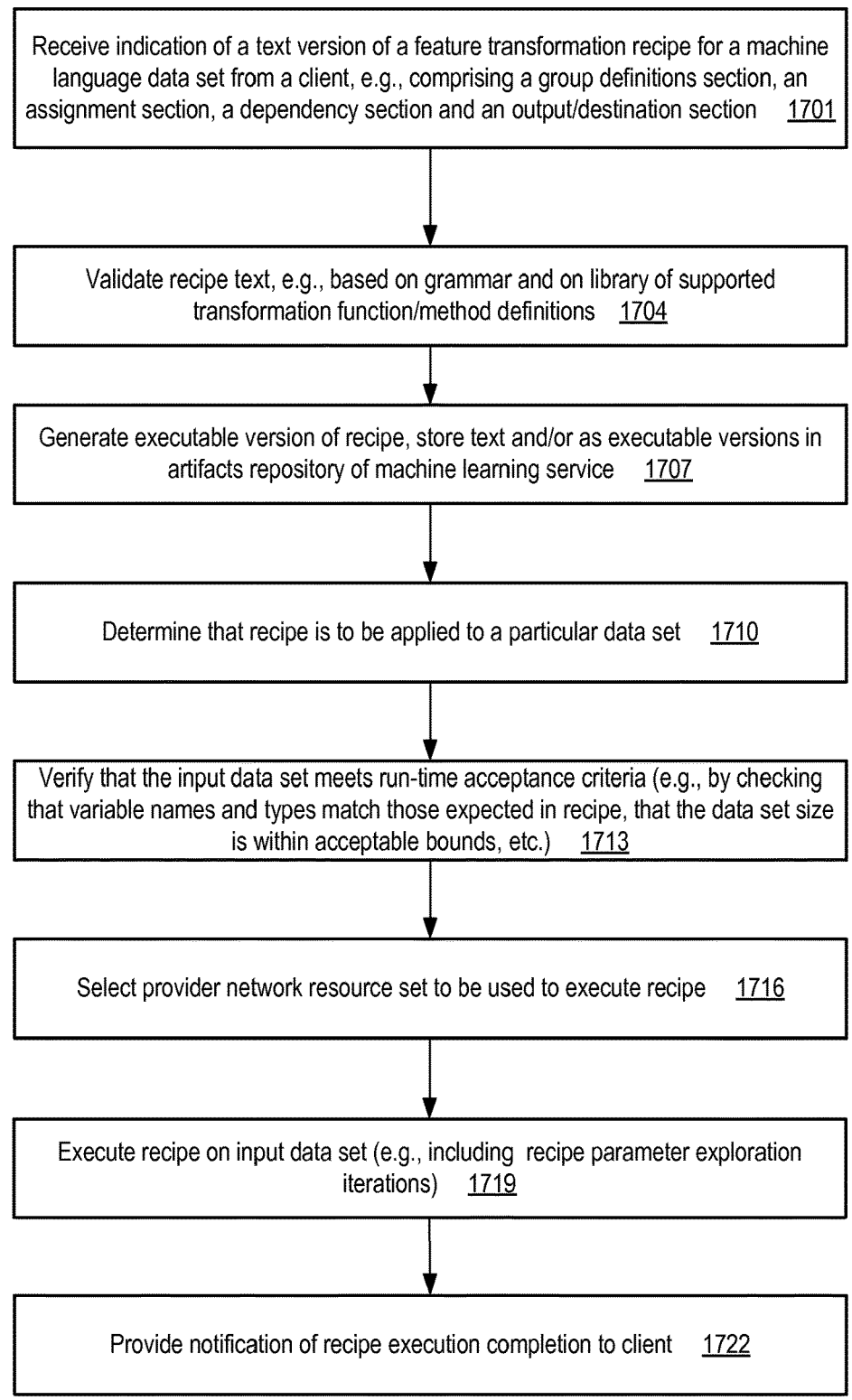
FIG. 17 is a flow diagram illustrating aspects of operations that may be performed at a machine learning service that supports re-usable recipes for data set transformations, according to at least some embodiments.

FIG. 17 is a flow diagram illustrating aspects of operations that may be performed at a machine learning service that supports re-usable recipes for data set transformations, according to at least some embodiments. As shown in element 1701, an indication of a text version of a recipe for transformation operations to be performed on input data sets may be received at a network-accessible MLS implemented at a provider network. In one embodiment, the recipe text may include one or more of four sections in accordance with a recipe language defined by the MLS: a group definitions section, an assignment section, a dependency section, and an output/destination section (which may also be referred to as simply the output section). In some embodiments, one or more sections (such as the output section) may be mandatory. In general, the output/destination section may indicate various feature processing transformation operations that are to be performed on entities defined in other sections of the recipe, or directly on input variables of a data set. The group definitions section may be used to define custom groups of input variables (or input data variables combined with other groups, or groups derived from other groups). Such group definitions may make it easier to specify in the output section that a common transformation is to be applied to several variables. A number of built-in or predefined groups may be supported by the recipe language in some embodiments, such as ALL_NUMERIC or ALL_CATEGORICAL, along with functions such as "group_remove" and "group" to allow recipe creators to easily indicate variable exclusions and combinations to be used when defining new groups. The assignment section may be used to define one or more intermediate variables that can be used elsewhere in the recipe. The dependency section may indicate that the recipe depends on another machine learning artifact (such as a model, or another recipe) or on multiple other artifacts stored in an MLS's repository. In some embodiments, the output section may indicate not just the specific transformations to be applied to specified input variables, defined groups, intermediate variables or output of the artifacts indicated in the dependency section, but also the destination models to which the transformation results are to be provided as input.

The machine learning service may natively support libraries comprising a variety of different transformation operations that can be used in the recipe's output section, such as the types of functions illustrated in FIG. 12. In some embodiments, several different libraries, each corresponding to a given problem domain or to a respective class of machine learning algorithm, may be supported by the MLS. In addition, in one embodiment MLS customers may be able to register their own custom functions (called "user-defined functions" or UDFs), third-party functions, or libraries comprising multiple UDFs or third-party functions with the MLS to extend the core feature processing capabilities of the MLS. UDFs may be provided to the MLS by clients in a variety of different formats (e.g., including one or more text formats and/or one or more binary formats) in some embodiments. A number of different programming or scripting languages may be supported for UDFs in such embodiments. An API for registering externally-produced transformation functions or libraries with the MLS may be supported in some embodiments, e.g., enabling a client to indicate whether the newly-registered functions are to be made accessible to other clients or restricted for use by the submitting client. In one implementation, a recipe may comprise an import section in which one or more libraries (e.g., libraries other than a core or standard library of the MLS) whose functions are used in the recipe may be listed. In some implementations, the MLS may impose resource usage restrictions on at least some UDFs—e.g., to prevent runaway consumption of CPU time, memory, disk space and the like, a maximum limit may be set on the time that a given UDF can run. In this way, the negative consequences of executing potentially error-prone UDFs (e.g., a UDF whose logic comprises an infinite loop under certain conditions) may be limited. In at least some embodiments, the recipe text (or a file or URL from which the recipe text can be read) may be passed as a parameter in an API (such as a "createRecipe" API) invoked by an MLS client.

The recipe text may be validated at the MLS, e.g., in accordance with a set of syntax rules of a grammar and a set of libraries that define supported transformation methods or functions (element 1704). If syntax errors or unresolvable tokens are identified during the text validation checks, in at least some embodiments error messages that indicate the portion of the text that needs to be corrected (e.g., by indicating the line number and/or the error-inducing tokens) may be provided to the recipe submitter. If no errors are found, or after the errors found are corrected and the recipe is re-submitted, an executable version of the recipe text may be generated (element 1707). One or both versions of the recipe (the text version and the executable version) may be stored in an artifact repository of the MLS in the depicted embodiment, e.g., with a unique recipe identifier generated by the MLS being provided to the recipe submitter.

The MLS may determine, e.g., in response to a different API invocation or because the initial submission of the recipe included an execution request, that the recipe is to be applied to a particular data set (element 1710). The data set may be checked to ensure that it meets run-time acceptance criteria, e.g., that the input variable names and data types match those indicated in the recipe, and that the data set is of an acceptable size (element 1713). A set of provider network resources (e.g., one or more compute servers, configured with appropriate amounts of storage and/or network capacity as determined by the MLS) may be identified for the recipe execution (element 1716). The transformations indicated in the recipe may then be applied to the input data set (element 1719). In some embodiments, as described above with respect to FIG. 16, the MLS may perform parameter explorations in an effort to identify acceptable parameter values for one or more of the transformations. After the recipe transformations are completed (and/or the results of the transformations are provided to the appropriate destinations, such as a model specified in the recipe itself), a notification that the recipe's execution is complete may be provided to the client that requested the execution (element 1722) in the depicted embodiment.

I/O-Efficient Input Data Filtering Sequences

As mentioned earlier, some machine learning input data sets can be much larger (e.g., on the order of terabytes) than the amount of memory that may be available at any given server of a machine learning service. In order to train and evaluate a model, a number of filtering or input record rearrangement operations may sometimes have to be performed in a sequence on an input data set. For example, for cross-validating a classification model, the same input data set may have to be split into training and test data sets multiple times, and such split operations may be considered one example of input filtering. Other input filtering operation types may include sampling (obtaining a subset of the data set), shuffling (rearranging the order of the input data objects), or partitioning for parallelism (e.g., dividing a data set into N subsets for a computation implemented using map-reduce or a similar parallel computing paradigm, or for performing multiple parallel training operations for a model). If a data set that takes up several terabytes of space were to be read from and/or written to persistent storage for each filtering operation (such as successive shuffles or splits), the time taken for just the I/O operations alone may become prohibitive, especially if a large fraction of the I/O comprised random reads of individual observation records of the input data set from rotating disk-based storage devices. Accordingly, in some embodiments, a technique of mapping large data sets into smaller contiguous chunks that are read once into some number of servers' memories, and then performing sequences of chunk-level filtering operations in place without copying the data set to persistent storage between successive filtering operations may be implemented at a machine learning service. In at least one such embodiment, an I/O library may be implemented by the machine learning service, enabling a client to specify, via a single invocation of a data-source-agnostic API, a variety of input filtering operations to be performed on a specified data set. Such a library may be especially useful in scenarios in which the input data sets comprise varying-length observation records stored in files within file system directories rather than in structured database objects such as tables, although the chunking and in-memory filtering technique described below may in general be performed for any of a variety of data source types (including databases) as described below. The I/O library may allow clients to indicate data sources of various types (e.g., single-host file systems, distributed file systems, storage services of implemented at a provider network, non-relational databases, relational databases, and so on), and may be considered data-source-agnostic in that the same types of filtering operations may be supported regardless of the type of data source being used. In some cases, respective subsets of a given input data set may be stored in different types of data sources.

Figure 18:
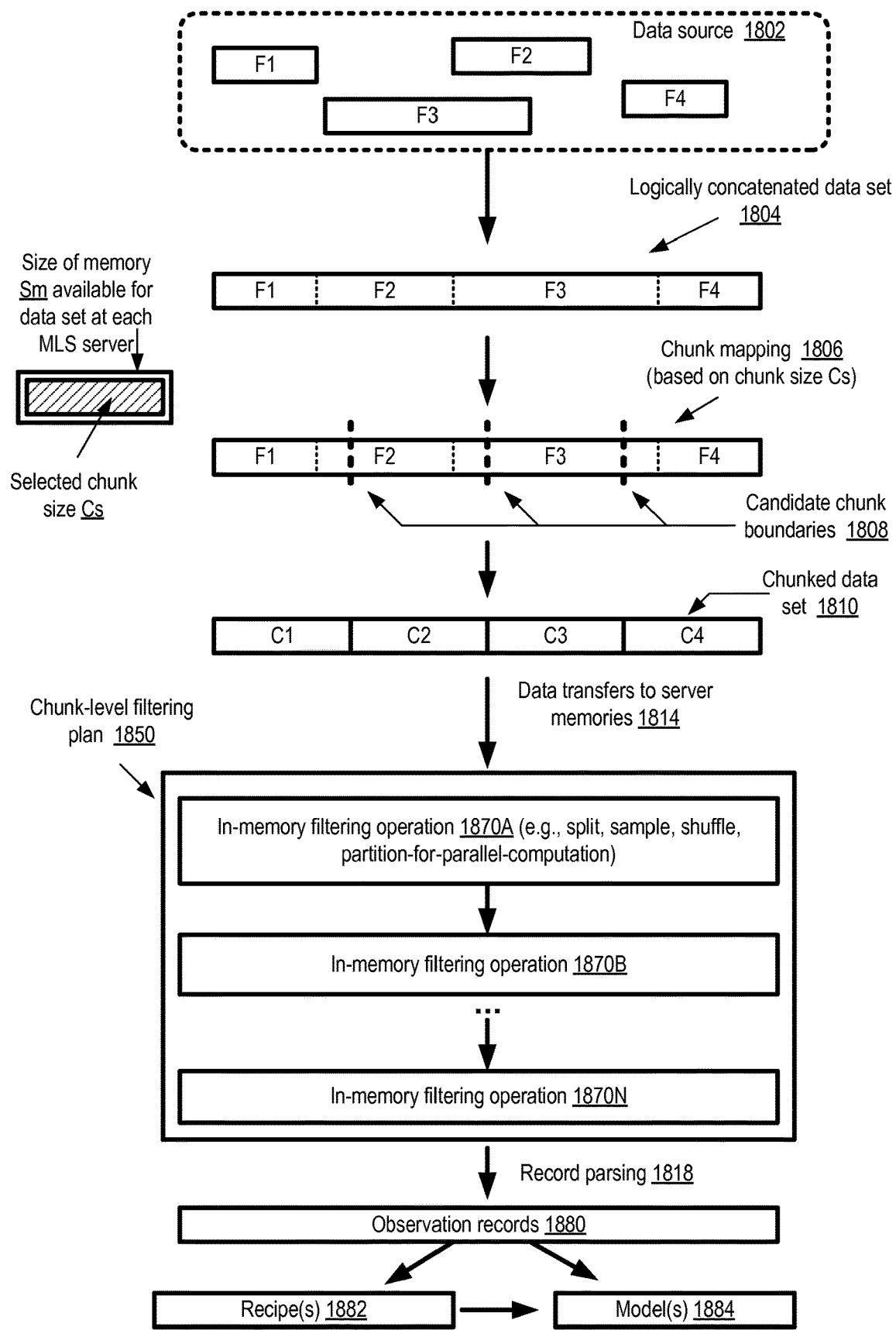
FIG. 18 illustrates an example procedure for performing efficient in-memory filtering operations on a large input data set by a machine learning service, according to at least some embodiments.

FIG. 18 illustrates an example procedure for performing efficient in-memory filtering operations on a large input data set by a machine learning service (MLS), according to at least some embodiments. As shown, a data source 1802 from which a client of the machine learning service wishes to extract observation records may comprise a plurality of data objects such as files F1, F2, F3 and F4 in the depicted embodiment. The sizes of the files may differ, and/or the number of observation records in any given file may differ from the number of observation records in other files. As used herein, the term "observation record" may be used synonymously with the term "data record" when referring to input data for machine learning operations. A data record extraction request submitted by the client may indicate the data source 1802, e.g., by referring to locations (e.g., a directory name or a set of URLs) of files F1, F2, F3 and F4. In response to the extraction request, the MLS may ascertain or estimate the size of the data set as a whole (e.g., the combined size of the files) in the depicted embodiment, and determine an order in which the files should be logically concatenated to form a unified address space. In the example shown, data set 1804 may be generated, for example, by logically concatenating the files in the order F1, F2, F3 and F4. In some embodiments, the client's data record extraction request may specify the order in which the files of a multi-file data set are to be combined (at least initially), and/or the sizes of the files. In other embodiments, the MLS may determine the concatenation order (e.g., based on any combination of various factors such as lexical ordering of the file names, the sizes of the files, and so on). It is noted that although files are used as an example of the data objects in which observation records are stored in FIG. 18 and some subsequent figures, similar techniques for input filtering may be used regardless of the type of the data objects used (e.g., volumes providing a block-level interface, database records, etc.) in various embodiments.

The concatenated address space of data set 1804 may then be sub-divided into a plurality of contiguous chunks, as indicated in chunk mapping 1806. The size of a chunk (Cs) may be determined based on any of several factors in different embodiments. For example, in one embodiment, the chunk size may be set such that each chunk can fit into the memory of an MLS server (e.g., a server of pools 185 of FIG. 1) at which at least a portion of the response to the client's data record extraction request is to be generated. Consider a simple scenario in which the memory portions available for the data records at each of several MLS servers is Sm. In such a scenario, a chunk size Cs such that Cs is less than or equal to Sm may be selected, as shown in FIG. 18. In other embodiments, the client request may indicate a chunk sizing preference, or the MLS may define a default chunk size to be used even if different servers have different amounts of memory available for the data records. In some embodiments, the chunk size to be used for responding to one record extraction request may differ from that used for another record extraction request; in other embodiments, the same chunk size may be used for a plurality of requests, or for all requests. The sub-division of the concatenated data set 1804 into contiguous chunks (rather than, for example, randomly selected sub-portions) may increase the fraction of the data set that can be read in via more efficient sequential reads than the fraction that has to be read via random reads, as illustrated below with respect to FIG. 19. In some embodiments, different chunks of a given chunk mapping may have different sizes—e.g., chunk sizes need not necessarily be identical for all the chunks of a given data set. It is noted that the initial sub-division of the data set into chunks represents a logical operation that may be performed prior to physical I/O operations on the data set.

In the depicted embodiment, an initial set of candidate chunk boundaries 1808 may be determined, e.g., based on the chunk sizes being used. As shown, candidate chunk boundaries need not be aligned with file boundaries in at least some embodiments. The candidate chunk boundaries may have to be modified somewhat to align chunk boundaries with observation record boundaries in at least some embodiments when the chunks are eventually read, as described below in greater detail with reference to FIG. 22. A chunk-level filtering plan 1850 may be generated for the chunked data set 1810 in some embodiments, e.g., based on contents of a filtering descriptor (which may also be referred to as a retrieval descriptor) included in the client's request. The chunk-level filtering plan may indicate, for example, the sequence in which a plurality of in-memory filtering operations 1870 (e.g., 1870A, 1870B and 1870N) such as shuffles, splits, samples, or partitioning for parallel computations such as map reduce are to be performed on the chunks of the input data. In some embodiments the machine learning model may support parallelized training of models, in which for example respective (and potentially partially overlapping) subsets of an input data set may be used to train a given model in parallel. The duration of one training operation may overlap at least partly with the duration of another in such a scenario, and the input data set may be partitioned for the parallel training sessions using a chunk-level filtering operation. A chunk-level shuffle, for example, may involve rearranging the relative order of the chunks, without necessarily rearranging the relative order of observation records within a given chunk. Examples of various types of chunk-level filtering operations are described below.

In at least some embodiments, the client may not necessarily be aware that at least some of the filtering operations will be performed on chunks of the data set rather than at the granularity of individual data records. In the depicted embodiment, data transfers 1814 of the contents of the chunks (e.g., the observation records respectively included within C1, C2, C3 and C4) may be performed to load the data set into the memories of one or more MLS servers in accordance with the first filtering operation of the sequence. To implement the first in-memory filtering operation of the sequence, for example, a set of reads directed to one or more persistent storage devices at which least some of the chunks are stored may be executed. De-compression and/or decryption may also be required in some embodiments, e.g., prior to one or more operations of the sequence of filtering operations 1870. For example, if the data is stored in compressed form at the persistent storage devices, it may be de-compressed in accordance with de-compression instructions/metadata provided by the client or determined by the MLS. Similarly, if the source data is encrypted, the MLS may decrypt the data (e.g., using keys or credentials provided or indicated by the client).

After the set of reads (and/or the set of associated de-compression/decryption operations) is completed, at least a subset of the chunks C1-C4 may be present in MLS server memories. (If the first filtering operation of the sequence involves generating a sample, for example, not all the chunks may even have to be read in.) The remaining filtering operations of plan 1850 may be performed in place in the MLS server memories, e.g., without copying the contents of any of the chunks to persistent storage in the depicted embodiment, and/or without re-reading the content of any of the chunks from the source data location. For example, the in-memory results of the first filtering operation may serve as the input data set for the second filtering operation, the in-memory results of the second filtering operation may serve as the input data set for the third filtering operation, and so on. In the depicted embodiment, the final output of the sequence of filtering operations may be used as input for record parsing 1818 (i.e., determining the content of various variables of the observation records). The observation records 1880 generated as a result of parsing may then be provided as input to one or more destinations, e.g., to model(s) 1884 and/or feature processing recipe(s) 1882. Thus, in the depicted embodiment, only a single pass of physical read operations may be required to implement numerous different filtering operations, which may result in a substantial input processing speedup compared to scenarios in which the data set is copied to persistent storage (or re-read) for each successive filtering operation. Of course, although multiple chunk-level and/or observation-record-level operations may be performed in memory without accessing persistent storage, the results of any such operation may be stored to persistent storage if necessary, e.g., so that the results may be re-used later for another job. Thus, although avoiding frequent and potentially time-consuming I/O operations to disk-based or other persistent storage devices is made easier by the technique described above, I/O to persistent storage may still be performed at any stage as and when necessary based on an application's requirements.

By performing filtering operations such as shuffling or sampling at the chunk level as described above, random physical read operations directed to individual data records may be avoided. Consider a scenario in which the input data set is to be shuffled (e.g., to cross-validate a classification model), the shuffling is performed at the chunk level with a chunk size of one megabyte, the data records of the data set have an average size of one kilobyte, and neither de-compression nor decryption is required. If the original data set was 1000 megabytes in size, in any given iteration of random shuffling, the order in which 1000 chunks are logically arranged may be changed. However, the order of the data records within any given chunk would not change in a chunk-level shuffle operation. As a result, all the data records that lie within a particular chunk (e.g., Chunk654 out of the 1000 chunks) would be provided as a group to train a model using the results of the shuffling. If the records within Chunk654 are not randomly distributed with respect to an independent variable V1 (which may also be referred to as an input variable) of interest, the chunk-level shuffle may not end up being as good with respect to randomizing the values of V1 for training purposes as, for example, a record-level shuffle would have been. Thus, at least in some scenarios there may be some loss of statistical quality or predictive accuracy as a result of performing filtering at the chunk level rather than the data record level. However, in general the loss of quality/accuracy may be kept within reasonable bounds by choosing chunk sizes appropriately. FIG. 19 illustrates tradeoffs associated with varying the chunk size used for filtering operation sequences on machine learning data sets, according to at least some embodiments.

Read operations corresponding to two example chunk mappings are shown for a given data set DS1 in FIG. 19. To simplify the presentation, data set DS1 is assumed to be stored on a single disk, such that a disk read head has to be positioned at a specified offset in order to start a read operation (either a random read or a set of sequential reads) on DS1. In chunk mapping 1904A, a chunk size of S1 is used, and DS1 is consequently subdivided into four contiguous chunks starting at offsets O1, O2, O3 and O4 within the data set address space. (It is noted that the number of chunks in the example mappings shown in FIG. 19 and in subsequent figures has been kept trivially small to illustrate the concepts being described; in practice, a data set may comprise hundreds or thousands of chunks.) In order to read the four chunks, a total of (at least) four read head positioning operations (RHPs) would have to be performed. After positioning a disk read head at offset O1, for example, the first chunk comprising the contents of DS1 with offsets between O1 and O2 may be read in sequentially. This sequential read (SR1) or set of sequential reads may typically be fast relative to random reads, because the disk read head may not have to be repositioned during the sequential reads, and disk read head positioning (also known as "seeking") may often take several milliseconds, which may be of the same order of magnitude as the time taken to sequentially read several megabytes of data. Thus, with the chunk size of S1, reading the entire data set DS1 as mapped to four chunks may involve a read operations mix 1910A that includes four slow RHPs (RHP1-RHP4) and four fast sequential reads (SR1-SR4).

Instead of using a chunk size of S, if a chunk size of 2S (twice the size used for mapping 1904A) were used, as in mapping 1904B, only two RHPs would be required (one to offset O1 and one to offset O3) as indicated in read operations mix 1910B, and the data set could be read in via two sequential read sequences SR1 and SR2. Thus, the number of slow operations required to read DS1 would be reduced in inverse proportion to the chunk size used. On the X-axis of tradeoff graph 1990, chunk size increases from left to right, and on the Y-axis, the change in various metrics that results from the chunk size change is illustrated. In general, increasing the chunk size would tend to decrease the total read time (TRT) for transferring large data sets into memory. Even if the reads of different chunks could be performed in parallel, increasing the fraction of the data that is read sequentially would in general tend to decrease total read time. Increasing the chunk size may in general require more memory at the MLS servers to hold the chunk contents, as indicated by the per-server memory requirement (MR) curve shown in graph 1990. Finally, as discussed above, for at least some types of machine learning problems, increased chunk sizes may lead to a slightly worse quality of statistics (QS) or slightly worse predictive accuracy of machine learning models. This may occur because the records within a given chunk may not be filtered with respect to records in the entire data set (or with respect to each other) in the same way that the chunks are filtered with respect to each other. In scenarios in which the MLS is able to select a chunk size, therefore, the tradeoffs illustrated in graph 1990 between total read time, memory requirements and statistical quality may have to be considered. In practice, depending on the size of the chunks relative to the entire data set, the loss of statistical quality resulting from using larger chunks may be fairly small. In at least some embodiments, there need not be a 1:1 relationship between chunks and MLS servers—e.g., a given MLS server may be configurable to store multiple chunks of a data set. In some embodiments, partial chunks or subsets of chunks may also be stored at an MLS server—e.g., the number of chunks stored in a given server's memory need not be an integer. In various embodiments, in addition to chunk-level filtering operations, intra-chunk and/or cross-chunk filtering operations (e.g., at the observation record level) may be performed as described below in further detail, which may help to further reduce the loss of statistical quality. It is noted that the curves shown in graph 1990 are intended to illustrate broad qualitative relationships, not exact mathematical relationships. The rate at which the different metrics change with respect to chunk size may differ from that shown in the graph, and the actual relationships may not necessarily be representable by smooth curves or lines as shown.

Figure 20A:
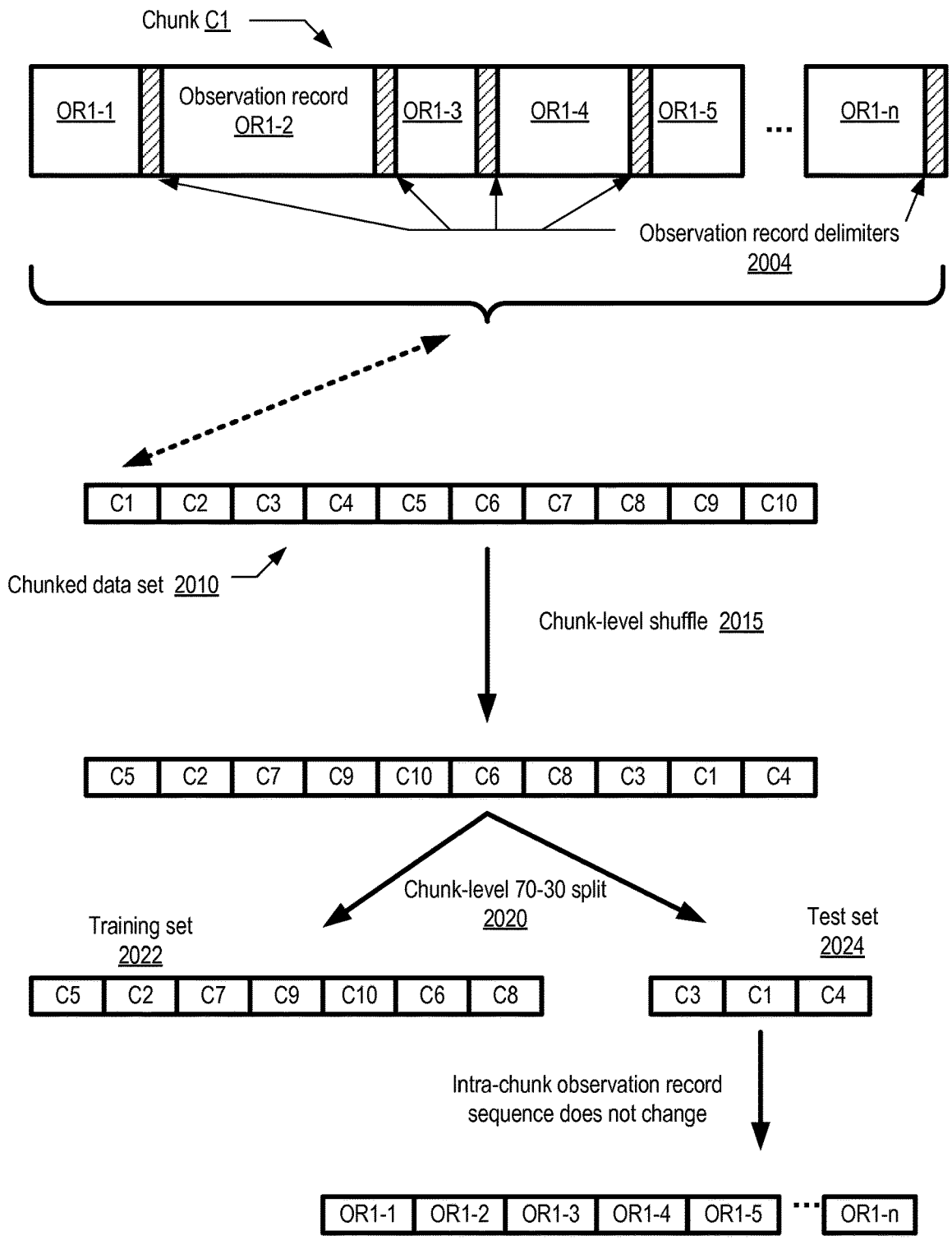
FIG. 20a illustrates an example sequence of chunk-level filtering operations, including a shuffle followed by a split, according to at least some embodiments.

FIG. 20a illustrates an example sequence of chunk-level filtering operations, including a shuffle followed by a split, according to at least some embodiments. As shown, a chunked data set 2010 comprises ten chunks C1-C10. A detailed view of chunk C1 at the top of FIG. 20a shows its constituent observation records OR1-1 through OR1-n, with successive observation records being separated by delimiters 2004. As shown, the observation records of a data set or a chunk need not be of the same size. In a chunk-level shuffle operation 2015, which may be one of the in-memory chunk-level filtering operations of a plan 1850, the chunks are re-ordered. After the shuffle, the chunk order may be C5-C2-C7-C9-C10-C6-C8-C3-C1-C4. In a subsequent chunk-level split operation 2020, 70% of the chunks (e.g., C5-C2-C7-C9-C10-C6-C8) may be placed in training set 2022, while 30% of the chunks (C3-C1-C4) may be placed in a test set 2024 in the depicted example. As the shuffle was performed at the chunk level, the internal ordering of the observation records within a given chunk remains unchanged in the depicted example. Thus, the observation records of chunk C1 are in the same relative order (OR1-1, OR1-2, . . . , OR1-n) after the shuffle and split as they were before the shuffle and split filtering operations were performed. It is noted that for at least some types of filtering operations, in addition to avoiding copies to persistent storage, the chunk contents may not even have to be moved from one memory location to another in the depicted embodiment. For example, instead of physically re-ordering the chunks from C1-C2-C3-C4-O5-C6-C7-C8-C9-C10 to C5-C2-C7-C9-C10-C6-C8-C3-C1-C4 during the shuffle, pointers to the chunks may be modified, such that the pointer that indicates the first chunk points to C5 instead of C1 after the shuffle, and so on.

Figure 20B:
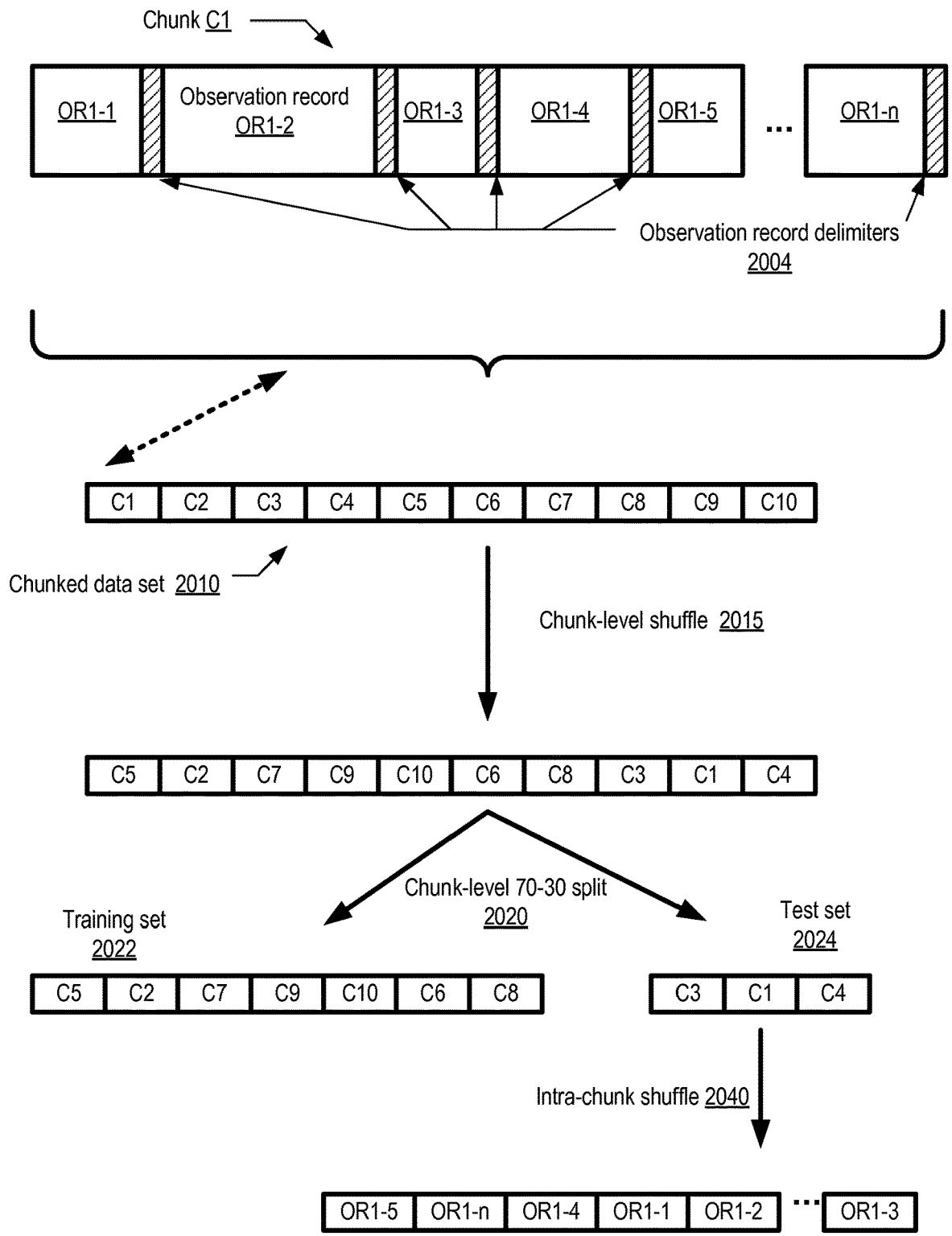
FIG. 20b illustrates an example sequence of in-memory filtering operations that includes chunk-level filtering as well as intra-chunk filtering, according to at least some embodiments.

In some embodiments, as mentioned earlier, filtering at the observation record level may also be supported by the MLS. For example, a client's record extraction request may comprise descriptors for both chunk-level filtering and record-level filtering. FIG. 20b illustrates an example sequence of in-memory filtering operations that includes chunk-level filtering as well as intra-chunk filtering, according to at least some embodiments. In the depicted example, the same set of chunk-level filtering operations are performed as those illustrated in FIG. 20a—i.e., a chunk-level shuffle 2015 is performed on data set 2004, followed by a 70-30 split 2020 into training set 2022 and test set 2024. However, after the chunk-level split, an intra-chunk shuffle 2040 is also performed, resulting in the rearrangement of the observation records within some or all of the chunks. As a result of the intra-chunk shuffle, the observation records of chunk C1 may be provided as input in the order OR1-5, OR1-n, OR1-4, OR1-1, OR1-2, . . . , to a model or feature processing recipe (or to a subsequent filtering operation), for example, which differs from the original order of the observation records prior to the chunk-level shuffle. Observation records of the other chunks (e.g., C2-C10), which are not shown in FIG. 20a or FIG. 20b, may also be shuffled in a similar manner in accordance with the client's filtering descriptor. In at least one embodiment, cross-chunk record-level filtering operations may also be supported. For example, consider a scenario in which at least two chunks Cj and Ck are read into the memory of a given MLS server S1. In a cross-chunk shuffle, at least some of the observation records of Cj may be shuffled or re-ordered with some of the observation records of Ck in S1's memory. Other types of record-level filtering operations (e.g., sampling, splitting, or partitioning) may also be performed across chunks that are co-located in a given server's memory in such embodiments. In one implementation, multiple servers may cooperate with one another to perform cross-chunk operations. For some applications, only a single chunk-level filtering operation may be performed before the result set of the chunk-level operation is fed to a recipe for feature processing or to a model for training—that is, a sequence of multiple chunk-level operations may not be required. Other types of operations (such as aggregation/collection of observation records or applying aggregation functions to values of selected variables of observation records) may also be performed subsequent to one or more chunk-level operations in at least some embodiments.

Figure 21:
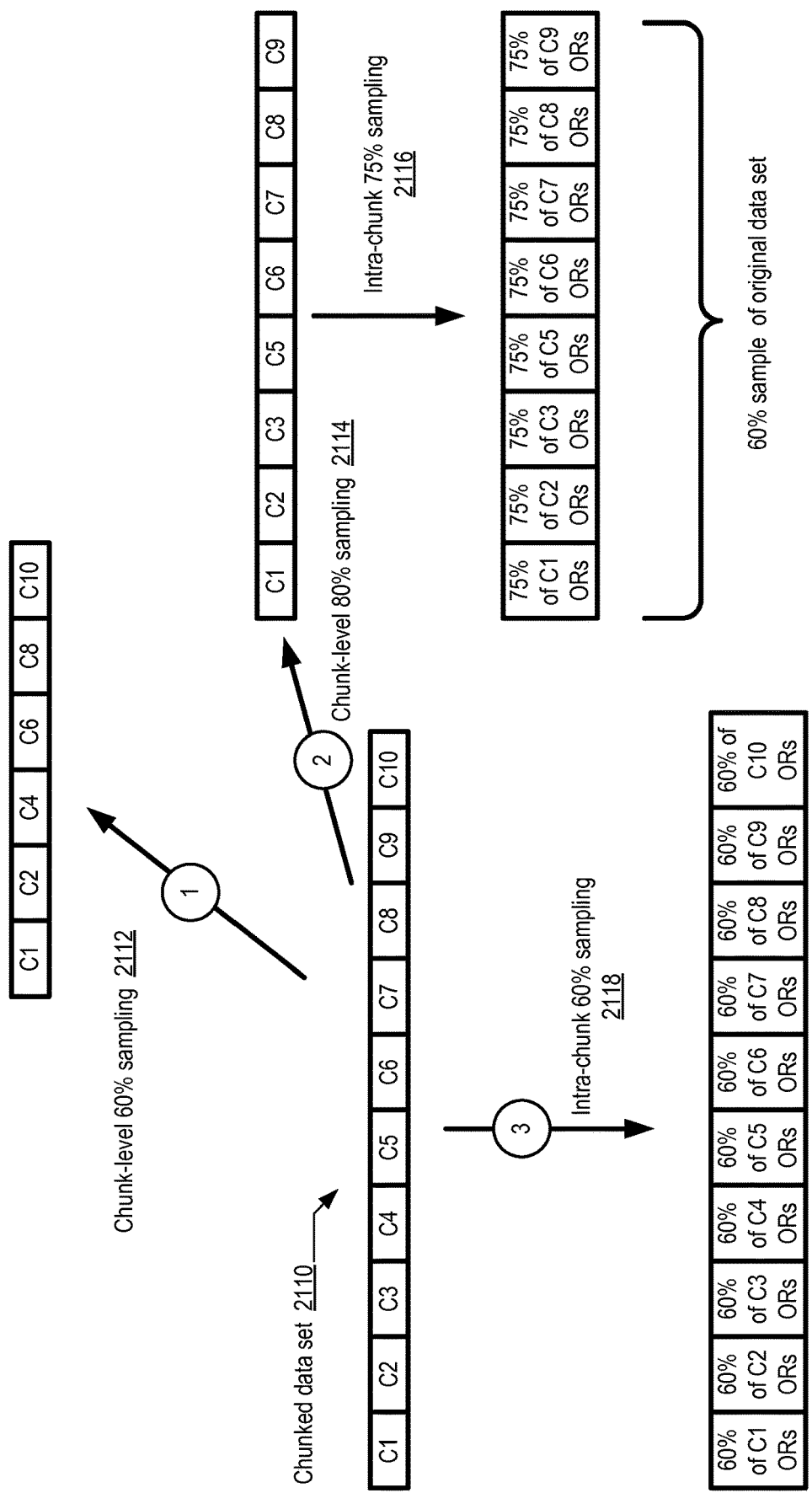
FIG. 21 illustrates examples of alternative approaches to in-memory sampling of a data set, according to at least some embodiments.

The ability to perform filtering operations at either the chunk level or the observation record level may enable several different alternatives to achieving the same input filtering goal. FIG. 21 illustrates examples of alternative approaches to in-memory sampling of a data set, according to at least some embodiments. A 60% sample of a chunked data set 2110 comprising ten chunks C1-C10 is to be obtained—that is, approximately 60% of the observation records of the data set are to be retained, while approximately 40% of the observation records are to be excluded from the output of the sampling operation.

In a first approach, indicated by the arrow labeled "1", straightforward chunk-level sampling 2112 of the chunks may be implemented, e.g., resulting in the selection of chunks C1, C2, C4, C6, C8 and C10 as the desired sample. In a second approach, a combination of chunk-level and intra-chunk sampling may be used. For example, as indicated by the arrow labeled "2", in a first step, 80% of the chunks may be selected (resulting in the retention of chunks C1, C2, C3, C5, C6, C7, C8 and C9) using chunk-level sampling 2114. Next, in an intra-chunk sampling step 2116, 75% of the observation records of each of the retained chunks may be selected, resulting in a final output of approximately 60% of the observation records (since 75% of 80% is 60%). In a third alternative approach indicated by the arrow labeled "3", 60% of each chunk's observation records may be sampled in a single intra-chunk sampling step 2118. Similar alternatives and combinations for achieving a given input filtering goal may also be supported for other types of filtering operations in at least some embodiments.

Figure 22:
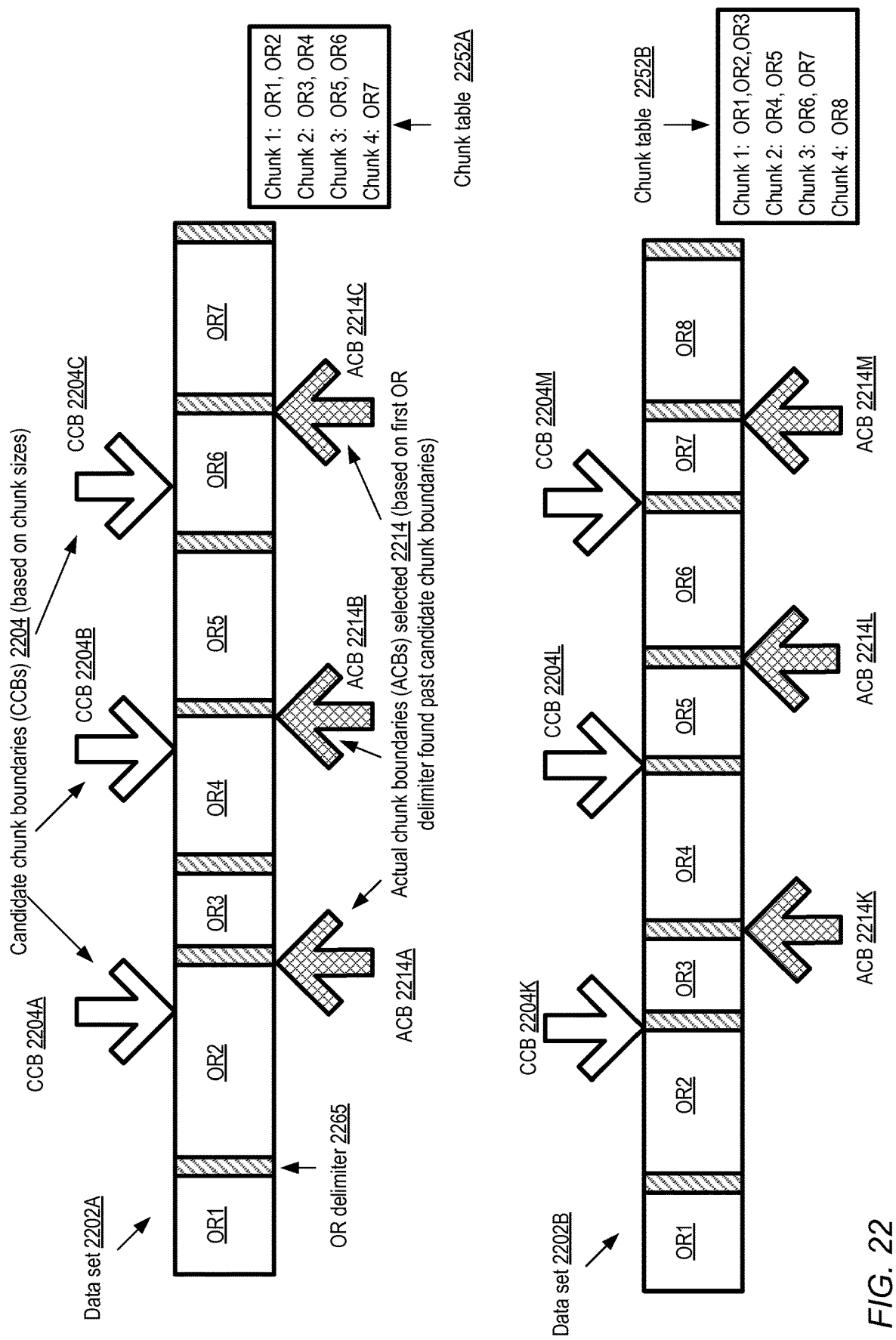
FIG. 22 illustrates examples of determining chunk boundaries based on the location of observation record boundaries, according to at least some embodiments.

In at least some embodiments, candidate chunk boundaries may have to be adjusted in order to ensure that individual observation records are not split, and to ensure consistency in the manner that observation records are assigned to chunks. FIG. 22 illustrates examples of determining chunk boundaries based on the location of observation record boundaries, according to at least some embodiments. Data set 2202A comprises observation records OR1-OR7 (which may vary in size) separated by record delimiters such as delimiter 2265. For example, in one implementation in which the data source includes alphanumeric or text files, newline characters ("\n") or other special characters may be used as record delimiters. Based on a selected chunk size, the candidate chunk boundaries happen to fall within the bodies of the observation records in data set 2202A. Candidate chunk boundary (CCB) 2204A falls within observation record OR2 in the depicted example, CCB 2204B falls within OR4, and CCB 2204C falls within OR6. In the depicted embodiment, the following approach may be used to identify the actual chunk boundaries (ACBs). Starting at the offset immediately after the CCB for a given chunk's ending boundary, and examining the data set in increasing offset order (e.g., in a sequential scan or read), the first observation record delimiter found is selected as the ending ACB for the chunk. Thus, in the example of data set 2202A, the position of the delimiter between OR2 and OR3 is identified as the actual chunk boundary 2214A corresponding to CCB 2204A. Similarly, ACB 2214B corresponds to the delimiter between OR4 and OR5, and ACB 2214C corresponds to the delimiter between OR6 and OR7. As a result of the selection of the actual chunk boundaries, as shown in chunk table 2252A, chunk C1 comprises OR1 and OR2, chunk C2 comprises OR3 and OR4, and chunk C3 comprises OR5 and OR6, while chunk C4 comprises OR7. Using the technique described, each observation record is mapped to one and only one chunk.

The same rules regarding the determination of chunk boundaries may be applied even if a CCB happens to coincide with an OR delimiter in some embodiments. For example, in data set 2202B, CCB 2204K happens to be aligned with the delimiter separating OR2 and OR3, CCB 2204L coincides with the delimiter separating OR4 and OR5, while CCB 2204M coincides with the delimiter separating OR6 and OR7. Using the rule mentioned above, in each case the search for the next delimiter starts at the offset immediately following the CCB, and the next delimiter found is selected as the ACB. Accordingly, ACB 2214K is positioned at the delimiter between OR3 and OR4, ACB 2214L is positioned at the delimiter between OR5 and OR6, and ACB 2214M is positioned at the delimiter between OR7 and OR8. As indicated in chunk table 2252B, chunk C1 of data set 2202B eventually includes OR1, OR2 and OR3, chunk C2 includes OR4 and OR5, chunk C3 includes OR6 and OR7, and chunk C4 includes OR8.

Figure 23:
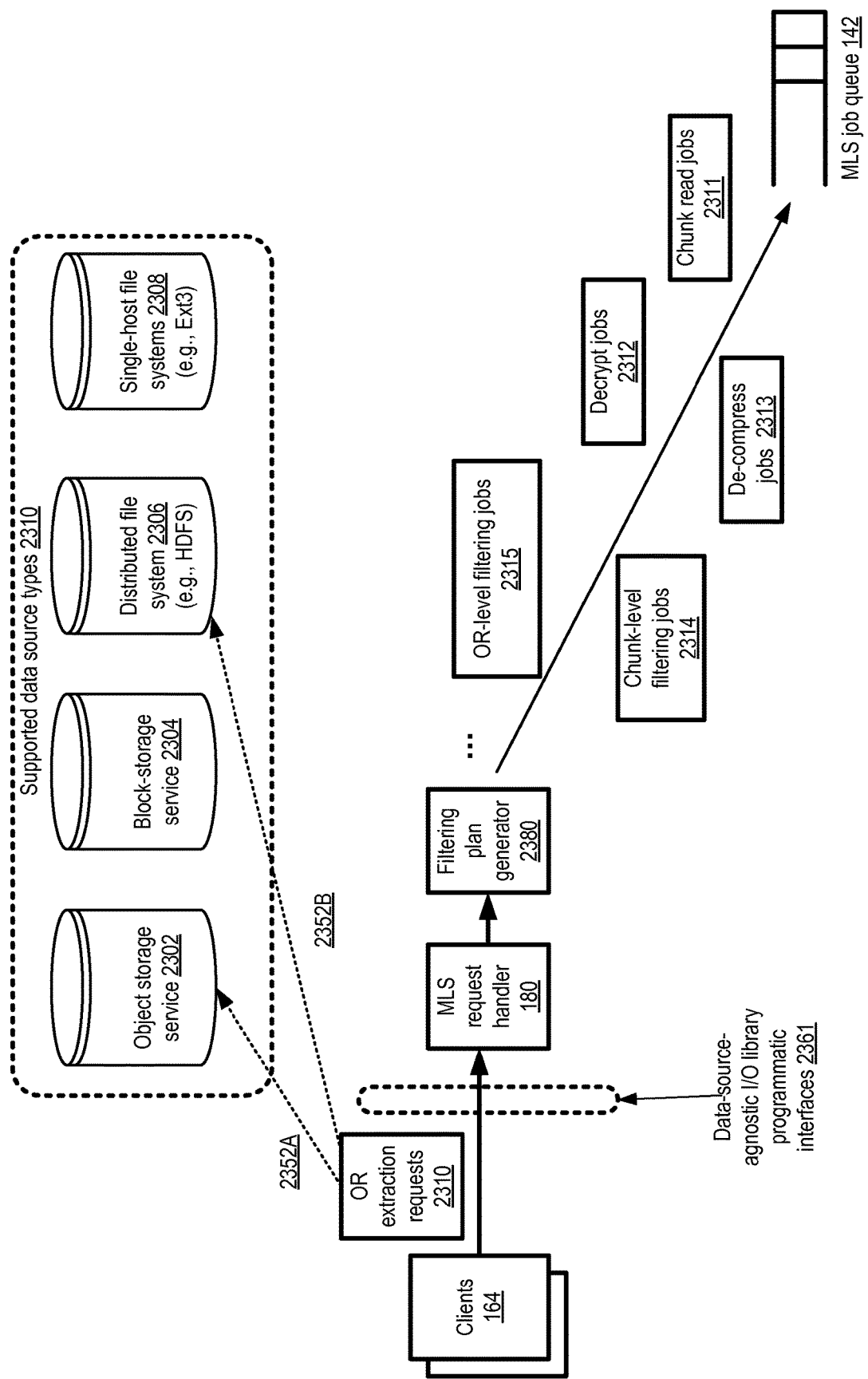
FIG. 23 illustrates examples of jobs that may be scheduled at a machine learning service in response to a request for extraction of data records from any of a variety of data source types, according to at least some embodiments.

FIG. 23 illustrates examples of jobs that may be scheduled at a machine learning service in response to a request for extraction of data records from any of a variety of data source types, according to at least some embodiments. As shown, a set of programming interfaces 2361 enabling clients 164 to submit observation record extraction/retrieval requests 2310 in a data-source-agnostic manner may be implemented by the machine learning service. Several different types 2310 of data sources may be supported by the MLS, such as an object storage service 2302 that may present a web-services interface to data objects, a block storage service 2304 that implements volumes presenting a block-device interface, any of a variety of distributed file systems 2306 (such as the Hadoop Distributed File System or HDFS), as well as single-host file systems 2308 (such as variants of Ext3 that may be supported by Linux-based operating systems). In at least some embodiments, databases (e.g., relational databases or non-relational databases) may also be supported data sources. Data objects (e.g., files) that are implemented using any of the supported types of data sources may be referred to in the retrieval requests, as indicated by the arrows labeled 2352A and 2352B. In some implementations, a single client request may refer to input data objects such as files that are located in several different types of data sources, and/or in several different instances of one or more data source types. For example, different subsets of a given input data set may comprise files located at two different single-host file systems 2308, while respective subsets of another input data set may be located at an object storage service and the block-storage service.

An MLS request handler 180 may receive a record extraction request 2310 indicating a sequence of filtering operations that are to be performed on a specified data set located at one or more data sources, such as some combination of shuffling, splitting, sampling, partitioning (e.g., for parallel computations such as map-reduce computations, or for model training operations/sessions that overlap with each other in time and may overlap with each other in the training sets used), and the like. A filtering plan generator 2380 may generate a chunk mapping of the specified data set, and a plurality of jobs to accomplish the requested sequence of filtering operations (either at the chunk level, the record level, or both levels) in the depicted embodiment, and insert the jobs in one or more MLS job queues 142. For example, one or more chunk read jobs 2311 may be generated to read in the data from the data source. If needed, separate jobs may be created to de-compress the chunks (such as jobs 2312) and/or decrypt the data (jobs 2313). In the depicted embodiment, jobs 2314 may be generated for chunk-level filtering operations, while jobs 2315 may be generated for observation record-level filtering operations. Filtering operations at the observation record level may comprise intra-chunk operations (e.g., shuffles of records within a given chunk) and/or cross-chunk operations (e.g., shuffles of records of two or more different chunks that may be co-located in the memory of a given MLS server) in the depicted embodiment. In at least some embodiments, respective jobs may be created for each type of operation for each chunk—thus, for example, if the chunk mapping results in 100 chunks, 100 jobs may be created for reading in one chunk respectively, 100 jobs may be created for the first chunk-level filtering operation, and so on. In other embodiments, a given job may be created for an operation involving multiple chunks, e.g., a separate job may not be required for each chunk. In some embodiments, as described below in further detail, the splitting of a data set into a training set and a test set may be implemented as separate jobs—one for the training set and one for the test set. As discussed earlier, a given job may indicate dependencies on other jobs, and such dependencies may be used to ensure that the filtering tasks requested by the client are performed in the correct order.

Figure 24:
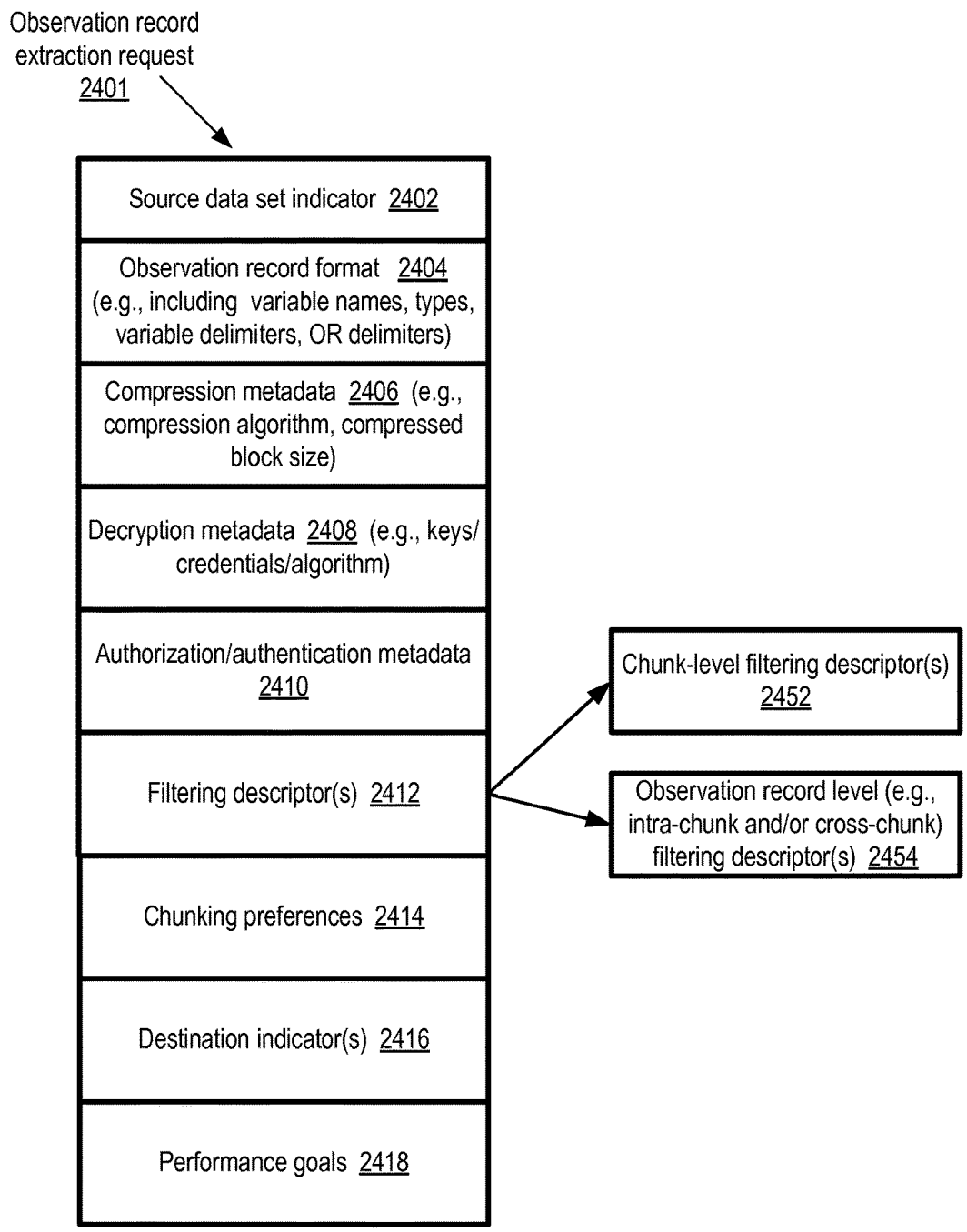
FIG. 24 illustrates examples constituent elements of a record retrieval request that may be submitted by a client using a programmatic interface of an I/O (input-output) library implemented by a machine learning service, according to at least some embodiments.

FIG. 24 illustrates examples constituent elements of a record extraction request that may be submitted by a client using a programmatic interface of an I/O (input-output) library implemented by a machine learning service, according to at least some embodiments. As shown, observation record (OR) extraction request 2401 may include a source data set indicator 2402 specifying the location(s) or address(es) from which the input data set is to be retrieved. For a data set stored in an object storage service presenting a web-service interface, for example, one or more URLs (uniform resource locators) or URIs (uniform resource identifiers) may be specified; for files, some combination of one or more file server host names, one or more directory names, and/or one or more file names may be provided as the indicator 2402. In one implementation, if a data set includes multiple objects such as more than one file, a client may include instructions for logical concatenation of the objects of the data set to form a unified address space (e.g., the logical equivalent of "combine files of directory d1 in alphabetical order by file name, then files of directory d2 in alphabetical order"). In some embodiments, an expected format 2404 or schema for the observation records may be included in the OR extraction request, e.g., indicating the names of the variables or fields of the ORs, the inter-variable delimiters (e.g., commas, colons, semicolons, tabs, or other characters) and the OR delimiters, the data types of the variables, and so on. In at least one implementation, the MLS may assign default data types (e.g., "string" or "character") to variables for which data types are not indicated by the client.

In one embodiment, the OR extraction request 2401 may include compression metadata 2406, indicating for example the compression algorithm used for the data set, the sizes of the units or blocks in which the compressed data is stored (which may differ from the sizes of the chunks on which chunk-level in-memory filtering operations are to be performed), and other information that may be necessary to correctly de-compress the data set. Decryption metadata 2408 such as keys, credentials, and/or an indication of the encryption algorithm used on the data set may be included in a request 2401 in some embodiments. Authorization/authentication metadata 2410 to be used to be able to obtain read access to the data set may be provided by the client in request 2401 in some implementations and for certain types of data sources. Such metadata may include, for example, an account name or user name and a corresponding set of credentials, or an identifier and password for a security container (similar to the security containers 390 shown in FIG. 3).

OR extraction request 2401 may include one or more filtering descriptors 2412 in the depicted embodiment, indicating for example the types of filtering operations (shuffle, split, sample, etc.) that are to be performed at the chunk level and/or at the OR level, and the order in which the filtering operations are to be implemented. In some implementations, one or more descriptors 2452 may be included for chunk-level filtering operations, and one or more descriptors 2454 may be included for record-level (e.g., intra-chunk and/or cross-chunk) filtering operations. Each such descriptor may indicate parameters for the corresponding filtering operation—e.g., the split ratio for split operations, the sampling ratio for sampling operations, the number of partitions into which the data set is to be subdivided for parallel computations or parallel training sessions, the actions to be taken if a record's schema is found invalid, and so on.

In at least one embodiment, the OR extraction request 2401 may include chunking preferences 2414 indicating, for example, a particular acceptable chunk size or a range of acceptable chunk sizes. The destination(s) to which the output of the filtering operation sequence is to be directed (e.g., a feature processing recipe or a model) may be indicated in field 2416. In some embodiments, a client may indicate performance goals 2418 for the filtering operations, such as a "complete-by" time, which may be used by the MLS to select the types of servers to be used, or to generate a filtering sequence plan that is intended to achieve the desired goals. It is noted that in at least some embodiments, not all of the constituent elements shown in FIG. 25 may be included within a record extraction request—for example, the compression and/or decryption related fields may only be included for data sets that are stored in a compressed and/or encrypted form.

Figure 25:
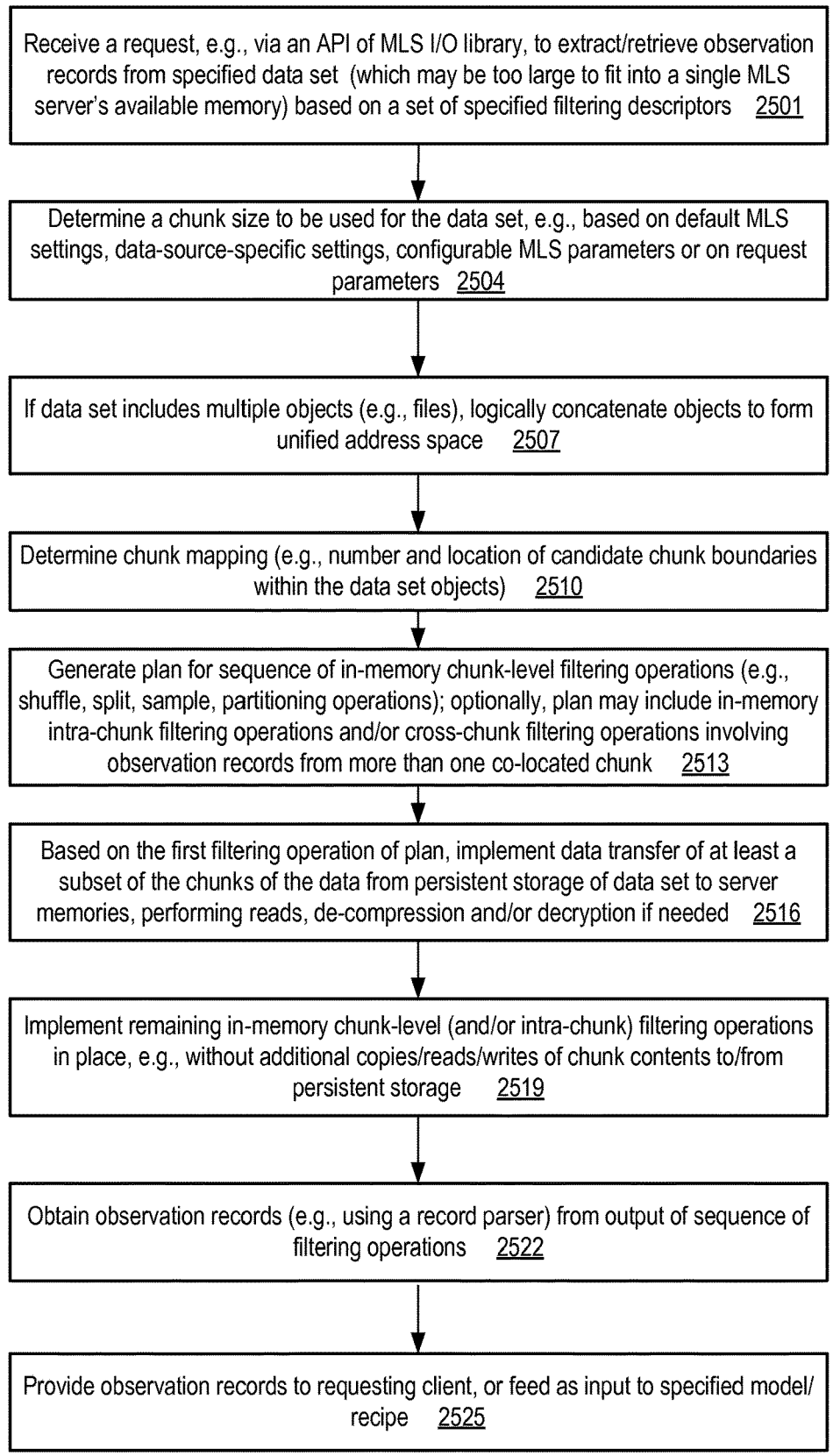
FIG. 25 is a flow diagram illustrating aspects of operations that may be performed at a machine learning service that implements an I/O library for in-memory filtering operation sequences on large input data sets, according to at least some embodiments.

FIG. 25 is a flow diagram illustrating aspects of operations that may be performed at a machine learning service that implements an I/O library for in-memory filtering operation sequences on large input data sets, according to at least some embodiments. An I/O library that enables clients to submit observation record extraction requests similar to those illustrated in FIG. 24 may be implemented. The I/O library may be agnostic with respect to the type of data store at which the input data set is stored—e.g., a common set of programmatic interfaces may be provided for record extraction requests stored at any combination of several different data store types. Such an OR extraction request may be received (element 2501), indicating a source data set that may be too large to fit into the available memory of an MLS server. The OR extraction request may include one or more descriptors indicating a sequence of filtering operations that are to be performed on the input data set.

A chunk size to be used for transferring contiguous subsets of the input data set into the memories of one or more MLS servers may be determined (element 2504), e.g., based on any of various factors such as the memory capacity constraints of the MLS servers, a preference indicated by the requesting client via parameters of the request, a default setting of the MLS, the estimated or actual size of the input data set, and so on. In some implementations several different chunk sizes may be selected—e.g., some MLS servers may have a higher memory capacity than others, so the chunks for the servers with more memory may be larger. If the input data set includes multiple objects (such as files), the objects may be logically concatenated to form a single unified address space (element 2507) in some embodiments. The sequence in which the objects are concatenated may be determined, for example, based on instructions or guidance provided in the request, based on alphanumeric ordering of the object names, in order of file size, in random order, or in some other order selected by the MLS.

A chunk mapping may be generated for the data set (element 2510), indicating a set of candidate chunk boundaries based on the selected chunk size(s) and the unified address space. The positions or offsets of the candidate chunk boundaries within the data object or object of the input data set may be computed as part of the mapping generation process. A plan for a sequence of chunk-level filtering operations corresponding to the filtering descriptor(s) in the OR extraction request may be created (element 2513). The plan may include record-level filtering operations (e.g., intra-chunk or cross-chunk operations), in addition to or instead of chunk-level filtering operations, in some embodiments. Cross-chunk operations may, for example, be performed on observation records of several chunks that are co-located in the memory of a given MLS server in some embodiments. In other embodiments, cross-chunk operations may also or instead be performed on chunks that have been read into the memories of different MLS servers. The types of filtering operations supported may include sampling, splitting, shuffling, and/or partitioning. Based at least in part on the first filtering operation of the plan, a data transfer of at least a subset of the chunks of the data set from persistent storage to MLS server memories may be performed (element 2516). Depending on the manner in which the data is stored at the source locations indicated in the OR extraction request, the data transfer process may include decryption and/or decompression in addition to read operations in some embodiments. In some embodiments, the client may request the MLS to encrypt and/or compress the data prior to transferring the chunks from the source locations to the MLS servers, and then to perform the reverse operation (decryption and/or decompression) once the encrypted/compressed data reaches the MLS servers.

After the first filtering operation of the sequence is performed in memory at the MLS servers, the remaining filtering operations (if any) may be performed in place in the depicted embodiment, e.g., without copying the chunks to persistent storage or re-reading the chunks for their original source locations (element 2519). In one embodiment, respective jobs may be generated and placed in an MLS job queue for one or more of the filtering operations. In at least some embodiments, a record parser may be used to obtain the observation records from the output of the sequence of filtering operations performed (element 2522). The ORs may be provided programmatically to the requesting client (e.g., as an array or collection returned in response to the API call representing the OR extraction request), and/or to a specified destination such as a model or a feature processing recipe (element 2525).

Consistent Filtering of Input Data Sets

Figure 26:
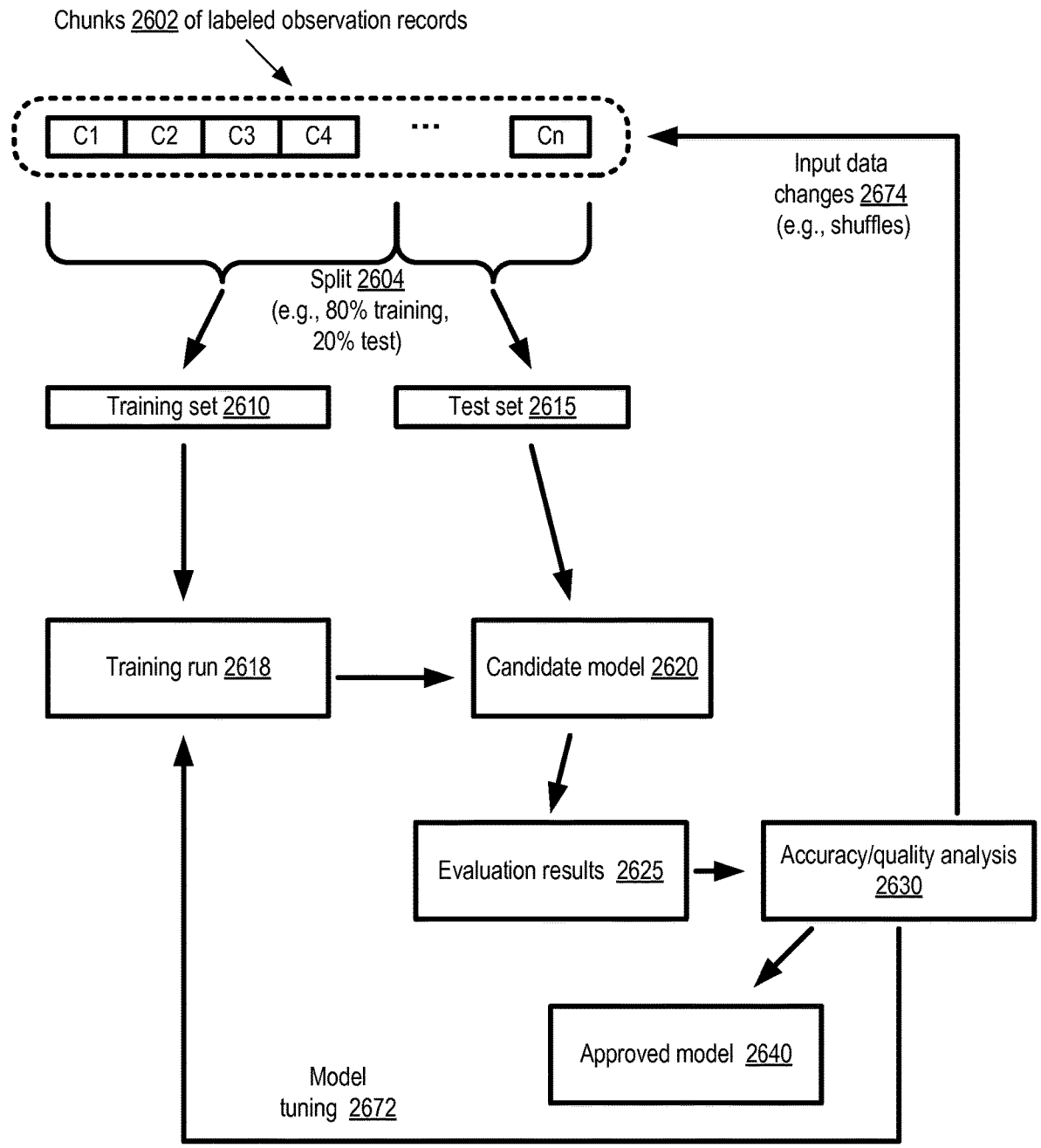
FIG. 26 illustrates an example of an iterative procedure that may be used to improve the quality of predictions made by a machine learning model, according to at least some embodiments.

FIG. 26 illustrates an example of an iterative procedure that may be used to improve the quality of predictions made by a machine learning model, according to at least some embodiments. The procedure may include re-splitting or re-shuffling the input data set for each of several cross-validation iterations, for example, as described below. An input data set comprising labeled observation records (i.e., observation records for which the values or "labels" of dependent variables are known) may be mapped to a set of contiguous chunks 2602, e.g., using the techniques described above to increase the fraction of physical I/O that can be performed sequentially. An in-memory chunk-level split operation 2604 may be performed to obtain a training set 2610 and a test set 2615. For example, 80% of the chunks may be included in the training set 2610 in one scenario, and the remaining 20% of the chunks may be included in the test set 2615. A candidate model 2620 may be trained in a training run 2618 (e.g., for a linear regression model, candidate coefficients to be assigned to the various independent/input variables of the data set may be determined). The candidate model 2620 may then be used to make predictions on the test set, and the evaluation results 2625 of the model may be obtained (e.g., indicating how accurately the model was able to generate predictions for the dependent variables of the records of the test set using the candidate coefficients). A variety of measures 2630 of the accuracy or quality may be obtained in different embodiments, depending on the type of model being used—e.g., the root mean square error (RMSE) or root mean square deviation (RMSD) may be computed for linear regression models, the ratio of the sum of true positives and true negatives to the size of the test set may be computed for binary classification problems, and so on.

If the accuracy/quality measures 2630 are satisfactory, the candidate model 2620 may be designated as an approved model 2640 in the depicted embodiment. Otherwise, any of several techniques may be employed in an attempt to improve the quality or accuracy of the model's predictions. Model tuning 2672 may comprise modifying the set of independent or input variables being used for the predictions, changing model execution parameters (such as a minimum bucket size or a maximum tree depth for tree-based classification models), and so on, and executing additional training runs 2618. Model tuning may be performed iteratively using the same training and test sets, varying some combination of input variables and parameters in each iteration in an attempt to enhance the accuracy or quality of the results. In another approach to model improvement, changes 2674 may be made to the training and test data sets for successive training-and-evaluation iterations. For example, the input data set may be shuffled (e.g., at the chunk level and/or at the observation record level), and a new pair of training/test sets may be obtained for the next round of training. In another approach, the quality of the data may be improved by, for example, identifying observation records whose variable values appear to be invalid or outliers, and deleting such observation records from the data set. One common approach for model improvement may involve cross-validating a candidate model using a specified number of distinct training and test sets extracted from the same underlying data, as described below with reference to FIG. 27. Just as multiple iterations of model tuning 2672 may be performed, data set changes 2674 may also be performed iteratively in some embodiments, e.g., until either a desired level of quality/accuracy is obtained, until resources or time available for model improvement are exhausted, or until the changes being tried no longer lead to much improvement in the quality or accuracy of the model.

Figure 27:
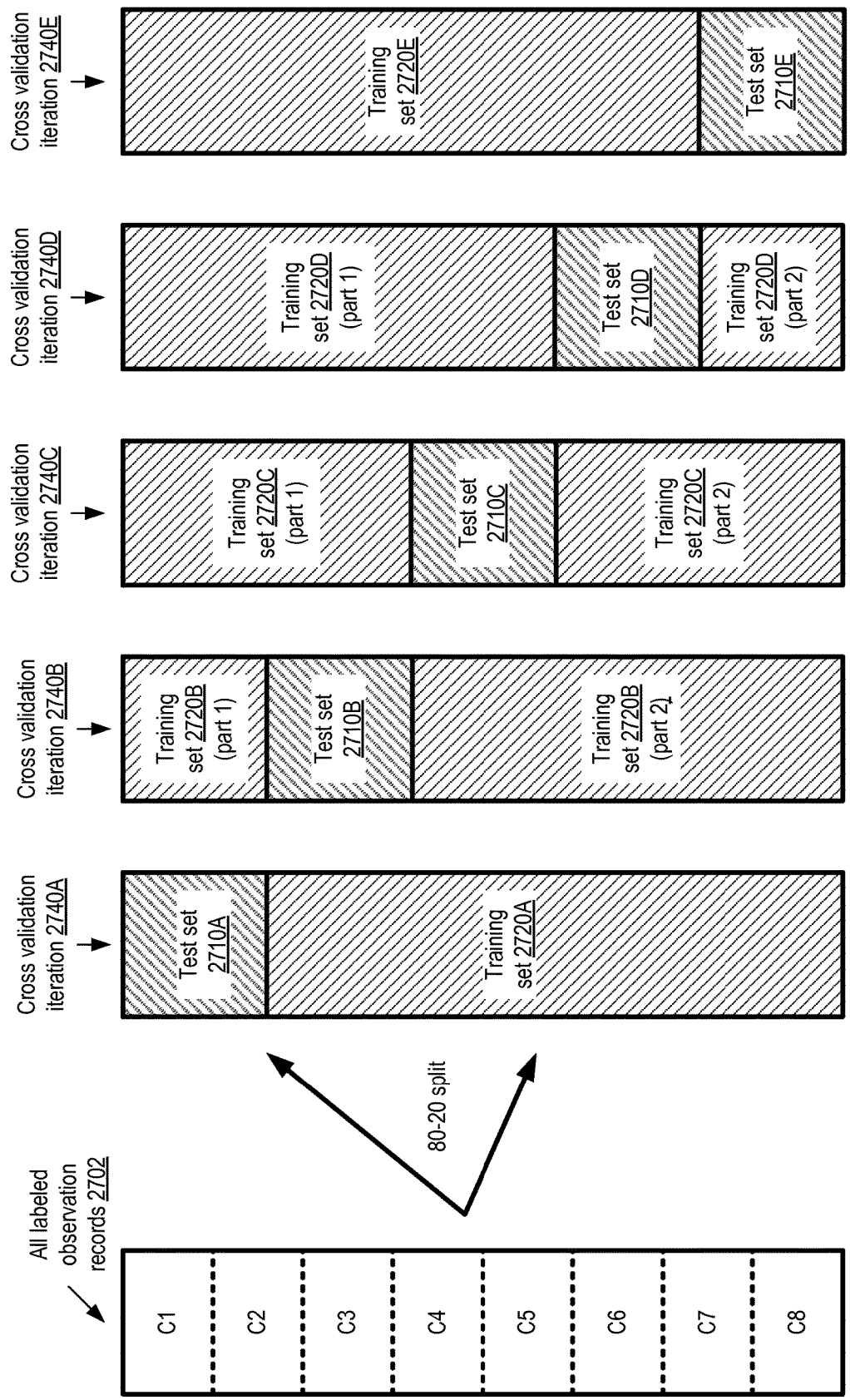
FIG. 27 illustrates an example of data set splits that may be used for cross-validation of a machine learning model, according to at least some embodiments.

FIG. 27 illustrates an example of data set splits that may be used for cross-validation of a machine learning model, according to at least some embodiments. In the depicted embodiment, a data set comprising labeled observation records 2702 is split five different ways to obtain respective training sets 2720 (e.g., 2720A-2720E) each comprising 80% of the data, and corresponding test sets 2710 (e.g., 2710A-2710E) comprising the remaining 20% of the data. Each of the training sets 2720 may be used to train a model, and the corresponding test set 2710 may then be used to evaluate the model. For example, in cross-validation iteration 2740A, the model may be trained using training set 2720A and then evaluated using test set 2710A. Similarly, in cross-validation iteration 2740B, a different training set 2720B (shown in two parts, part 1 and part 2 in FIG. 27) comprising 80% of the input data may be used, and a different test set 2710B may be used for evaluating the model. The cross-validation example illustrated in FIG. 27 may be referred to as "5-fold cross validation" (because of the number of different training/test set pairs generated and the corresponding number of training-and-evaluation iterations.) The MLS may implement an API allowing a client to request k-fold cross validation in some embodiments, where k is an API parameter indicating the number of distinct training sets (and corresponding test sets) to be generated for training a specified model using the same underlying input data set.

The labeled observation records are distributed among eight chunks C1-C8 in the example shown in FIG. 27. As mentioned earlier, the chunk sizes and boundaries may be determined based on any of various factors, including memory size limits at MLS servers, client preferences, and so on. In some scenarios, the split ratio desired (such as the 80-20 split illustrated in FIG. 27) may result in the observation records of a given chunk having to be distributed across a training set and the corresponding test set. That is, partial chunks may have to be included in training and test sets in some cases. Some observation records of chunk C2 may be included in test set 2710A, while other observation records of chunk C2 may be included in training set 2720A, for example.

It is noted that although the training sets may appear to comprise contiguous portions of the input data set in FIG. 27, in practice the training and test data sets may be obtained using random selection (e.g., either at the chunk level, at the observation record level, or at both levels) in at least some embodiments. By changing the set of observation records included in the training and test sets of the different cross-validation iterations 2740A-2740E, the quality of the predictions made may in general improve, as the effect of localized non-uniformity of the input variable values in different subsets of the input data set may be reduced. For example, if the value of an independent numerical variable within the subset of data records that are in test set 2710A is unusually high compared to the mean of that variable over the entire data set, the effects of that anomaly on model accuracy/quality would be expected to be dissipated by the use of different test data sets for the other cross-validation iterations.

Figure 28:
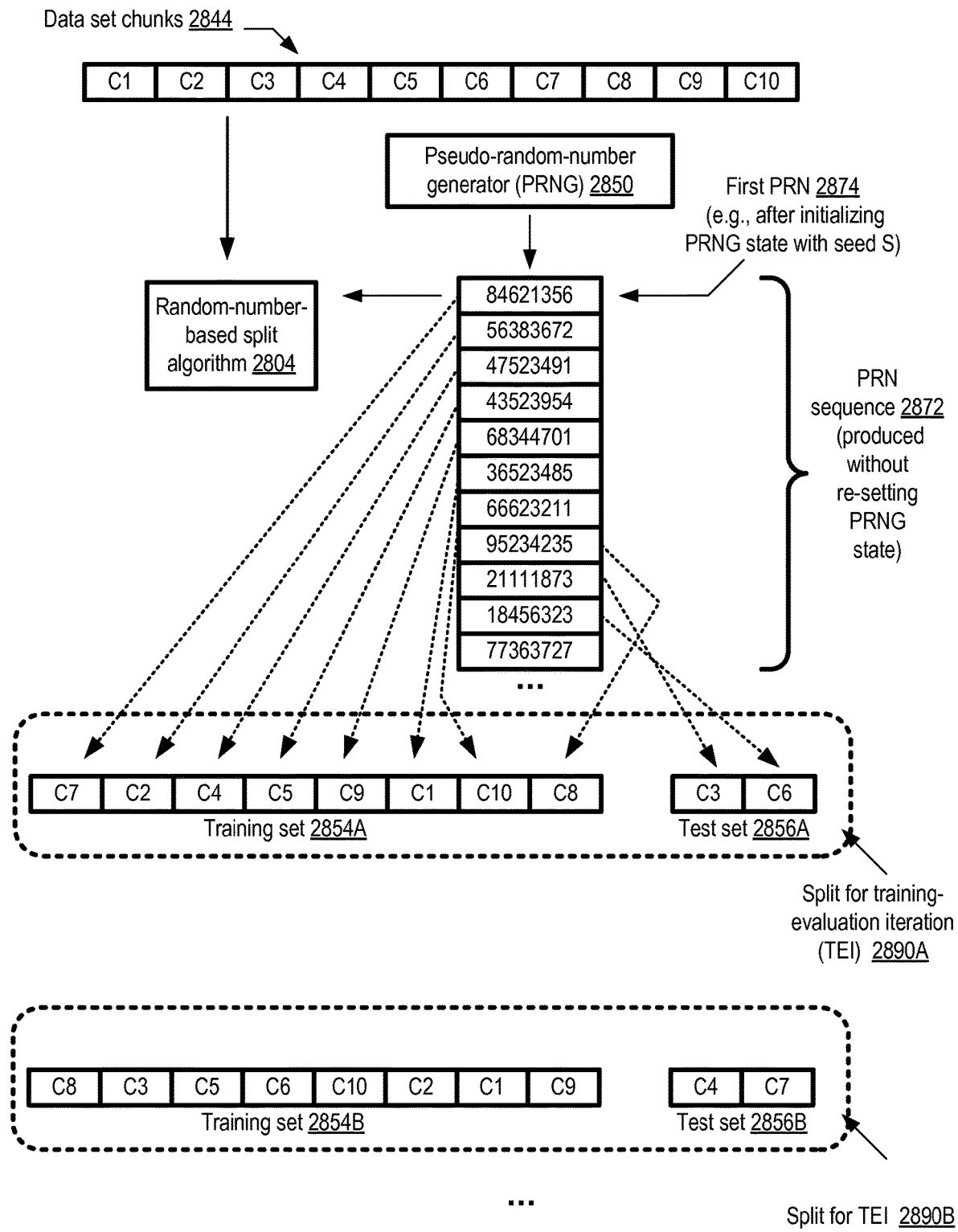
FIG. 28 illustrates examples of consistent chunk-level splits of input data sets for cross validation that may be performed using a sequence of pseudo-random numbers, according to at least some embodiments.

FIG. 28 illustrates examples of consistent chunk-level splits of input data sets for cross validation that may be performed using a sequence of pseudo-random numbers, according to at least some embodiments. A random number based split algorithm 2804 is used to divide data set chunks C1-C10 into training and test sets for successive training-evaluation iterations (TEIs). Each TEI may, for example, represent a particular cross-validation iteration such as those illustrated in FIG. 27, although such training and evaluation iterations may also be performed independently of whether cross-validation is being attempted. A pseudo-random number generator (PRNG) 2850 may be used to obtain a sequence 2872 of pseudo-random numbers. The PRNG 2850 may be implemented, for example, as a utility function or method of an MLS library or a programming language library accessible from a component of the MLS. The state of PRNG 2850 may be deterministically initialized or reset using a seed value S (e.g., a real number or string) in the depicted embodiment, such that the sequence of pseudo-random numbers that is produced after resetting the state with a given seed S is repeatable (e.g., if the PRNG is reset using the same seed multiple times, the same sequence of PRNs would be provided after each such state reset).

In the depicted example, to simplify the presentation, the number of chunks of the input data set (10) and the split ratio (80-20) has been chosen such that an integer number of chunks is placed into the training set and the test set—i.e., observation records of a given chunk do not have to be distributed between both a training set and a test set. The pseudo-random numbers (PRNs) of the sequence 2872 produced by the PRNG may be used to select members of the training and test sets. For example, using the first PRN 2874 (produced after resetting the state of the PRNG), which has a value of 84621356, chunk C7 may be selected for inclusion in the training set 2854A to be used for TEI 2890A. Using the second PRN 56383672, chunk C2 may be selected for the training set 2854A, and so on. The random-number based split algorithm 2804 may rely on certain statistical characteristics of the PRN sequence to correctly designate each chunk of the input data set into either the training set or the test set in the depicted example scenario. The statistical characteristics may include the property that a very large number of distinct pseudo-random numbers (or distinct sub-sequences of some length N) are expected to be produced in any given sequence (e.g., before a given PRN is repeated in the sequence, or before a sub-sequence of length N is repeated). If the state of the PRNG is not reset between the time that a given training set 2854 is generated and the time that the corresponding test set 2856 is generated in the depicted embodiment, the sequence of PRNs 2872 generated may ensure that each chunk of the input data is mapped to either the training set or the test set, and no chunk is mapped to both the training set and the test set. Such a split operation, in which each object (e.g., chunk or observation record) of the source data set is placed in exactly one split result set (e.g., a training set or the corresponding test set), may be referred to as a "consistent" or "valid" split. A split operation in which one or more objects of the input data set are either (a) not placed in any of the split result sets, or (b) placed in more than one of the split result sets may be termed an "inconsistent" or "invalid" split. The sequence of the PRNs used for each of the two split mappings (the mapping to the training set and the mapping to the test set), and hence the state of the PRN source, may influence the probability of producing inconsistent splits in at least some embodiments. In turn, the use of inconsistent splits for training and evaluation may result in poorer prediction quality and/or poorer accuracy than if consistent splits are used.

In at least some embodiments, intra-chunk shuffles may be implemented within the training set and/or the test set, e.g., based on contents of a client request in response to which the TEIs are being implemented. Thus, for example, the observation records within a given chunk (e.g., C7) of training set 2854A may be re-ordered in memory (without copying the records to persistent storage) relative to one another before they are provided as input to the model being trained. Similarly, the observation records of a given chunk (e.g., C3) of test set 2856A may be shuffled in memory before the model is evaluated using the test set.

As a result of using the PRN sequence 2872, the first TEI 2890A may be implemented with a training set 2854A of chunks (C7, C2, C4, C5, C9, C1, C10, C8) and a test set 2856A of chunks (C3, C6). In some embodiments, the same PRNG 2850 may also be used (e.g., without re-initialization or resetting), to split the input data set for the next TEI 2890B. It is noted that for some models and/or applications, only one TEI may be implemented in various embodiments. In the depicted example, training set 2854B of TEI 2890B comprises chunks (C8, C3, C5, C6, C10, C2, C1, C9) and the corresponding test set 2856B comprises chunks (C4, C7). Both the splits illustrated in FIG. 28 are consistent/valid according to the definitions provided above. It is noted that although the splitting of the data is illustrated at the chunk level in FIG. 28, the same type of relationship between the PRNG state and the consistency of the split may apply to splits at the observation record level (or splits involving partial chunks) in at least some embodiments. That is, to perform a consistent split at the observation record level using a PRNG, the state of the PRNG should ideally not be re-initialized between the determination of the training set and the determination of the test set. A split involving partial chunks may be implemented in some embodiments as a chunk-level split in which a non-integer number of chunks is placed in each split result set, followed by an intra-chunk split for those chunks whose records are distributed across multiple split result sets. In addition to two-way splits, the PRN-based approach to splitting a data set may also be used for N-way splits (where N>2).

Figure 29:
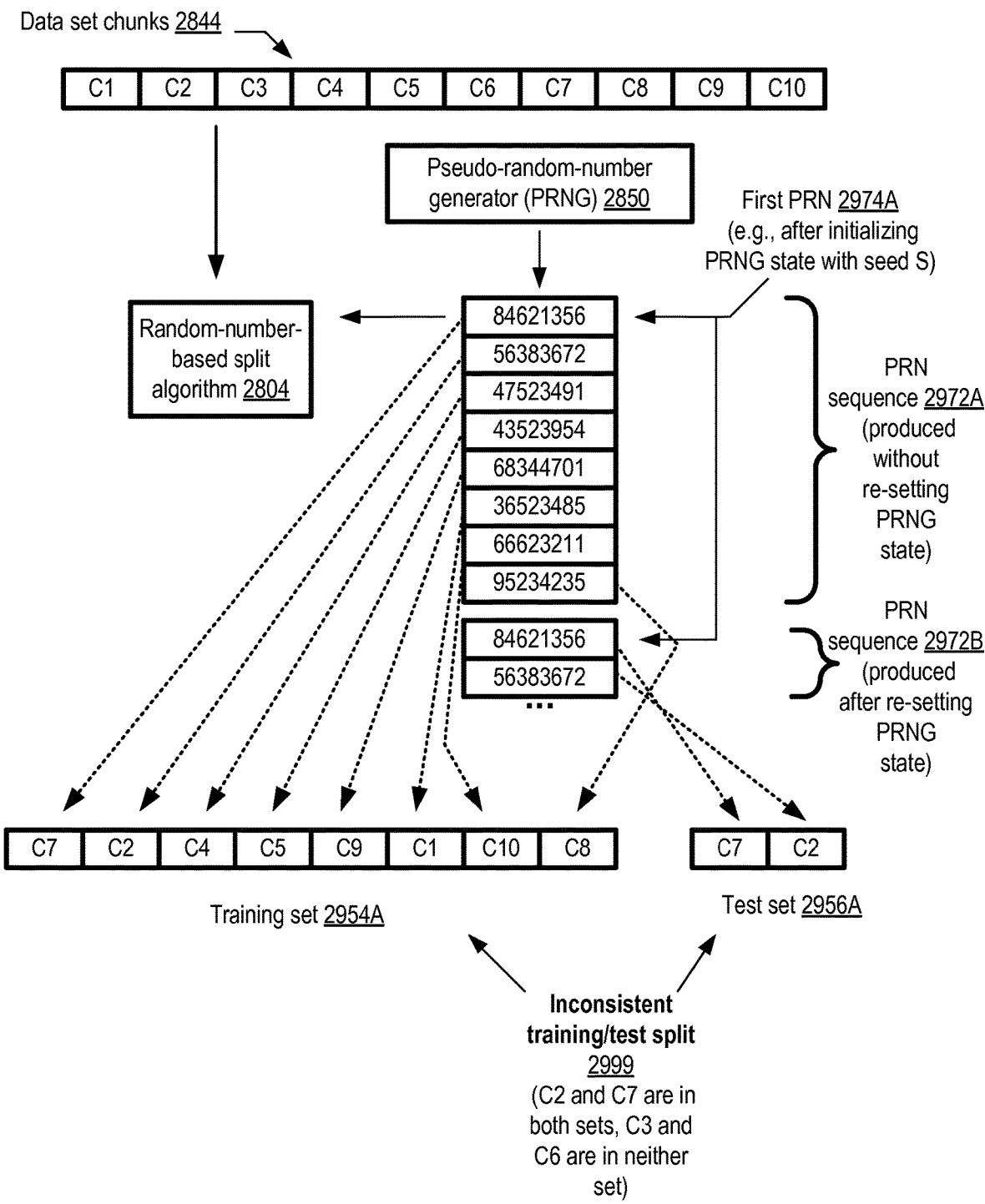
FIG. 29 illustrates an example of an inconsistent chunk-level split of an input data set that may occur as a result of inappropriately resetting a pseudo-random number generator, according to at least some embodiments.

FIG. 29 illustrates an example of an inconsistent chunk-level split of an input data set that may occur as a result of inappropriately resetting a pseudo-random number generator, according to at least some embodiments. In the depicted example, a PRNG 1850 is initialized using a seed S. The PRN sequence 2972A is used by the split algorithm 2804 to produce the training set 2954A comprising the same set of chunks of data set 2844A that were included in test set 2854A of FIG. 28 (C7, C2, C4, C5, C9, C1, C10, C8). After the training set 2954A is generated, the PRNG is re-initialized. As a result, the sequence of pseudo-random numbers generated is repeated—e.g., the first PRN generated after the reset is once again 84621356, the second PRN is once again 56383672, and so on. The split algorithm chooses chunks C7 and C2 for inclusion in test set 2956A as a result of the repetition of PRNs in the depicted example. Such a split may be deemed invalid or inconsistent because C2 and C7 are in both the training set and the test set (and because chunks C3 and C6 are in neither the training set nor the test set).

In some embodiments, a PRNG may not be invoked in real time for each placement of a given chunk or record into a training set or a test set. Instead, a list of pseudo-random numbers or random numbers may be generated beforehand (e.g., using a PRNG), and the numbers in the pre-generated list may be used one by one for the split placements. In such a scenario, as long as a pointer is maintained to the last number in the list that was used for the training set, and the test set placement decisions are made using the remainder of the numbers (i.e., numbers that were not used for the training set), split consistency may be achieved in at least some embodiments.

In another approach to attaining consistent splits, respective mechanisms (e.g., APIs) may be implemented to (a) save a current state of a PRNG and (b) to re-set a PRNG to a saved state in one embodiment. Consider a scenario in which an API "save_state(PRNG)" can be invoked to save the internal state of a PRNG to an object "state_AfterTraining" after the training set of a TEI has been generated, and a different API "set_state(PRNG, state_AfterTraining)" can be invoked to reset the state of the PRNG (or a different PRNG) to the saved state just before starting the selection of the test set of the TEI. Using such a pair of state save and restore operations, the same sequence of PRNs may be obtained as would be obtained if all the PRNs were obtained without saving/resetting the PRNG state. In some embodiments, different PRN sources may be used for the training set selection than of a given TEI are used for the test set selection, as described below with respect to FIG. 30, and the state of such PRN sources may be synchronized to help achieve consistent splits.

Figure 30:
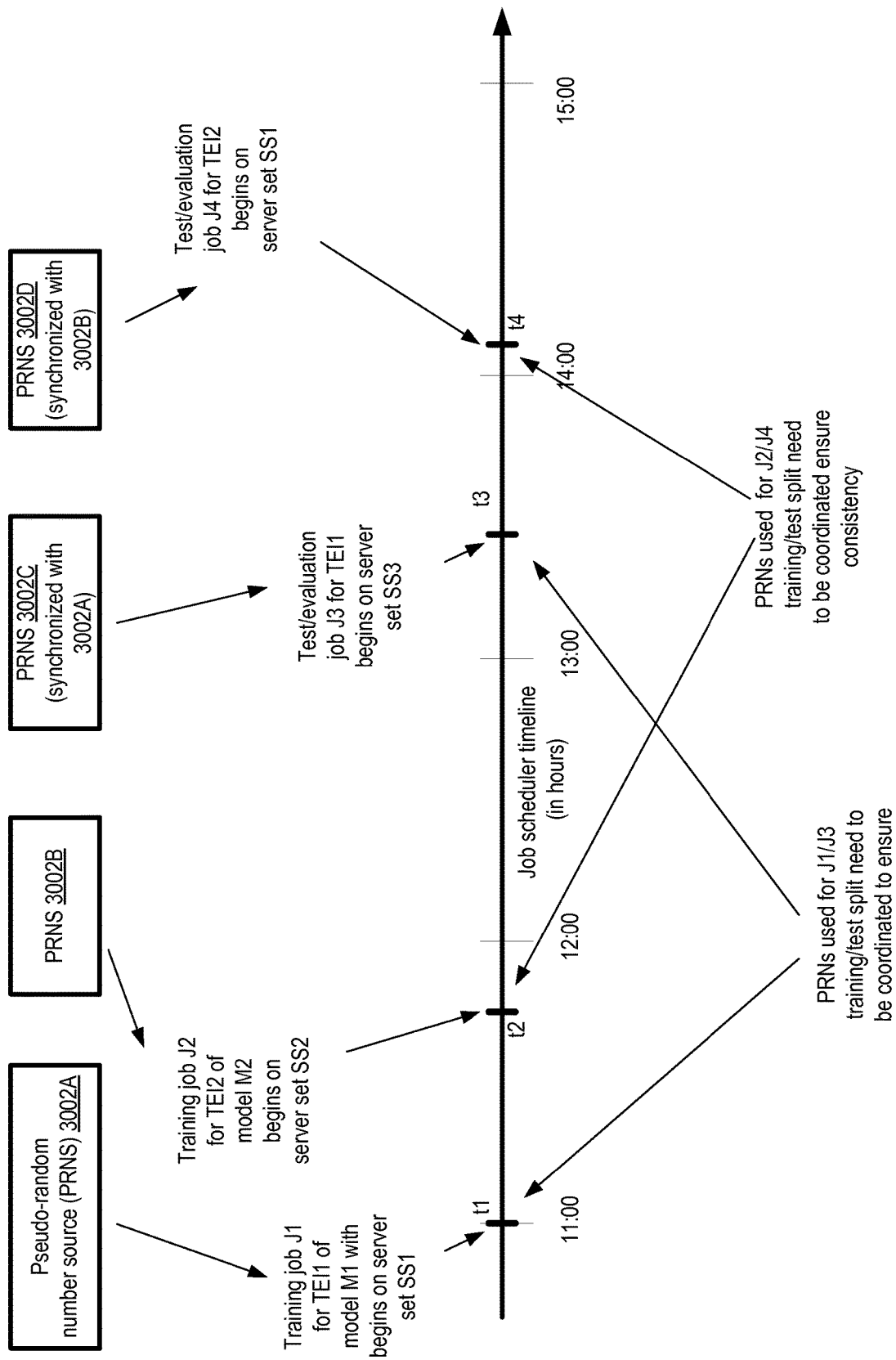
FIG. 30 illustrates an example timeline of scheduling related pairs of training and evaluation jobs, according to at least some embodiments.

In at least some embodiments, the selection of a test set from a given input data set may occur asynchronously with respect to (and in some cases much later than) the selection of the corresponding training set. For example, separate jobs may be inserted in the MLS job queue for the selection of a training set and the selection of the corresponding test set, and the jobs may be scheduled independently of each other in a manner similar to that described earlier. In such scenarios, in order to ensure that the training/test split is valid and consistent despite the delay between the two operations, the MLS may maintain state information pertaining to the selection of the training set in some embodiments, which can then be used to help generate the test set. FIG. 30 illustrates an example timeline of scheduling related pairs of training and evaluation jobs, according to at least some embodiments. Four events that occur during a period of approximately four hours (from 11:00 to 15:00 on a particular day) of a job scheduler's timeline are shown.

At time t1, a training job J1 of a training-and-evaluation iteration TEI1 for a model M1 is begun. Job J1 is scheduled at a set of servers SS1 of the MLS, and may include the selection of a training set, e.g., either at the chunk-level, at the observation record level, or at both levels. A pseudo-random number source PRNS 3002 (such as a function or method that returns a sequence of PRNs, or a list of pre-generated PRNs) may be used to generate the training set for Job J1. At time t2, a training job J2 may be scheduled at a server set SS2, for a training-and-evaluation iteration TEI2 for a different model M2. The training set for job J2 may be obtained using pseudo-random numbers obtained from a different PRNS 3002B.

At time t3, a test job J3 for the evaluation phase of TEI1 is scheduled, more than two hours later than job J1. The scheduling of J3 may be delayed until J1 completes, for example, and the size of the data set being used for J1/J3 may be so large that it takes more than two hours to complete the training phase in the depicted example. J3 may be scheduled at a different set of servers SS3 than were used for J1. In at least some implementations, a different PRNS 9002C may be available at server set SS3 than was available at server set SS1. In order to ensure consistency of the training/test split, PRNS 3002C may be synchronized with PRNS 3002A in the depicted embodiment. Thus for example, if a seed value Seed1 was used to initialize PRNS 3002A, and 1000 pseudo-random numbers were obtained from PRNS 3002A during job J1, the same seed value Seed1 may be used to initialize a logically equivalent PRNS 3002C, and 1000 pseudo-random numbers may be acquired from PRNS 3002C before the pseudo-random numbers to be used for test set selection are acquired. Equivalents of the "save_state( )" and "set_state( )" calls discussed above may be used in some embodiments to synchronize PRNS 3002C with PRNS 3002A. If lists of pre-generated PRNS are being used as the PRN sources, in one embodiment the MLS may ensure that (a) the same list is used for J1 and J3 and (b) the first PRN in the list that is used for J3 is in a position immediately after the position of the last PRN used for J1. Other synchronization techniques may be used in various embodiments to ensure that the sequence of pseudo-random numbers used for test set determination is such that a valid and consistent split is achieved for jobs J1 and J3. Similarly, for test job J4 (scheduled at t4) corresponding to training job J2, PRNS 3002D may be synchronized with PRNS 3002B. In at least the depicted embodiment, to ensure split consistency, it may be necessary to enforce a logical relationship or some degree of coordination between the sets of pseudo-random numbers used for generating a training set and the corresponding test set (e.g., the numbers used in J3 may have to be coordinated with respect to the numbers used in J1, and the numbers used in J4 may have to be coordinated with respect to the numbers used in J2).

Figure 31:
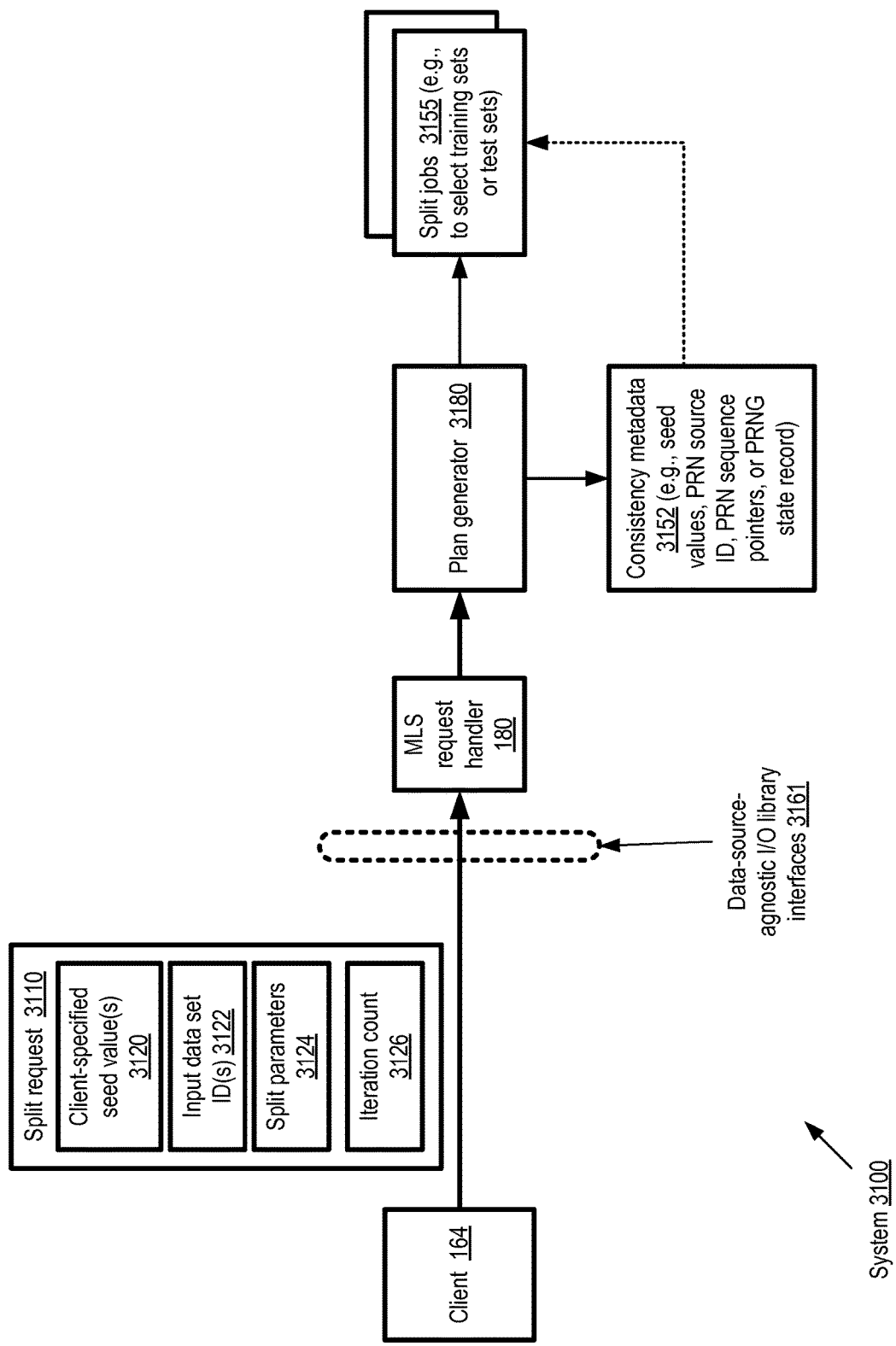
FIG. 31 illustrates an example of a system in which consistency metadata is generated at a machine learning service in response to a client request, according to at least some embodiments.

FIG. 31 illustrates an example of a system in which consistency metadata is generated at a machine learning service in response to a client request, according to at least some embodiments. The consistency metadata may be retained or shared across related jobs (e.g., a training job and a corresponding evaluation job) to achieve the kinds of coordination/synchronization discussed with respect to FIG. 30. In system 3100 of FIG. 31, a client 164 of an MLS may submit a split request 3110 via a data-source-agnostic programmatic interface 3161 of an MLS I/O library. In some implementations, the split request may be part of a cross-validation request, or part of a request to perform a specified number of training-and-evaluation iterations. In at least one embodiment, the split request may represent a variant of the type of observation record extraction request 2401 shown in FIG. 24. The split request may include, for example, one or more client-specified seed values 3120 that may be used for obtaining the pseudo-random numbers for the requested split operations, although such seed values may not have to be provided by the client in at least one embodiment. In addition, in the depicted embodiment, the split request 3110 may include an indication (e.g., file names, paths or identifiers) of the input data set 3122. Split parameters 3124 may indicate one or more training-to-test ratios (e.g., the 80-20 split ratio illustrated in FIG. 29). In some embodiments in which the split request is part of a request for training-and-evaluation iterations or cross-validation iterations, the desired iteration count 3126 may be included in the client request.

A request handler component 180 of the MLS may pass on the request 3110 to a plan generator 3180 in the depicted embodiment. The plan generator may determine a set of consistency metadata 3152, e.g., metadata that may be shared among related jobs that are inserted in the MLS job queue for the requested split iterations. The metadata 3152 may comprise the client-provided seed values 3120, for example. In one embodiment, if a client-provided seed value is not available (e.g., because the API 3161 used for the client request does not require a seed to be provided, or because the client failed to provide a valid seed value), the plan generator 3180 may determine a set of one or more seed values. Such MLS-selected seed values may be based, for example, on some combination of input data set IDs 3122 (e.g., a hash value corresponding to a file name or directory name of the input data set may be used as a seed), client identifier, the time at which the request 3110 was received, the IP address from which the request 3110 was received, and so on. In one implementation, the MLS may have several sources of pseudo-random numbers available, such as PRNGs or lists of pre-generated PRNs, and an identifier of one or more PRN sources may be included in the consistency metadata 3152. In an embodiment in which pre-generated PRN lists are to be used, a pointer to the last-used PRN within a specified list may be used, such that each entity that uses the list (e.g., an MLS job executor) updates the pointer after it has used some number of the list's PRNs. In one embodiment in which equivalents of the "save_state( )" and "set_state( )" operations described above are supported for PRNGs, a state record of a PRNG may be included in the metadata. The state record may be updated by each entity (e.g., an MLS job executor) that used the PRNG, e.g., so that the next entity that uses the PRNG can set its state appropriately to obtain PRNs that can be used to perform a consistent split.

The plan generator 3180 may generate respective jobs 3155 for selecting the split result sets. For example, for a given training-and-evaluation iteration, one job may be created for selecting the training set and another job may be generated for selecting the test set. In some implementations, a job object created by the plan generator 3180 may include a reference or pointer to the consistency metadata to be used for that job. In another implementation, at least a portion of the consistency metadata 3152 may be included within a job object. When a job is executed, the metadata 3152 may be used to ensure that the input data set is split consistently. In some embodiments, a single job may be created that includes both training and test set selection.

It is noted that a similar approach towards consistency or repeatability may be taken for other types of input filtering operations, such as sampling or shuffling, in at least some embodiments. For example, in one embodiment, a client may wish to ensure shuffle repeatability (i.e., that the results of one shuffle request can be re-obtained if a second shuffle request with the same input data and same request parameters is made later) or sample repeatability (i.e., that the same observation records or chunks are retrievable from a data set as a result of repeated sample requests). If the filtering operation involves a use of pseudo-random numbers, saving seed values and/or the other types of consistency metadata shown in FIG. 31 may enable support for shuffle repeatability and/or sample repeatability as well. For example, a repeated shuffle may be obtained starting with the same input data set and re-initializing a PRNG with the same seed value as was used for an initial shuffle. Similarly, re-using the same seed may also result in a repeatable sample. In various embodiments, consistent splits may be performed at the chunk level, at the observation record level, or at some combination of chunk and record levels, using consistency metadata of the kind described above. In at least one embodiment, after a chunk-level split is performed, the records of the individual chunks in the training set or the test set may be shuffled prior to use for training/evaluating a model.

Figure 32:
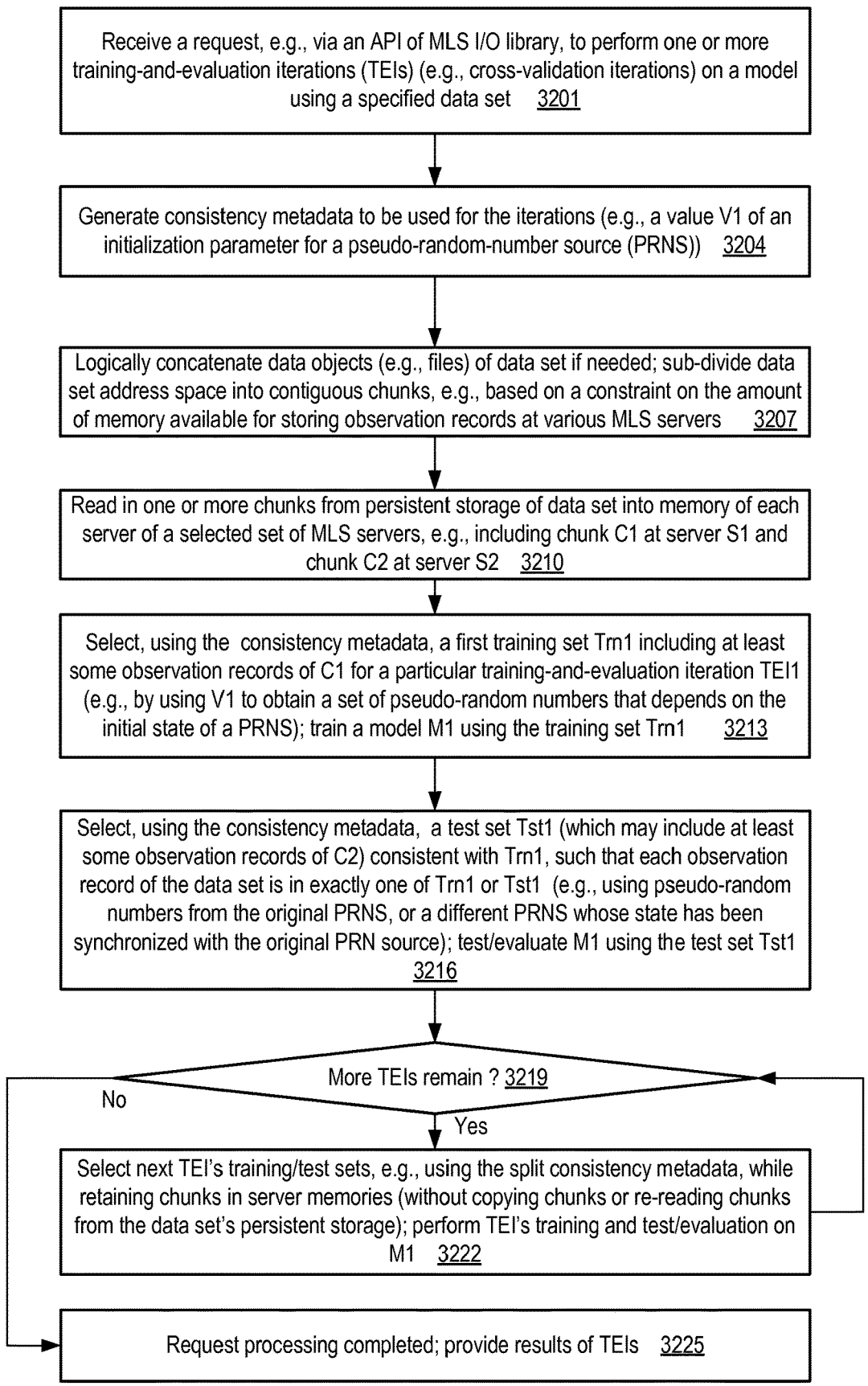
FIG. 32 is a flow diagram illustrating aspects of operations that may be performed at a machine learning service in response to a request for training and evaluation iterations of a machine learning model, according to at least some embodiments.

FIG. 32 is a flow diagram illustrating aspects of operations that may be performed at a machine learning service in response to a request for training and evaluation iterations of a machine learning model, according to at least some embodiments. As shown in element 3201, a request to perform one or more TEIs (training-and-evaluation iterations, such as cross-validation iterations) may be received via a programmatic interface such as an MLS I/O library API. A set of consistency metadata may be generated for the iteration(s), e.g., comprising one or more initialization parameter values (such as a value V1) for pseudo-random number sources (PRNSs). The metadata may comprise a seed value to be used to initialize or reset a state of a PRNG, for example, or a pointer to a particular offset within a list of pre-generated pseudo-random number. In some embodiments, the client may include at least a portion of the metadata in the TEI request. In addition to or instead of seed value(s), the consistency metadata may include, for example, an identifier of a PRNS, a representation of a state of a PRNS, and/or a pointer into a list of pseudo-random numbers.

If the input data set indicated in the request is spread over multiple files or multiple data objects, the files/objects may be logically concatenated to form a unified address space for the input data. The address space of the input data set may be sub-divided into contiguous chunks (element 3207), e.g., with the chunk sizes/boundaries being selected based on client preferences, memory constraints at MLS servers, and/or other factors. One or more chunks of the input data set may be read in from persistent storage to respective memories at one or more MLS servers, e.g., such that at least a portion of chunk C1 is stored in memory at server $S^1$ and at least a portion of chunk C2 is stored in memory at server S2 (element 3210).

Using the consistency metadata, a first training set Trn1 of the input data may be selected (element 3213), e.g., including at least some observation records of chunk C1. The training set may be selected at the chunk level, the observation record level, or some combination of chunk level and observation record level. Partial chunks may be included in the training set Trn1 in at least some embodiments (that is, some observation records of a given chunk may be included in the training set while others may eventually be included in the corresponding test set). In one embodiment, an initialization parameter value V1 may be used to obtain a first set of pseud-random numbers from a source that provided deterministic sequences of such numbers based on the source's initial state, and the first set of pseudo-random numbers may in turn be used to select the training set Trn1 used to train a targeted machine learning model M1.

To evaluate the model after it has been trained, a test set Tst1 may be determined using the consistency metadata (element 3216) (e.g., using a set of pseudo-random numbers obtained from the same source, or from a source whose state has been synchronized with that of the source used for selecting Trn1). In one implementation, for example, the consistency metadata may indicate a seed Seed1 and a count N1 of pseudo-random numbers that are obtained from a PRNG for generating Trn1. If the original PRNG is not available to provide pseudo-random numbers for selecting Tst1 (e.g., if the test set is being identified at a different server than the server used for identifying Trn1, and local PRNGs have to be used at each server), an equivalent PRNG may be initialized with Seed1, and the first N1 pseudo-random numbers generated from the equivalent PRNG may be discarded before using the succeeding pseudo-random numbers (starting from the (N1+1)th number) for selecting Tst1. In another implementation, the algorithm used for selecting Trn1 and Tst1 (or any pair of training and test sets) may be designed in such a way that the same sequence of pseudo-random numbers can be used to select Trn1 and Tst1 while still meeting the consistency criteria described earlier. In such an implementation, same seed value may be used to initialize a PRNG for Tst1, and no pseudo-random numbers may have to be skipped to select Tst1. Model M1 may be tested/evaluated (e.g., the accuracy/quality of the model's predictions may be determined) using test set Tst1.

As long as more TEIs remain to be performed (as determined in element 3219), the training and test sets for the next iteration may be identified in place, without copying any of the chunk contents to other locations in the depicted embodiment (element 3222). In the depicted embodiment, the consistency metadata that was used to generate Trn1 and Tst1 may be used for selecting the training set and the test set for subsequent TEIs as well. In other embodiments, respective sets of consistency metadata may be used for respective TEIs. In at least some embodiments in which a training set is initially identified at the chunk level, the observation records within individual chunks of the training set may be shuffled in memory (i.e., an intra-chunk shuffle may be performed without any additional I/O to persistent storage) prior to using the observation records to train the model. Similarly, intra-chunk shuffles may be performed on test sets in some embodiments before the test sets are used for evaluation. After all the requested iterations of training and evaluation are completed, the processing of the request received in operations corresponding to element 3201 may be considered complete, and the final results of the iterations may be provided to a destination indicated in the request (element 3225).

Optimizations for Decision Tree Based Models

Figure 33:
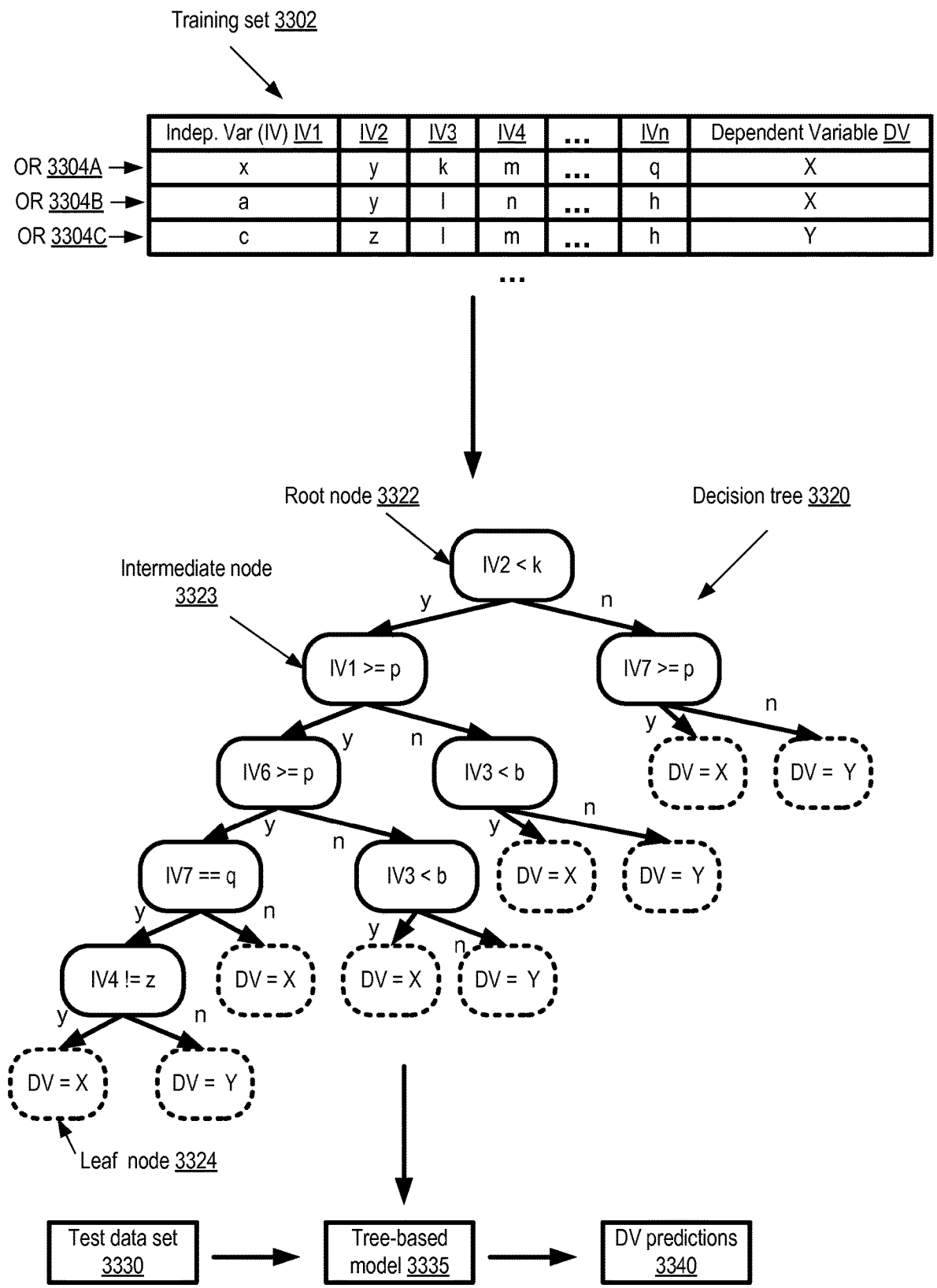
FIG. 33 illustrates an example of a decision tree that may be generated for predictions at a machine learning service, according to at least some embodiments.

A number of machine learning methodologies, for example techniques used for classification and regression problems, may involve the use of decision trees. FIG. 33 illustrates an example of a decision tree that may be generated for predictions at a machine learning service, according to at least some embodiments. A training set 3302 comprising a plurality of observation records (ORs) such as OR 3304A, OR 3304B and OR 3304C is to be used for training a model to predict the value of a dependent variable DV. Each OR in the training set 3302 contains values for some number of independent variables (IVs), such as IV1, IV2, IV3, . . . , IVn (for example, in OR 3304A, IV1's value is x, IV2's value is y, IV3's value is k, IV4's value is m, and IVn's value is q) as well as a value of the dependent variable DV (whose value is X in the case of OR 3304A). Independent variables may also be referred to herein as input variables, and the dependent variable may be referred to as an output variable. In general, not all the ORs 3304 need have values for all of the independent variables in at least some embodiments; for example, some values may not be available from the source from which the observation records are obtained. In the depicted example, assume that the dependent variable, which may also be referred to as the "label" or the "target variable" (since it is the variable whose value the model is to predict) takes on one of two values, X or Y. Any given independent variable as well as the dependent variable may take on any number of different values, and may be of any desired data type such as numerical, categorical, Boolean, character, and so on.

Based on an analysis of the observation records 3304 of a subset or all of the training set, one or more decision trees 3320 may be constructed, e.g., by a model generator component or model manager component of the machine learning service described above, to make predictions for the value of DV based on the values of at least some of the IVs of an observation record. Each non-leaf node of a decision tree 3320, such as root node 3322, may indicate one or more conditions or predicates to be evaluated on one or more independent variables, and the results of evaluating the predicate may determine the path to be taken next towards a leaf node of the tree at which a prediction for the DV is made for the OR. For example, in the decision tree illustrated, the root node indicates that the value of independent variable IV2 is to be compared with k. If IV2 is less than k for a given observation record for which a prediction is to be made, the path to intermediate node 3323 should be taken, as indicated by the edge labeled "y" (for "yes" in answer to the evaluation of "IV2<k"). If IV2 is greater than or equal to k in the observation record being analyzed, the path labeled "n" (for "no") would be taken. Similar decisions would be taken at various non-leaf nodes until a leaf node is reached, at which point a value for DV would be predicted based on the combination of predicates checked along the path. Thus, in the depicted tree 3320, if the following conditions are found to be true, a DV value of X may be predicted at leaf node 3324: (IV2<k) and (IV1>=p) and (IV6>=p) and (IV7==q) and (IV4 !=z). A similar traversal would be performed for all the records of a test data set 3330 by a decision tree based model 3335, resulting in a set of predictions 3340 of DV values. For many training data sets, one or more of the independent variables may not necessarily be represented in a decision tree—for example, if independent variable IVn is not significant with respect to predicting DV, none of the nodes included in the tree 3320 may include a condition that refers to IVn. In general, the model generator component of the machine learning service may be responsible for identifying efficient ways of predicting DV values accurately using some subset of the independent variables, and encoding such efficient ways in the form of one or more decision trees. A number of factors which may contribute to prediction quality and efficiency are discussed below.

A simple binary classification example is illustrated in FIG. 33 to simplify the presentation. Decision trees may also be used for multi-way classification and/or regression in various embodiments. A given node of a decision tree may have more than two child nodes (i.e., more than two outgoing paths towards the leafs) in some embodiments—that is, more complex multi-result conditions may be evaluated at each node than the simple binary tests shown in FIG. 33. As described below in further detail, each node may be represented by a corresponding descriptor indicating the predicates/conditions to be checked, the number and identity of its child nodes, etc., so that the tree as whole may be represented as a collection of node descriptors. The size and shape of a decision tree 3320 that is generated may depend on various factors such as the number of independent variables that are found to be significant for predictions, the order in which the tree-generation algorithm analyzes the observation records of the training set, and so on. Some models (such as Random Forest models and adaptive boosting models) may require or rely on ensembles or collections of many different trees, e.g., respective trees obtained using respective subsets of the training data set.

The costs (e.g., in terms of resources used or time required) for making decision-tree based predictions may be broadly categorized into two categories: training costs and execution/prediction costs. Execution/prediction costs may also be called run-time costs herein. Training costs refer to the resources used to construct the trees and train the model using the training data set, while the execution costs refer to the resources used when the models make predictions on new data (or test data) that was not used for the training phase. In at least some embodiments, as described below, tradeoffs may be possible between the training costs and the quality of the predictions made on new data. By expending more resources and/or time during training, better (e.g., more accurate and/or faster) predictions may be made possible for at least some types of problems. For example, unlike in some conventional tree-construction approaches, in some embodiments decision trees may be constructed in depth-first order, with the descriptors for the nodes being streamed immediately to disk or some other form of persistent storage as they are being created, instead of requiring the tree-construction procedure to be limited to the amount of main memory available at a given server. Such a depth-first and persistent-storage-based tree construction pass may result in a number of benefits relative to breadth-first memory-constrained approaches, such as better prediction accuracies for observation record classes with small populations, better processor cache utilization (e.g., at level 2 or level 1 hardware caches associated with the CPUs or cores being used at MLS servers), and so on. Although fairly large trees may be produced as a result of such an approach (since the tree sizes are not memory-constrained during the tree construction pass), the trees may be pruned intelligently during a second pass of the training phase, e.g., to remove a subset of the nodes based on one or more run-time optimization goals. The term "run-time optimization goals" may be used herein to refer to objectives associated with executing a trained model to make predictions, such as reducing the time it takes to generate predictions for a test data set or a production data set, reducing the amount of CPU or other resources consumed for such predictions, and so on. (In some embodiments, in addition to or instead of such run-time or prediction-time goals, clients of the MLS may also or instead have training time goals pertaining to the resources or time used for training the model.) Pruned trees that can fit within memory constraints may then be used to make high-quality predictions on non-training data sets. Details regarding the manner in which the decision trees may be generated and pruned in different embodiments are provided below.

Figure 34:
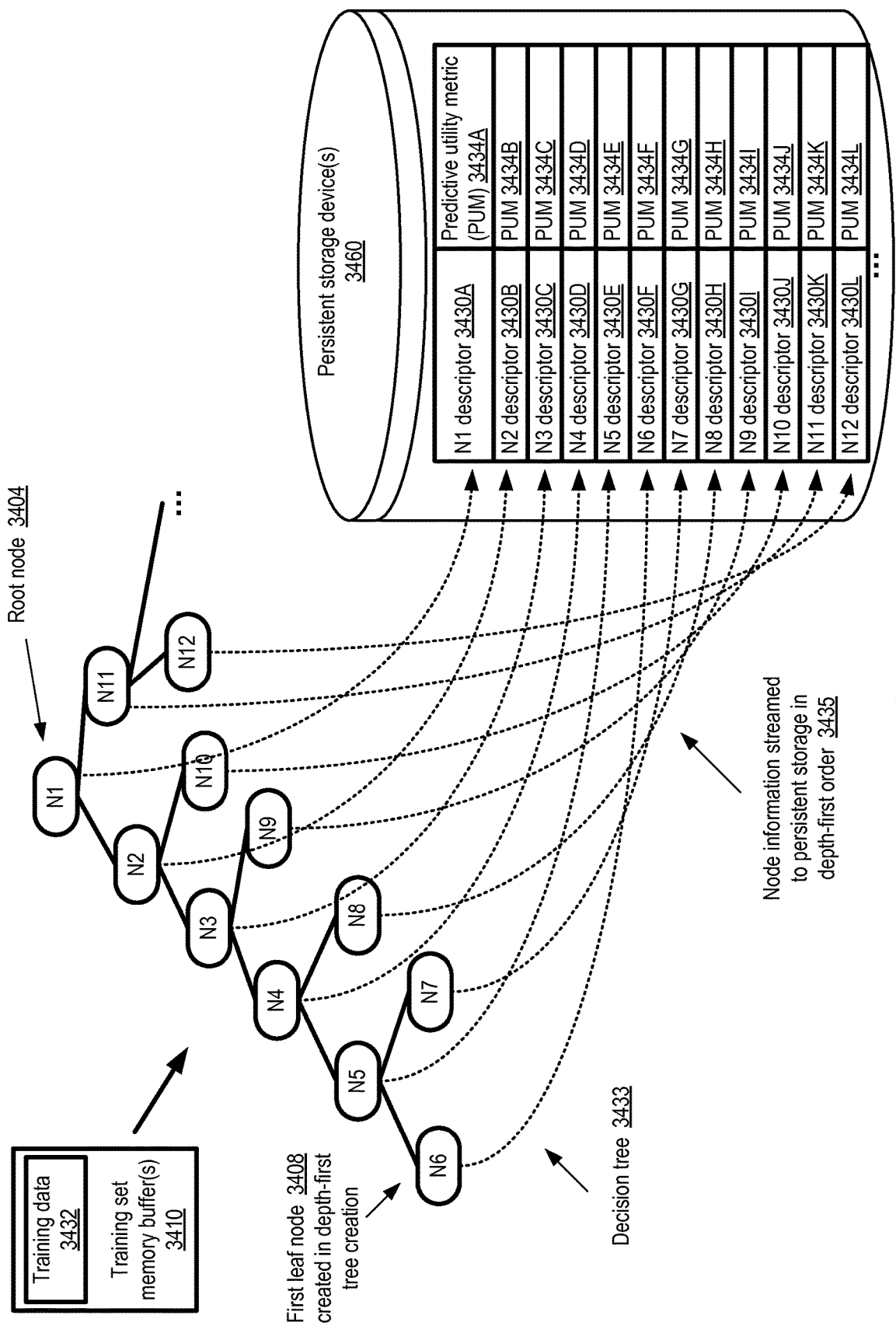
FIG. 34 illustrates an example of storing representations of decision tree nodes in a depth-first order at persistent storage devices during a tree-construction pass of a training phase for a machine learning model, according to at least some embodiments.

FIG. 34 illustrates an example of storing representations of decision tree nodes in a depth-first order at persistent storage devices during a tree-construction pass of a training phase for a machine learning model, according to at least some embodiments. In the depicted example, training data 3432 may be read into training set memory buffers 3340 (e.g., at one or more MLS servers) prior to construction of one or more decision tree trees 3433. In other embodiments, the entire training set need not be read into memory—for example, in one implementation, pointers to the observation records may be retained in memory instead of the entire records. As each node of tree 3433 is created, the training set (e.g., the observation records themselves, or pointers to the observation records) may be sorted or rearranged in memory in accordance with the predicate evaluated for that node. For example, if node N1 of tree 3433 includes an evaluation of a predicate "IV1<=x" for an independent variable IV1, the training set records may be rearranged such that all the records with IV1 values less than equal to x are in one contiguous portion P1 of the memory, and the tree generator component of the MLS may then analyze the contents of that portion P1 for constructing the left sub-tree (node N2 and its children) in the depicted embodiment. The rearrangement of the training set records may be performed in memory (i.e., without I/O to disk or other persistent storage devices) in at least some embodiments. As lower levels of the tree are reached, smaller subsets of the training set may have to be rearranged, thereby potentially improving hardware cache utilization levels in at least some embodiments.

Tree 3433 may be constructed in depth-first order in the depicted embodiment. Although the pre-order version of depth first traversal/construction is illustrated in FIG. 34, in-order or post-order depth-first traversals/construction may be employed in some embodiments. The labels "N<#>" for the nodes indicate the sequence in which they are generated, and the order in which corresponding descriptors 3430 are written from memory to persistent storage device(s) such as various disk-based devices accessible at the MLS servers at which the model generator or model manager runs. Thus, node N1 is created first, and written to persistent storage first, followed by N2, N3, . . . . . , as indicated by arrows 3435. The first leaf node created in the depth-first sequence is N6, followed by N7, N8, N9, N10 and N12. The descriptors 3430 (e.g., 3430A-3430L for nodes N1-N12 respectively) may indicate, for example, the predicates or conditions to be evaluated at the corresponding nodes, the number and/or identities of the child nodes, and so on.

In addition to the predicates to be evaluated at each node, a respective predictive utility metric (PUM) 3434 may also be generated for some or all of the nodes of tree 3433 in the depicted embodiment and stored in persistent storage—e.g., PUM 3434A may be computed and stored for node N1, PUM 3434B for node N2, and so on. Generally speaking, the PUM of a given node may be indicative of the relative contribution or usefulness of that node with respect to the predictions that can be made using all the nodes. Different measures may be used as predictive utility metrics in different embodiments, e.g., based on the type of machine learning problem being solved, the specific algorithm being used for the tree's construction, and so on. In one implementation, for example, a Gini impurity value may be used as the PUM or as part of the PUM, or an entropy-based measure of information gain, or some other measure of information gain may be used. In some implementations, a combination of several different measures may be used. In at least some embodiments, some measure of predictive utility or benefit of a predicate may have to be computed in any case during tree construction for at least some of the nodes to be added to the tree, and the PUM assigned to the node may simply represent such a benefit. In some implementations, PUM values may not be identified for one or more nodes of a tree—that is, having PUM values available for a subset of the nodes may suffice for tree pruning purposes.

In at least some implementations, it may be possible to create a partial (or total) order of the nodes of a decision tree based on the PUMs of the nodes, and such an ordering may be used in a tree pruning pass of the training phase as described below. In one embodiment, instead of or in addition to generating an ordered list of all the nodes, a histogram or similar distribution indicator of the PUM values with respect to the tree nodes may be created and/or written to persistent storage, e.g., together with the node descriptors and PUM values. A histogram may, for example, take much less memory than an exhaustive list of the tree's nodes and corresponding PUM values.

Figure 35:
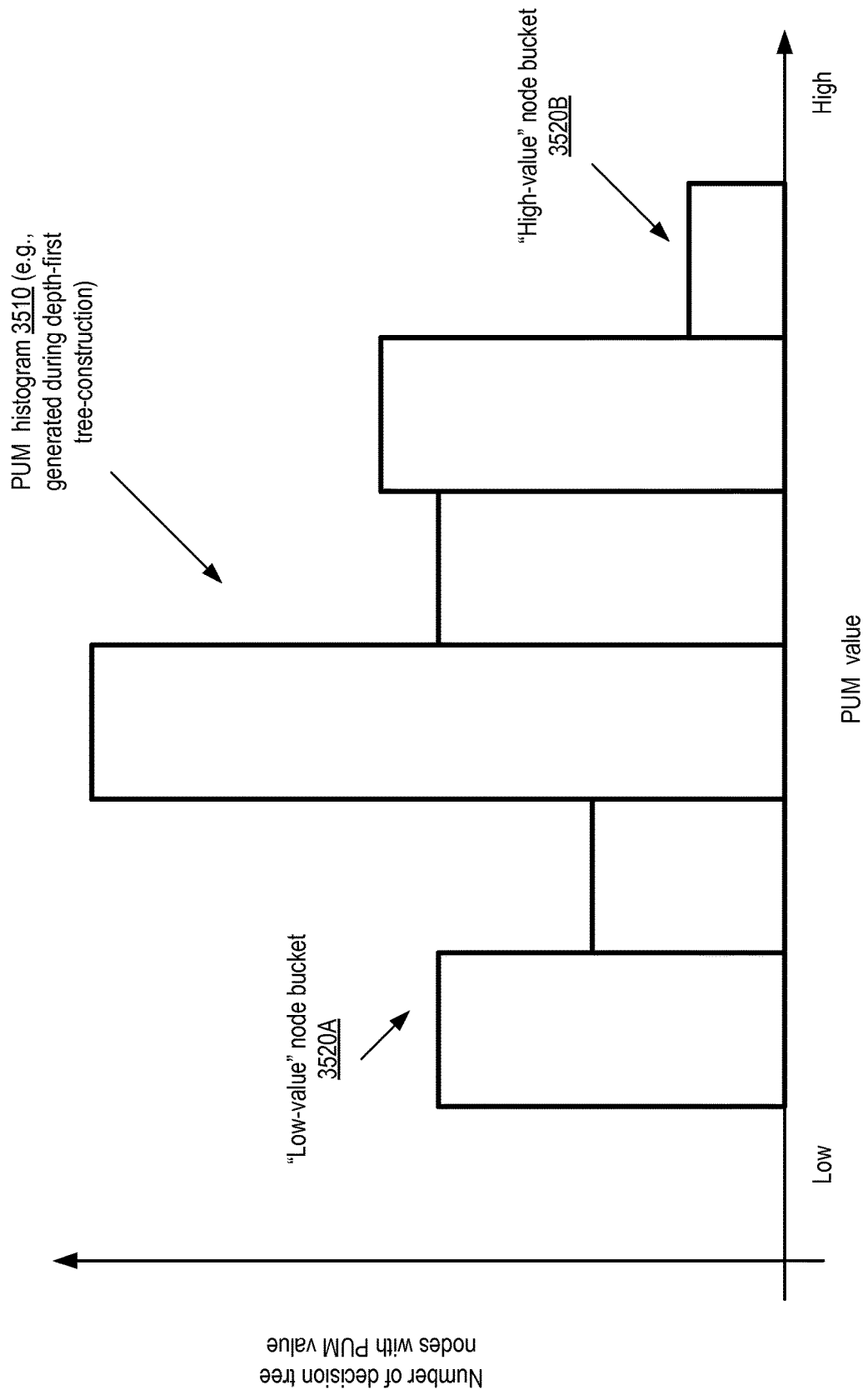
FIG. 35 illustrates an example of predictive utility distribution information that may be generated for the nodes of a decision tree, according to at least some embodiments.

FIG. 35 illustrates an example of predictive utility distribution information that may be generated for the nodes of a decision tree, according to at least some embodiments. PUM values increase from left to right on the X-axis of the PUM histogram 3510, and the number of decision tree nodes that fall within each PUM value bucket is indicated by the height of the corresponding bar of the histogram. As a result of generating the distribution information, bucket 3520A representing relatively low-value nodes may be identified, indicating how many nodes have low PUM values, and bucket 3520B indicating the number of high-value nodes may be identified, for example. The low value nodes may be deemed better candidates for removal from the tree during pruning than the high value nodes. In some implementations, identifiers of at least some of the nodes belonging to one or more of the buckets of the histogram 3510 may be stored in persistent storage to assist in the pruning phase. For example, the identifiers of nodes within two levels from a leaf node may be stored for one or more low-value buckets in one implementation, and such a list may be used to identify pruning candidate nodes.

Figure 36:
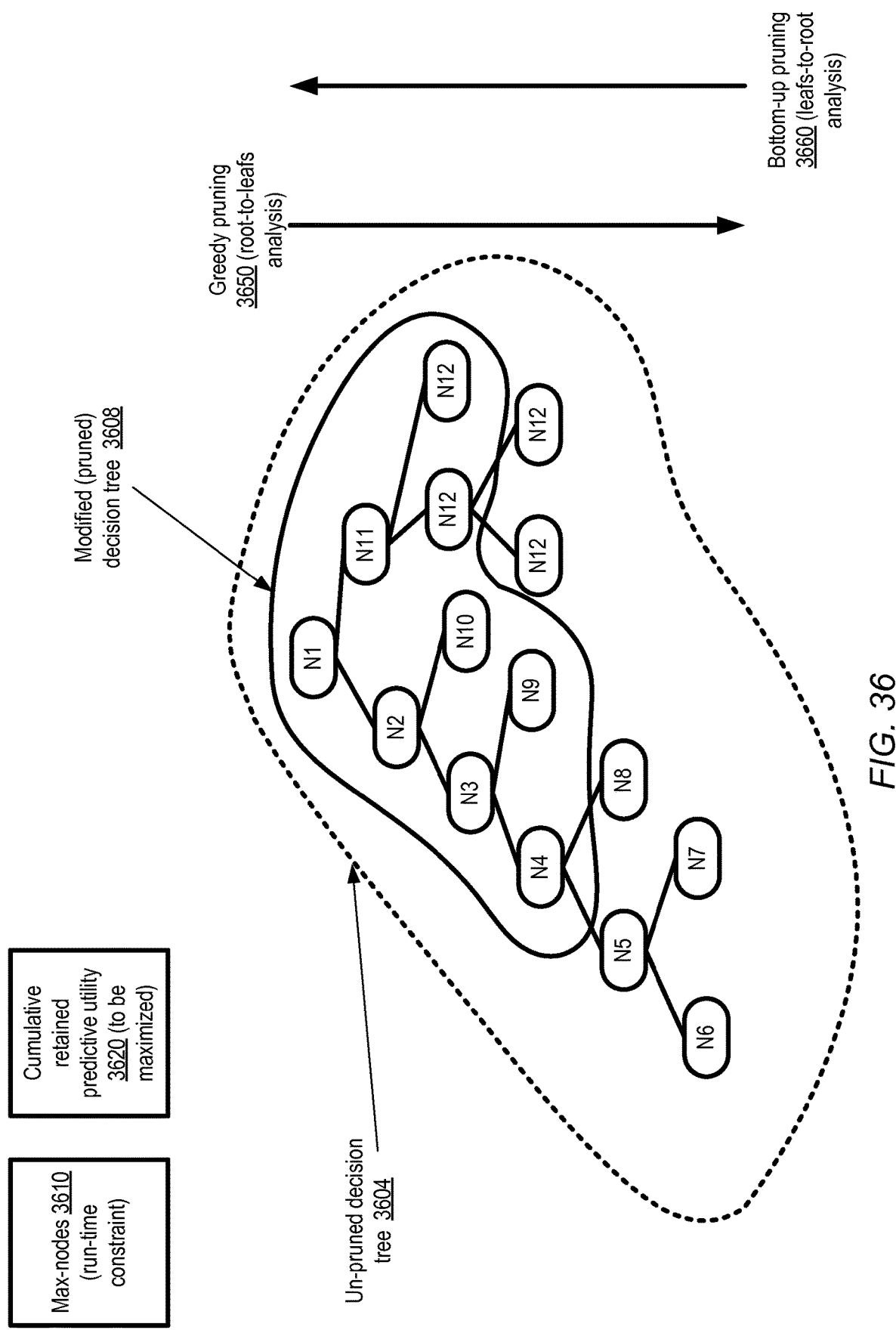
FIG. 36 illustrates an example of pruning a decision tree based at least in part on a combination of a run-time memory footprint goal and cumulative predictive utility, according to at least some embodiments.

The tree-construction pass of a training phase may be followed by a pruning pass in at least some embodiments, in which the tree representations are reduced in size by eliminating selected nodes in view of one or more run-time optimization goals or criteria. In some embodiments, several separate periods of tree-construction interspersed with periods of tree-pruning may be implemented, so that the entire tree need not necessarily be generated before some its nodes are pruned (which might help reduce the total number of nodes generated). A number of different goals may be taken into consideration in different embodiments for pruning FIG. 36 illustrates an example of pruning a decision tree based at least in part on a combination of a run-time memory footprint goal and cumulative predictive utility, according to at least some embodiments. The term "run-time memory footprint" may be used herein to indicate the amount of main memory required for an execution of the model at a given server or a combination of servers, e.g., after the model's training phase is completed. Tradeoffs between two conflicting run-time goals may be considered in the depicted embodiment: the amount of memory it takes to store the tree during model execution, and the accuracy or quality of the prediction. In at least some implementations, both the memory footprint or usage (for which lower values are better) and the accuracy/quality (for which higher values are better) may increase with the number of retained nodes (i.e., the nodes that are not removed/pruned from the initial decision tree generated using the depth-first stream-to-persistent-storage technique described above). A run-time memory footprint goal may be translated into a "max-nodes" value 3610, indicating the maximum number of nodes that can be retained. The quality or accuracy of the pruned tree may be expressed in terms of the cumulative retained predictive utility 3620, for example, which may be computed by summing the PUM values of the retained nodes, or by some other function that takes the PUM values of retained nodes as inputs.

Nodes may be identified for removal using a variety of approaches in different embodiments. For example, in a greedy pruning technique 3650, the unpruned tree 3604 may be analyzed in a top-down fashion, selecting the path that leads to the node with the highest PUM value at each split in the tree. The cumulative PUM values of the nodes encountered during the greedy top-down traversal may be tracked, as well as the total number of nodes encountered. When the total number of nodes encountered equals the max-nodes value, the nodes that have been encountered thus far may be retained and the other nodes may be discarded or removed. In at least some embodiments, a modified or pruned version 3608 of the tree 3604 may be stored (e.g., in persistent storage) separately from the un-pruned version, so that, for example, re-pruning may be attempted using a different pruning approach if necessary. In other embodiments, only the pruned version 3608 may be retained. In some embodiments, instead of using a greedy top-down approach, a bottom-up approach may be used as indicated by arrow 3660, in which leaf nodes are analyzed first, and nodes are removed if their contribution to the quality/accuracy of the model is below a threshold until the max-nodes constraint 3610 is met. In some embodiments, the PUM distribution information (such as a histogram similar to that illustrated in FIG. 35) may be consulted when selecting nodes to be pruned. In embodiments in which multiple run-time goals (some of which may conflict with each other) guide the pruning procedure, the MLS may have to prioritize the conflicting goals relative to each other. For example, the max-nodes goal shown in FIG. 36 may be considered a higher priority than the goal of accumulating predictive utility. In at least some implementations, at least some nodes may be selected for pruning using a random selection procedure, e.g., without using a strictly top-down or bottom-up approach while still adhering to the run-time goals and quality objectives.

Figure 37:
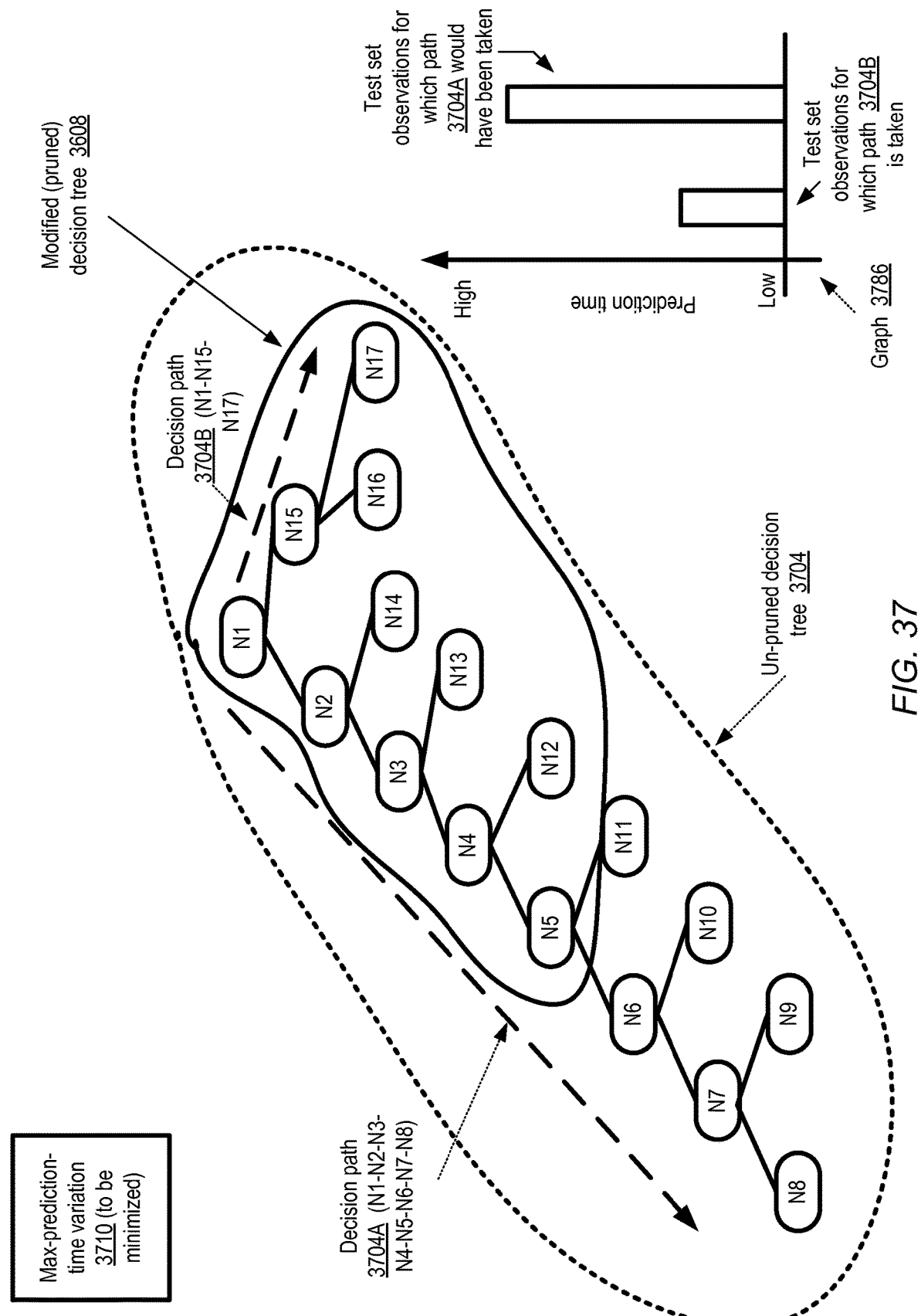
FIG. 37 illustrates an example of pruning a decision tree based at least in part on a prediction time variation goal, according to at least some embodiments.

In some embodiments, other types of run-time goals may be taken into account during the tree pruning pass of a model's training phase. FIG. 37 illustrates an example of pruning a decision tree based at least in part on a prediction time variation goal, according to at least some embodiments. In some cases, depending on the distributions of the values of the independent variables of the training data set and the relationships between the independent variables and the dependent variable, a decision tree such as un-pruned decision tree 3704 may be very unbalanced. That is, some paths between the root node and leaf nodes may be much longer than others. For example, leaf node N8 of tree 3704 may be reached from root node N1 via a decision path 3704A that traverses eight nodes (including N1 and N8), while leaf node N17 may be reached via a decision path 3704B that includes only three nodes.

In the depicted embodiment, the time taken (and the CPU resources consumed) to make a prediction for a given observation record's dependent variable may be at least approximately proportional to the length of the decision path, as indicated in graph 3786. For some latency-sensitive applications, the variation in the time taken to make predictions for different observation records or test sets may be considered an important indicator of the quality of the model, with less variation typically being preferred to more variation. Accordingly, the maximum variation in prediction time 3710 may be an important run-time optimization goal in such embodiments, and some number of nodes may be removed from the tree 3704 so as to reduce the maximum variation in possible decision paths. As shown, for example, nodes N6, N7, N8, N9, N10 and N11 may be removed from tree 3704, so that the maximum decision path length in the modified/pruned tree 3608 is reduced from eight to five. In at least some embodiments, a primary goal of minimizing variation in prediction time may be combined with a secondary goal of maximizing cumulative retained predictive utility. For example, when choices for pruning are to be made that affect the lengths of decision paths equally, the PUM values of the alternative pruning target nodes may be compared and the node with the greater PUM value may be retained.

In at least some embodiments, business goals may also be considered when pruning decision trees. For example, consider a scenario in which a group of potential customers of a service is being classified into segments S1, S2, . . . , Sn, such that the customers that are classified as belonging to segment S6 are expected to spend substantially higher amounts on the service that customers belonging to other segments. In such a scenario, nodes along the decision paths that lead to classification of S6 customers may be retained during pruning in preference to nodes along decision paths that lead to other segments. In various embodiments, a combination of memory footprints/constraints, quality/accuracy goals, absolute execution-time (prediction-time) goals, prediction-time variation goals, business/revenue goals, and/or other goals may be used, with application-specific prioritization of the different goals. In at least some embodiments, a programmatic interface of the MLS may allow clients to indicate one or more run-time optimization goals of the kinds described above, e.g., by ranking the relative importance to a client of the different types of goals for a given model or problem. In some embodiments, information regarding best practices for decision tree pruning (e.g., which pruning methodologies are most useful) for different problem domains may be collected by the MLS in knowledge base 122 (shown in FIG. 1) and applied as needed.

Figure 38:
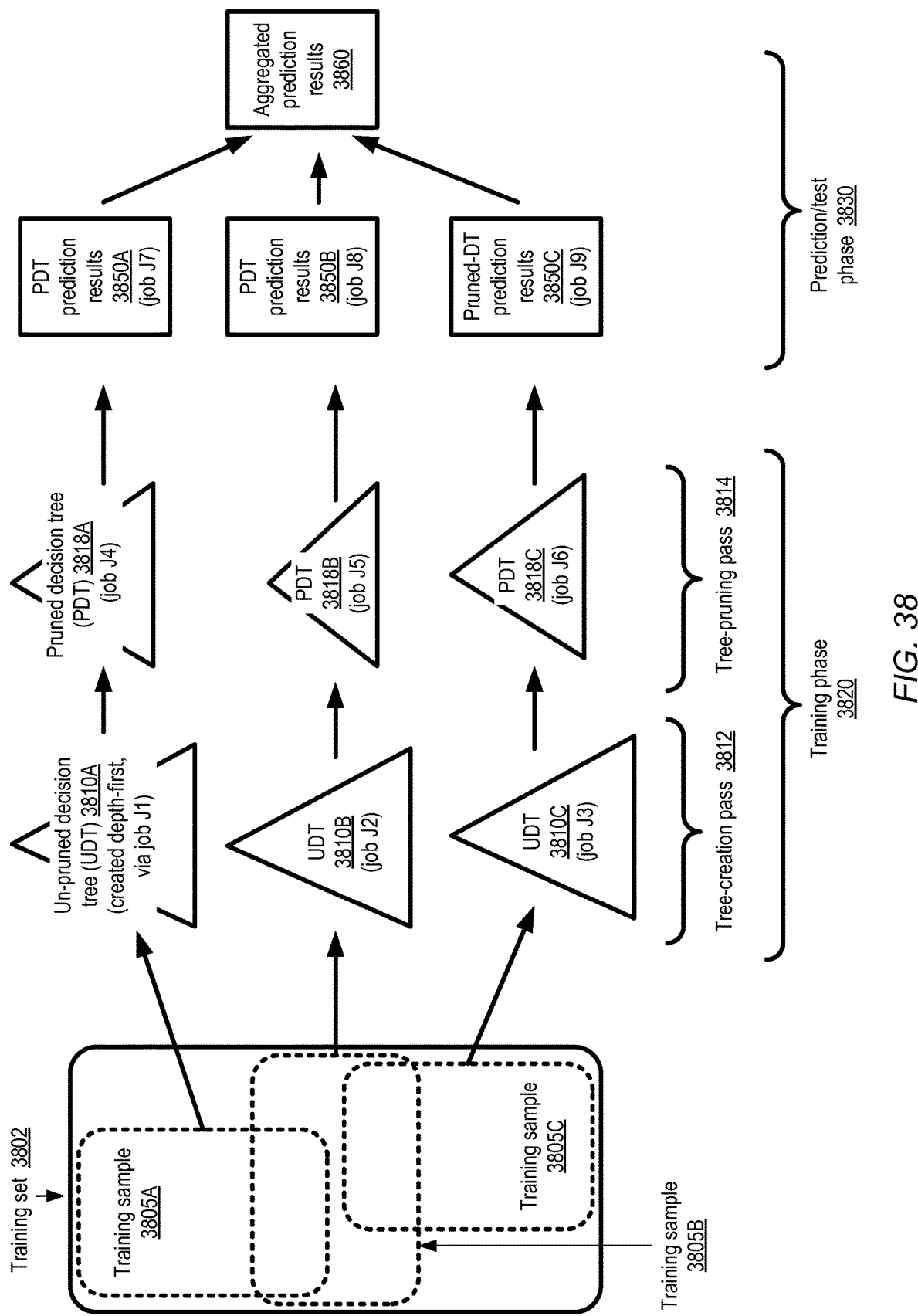
FIG. 38 illustrates examples of a plurality of jobs that may be generated for training a model that uses an ensemble of decision trees at a machine learning service, according to at least some embodiments.

FIG. 38 illustrates examples of a plurality of jobs that may be generated for training a model that uses an ensemble of decision trees at a machine learning service, according to at least some embodiments. In the depicted embodiment, respective training samples 3805A, 3805B and 3805C may be obtained from a larger training set 3802 (e.g., using any of a variety of sampling methodologies such as random sampling with replacement), and each such sample may be used to create a respective decision tree using the depth-first approach described above. Thus, training sample 3805A may be used to generate and store an un-pruned decision tree (UDT) 3810A in depth-first order at persistent storage during tree-creation pass 3812 of training phase 3820, training sample 3805B may be used for UDT 3810B, and UDT 3810C may be generated using training sample 3805C. Respective jobs J1, J2 and J3 may be inserted into an MLS job queue or collection for the construction of UDTs 3810A, 3810B and 3810C in some embodiments. The jobs of the tree-creation pass may be performed in parallel in at least some embodiments, e.g., using respective servers of an MLS server pool, or using multiple threads of execution (or processes) at the same MLS server.

Each UDT may be pruned in accordance with applicable run-time optimization goals to produce a corresponding pruned decision tree (PDT) 3818 in the pruning pass 3814 of the training phase in the depicted embodiment. Jobs J4, J5 and J6 may be implemented for pruning UDTs 3810A-3810C respectively, producing PDT 3818A-3818C. Finally, jobs J7, J8 and J9 respectively may be scheduled to execute the model using the three PDTs 3818A-3818C using some specified test set (or production data set) in the depicted embodiment, resulting in prediction results 3850A-3850C. The results 3850 obtained from the different PDTs may be combined in any desired fashion (e.g., by identifying an average or median value for the predictions for each test set observation record) to produce aggregated prediction results 3860 during a prediction or test phase of the machine learning algorithm being used. A prediction phase may differ from a test phase, for example, in that the values of the dependent variables may not be known for the data set in the prediction phase, while values for the dependent variables may be known for the data set used for testing the model. In some embodiments, an additional job J10 may be scheduled for the aggregation of the results. It is noted that any of the jobs J1-J10 may be performed in parallel with other jobs, as long as the applicable job dependencies are met—e.g., job J4 may have to be initiated after J1 completes, and J7 may be initiate after J4 completes. Note, however, that J7 may be begun even before J2 completes, as J7 does not depend on J2—thus, in at least some embodiments, the prediction/test phase 3830 may overlap with the training phase if sufficient resources are available. For some tree ensemble-based algorithms such as Random Forest, hundreds of UDTs and PDTs may be generated for a given training set, and the use of parallelism may reduce both the training time and the execution time substantially relative to sequential approaches. In some embodiments, different run-time optimization goals may be applied to pruning different UDTs, while in other embodiments, the same set of run-time optimization goals may be applied to all the trees of an ensemble. Jobs for any of the different tasks illustrated (e.g., tree generation, tree pruning or model execution) that have met their dependencies may be executed in parallel at the thread level (e.g., different threads of execution may be used for the jobs on the same server), the process level (e.g., respective processes may be launched for multiple jobs to be run concurrently on the same server or different servers), or the server level (e.g., each job of a set of concurrently-schedulable jobs may be executed at a different thread/process at a respective MLS server) in various embodiments. Combinations of thread-level, process-level and server-level parallelism may be used in some embodiments—e.g., of four jobs to be run in parallel, two may be run at respective threads/processes at one MLS server, while two may be run at another MLS server.

Figure 39:
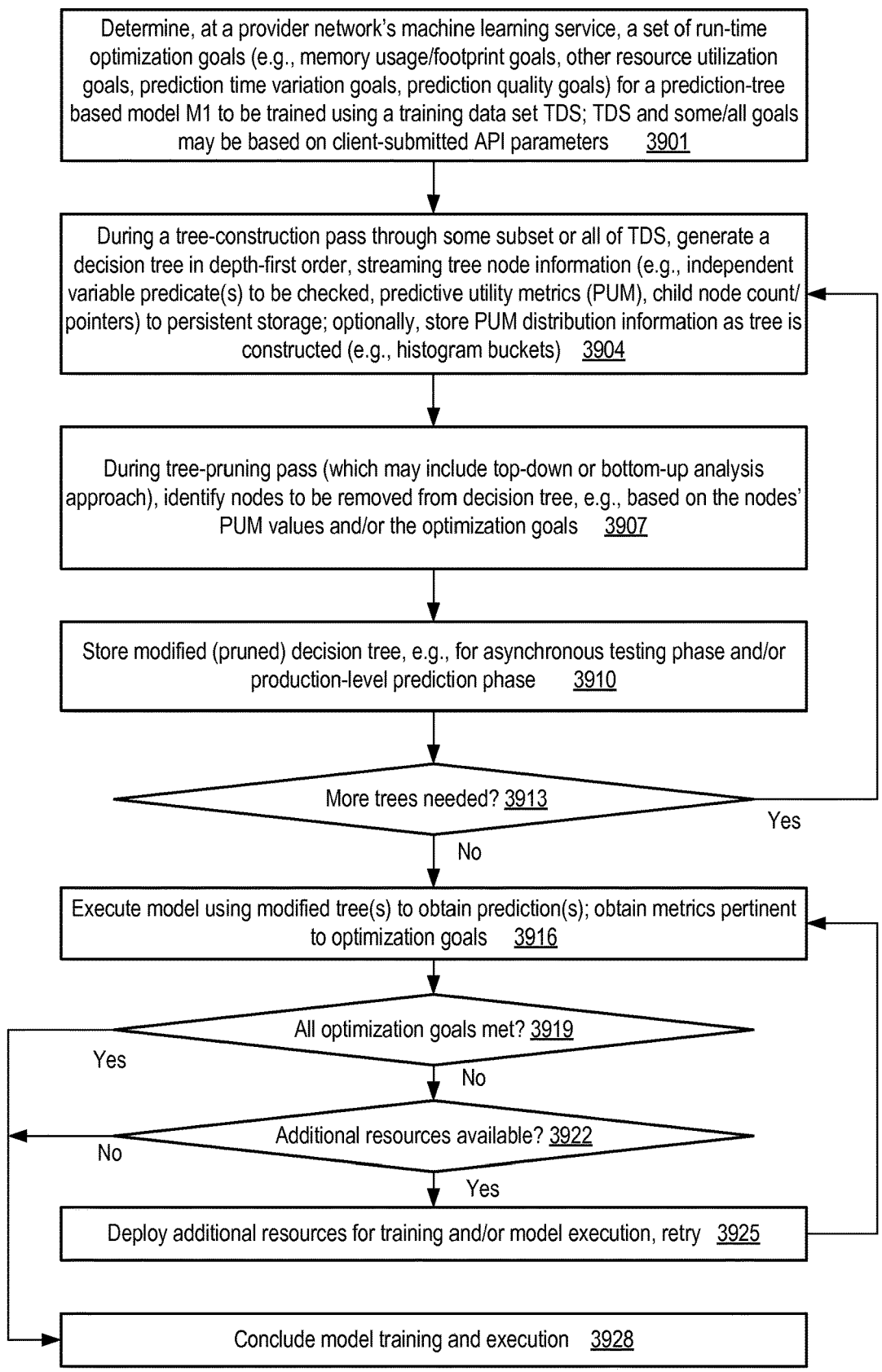
FIG. 39 is a flow diagram illustrating aspects of operations that may be performed at a machine learning service to generate and prune decision trees stored to persistent storage in depth-first order, according to at least some embodiments.

FIG. 39 is a flow diagram illustrating aspects of operations that may be performed at a machine learning service to generate and prune decision trees stored to persistent storage in depth-first order, according to at least some embodiments. As shown in element 3901, a set of run-time optimization goals may be identified for a prediction-tree based model M1 to be trained using a training data set TDS and executed at a machine learning service. A variety of goals may be determined and/or prioritized in different embodiments, including for example memory usage or footprint goals, utilization goals for other resources such as CPUs, prediction-time goals (e.g., the elapsed time for a prediction run of the model), prediction-time variation goals (e.g., reducing the differences between model prediction times for different observation records), prediction accuracy/quality goals, budget goals (e.g., the total amount that a client wishes to spend on model execution, which may be proportional to the CPU utilization of the model execution or to utilization levels of other resources), revenue/profit goals of the kind described above, and so on. In some embodiments, the training data set and/or indications of some or all of the optimization goals (or the relative priorities of the different goals) may be provided by an MLS client programmatically, e.g., via one or more MLS APIs. For example, in one embodiment an API to create a decision tree based model may be invoked by a client, with respective request parameters indicating the data set and one or more run-time goals.

At least some of the goals may be qualitative instead of being expressed in exact quantities in some embodiments— e.g., it may not always be possible to indicate a precise target value for cumulative predictive utility, but a goal of maximizing cumulative predictive utility to the extent possible may still be used to guide pruning in some scenarios.

A tree-construction pass of M1's training phase may be initiated using some selected subset of all of the training data set. In some implementations, the training data (or at least pointers to the observation records of the training data) may be loaded into memory prior to the construction of the tree, and rearranged in memory based on the predicates evaluated at the nodes of the tree as the nodes are generated. During the tree-construction pass, the nodes of a decision tree may be generated in depth-first order in the depicted embodiment (element 3904), and node information such as the predicates being tested and the child node count or pointers to the child nodes may be streamed to persistent storage (e.g., rotating-disk based storage) in depth-first order. In the depicted embodiment, a predictive utility metric (PUM) value may be stored for at least some of the nodes, indicative of the contribution or utility of the nodes towards the predictions made by the model. Any of several types of statistical measures may be used as PUM values in different implementations, such as Gini impurity values, entropy measures, information gain measures, and so on. The PUM values may be used, for example in a subsequent tree-pruning pass of the training phase, to determine an order in which nodes can be pruned or removed from the tree without affecting the quality of the model predictions significantly. In some embodiments a histogram or a similar representation of the distribution of PUM among the tree's nodes may be generated during the tree construction pass. In other embodiments, the distribution information may be collected in a separate traversal of the tree. The terms "tree construction" and "tree creation" may be used as synonyms herein.

The constructed tree may be analyzed, e.g., in either a top-down greedy approach or a bottom-up approach, to identify some number of nodes that should be removed in view of the run-time optimization goals and/or the nodes' PUM values in the depicted embodiment (element 3907). In some embodiments, the tree-pruning phase need not be performed, e.g., if the un-pruned tree already meets desired optimization goals. In at least one embodiment, it may be the case that none of the nodes of a given tree is pruned, e.g., because a cost-benefit analysis indicates that the removal is not worthwhile. The modified or pruned version of the decision tree may be stored (element 3910), e.g., in a separate location than the un-pruned tree, for use later during a test phase and/or production-level prediction runs of the model.

Depending on whether the model is ensemble-based or not, multiple trees may have to be constructed in some cases. If more trees are required (as determined in element 3913), a different sample of the training data set may be generated and the construction and pruning operations of elements 3904 onwards may be repeated. Although parallelism is not explicitly illustrated in FIG. 39, in some embodiments, as mentioned earlier, multiple trees may be constructed and/or pruned in parallel. In the depicted embodiment, after all the trees have been constructed and pruned, the model may be executed using the pruned tree(s) to obtain one or more sets of predictions (element 3916). Prediction runs corresponding to multiple pruned trees may be performed in parallel in some implementations. Metrics that can be used to determine whether the optimization goals were achieved during the prediction run(s) may be obtained in some embodiments.

If all the goals were met to an adequate extent, as detected in element 3919, the training and execution phases of the model may be considered complete (element 3928). If some goals (such as a desired level of accuracy) were not met, and if additional resources such as more memory are available (as detected in element 3922), in some embodiments the training and/or execution phases may be retried using additional resources (element 3925). Such retries may be repeated in some embodiments until the goals are met or no additional resources are available. The techniques described herein for generating and pruning trees based on training-time versus run-time tradeoffs may be used for various types of tree-based models in different embodiments, including for example CART (classification and regression tree) models, Random Forest models, and adaptive boosting models. In some embodiments, tree generation and tree pruning may be performed iteratively, e.g., with several different periods of tree generation and several different periods of tree pruning interspersed with each other during the training phase of the model. In such a scenario, some number of nodes may be generated and stored in depth first order in a first tree-generation period. Then, tree generation may be paused, the created nodes may be examined for pruning (e.g., based on their PUM values and on the optimization goals) in a first tree-pruning period, and some nodes may be removed based on the analysis. More nodes may be generated for the resulting tree in the next tree-generation period, followed by removal of zero or more nodes during the next tree-pruning period, and so on. Such iterative generation and pruning may help eliminate nodes with low utility from the tree earlier than in an approach in which the entire tree is generated before any nodes are pruned.

In at least one embodiment, a number of different components of the machine learning service may collectively perform the operations associated with decision tree optimizations. A client request for the training or creation of a tree-based model (e.g., either a model based on a single tree, or a model using an ensemble of trees), submitted via one or more APIs may be received at a request/response handler, which may determine the nature of the request and pass on the client request (or an internal representation of the client request) to a model generator or model manager. In some embodiments, each pass of the training phase may be performed by a respective MLS component—e.g., one or more tree generator components may create the trees in depth-first order and stream the node descriptors to persistent storage at one or more MLS servers, while one or more tree reducers may be responsible for pruning trees. In at least one embodiment, one or more training servers of the MLS may be used for training tree-based models, while one or more prediction servers may be used for the actual predictions. In embodiments in which respective jobs are created for different tasks, a job manager may be responsible for maintaining a collection or queue of outstanding jobs and for scheduling jobs as resources become available and job dependencies are met. Responses (e.g., an identifier of a tree-based model, or results of a prediction run) may be provided to the client by the front-end request/response handler in some embodiments. In at least some embodiments, some or all of these components may comprise specialized, tuned, or task-optimized hardware and/or software.

Feature Processing Tradeoffs

As described earlier, a machine learning service implemented at a provider network may support a wide variety of feature processing transformations (which may be referred to as FPTs), such as quantile binning, generation of a Cartesian product of values of one or more variables, n-gram generation, and so on. For input data sets that have many independent variables and are to be used for training a model, a very large number of feature processing transformations may potentially be feasible for generating derived or processed variables from the raw input data, such that the processed variables may then be used to predict values of one or more target or dependent variables of interest to a client. For a client, it may not always be straightforward to estimate either the usefulness of a given FPT with respect to the quality of the predictions of a model trained using a result of the FPT, or the costs associated with implementing the FPT. Each FPT (or group of related FPTs) may have its own set of costs for various phases of a model's lifecycle, which may be expressible in any of a variety of units such as elapsed times, resource consumption, and so on. For example, the additional or marginal costs (e.g., memory, CPU, network or storage costs) of applying the FPT to the training set, training a model using input data that includes the result of the FPT, applying the FPT to an evaluation or test data set, and including the FPT's processed variable(s) as inputs for the model's execution for a prediction/evaluation run, may all have to be considered in some embodiments when determining whether the FPT is worthwhile. In some embodiments, the MLS may be configured to provide recommendations to clients regarding possible sets of feature processing transformations, e.g., based on automated cost-benefit analyses in view of goals indicated by the clients. It may be possible, for example, to spend more time or more resources analyzing the FPTs at training time, in order to come up with more accurate and/or faster predictions during production runs of the model. At least some such feature processing recommendation techniques may have similar objectives to the automated parameter tuning that may be performed for recipes in some embodiments as described above.

Figure 40:
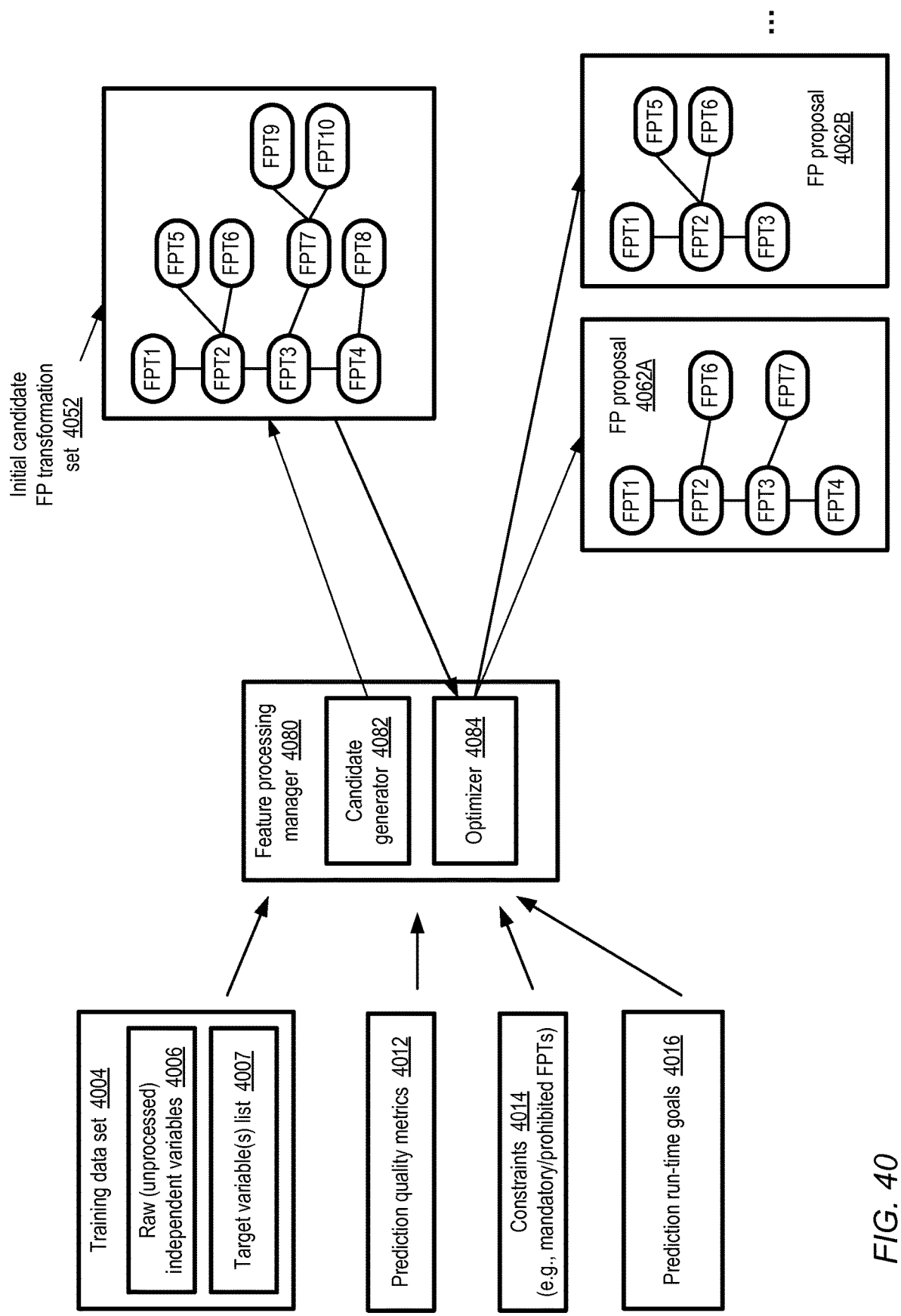
FIG. 40 illustrates an example of a machine learning service configured to generate feature processing proposals for clients based on an analysis of costs and benefits of candidate feature processing transformations, according to at least some embodiments.

FIG. 40 illustrates an example of a machine learning service configured to generate feature processing proposals for clients based on an analysis of costs and benefits of candidate feature processing transformations, according to at least some embodiments. As shown, a feature processing (FP) manager 4080 of the machine learning service may comprise a candidate generator 4082 and an optimizer 4084. The FP manager 4080 may receive an indication of a training data set 4004 comprising values for a set of raw or unprocessed independent variables 4006 and one or more target variables 4007 whose values are to be predicted by a model. The model may be trainable using variables derived from the training data set using one or more FPTs. In addition, in the depicted embodiment, the FP manager 4080 may also determine one or more prediction quality metrics 4012, and one or more run-time goals 4016 for the predictions. A variety of quality metrics 4012 may be determined in different embodiments and for different types of models, such as ROC (receiver operating characteristics) AUC (area under curve) measures for binary classification problems, mean square error metrics for regression problems, and so on. In some embodiments, a client may indicate one or more constraints 4014 (such as one or more required or mandatory FPTs, and/or one or more prohibited FPTs) for training the model, and the FP manager may attempt to meet the specified constraints. The goals 4016 may include elapsed time goals for producing predictions on a data set of a specified size, goals for an amount of memory not to be exceeded when making such predictions, budget goals regarding the maximum billing costs per prediction, and so on. In some embodiments, the FP manager may also be provided with a set of training phase goals, such as the maximum amount of time to be consumed to train the model, a budget not to be exceeded for training the model, or a time or budget limit for the MLS to provide a feature processing proposal to the client.

In the depicted embodiment, the candidate generator 4082 may be responsible for identifying an initial candidate FPT set 4052. The initial candidate FPT set may be represented at least internally within the MLS as an acyclic graph of possible transformations in some implementations, such as the illustrated graph comprising FPT1-FPT10. The acyclic graph representation may indicate, for example, a recommended sequence in which the different FPTs should be performed, and/or dependencies between different FPTs. For example, the depicted representation of FPT set 4052 may indicate that FPT9 depends on a result of FPT7, FPT7 depends on a result of FPT3, and so on. In some embodiments in which a budget limit or a time limit is not indicated for generating a feature processing proposal, the candidate generator 4082 may include a large number (e.g., dozens or hundreds) of candidate FPTs. In other embodiments, in which constraints such as time limits or resource limits are placed on the FP manager with regard to FP proposal generation, the initial set 4052 of candidate FPTs may comprise a relatively small subset of the feasible candidate transformations. The initial set 4052 may include any FPTs that are specified (e.g., in constraints 4014) as being mandatory, and exclude any FPTs that were prohibited.

The optimizer 4084 may be responsible for generating one or more FP proposals such as 4062A and 4062B. The FP proposals may typically be versions of the candidate set 4052 from which some number of candidate FPTs have been removed or pruned, e.g., based on a cost-benefit analysis performed by the optimizer. If a client had indicated mandatory feature processing transformations via constraints 4014, such transformations may be retained in the FP proposals. The cost benefit analysis may comprise the scheduling of a plurality of jobs as described below in various embodiments, e.g., jobs that involve training and evaluating a model with results of the initial set of candidate FPTs, re-evaluating the model with modified evaluation sets to estimate the impact of various FPTs on prediction quality, and/or re-training the model with modified sets of processed variables to estimate the impact of various FPTs on prediction run-time metrics. In the scenario shown in FIG. 40, proposal 4062A is obtained from initial FPT candidate set 4052 by removing FPT5, FPT8, FPT9 and FPT10, while proposal 4062B results from the elimination of FPT4, FPT7, FPT8, FPT9 and FPT10 from FPT candidate set 4052. A variety of techniques may be used in different embodiments for selecting the FPTs that are eliminated in different proposals, such as random removals, greedy algorithms, and so on, as described below in further detail. One of the advantages of pruning (e.g., removing) FPTs from the candidate set is that clients may not have to go to the trouble of including some independent variables in their training and testing data sets. For example, if FPT5 is the only transformation in the candidate set 4052 that applies to a given independent variable 4006, and the FP manager determines that FPT5 is not required to meet the objectives of the client, the client need not collect values of the independent variable 4006 for future training and/or test/evaluation data. Since collecting, storing and providing training data to the MLS may have a significant impact on the client's overall costs of obtaining solutions to machine learning problems, such training-data-reduction optimizations may be especially valuable.

In at least some embodiments, one or more FP proposals 4062 may be provided programmatically to a client of the MLS, e.g., in the form of a catalog or menu from which the client may approve a specific proposal or multiple proposals. In some cases, an iterative process may be used to arrive at a final approved FP plan, e.g., with a given iteration comprising the MLS providing a proposal to the client, followed by a proposal change request from the client. If a client does not approve any of the proposals generated during an iteration, in some embodiments the FP manager may transmit a requirements reconsideration request to the client, in effect requesting the client to prioritize/modify at least some of the goals or quality metrics, or relax some of the constraints. The client may respond to the reconsideration request by indicating relative priorities for some or all of the goals and metrics. After an FP proposal is eventually approved, the MLS may implement the proposal on behalf of the client, e.g., using the results of approved FPTs as input to train a model and then obtaining predictions/evaluations on specified non-training data. Such optimization based on feature processing cost-benefit tradeoffs may be used for a variety of model types, including for example classification models, regression models, clustering models, natural language processing models and the like, and for a variety of problem domains in different embodiments.

In at least some embodiments, a client may indicate that a recipe written using a recipe language of the kind described earlier is to be used for generating processed variables for training their model. In such a scenario, the MLS may analyze the FPTs indicated in the recipe, and may ascertain whether some (or all) of the FPTs in the recipe should be replaced or eliminated when generating the FP proposal to be provided to the client. That is, an FP manager may be configured to suggest or recommend modifications to a client-specified FP recipe in such embodiments if better alternatives appear to be available. In some embodiments, one or more programmatic interfaces may be made available to clients to enable them to submit requests for FP optimizations, e.g., indicating their training data, target variables, run-time goals, prediction quality metrics, and so on. In response to receiving a request via such an API, the MLS may utilize various internal APIs to provide the requested recommendations, e.g., respective jobs may be scheduled using lower-level APIs to read the training data using the chunked approach described above, to perform feature processing, training, evaluation, re-training and/or re-evaluation. In at least one embodiment, programmatic interfaces (e.g., web-based dashboards) may be made available to clients to enable them to view the extent to which their run-time goals are being met for various models.

Figure 41:
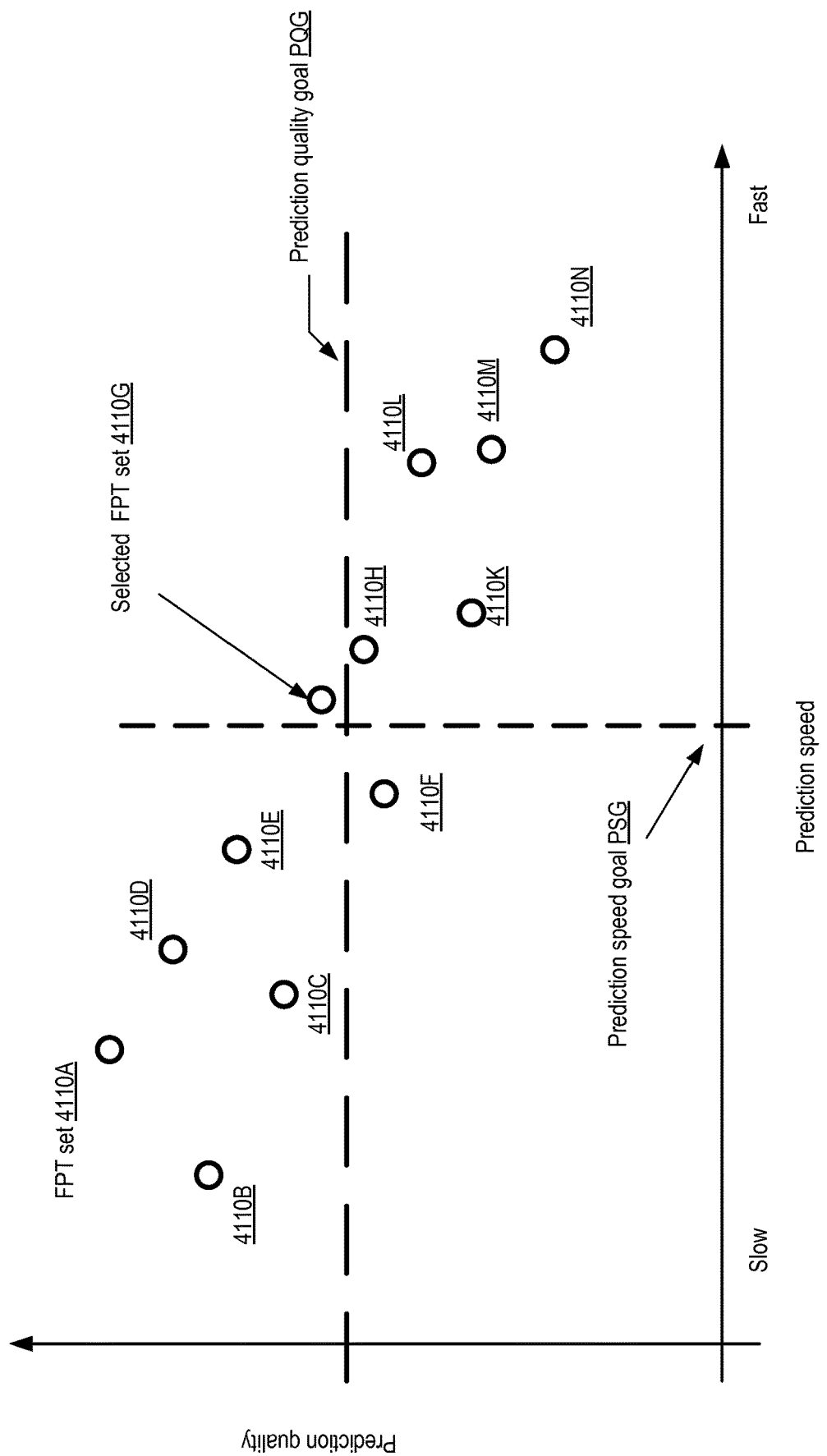
FIG. 41 illustrates an example of selecting a feature processing set form several alternatives based on measured prediction speed and prediction quality, according to at least some embodiments.

FIG. 41 illustrates an example of selecting a feature processing set from several alternatives based on measured prediction speed and prediction quality, according to at least some embodiments. In the depicted graph, the prediction speed (for a given data set size for which predictions are expected to be made after training) increases from left to right along the X-axis. Each point 4110 (e.g., any of the twelve points 4110A-4110N) represents a prediction run of a model with a corresponding set of FPTs being used for training the model. The client on whose behalf the model is being trained and executed has indicated a target prediction speed goal PSG and a target prediction quality goal PQG. Among the sets of FPTs for which results have been obtained by the FP manager, FPT set 4110G is selected as the best alternative, as it meets both of the client's criteria.

In at least some scenarios, not all the client's objectives may be simultaneously achievable. For example, a client may desire prediction times to be less than X seconds, and also desire prediction quality to exceed some measure Q1, such that the MLS is not necessarily able to meet both goals. In some such cases, the client may be requested to prioritize the goals, so that the MLS can try to optimize for one goal in preference to others. In many embodiments, at least some clients may not have to specify quality goals (or may not specify quality goals even if such goals can be specified), and may rely instead on the MLS to select appropriate prediction quality criteria that should be targeted for optimization. In at least one embodiment, the MLS may even select and/or prioritize the run-time goals that should be targeted on behalf of a given client. Clients that are more knowledgeable with respect to machine learning may be allowed to provide as much detailed guidance regarding FP tradeoff management as they wish to in some embodiments, e.g., using values for optional API parameters when interacting with the MLS. Thus, the MLS may be able to handle a variety of client expertise levels with respect to managing tradeoffs between feature processing costs and benefits.

Figure 42:
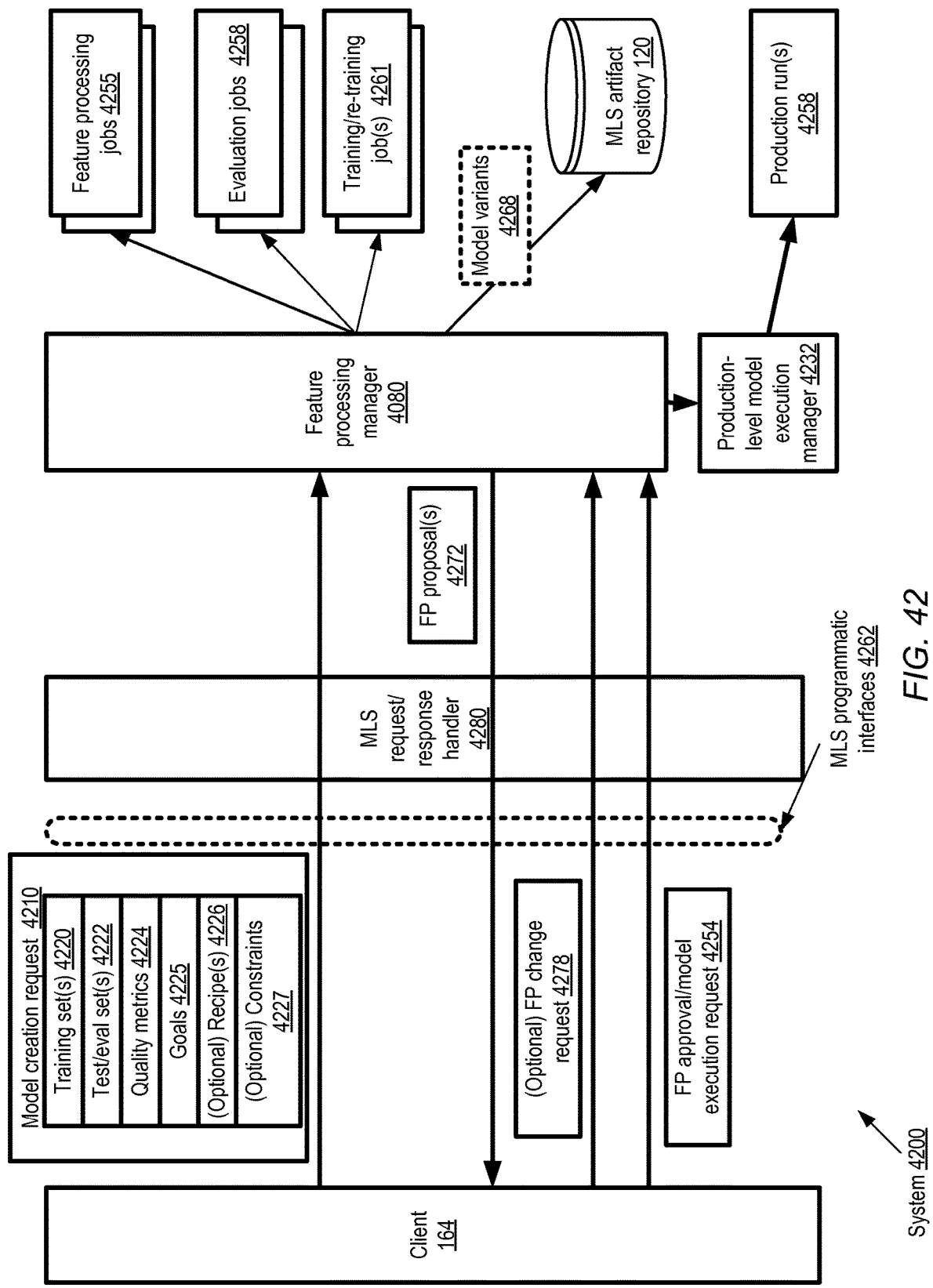
FIG. 42 illustrates example interactions between a client and a feature processing manager of a machine learning service, according to at least some embodiments.

FIG. 42 illustrates example interactions between a client and a feature processing manager of a machine learning service, according to at least some embodiments. As shown, a client 164 of the machine learning service implemented in system 4200 may submit a model creation request 4210 via a programmatic interface 4262. The model creation request 4210 may indicate, for example, some combination of the following elements: one or more training sets 4220 (which include an indication of the target variables to be predicted), one or more test or evaluation sets 4222, one or more model quality metrics 4224 of interest to the client, goals 4225 (such as prediction run-time goals and/or training goals), and in some cases, one or more optional feature processing recipes 4226 formatted in accordance with the MLS's recipe language specification. In at least one embodiment, a client may also optionally indicate one or more constraints 4227, such as a mandatory feature processing transformation that has to be performed on behalf of the client or a prohibited transformation that must not be performed. Not all the elements shown in FIG. 42 may be included in the model creation request 4210 in some embodiments; for example, if no specific model quality metrics are indicated, the FP manager may select certain metrics for optimization based on the nature of the machine learning problem being solved. The model creation request 4210 may be received by a front-end request/response handler 4280 of the MLS, and an internal representation of the request may be handed off to the FP manager 4080. Model creation requests may also be referred to as model training requests herein.

The FP manager 4080 may generate a candidate set of feature processing transformations, and then prune that candidate set to identify proposals based on the quality metrics, goals and/or constraints identified for the model. In the depicted embodiment, a number of different jobs may be generated and scheduled during this process, including, for example one or more feature processing jobs 4255, one or more model evaluation jobs 4258, and/or one or more training or re-training jobs 4261. If the model creation request includes a recipe 4226, the FP manager may take the recipe as a starting point for its exploration of feature processing options, without necessarily restricting the set of transformations considered to those indicated in the recipe. The FP manager may consult the MLS's knowledge base of best practices to identify candidate transformations in some embodiments, e.g., based on the problem domain being addresses by the model to be created or trained. As mentioned earlier, once a candidate set of FPTs (feature processing transformations) is identified, some subset of the transformations may be removed or pruned from the set in each of several optimization iterations, and different variants of the model may be trained and/or evaluated using the pruned FPT sets. The model variants 4268 may be stored within the MLS artifact repository in at least some embodiments. If the client request includes training time goals or deadlines by which the MLS is required to provide FP proposals, such goals/deadlines may influence the specific pruning techniques that are used by the FP manager 4080— for example, a greedy pruning technique such as that illustrated below may be used with strict training time deadlines. Since at least for some problems it may be possible to consider a very large number of FPTs, the MLS may set its own training time goals in scenarios in which clients do not specify such goals, e.g., so as to keep training-time resource consumption within reasonable bounds. In some embodiments, the client may be billed a fixed fee for the generation of FP proposals, in which case the experimentation/testing of different FPT options by the FP manager may be constrained by the resource usage limits corresponding to the fixed fee.

The FP manager 4080 may eventually terminate its analysis of alternative transformation sets and provide one or more FP proposals 4272 to the client 164 in the depicted embodiment (e.g., via an API response generated by the request/response handler 4280). In scenarios in which the client provided a recipe 4226, the FP proposal may indicate one or more changes to the client's recipe(s) that are recommended based on the analysis performed by the MLS, or entirely different recipes may be indicated. In some embodiments, the FP proposal(s) may be formatted in accordance with the MLS's recipe language, while in other embodiments a different representation of the proposed feature processing transformations may be provided. The client 164 may either approve one or more of the proposals, or may request changes to the proposal(s), e.g., via FP change requests 4278. In at least some embodiments, an iterative negotiation may occur between the MLS and the client, in which the client submits suggestions for changes and the MLS performs additional evaluations or re-training operations to try out the changes. The number of such iterations that are performed before the negotiation ends may also be based at least partly on billing in some embodiments—e.g., the client may be charged a fee based on the amount of time or resources consumed for each iteration of re-testing. Eventually, in the depicted embodiment, the client may approve a particular FP proposal and submit a model execution request 4254, e.g., via an MLS API. A production-level model execution manager 4232 may then implement production run(s) 4258 of the model corresponding to the approved FP proposal. The client may request additional changes based on the results achieved in the production runs, e.g., by submitting additional change requests 4278 and/or requesting re-training or re-creation of the model based on new training data.

Figure 43:
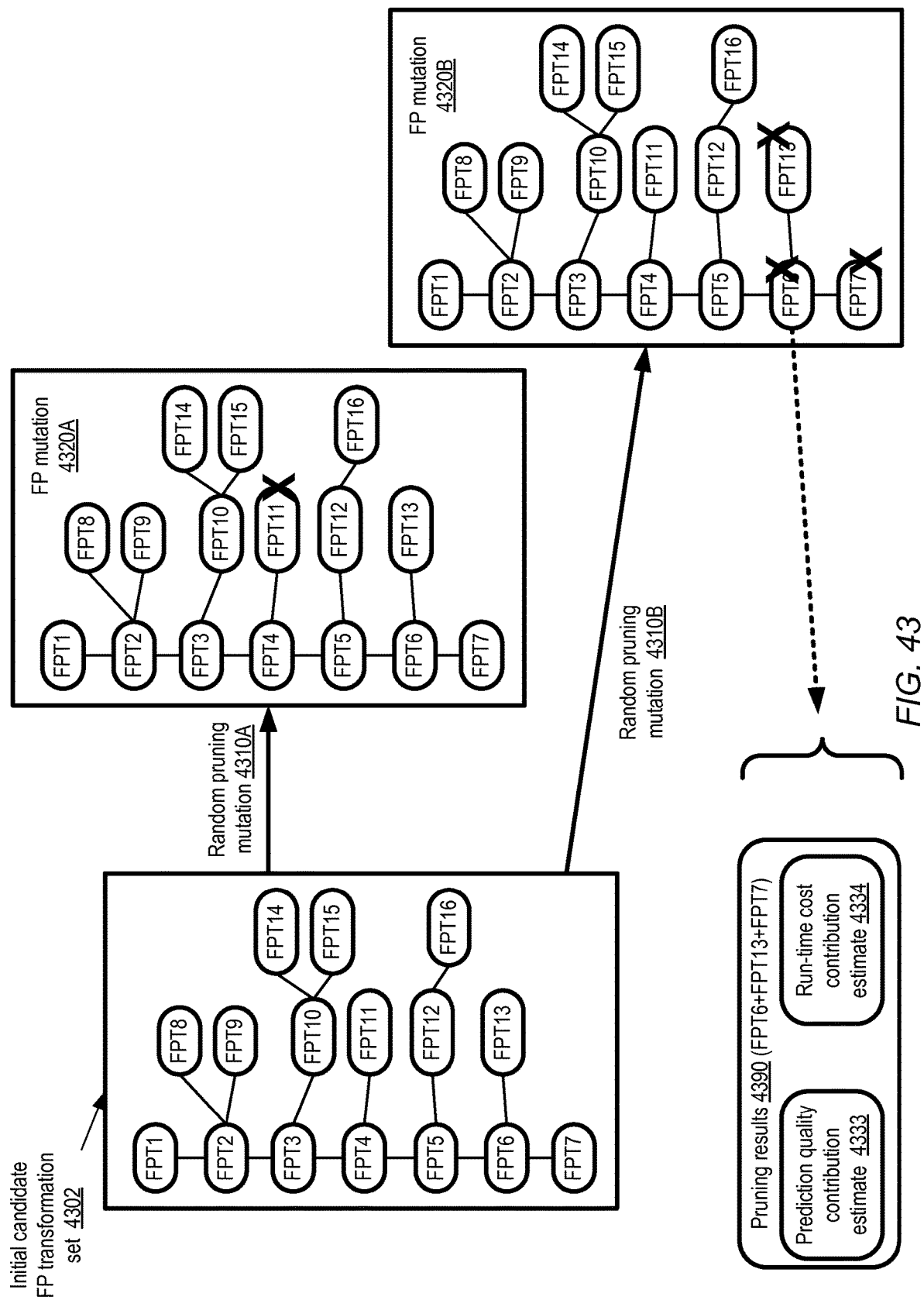
FIG. 43 illustrates an example of pruning candidate feature processing transformations using random selection, according to at least some embodiments.

A number of different techniques may be used for pruning candidate FP transformations (i.e., removal of the transformations from the candidate set) in various embodiments. FIG. 43 illustrates an example of pruning candidate feature processing transformations using random selection, according to at least some embodiments. In this approach, one or more FPTs of the initial candidate FPT set 4302 may be selected for removal at random, and the impact of such a removal on the model's quality metrics and the goals may be estimated. FP mutation 4320A may result from the removal of FPT11 from candidate FPT set 4302, for example, while FP mutation 4320B may result from the removal of FPT6, FPT7 and FPT13.

Depending on the logical relationships or dependencies between different FPTs of the candidate set, a selection of one particular node of an FPT set as a pruning victim may result in the removal of one or more other nodes as well. For example, if FPT13 and FPT7 depend on (e.g., use the output of) FPT6, the selection of FPT6 as a victim may also result in the pruning of FPT7 and FPT13. The estimates of the costs and benefits of removing the victim FPTs may be determined, e.g., by re-evaluating the model using dummy or statistically selected replacement values for the features produced by the victims to determine the impact on the prediction quality metrics, and/or by re-training the model with a smaller set of features to determine the impact on run-time performance metrics. The FP manager may store the pruning results for each FP mutation 4320 in the depicted embodiment, e.g., as artifacts in the MLS artifact repository. Pruning results 4390, corresponding to mutation 4320B, for example, may include an estimate of prediction quality contribution 4333 of the removed FPTs (FPT6, FPT7 and FPT13), as well as an estimate of the contribution 4334 of the removed FPTs to prediction run-time costs. Such estimates for different mutations may be used to generate the proposals to be provided to the client by the FP manager. The randomized pruning approach may be especially useful if the different candidate FPTs are not expected to differ significantly in their cost and quality contributions, or if the FP manager cannot predict (e.g., based on best practices) whether different candidates are likely to have significantly different cost or quality contributions.

Figure 44:
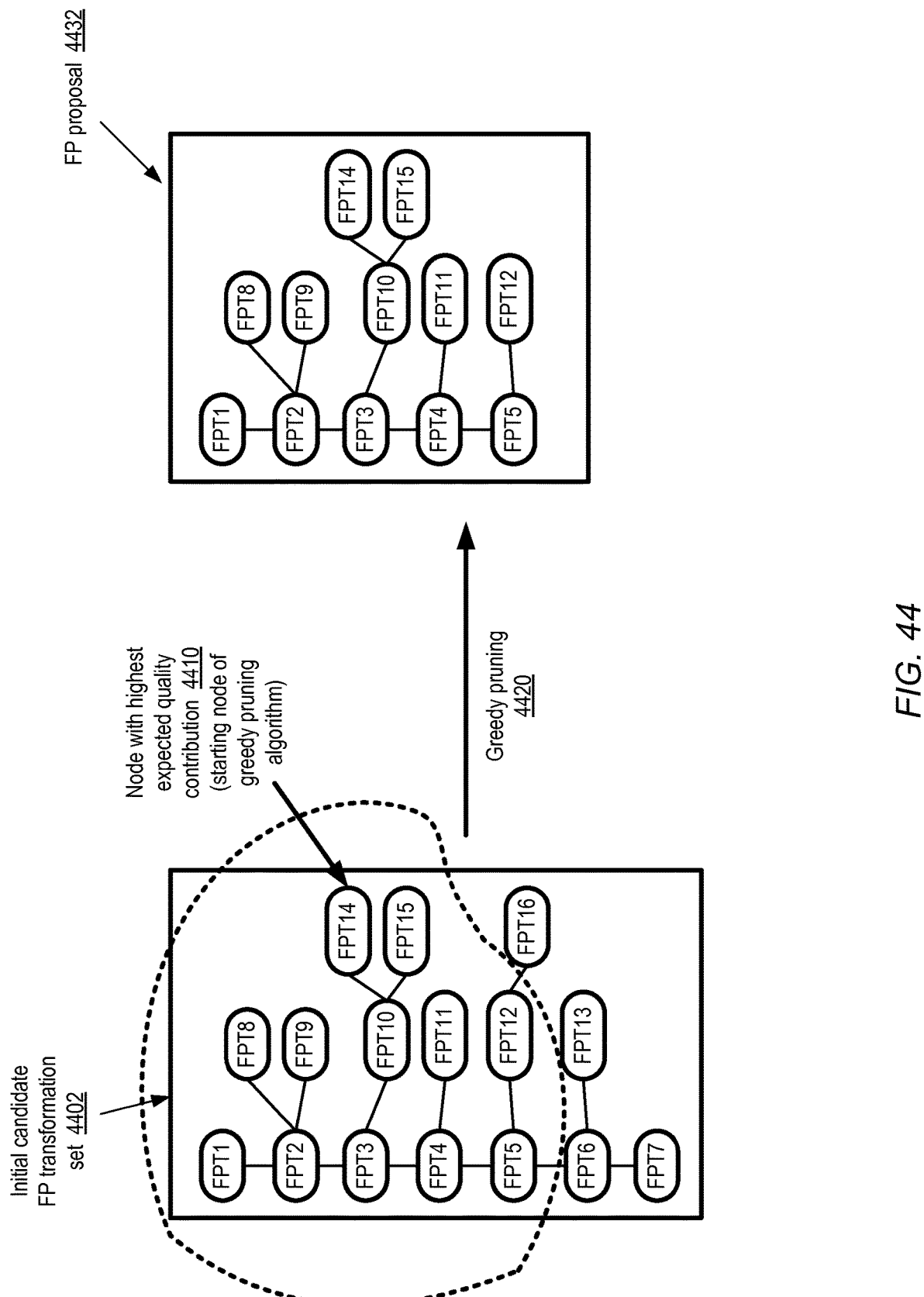
FIG. 44 illustrates an example of a greedy technique for identifying recommended sets of candidate feature processing transformations, according to at least some embodiments.

In some embodiments, e.g., either as a result of some number of randomized pruning iterations or based on experience with similar models, it may be possible for the FP manager's optimizer to identify specific FPTs that are expected to provide a significant positive contribution to model quality. The FP manager may then develop proposals based on the positions of such highly beneficial FPTs in the candidate FPT graph, e.g., proposals that include the beneficial FPTs and their neighbors. FIG. 44 illustrates an example of such a greedy technique for identifying recommended sets of candidate feature processing transformations, according to at least some embodiments.

In the graph of initial candidate FPT set 4402, the FP manager has identified node 4410 (corresponding to FPT14) as the particular node with the highest contribution to model quality (or at least the highest contribution among the nodes whose quality contributions have been evaluated). Node 4410 has accordingly been selected as the starting node for construction a graph of FPTs to be included in a proposal of recommended FPTs to be provided to a client. In one approach to constructing the proposal, after the starting FPT node has been identified, its prerequisite nodes (if any) may also be included in the proposal. For example, in order to perform the transformation indicated by FPT14, results of FPT10, FPT3, FPT2 and FPT1 may be required in the depicted example. The contributions and costs of other neighboring nodes of the already-selected nodes, such as nodes FPT8, FPT9, FPT4, FPT11, FPT5 and FPT12 may then be determined using re-evaluations and re-training iterations, until the desired quality and/or cost goals are met. The resulting FPT graph (with other candidate FPTs removed) may be included in the FP proposal 4432 transmitted to the client.

Figure 45:
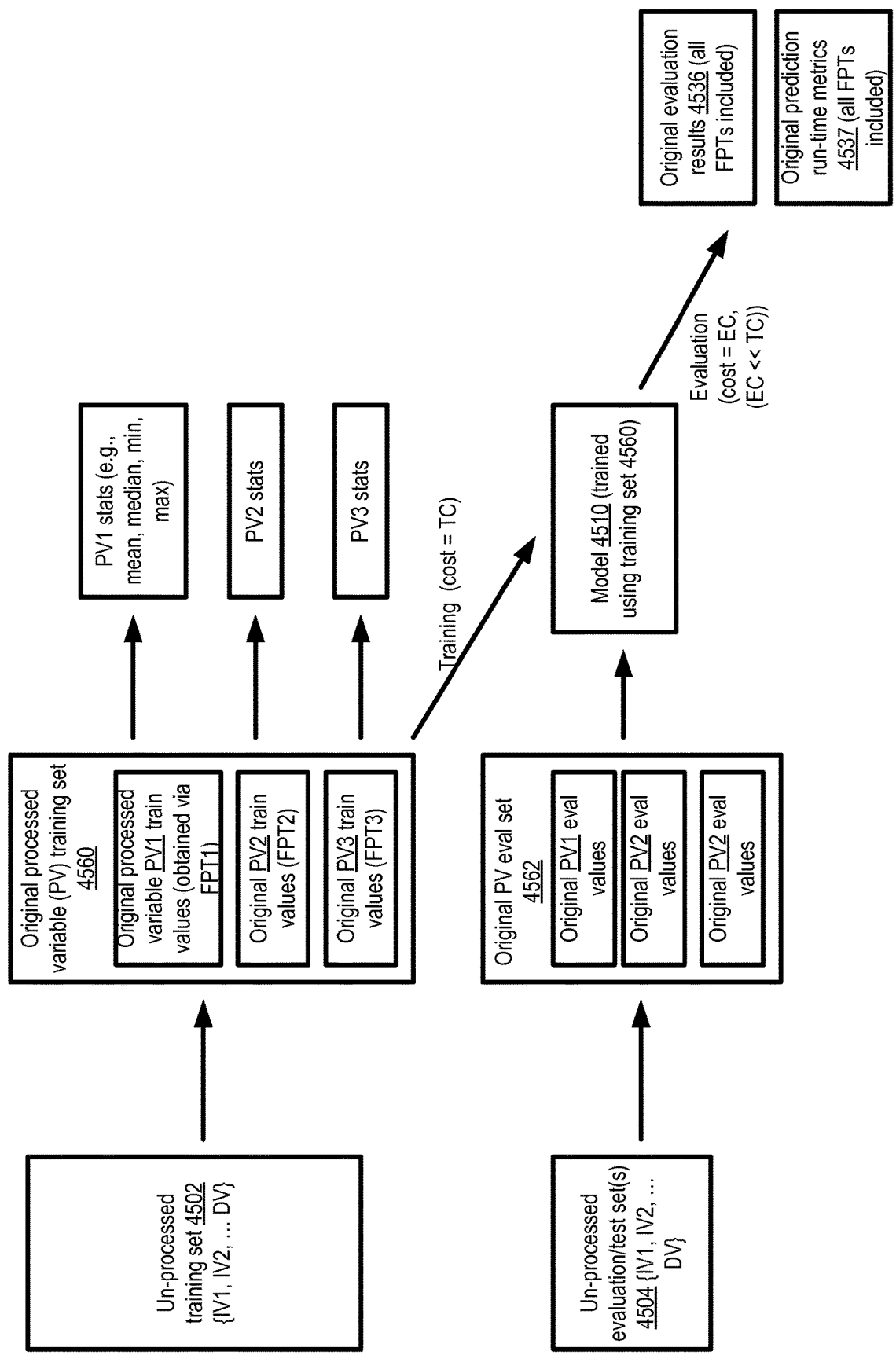
FIG. 45 illustrates an example of a first phase of a feature processing optimization technique, in which a model is trained using a first set of candidate processed variables and evaluated, according to at least some embodiments.

The process of generating FP proposals based on optimization for specific run-time goals may involve several phases in different embodiments. In one embodiment, for example, a model may first be generated/trained using the entire set of candidate FPTs identified initially. Statistics on the values of certain candidate processed variables (PVs) may be obtained and later used for determining the specific contributions of the PVs and their corresponding FPTs to model prediction quality. FIG. 45 illustrates an example of a first phase of a feature processing optimization technique, in which a model is trained using a first set of candidate processed variables and evaluated, according to at least some embodiments. As shown, an original set of processed variables (PVs) 4560 (i.e., results of FPTs) may be obtained from an un-processed training set 4502 in the depicted embodiment. The un-processed training set 4502 may include some number of independent variables IV1, IV2, . . . , and a dependent or target variable DV. The PV training set 4560 may include some number of PVs such as PV1 (obtained from feature processing transformation FPT1), PV2 (obtained via FPT2) and PV3 (obtained via FPT3). It is noted that while in general, a training set may include one or more un-processed variables as well as some number of processed variables, to simplify the presentation only three processed variables are shown in the example training set 4560. Respective sets of statistics (such as mean, median, minimum and maximum values for numerical PVs, or mode values for non-numerical PVs) may be generated in the depicted embodiment for some or all of the PVs, such as PV1 stats, PV2 stats, and PV3 stats. In at least some embodiments, prior to generating the FPTs, categorical variables of the unprocessed training data may be converted or mapped to numerical or Boolean values, and in some cases numerical values may be normalized (e.g., mapped to real numbers in the range −1 to 1).

A model 4510 may be trained using the original PV training set 4560 at some training cost TC. TC may be expressed in a variety of units, such as CPU-seconds on a machine with memory size M1, or the corresponding billing amounts. The model may be evaluated using a PV set 4562 derived from an un-processed evaluation set (or several such sets) 4504 in the depicted embodiment. Thus, just as the training set values for PV1, PV2, and PV3, were obtained using transformations FPT1, FPT2, FPT3, respectively, the evaluation set values for PV1, PV2 and PV3 may be obtained by applying the same types of transformations to the un-processed evaluation set(s) 4504. The cost (EC) of evaluating the trained model may at least in some cases be smaller than TC, the cost of training the model with results of all the candidate FPTs (e.g., because identifying various coefficients to be used for predictions may be more compute-intensive than simply applying the coefficients during test/evaluation runs). The original evaluation results 4536, obtained without pruning any of the candidate FPTs, may be saved in a persistent repository (e.g., to be used later as described below to determine the respective quality contributions of different FPTs). Similarly, the original prediction run-time metrics 4537 (e.g., elapsed time, CPU-seconds used, memory used, etc.) corresponding to a use of all the candidate FPTs may be collected and saved (e.g., to be used later when determining the respective cost contributions of different FPTs).

Figure 46:
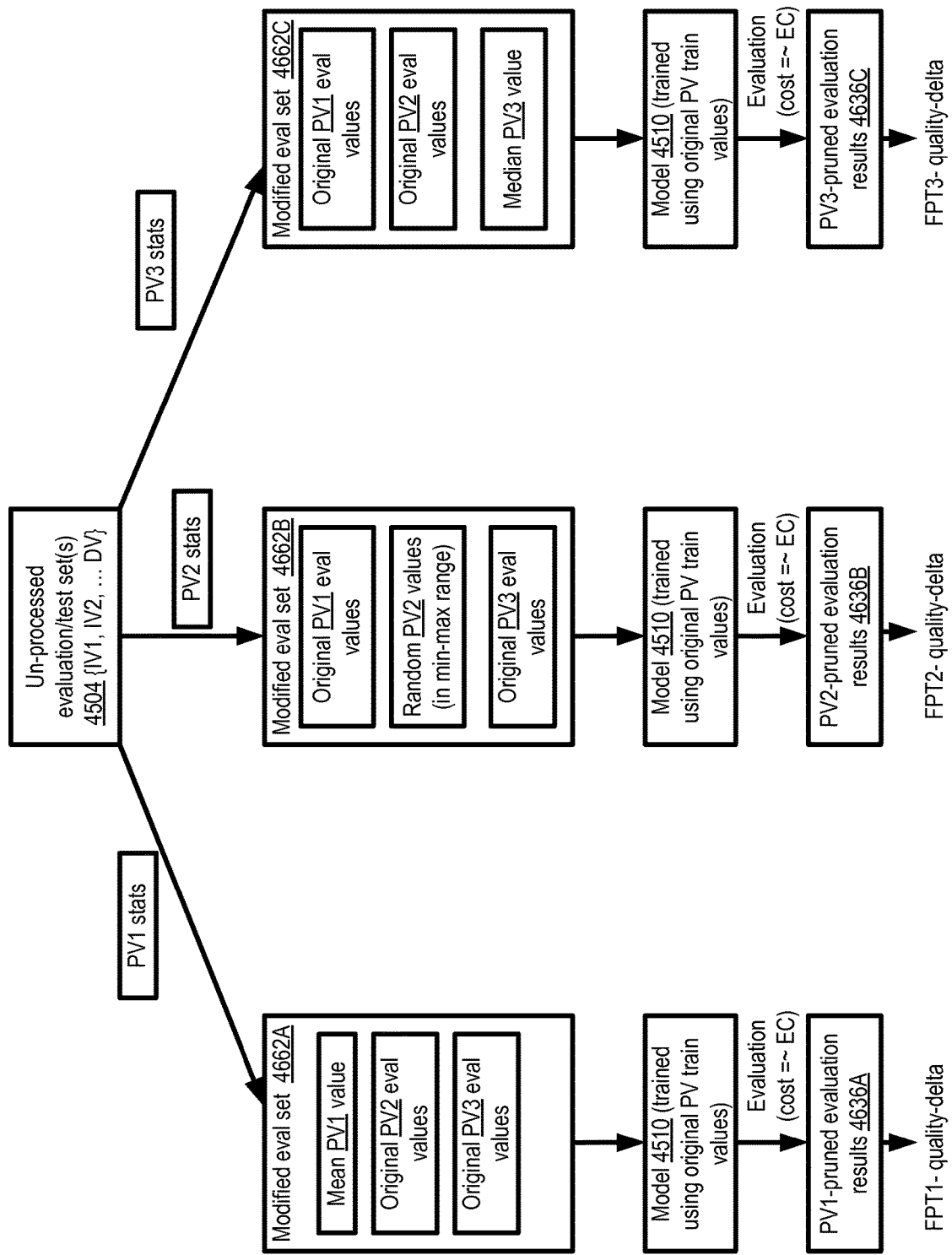
FIG. 46 illustrates an example of a subsequent phase of the feature processing optimization technique, in which a model is re-evaluated using modified evaluation data sets to determine the impact on prediction quality of using various processed variables, according to at least some embodiments.

For at least some types of machine learning problems, in general, the prediction quality of the model may be higher when more FPTs are used for training Differences or deltas to the model's prediction quality metrics, corresponding to different pruning selections, may then be obtained in later phases of the feature processing technique as described below. FIG. 46 illustrates an example of a subsequent phase of the feature processing optimization technique, in which a model is re-evaluated using modified evaluation data sets to determine the impact on prediction quality of using various processed variables, according to at least some embodiments. In the depicted example, the statistics obtained for PV1, PV2 and PV3 are used to modify the evaluation data set for a respective run of the model. As shown, in modified evaluation set 4662A, the original PV1 values are replaced by PV1's mean value (from the PV1 statistics obtained earlier), while the original values of PV2 and PV3 are retained. In modified evaluation set 4662B, the original PV2 values are replaced by random values selected in the range between the minimum and maximum values for PV2 from the statistics generated using the original candidate training set. In modified evaluation set 4662C, the original PV3 values are replaced by the median PV3 value in the PV3 statistics obtained from the original candidate training set.

Each of the modified evaluation sets is then provided as input to model 4510 which was trained using the original PV training set 4560 to obtain a respective set of predictions. Using modified evaluation set 4662A, PV1-pruned evaluation results 4636A may be obtained (indicative of, or approximating, the results that may have been achieved had PV1 not been included in the training set of model 4510). By computing the difference between the prediction quality metrics corresponding to the pruning of PV1, and the prediction quality metrics corresponding to the unpruned evaluation set shown in FIG. 45, a measure of the contribution of PV 1 to the model's quality (termed FPT1-quality-delta in FIG. 46) may be obtained. Similarly, PV1-pruned evaluation results 4636B may be used to estimate FPT2-quality-delta, the contribution of FPT2 or PV2 to the quality of the model prediction result, and PV3-pruned evaluation results 4636C may be used to estimate FPT3-quality-delta. In this way, the relative contributions of several different FPTs towards the quality of the model's predictions may be estimated, and such contribution estimates may be used to generate the FP proposals for the client. The costs (e.g., in terms of resource consumption or time) of estimating the quality contributions such as FPT1-quality-delta, FPT2-quality-delta and FPT3-quality-delta using the modified evaluation sets may be similar to the evaluation costs EC, which may be smaller than the costs of re-training the model TC and then re-evaluating the model.

The particular statistic or values to be used to generate the modified PV evaluation set may differ for different types of PVs and/or for different types of models or problem domains. In some embodiments, the mean value may be used (as in the case of PV1 in FIG. 46) as the default substitution, while in other cases random values may be assigned, or the median or mode value may be used based on earlier results achieved for similar types of problems.

Figure 47:
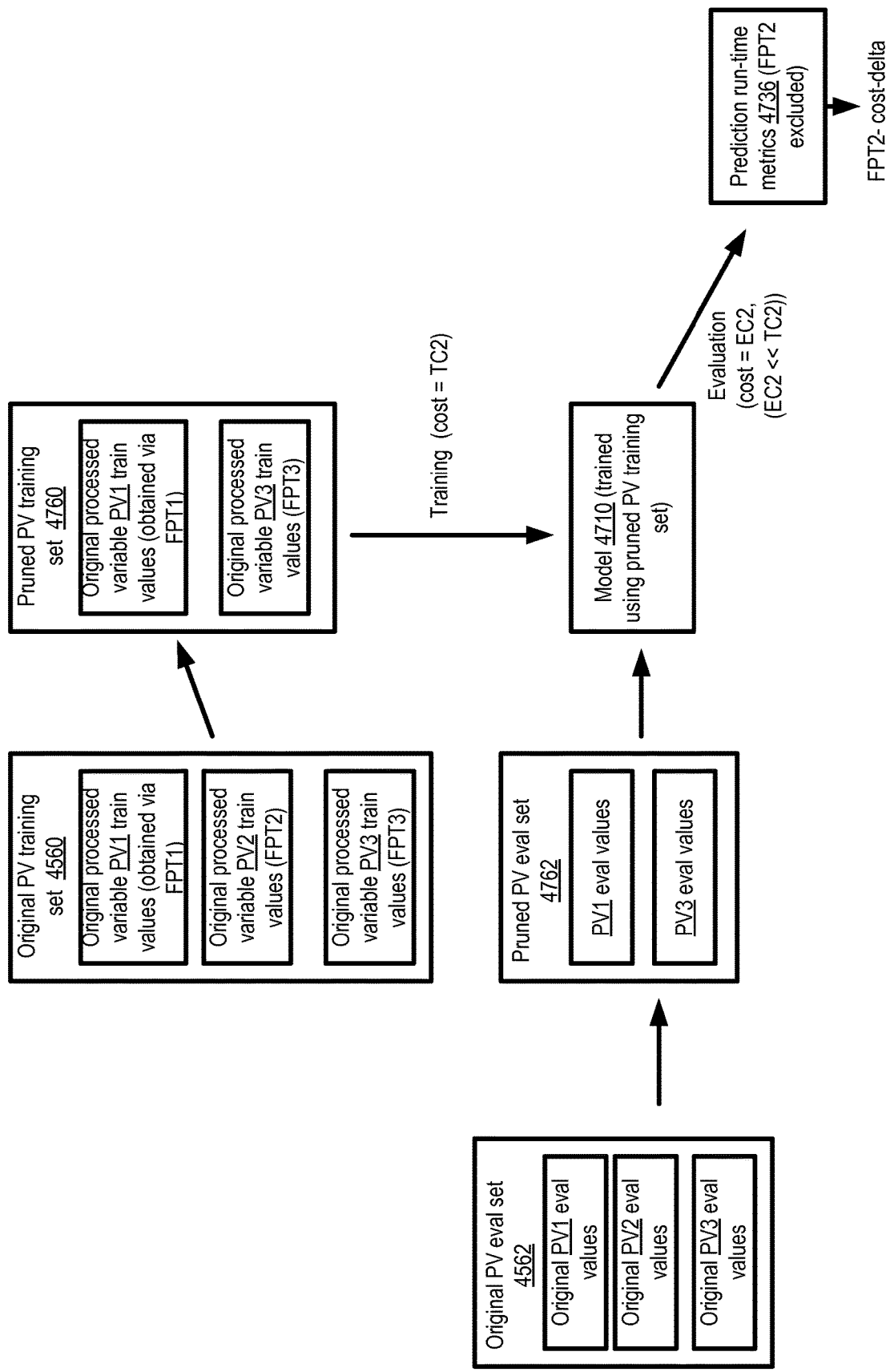
FIG. 47 illustrates another example phase of the feature processing optimization technique, in which a model is re-trained using a modified set of processed variables to determine the impact on prediction run-time cost of using a processed variable, according to at least some embodiments.

As discussed above, the substitution-based technique illustrated in FIG. 46 may be part of a second phase of optimization in which the quality contributions of different PVs and FPTs are obtained. To obtain the run-time costs associated with different PVs or FPTs, some models may have to be re-trained. FIG. 47 illustrates another example phase of the feature processing optimization technique, in which a model is re-trained using a modified set of processed variables to determine the impact on prediction run-time cost of using a processed variable, according to at least some embodiments. In the depicted example, a pruned PV training set 4760 may be obtained from the PV training set 4560 that was generated in an earlier phase of the optimization process, e.g., by simply omitting the values of PV2. Similarly, a pruned PV evaluation set may be obtained from the original PV evaluation set 4562, e.g., by omitting the PV2 values. In embodiments in which the original PV training set and/or the original PV evaluation set is discarded after the original phase, the pruned PV training set 4760 and/or the pruned PV evaluation set 4762 may have to be obtained from the un-processed training and evaluation sets.

The model 4710 may be trained using the pruned PV training set 4760 and evaluated using the pruned PV evaluation set 4762. FPT2-cost-delta, a measure of the contribution of FPT2 to prediction run-time costs, may be computed as the difference between the prediction run-time metrics 4736 (corresponding to the pruning of FPT2 or PV2) and the original run-time metrics 4537 (which were obtained using a model trained/evaluated with all the candidate FPTs). The cost TC2 of re-training the model may be similar to the cost TC (shown in FIG. 45) of training the model with all the FPTs included, while the cost EC2 of re-evaluating the model may be smaller. In some embodiments in which the training costs are much higher than evaluation costs, the FP manager may attempt to do more re-evaluations than re-trainings—e.g., many FPTs may be analyzed for their quality contributions, and then a smaller subset may be analyzed for their cost contributions.

Figure 48:
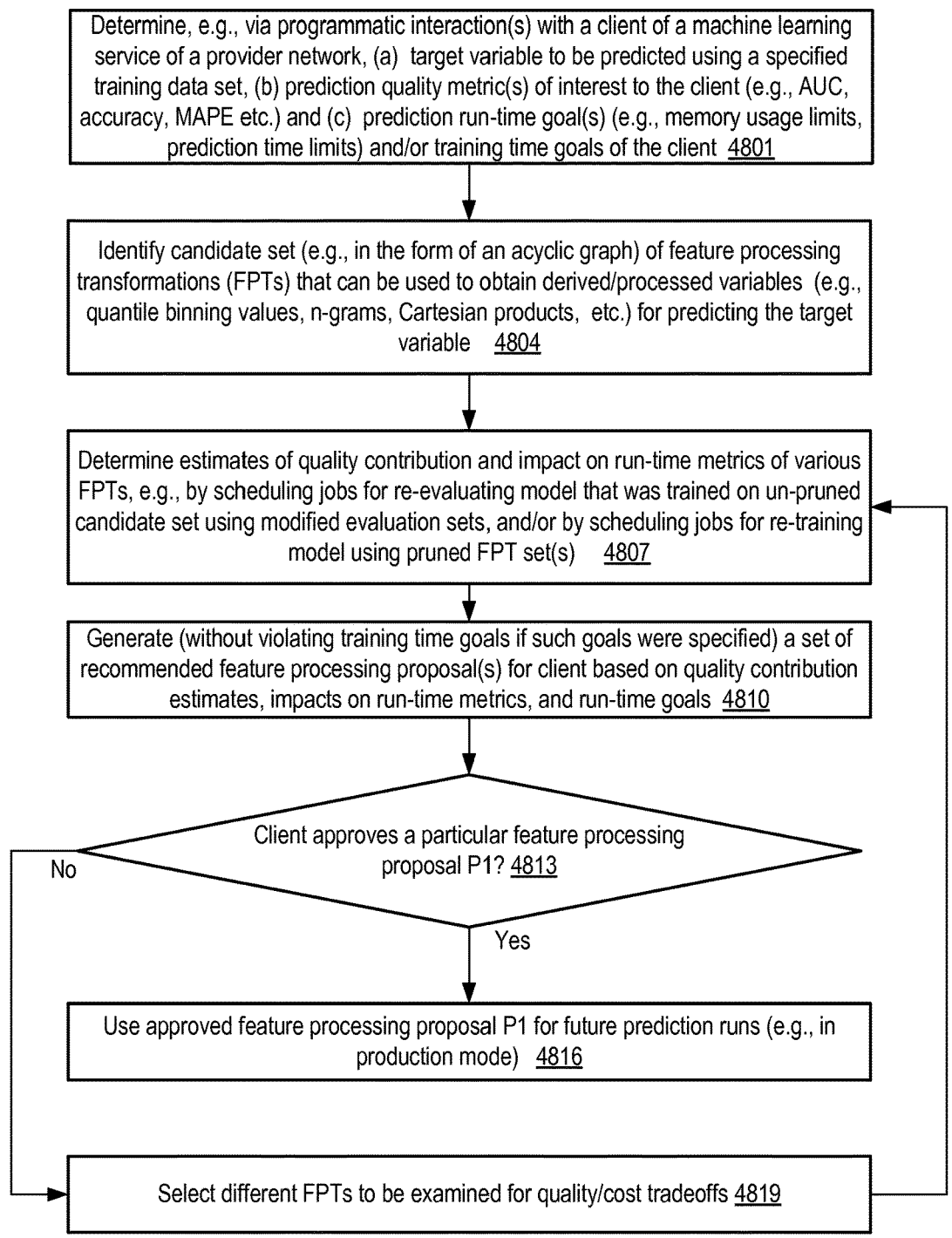
FIG. 48 is a flow diagram illustrating aspects of operations that may be performed at a machine learning service that recommends feature processing transformations based on quality vs. run-time cost tradeoffs, according to at least some embodiments.

FIG. 48 is a flow diagram illustrating aspects of operations that may be performed at a machine learning service that recommends feature processing transformations based on quality vs. run-time cost tradeoffs, according to at least some embodiments. As shown in element 4801, a component of an MLS (such as a feature processing manager) may determine one or more target variables to be predicted using a model trained with specified training data set, one or more prediction quality metrics of interest to the client, and one or more prediction run-time goals. In one embodiment, a client may indicate constraints, such as one or more mandatory feature processing transformations or one or more prohibited feature processing transformations. In at least some embodiments, some or all of these parameters may be indicated in a client's request submitted to the MLS, e.g., via a programmatic interface such as an API (application programming interface), a web-based console, a standalone GUI (graphical user interface), or a command-line tool. In some cases the client may indicate one or more training-time goals, e.g., in addition to run-time goals for prediction runs. Any combination of a variety of prediction quality metrics may be identified by the MLS component for different types of machine learning problems, such as an AUC (area under curve) metric, an accuracy metric, a recall metric, a sensitivity metric, a true positive rate, a specificity metric, a true negative rate, a precision metric, a false positive rate, a false negative rate, an F1 score, a coverage metric, an absolute percentage error metric, or a squared error metric. Similarly, any combination of a variety of run-time goals may be determined, such as a model execution time goal, a memory usage goal, a processor usage goal, a storage usage goal, a network usage goal, or a budget. Corresponding types of goals for training (as opposed to post-training prediction) may be determined in some embodiments. In some embodiments, goals may be specified in absolute terms (e.g. that the model execution time must be less than X seconds) or in terms of distributions or percentiles (e.g., that 90% of the model execution times must be less than x seconds). Clients may request the creation, training or re-training of a wide variety of models in different embodiments, including for example classification models (e.g., binary or n-way classification models), regression models, natural language processing (NLP) models, clustering models and the like.

The MLS may identify a set of candidate feature processing transformations (FPTs) that can be used to obtain processed variables or features from the raw training data, such that the features may in turn be used to predict values of the target variable(s) (element 4804). In at least some cases, one or more of the un-processed independent variables may also be included in the candidate sets of variables to be used for training; that is, not all the variables in a training set need be the results of FPTs. Depending on the nature of the problem or model, any of a wide variety of FPT candidates may be selected, such as quantile binning, Cartesian product generation, bi-gram generation, an n-gram generation, an orthogonal sparse bigram generation, a calendar-related transformation, an image processing function, an audio processing function, a bio-informatics processing function, or a natural language processing function. While the MLS may generally try to come up with a large list of candidates, in some embodiments, the number of different FPT candidates may be restricted based on one or more constraints, such as explicit or implicit goals for training time or training resources. In one embodiment, at least some of the FPT candidates may be dependent upon each other, e.g., the output of one FPT may be used as the input of another, and one or more directed graphs of FPT candidates may be generated in some cases to represent such relationships.

For at least a subset of the FPT candidates identified, respective estimates of the contribution of the FPT to the prediction quality of the model, and/or respective estimates of the effects of the FPT on metrics that impact the run-time goals may be determined (element 4807). For example, in one embodiment, the model may first be trained and evaluated using the complete set of candidate FPTs to obtain a best-case prediction quality measure and corresponding run-time metrics. Then, to obtain quality contributions, the model may be re-evaluated using modified evaluation data sets, e.g., evaluation data sets in which the values of a given processed variable are replaced by a mean value (or some other statistically derived replacement value) for that processed variable in the un-modified training set in a manner similar to that illustrated in FIG. 46. To obtain the impact on run-time goals, models may have to be re-trained with pruned training data (i.e., training data from which one or more processed variables of the candidate set have been removed) in some embodiments. In at least one embodiment, respective jobs may be generated for the re-evaluations and/or the re-trainings.

Using the estimates of quality contributions and cost impacts, the MLS may produce one or more feature processing proposals to be presented programmatically to the client (element 4810), e.g., without violating any explicit or implicit training time constraints or goals. If the client indicates an approval of a particular proposal FP1 (as detected in element 4813), that proposal may be implemented for subsequent runs (e.g., post-training production runs of the model) on behalf of the client (element 4816). If the client does not approve of any proposal put forth by the MLS (as also detected in element 4813), different combinations of FPTs may be selected for further training/testing (element 4819), and the operations corresponding to elements 4807 onwards may be repeated for the new combinations until either a proposal is accepted or a decision to abandon the optimization iterations is reached by the MLS or the client. In some embodiments, the client may be given the option of utilizing the full (un-optimized) candidate set of FPTs—that is, the MLS may retain a model variant that was trained using all the candidate FPTs that were identified prior to pruning.

In various embodiments, the MLS may have to prioritize among the goals indicated by the client—e.g., fast prediction execution times may be incompatible with low memory usage goals. In some such cases, the MLS may indicate such prioritizations to the client and obtain the client's approval for the selected ordering of goals. In at least some embodiments, the client may indicate or suggest a recipe of FPTs to be used, and the MLS may analyze at least some of the FPTs indicated in the recipe for possible inclusion in the candidate FPT set. In one implementation, even if the client does not indicate a recipe in the model creation request, the MLS may provide the FP proposal in the form of a recipe formatted in the MLS recipe language discussed earlier. The proposals (or recipes corresponding to the proposals) may be stored as artifacts in the MLS artifact repository in at least some embodiments.

Figure 49:
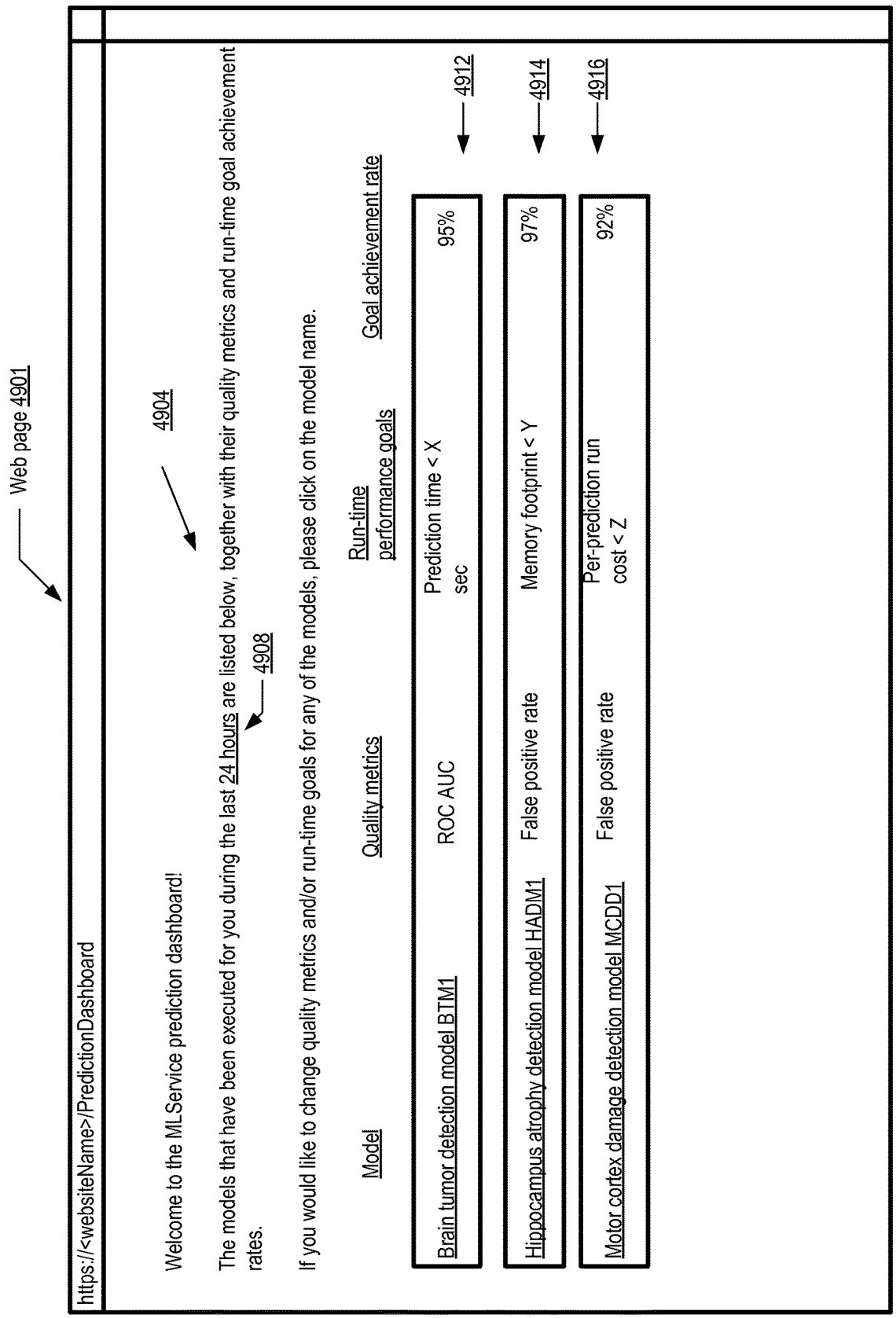
FIG. 49 is an example of a programmatic dashboard interface that may enable clients to view the status of a variety of machine learning model runs, according to at least some embodiments.

After an FP proposal is approved by a client, it may be used for subsequent executions of the model (i.e., processed variables produced using the FP proposal may be used as input variables used to train the model and to make predictions using the model), potentially for many different production-mode data sets. A given client may submit several different model creation requests to the service, approve respective FP proposals for each model, and then utilize the approved FP models for a while. In some implementations, clients may wish to view the success rate with respect to their prediction run-time goals for various models after they are approved. FIG. 49 is an example of a programmatic dashboard interface that may enable clients to view the status of a variety of machine learning model runs, according to at least some embodiments. The dashboard may be incorporated within a web page 4901 in the depicted example, comprising a message area 4904 and respective entries for some subset or all of a client's approved models. In the depicted example, as indicated in the message area 4904, information about the models that have been run on behalf of the client during the previous 24 hours is provided. In some embodiments, the client may change the time period covered by the dashboard, e.g., by clicking on link 4908.

The client for whom the example dashboard shown in FIG. 49 is displayed has three models that were run in the covered time period of 24 hours: a brain tumor detection model BTM1, a hippocampus atrophy detection model HADM1 and a motor cortex damage detection model MCDD1. As indicated in region 4912 of the dashboard, the quality metric selected by the client for BTM1 is ROC AUC, the run-time performance goal is that the prediction be completed in less than X seconds, and 95% of the prediction runs in the last 24 hours have met that goal. For HADM1, as indicated in region 4914, the quality metric is the false positive rate, the run-time performance goal is a memory footprint no greater than Y, and the achieved success rate is 97%. As indicated in region 4916, for MCDD1 the prediction quality metric is also the false positive rate, the run-time performance goal is a cost goal per prediction run of less than Z, and the achieved success rate is 92%. A number of variations of the types of information provided in FIG. 49 may be indicated to a client programmatically in different embodiments, and the interface details used in practice may differ substantially from those shown here.

Optimizations for Training Linear Models

Figure 50:
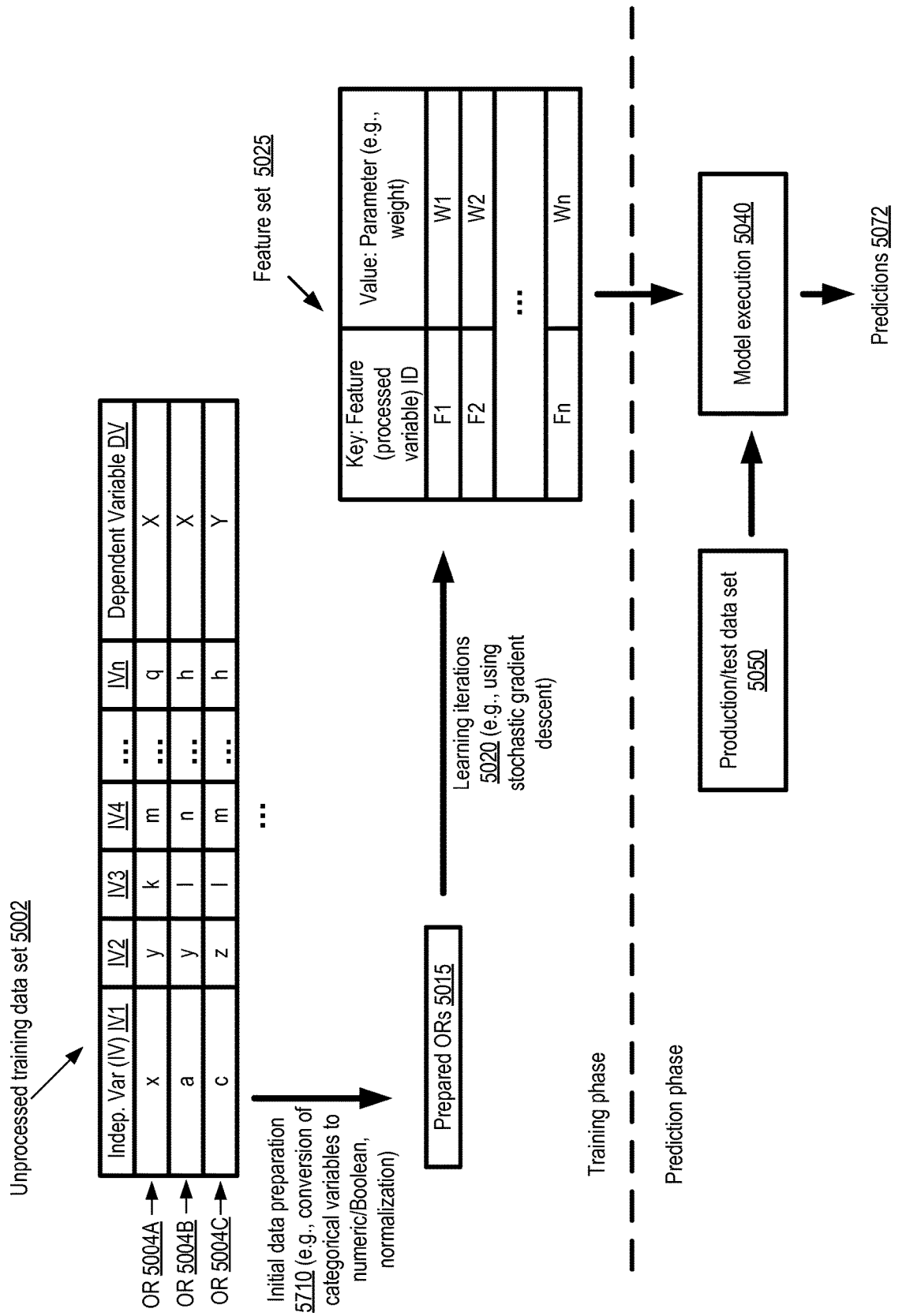
FIG. 50 illustrates an example procedure for generating and using linear prediction models, according to at least some embodiments.

Linear prediction models are the most popular (and often most effective) approaches for dealing with many types of machine learning problems. FIG. 50 illustrates an example procedure for generating and using linear prediction models, according to at least some embodiments. As shown, an unprocessed or raw training data set 5002 to be used to train a linear model may comprise some number of observation records (ORs) 5004, such as ORs 5004A, 5004B, and 5004B. Each OR 5004 may in turn comprise values of some number of independent variables (IVs), such as IV1, IV2, IV3, ..., IVn, and a value of at least one dependent variable DV. In at least some embodiments, not all the observation records may be available before model training has to be begun—e.g., as described below in further detail, in some cases observation records may be streamed to a machine learning service as they become available from one or more online data sources. In such scenarios, the MLS may be responsible for training a model iteratively, e.g., with each iteration representing an attempt to improve the quality of the model's predictions based on the ORs analyzed up to that point. Such training iterations that are based on analysis of respective sets of observation records may also be termed "learning iterations" herein.

In at least some embodiments, a model generator component of the MLS may require that input variables to be used for generating features (that can then be used for training a linear model) meet certain data-type constraints. For example, in the depicted embodiment, the model generator may require that the raw values of categorical IVs of the training data be converted into numerical values and/or normalized (e.g., by mapping the numerical values to real numbers between −1 and 1). Such type transformations may be performed during an initial data preparation phase 5010, producing a set of modified or prepared observation records 5015.

The linear model may then be trained iteratively in the depicted embodiment, e.g., using a plurality of learning iterations 5020. Initially, in at least some implementations, an empty feature set 5025 may be created. The feature set 5025 may be used to store parameters (e.g., real numbers or doubles that represent respective weights) assigned to a collection of features or processed variable values, where the features are derived from the observation record contents using one or more feature processing transformations (FPTs) of the types described earlier. When making a prediction of a dependent variable value for a give observation record, a linear model may compute the weighted sum of the features included in the feature set in some implementations. In at least some embodiments, a key-value structure such as a HashMap may be used for the feature set 5025, with feature identifiers (assigned by the model generator) as keys, and the parameters as respective values stored for each key. For example, parameters W1, W2, and Wn shown in FIG. 50 are assigned respectively to features F1, F2, and Fn.

During each learning iteration 5020, one or more prepared ORs 5015 may be examined by the model generator (which may also be referred to as a model trainer). Based on the examination of the independent variables in the prepared OR, and/or the accuracy of a prediction for the dependent variables of the prepared OR by the model in its current state, respective parameters or weights may be identified for a new set of one or more processed variables. In at least some implementations, the previously-stored parameters or weights may be updated if needed in one or more learning iterations, e.g., using a stochastic gradient descent technique or some similar optimization approach. As more and more observation records are examined, more and more (feature, parameter) key-value pairs may be added into the feature set. As described below with reference to FIG. 51, this growth of the feature set, if left unchecked, may eventually lead to a scenario in which the memory available at an MLS server being used for the model generator is exhausted and an out-of-memory error may end the training phase of the model prematurely.

To avoid such undesirable scenarios, a technique for pruning selected parameters may be employed in some embodiments. According to such a technique, when certain triggering conditions are met (e.g., when the number of features for which parameters are stored exceeds a threshold), a fraction of the features that contribute least to the models' predictions may be identified as pruning victims. An efficient in-memory technique to estimate quantile boundary values (e.g., the 20% of the features that contribute the least to the model's predictions) for parameters may be used in some embodiments, without requiring copying of the parameters or an explicit sort operation. Entries (e.g., parameter values) for the pruning victims identified may be removed from the feature set 5025, thus reducing the memory consumed. However, additional learning iterations may be performed even after pruning some features. Thus, the feature set size may grow and shrink repeatedly as more observation records are considered, more features are added, and more features are pruned. In at least some implementations, a particular feature that was pruned in one learning iteration may even be re-added to the feature set later, e.g., in response to a determination by the model generator (based on additional observation records) that the feature is more useful for predictions than at the time when it was pruned.

After some number of learning iterations during which the feature set may have grown and shrunk a number of times, the linear model may be executed using the current feature set. In some embodiments, the feature set 5025 may be "frozen" (e.g., an immutable representation of the feature set as of a particular point in time may be stored in an MLS artifact repository) prior to model execution 5040 for predictions 5072 on a production or test data set 5050. In other embodiments, even after the model is used to make production or test runs, additional learning iterations 5020 may be performed using new observation records. In scenarios in which a feature set is frozen for production use or testing, additional learning iterations may continue on a non-frozen or modifiable version of the feature set. In various embodiments, operations on either side of the boundary indicated by the dashed line in FIG. 50 may be interspersed with one another—e.g., one or more learning iterations during which the feature set is modified based on new observation data may be followed by a production run of the model, and the production run may be followed by more learning iterations, and so on.

Figure 51:
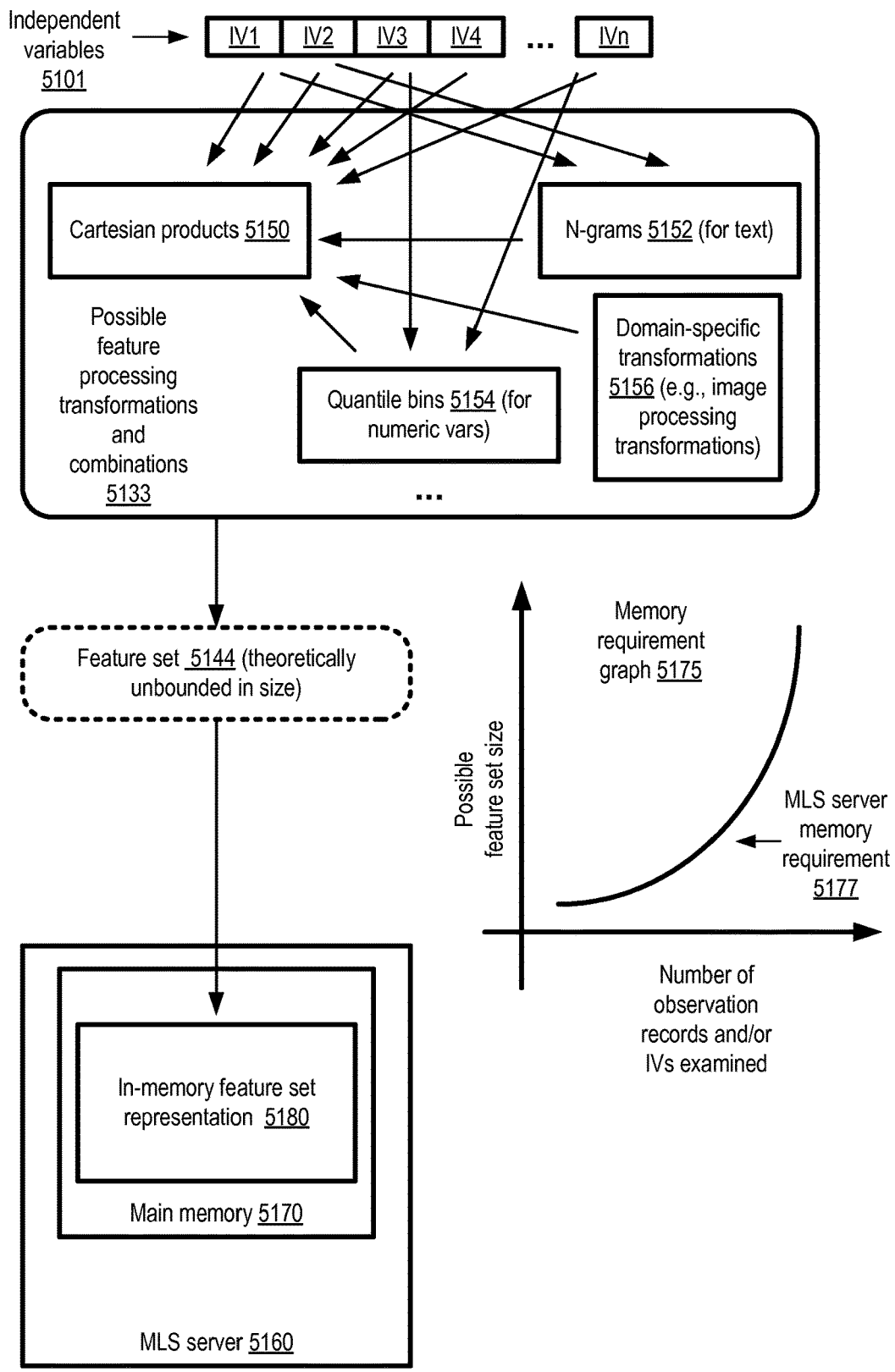
FIG. 51 illustrates an example scenario in which the memory capacity of a machine learning server that is used for training a model may become a constraint on feature set size, according to at least some embodiments.

FIG. 51 illustrates an example scenario in which the memory capacity of a machine learning server that is used for training a model may become a constraint on feature set size, according to at least some embodiments. As discussed earlier, a wide variety of feature processing transformations (FPTs) may be supported at a machine learning service for independent variables in various embodiments, and at least some FPTs may be chained in a sequence—i.e., applied to features that have been generated using other FPTs. Supported feature processing transformation functions may include, for example, quantile_bin functions 5154 for numerical variables, Cartesian product functions 5150 for various types of variables, n-gram functions 5152 for text, calendar functions, domain-specific transformation functions 5156 such as image processing functions, audio processing functions, bio-informatics processing functions, natural language processing functions other than n-grams, and so on. Depending on the data type of an independent variable, one or more FPTs may be applied to it, and additional FPTs may be applied to the results. For example, new features comprising Cartesian products of n-grams, quantile bins, and/or domain-specific transformations may be created in the depicted embodiment. The number 5133 of possible feature processing transformations and combinations may be very large, which could lead to a feature set 5144 that is unbounded in size. In some implementations, the various features identified may be mapped to a vector of real numbers, where the dimension of the vector may be arbitrarily large at least in principle.

At least in some implementations, a significant portion or all of the learning iterations of a particular model may be intended to be performed on a single MLS server such as server 5160. For example, the learning iterations may be implemented as single-threaded operations in one implementation. In some such implementations, the feature set for the model may be required to fit in the main memory 5170 of the MLS server 5160. If the in-memory feature set representation 5180 grows too large, the process or thread used for learning may exit prematurely with an out-of-memory error, and at least some of the learning iterations may have to be re-implemented. As shown in memory requirement graph 5175, the MLS server memory requirement may grow in a non-linear fashion with the number of independent variables and/or observation records examined. It is noted that the requirement graph 5175 is not intended to illustrate an exact relationship between the number of observations and the possible feature set size for any given machine learning problem; instead, it is intended to convey general trends that may be observed in such relationships.

In some conventional machine learning systems, the training of a model may simply be terminated when the number of features accumulated in the feature set reaches a selected maximum. This means that in such approaches, features that may otherwise have been identified later as significant contributors to prediction quality may never be considered for inclusion in the feature set. In another common technique, different features may be combined disjunctively using hash functions (e.g., to save space, only N bits of K bits of a hash value that would otherwise represent a particular feature may be used, with the N bits being selected using a modulo function), which may also result in reduction in the quality of the predictions. In some machine learning systems, one or more regularization techniques may be used, in which the weights or parameters assigned to different features may be reduced by some factor in various learning iterations, and as a result, some features may gradually be eliminated (with their weights approaching zero). However, when used by itself for constraining feature set size, regularization may result in relatively poor quality of model prediction. Regularization may also require a selection of one or more hyper-parameters (such as the reduction factors to use), which may not be straightforward.

Accordingly, a technique that imposes limits on the size of the feature set used for a linear model, without sacrificing the quality of the predictions made and without restricting the set of features based on how early during the training phase the features are identified may be utilized in some embodiments. According to this technique, when a triggering condition is met, a subset of the features identified thus far may be pruned from the feature set (e.g., their parameter values may be removed from the feature set, effectively replacing the parameter values with a default value). An efficient estimation technique to identify a selected fraction or quantile of the features that contribute the least to the predictions of the model may be used to identify the pruning victims in some implementations as described below. At least in some implementations, such a technique may not require explicitly sorting the parameters or copying the parameters. After some features have been pruned, additional features may be added, e.g., in subsequent learning iterations. In some cases, a given feature that was pruned earlier may be re-introduced into the feature set if later observations indicate that the given feature may be more useful for prediction than it was expected to be when it was pruned.

Figure 52:
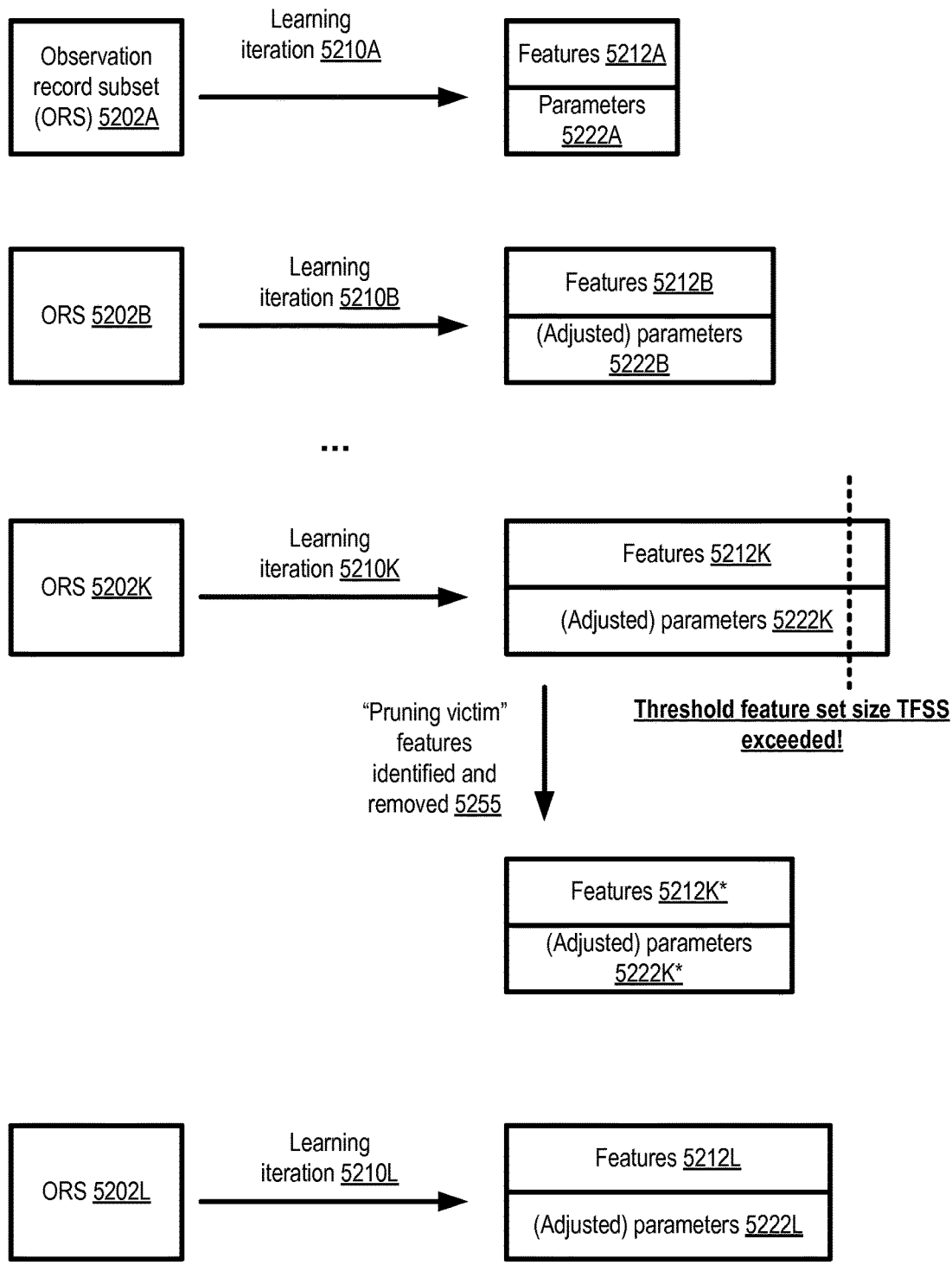
FIG. 52 illustrates a technique in which a subset of features of a feature set generated during training may be selected as pruning victims, according to at least some embodiments.

FIG. 52 illustrates such a technique in which a subset of features of a feature set generated during training may be selected as pruning victims, according to at least some embodiments. Four learning iterations 5210A, 5210B, 5210K and 5210L are shown. In each learning iteration, a respective observation record set (ORS) 5202 (e.g., ORS 5202A in learning iteration 5210A, ORS 5202B in learning iteration 5210B, and so on) comprising one or more observation records may be examined by the model generator to determine whether any new features should be added to the feature set. In addition, earlier-generated parameter values may be updated or adjusted in at least some embodiments, e.g., using a stochastic gradient technique. After learning iteration 5210, the feature set comprises features 5212A and corresponding parameter values 5222A. After the next learning iteration 5210B, the feature set has grown and now comprises features 5212B and parameters 5222B (and some or all of the parameters set in learning iteration 5210A may have been adjusted or changed).

As additional learning iterations are performed, more features may be added to the feature set. Eventually, during or after some learning iteration 5210K, the model generator may determine that a threshold feature set size TFSS has been exceeded, and may perform a pruning analysis of the feature set. It is noted that at least in some embodiments, operations to detect whether the triggering condition for pruning has been met may not be performed in or after every learning iteration, as such frequent pruning may be unnecessary. Instead, such checks may be performed periodically, e.g., based on the number of learning iterations that have been performed since such a check was last completed, or based on the time that has elapsed since such a check was last performed, or based on the number of observation records that have been examined since a check was last performed. In at least some embodiments, the TFSS may be based at least in part on (e.g., set to some fraction of) the memory capacity of an MLS server. In one embodiment, a client on whose behalf the linear model is being trained may indicate one or more goals for training (e.g., that a server with no more than X gigabytes of memory is to be used for training) and/or for post-training execution, and such goals may influence the value of TFSS. In various embodiments, TFSS may be expressed in terms of the number of features included in the feature set, or simply in terms of the amount of memory consumed by the feature set.

In the pruning analysis, the model generator may identify some selected number (or some selected fraction) of the features that are to be removed. In one embodiment, for example, the 10% least significant features may be identified, e.g., based on the absolute values of weights assigned to the features of the feature set. In some embodiments, the relative contribution of the features to a prediction (which is computed at least in part using the weighted sums of the feature values) may be assumed to be proportional to the absolute value of their weights. The task of identifying the 10% least important features may thus be equivalent to identifying the 10% of the weights that have the smallest absolute value. An exact identification of such a fraction of the features may require sorting the weights of the entire feature set, which may pose resource consumption problems of its own for large feature sets—e.g., a substantial amount of memory, CPU cycles and/or persistent storage may be required for such sort operations. Accordingly, an optimization may be used in some implementations to find an approximate boundary weight for the selected fraction (i.e., the weight Wk such that approximately 10% of the features have smaller weights and the remaining approximately 90% have higher weights), without sorting the weights or copying the weights. An example of such an optimization technique is described below in conjunction with the discussion of FIG. 55. After the boundary for the selected quantile (e.g., 10% in the above example) is estimated, weight values below the boundary may be easily identified, and the entries for such weights may be removed from the feature set. It is noted that although weights are discussed herein as a simple example of the parameters that may be stored for the members of the feature set, similar techniques may be used to determine pruning candidates when more complex parameters (e.g., parameter structures that include more than just a single real number) are used. That is, the pruning technique described is not restricted to embodiments in which a single numerical quantity (such as a weight with a real number value) is used as a feature parameter. More complex parameters may be transformed, for example, into numerical values that approximate the relative contributions of the corresponding features to the predictions made by the model.

After some subset of the features have been identified as pruning candidates and removed, as indicated by the arrow labeled 5255 in FIG. 52, the pruned feature set (comprising adjusted parameters 5222K\* for features 5212K\*) may no longer violate the TFSS constraint. In at least some embodiments, a sufficiently large fraction of the feature set may be pruned that additional features may again be added in one or more subsequent learning iterations, such as learning iteration 5210L shown in FIG. 52. Thus, the feature set size may grow again after being reduced via pruning Additional pruning may be required if the feature set size again exceeds TFSS eventually, and more features may be added after the additional pruning is completed. Any feature may be added to the feature set in a given learning iteration, including for example some of the features that were pruned earlier. By not restricting the set of features that can be considered for inclusion in the feature set during any learning iteration, and eliminating only those features at each pruning stage that are currently identified as contributing the least to the model's predictions, the technique illustrated in FIG. 52 may converge on a feature set that provides highly accurate predictions while limiting memory use during training. In addition, the reduction in the feature set size may also reduce the time it takes to load and execute the model during prediction runs—thus, the benefits of the technique may be obtained both during the training phase and in post-training-phase prediction runs.

The approach of iterative learning described above, in which the feature set membership may decrease and increase over time, may be especially useful in embodiments in which observation records may be streamed to the MLS from a variety of data sources. In such scenarios, compared to environments in which the entire training data set is collected prior to any of the learning iterations, it may be even more helpful to be able to reconsider features that have been pruned earlier, and in general to keep modifying the feature set as more observation records arrive. The characteristics of the observation records (e.g., the distributions of the values of various independent variables) may change over time, for example, making it more likely that the feature set that can make the best predictions will also change over time.

Figure 53:
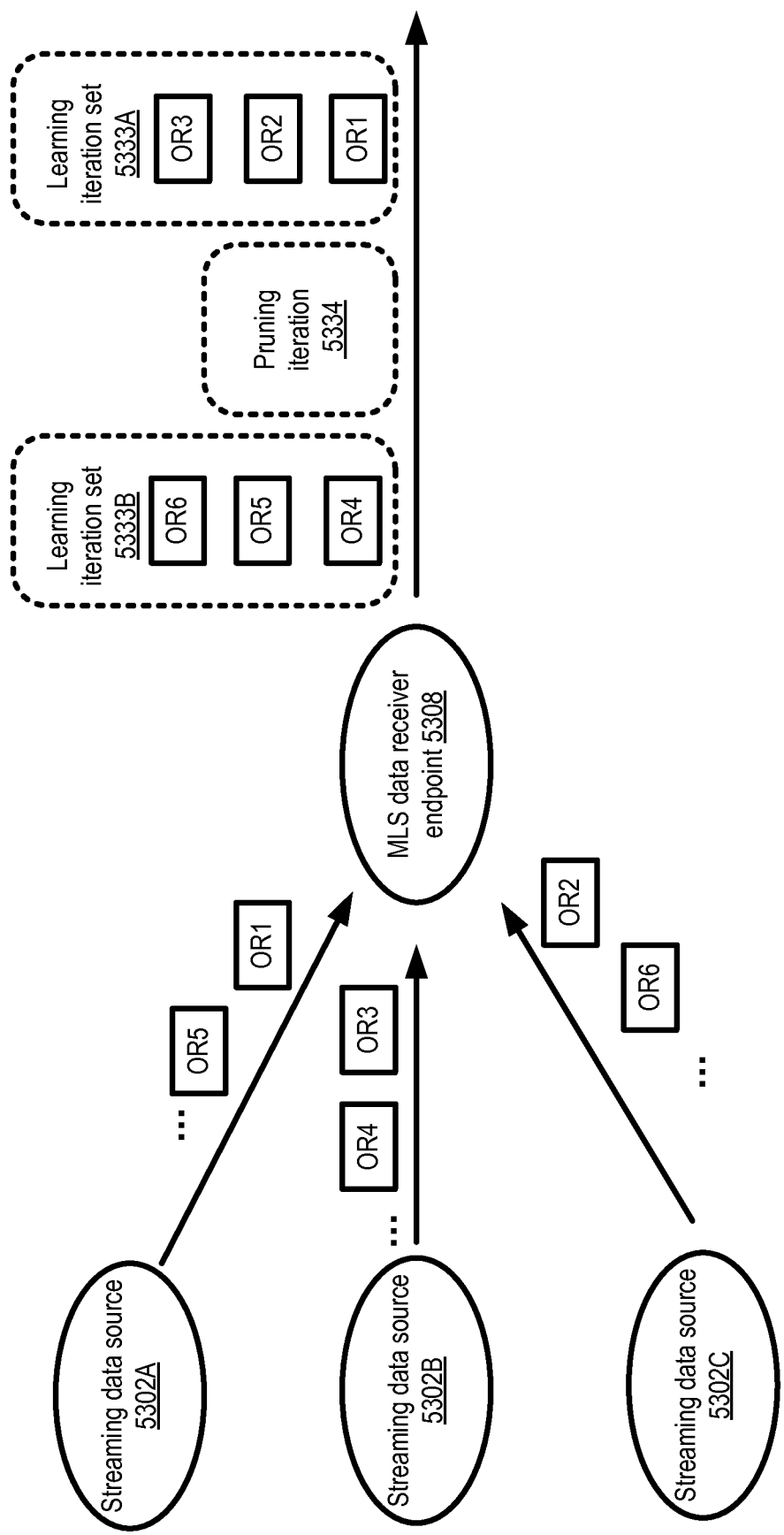
FIG. 53 illustrates a system in which observation records to be used for learning iterations of a linear model's training phase may be streamed to a machine learning service, according to at least some embodiments.

FIG. 53 illustrates a system in which observation records to be used for learning iterations of a linear model's training phase may be streamed to a machine learning service, according to at least some embodiments. As shown, a data receiver endpoint 5308 (e.g., a network address or a uniform resource identifier) may be established at the MLS for receiving observation records from one or more streaming data sources (SDSs) 5302, such as SDS 5302A, SDS 5302B and SDS 5302C. Such data sources may, for example, include web server logs of a geographically distributed application, sensor-based data collectors, and the like. The observation records (ORs) from such data sources may arrive in arbitrary order—e.g., OR1 from SDS 5302A may be received first, followed by OR2 from SDS 5302C, OR3 and OR4 from SDS 5302B, and so on.

At the model generator the records may be used for learning iterations in the order in which they arrive in the depicted embodiment. For example, OR1, OR2 and OR3 may be examined during a first set of learning iterations 5333A, resulting in the generation of a particular feature set. The learning iteration set 5333A may be followed by a pruning iteration 5334 in which some selected features are removed from the feature set based on their relative contributions to the predictions of the model being trained. Pruning iteration 5334 may be followed by another learning iteration set 5333B, in which OR4, OR5 and OR6 are examined and one or more new features (and/or previously pruned features) are added to the feature set. Over time, the feature set may evolve to provide accurate predictions for data from all the streaming data sources 5302. In some embodiments, pruning iterations 5334 may be scheduled at regular intervals, e.g., once every X seconds, regardless of the rate at which observation records are received or examined. Such schedule-based pruning may help the MLS to respond to wide fluctuations in observation record arrival rates—e.g. to prevent out-of-memory errors resulting from a sudden burst of observation records that arrive at a time at which the feature set size is already close to its maximum threshold.

Figure 54:
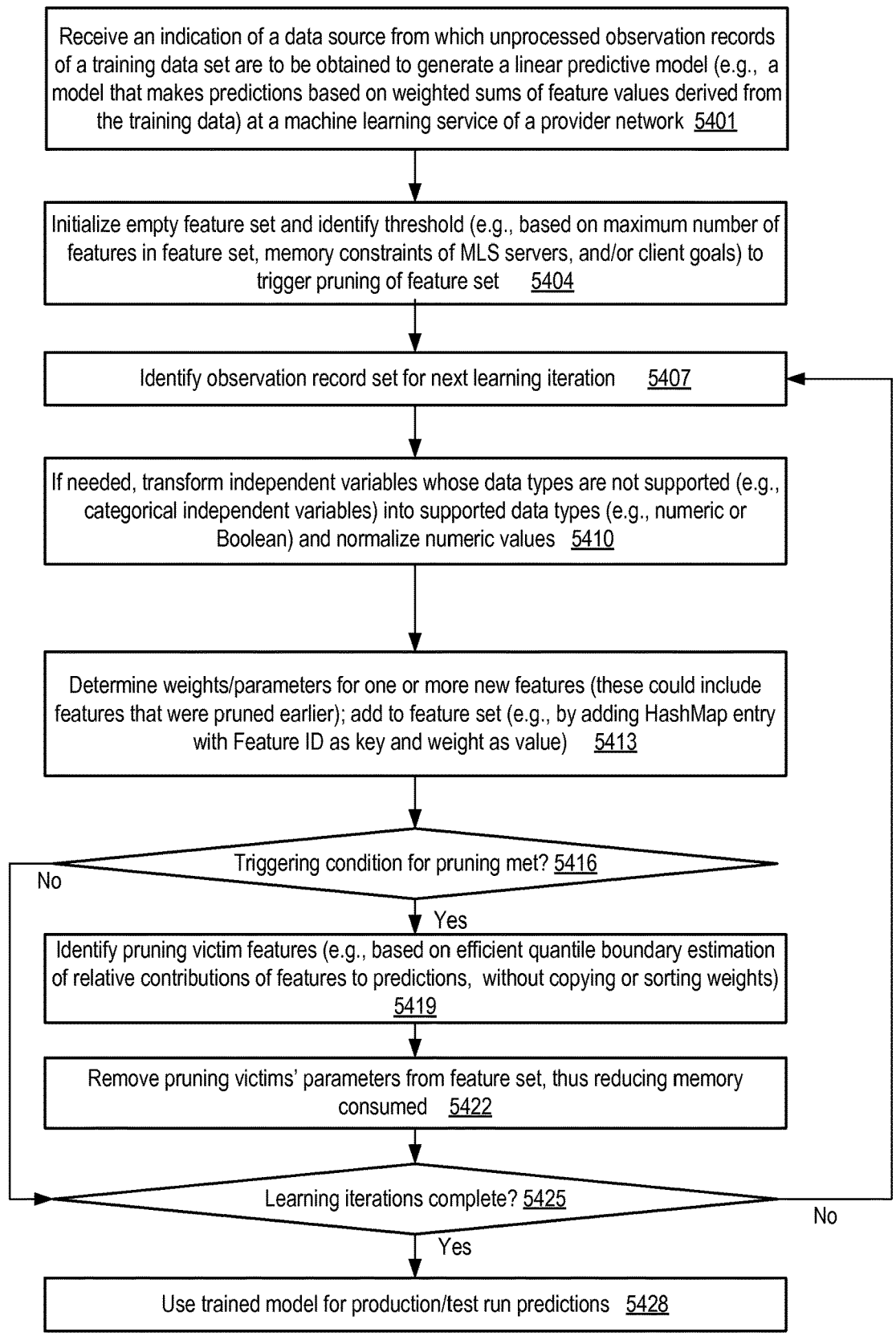
FIG. 54 is a flow diagram illustrating aspects of operations that may be performed at a machine learning service at which, in response to a detection of a triggering condition, parameters corresponding to one or more features may be pruned from a feature set to reduce memory consumption during training, according to at least some embodiments.

FIG. 54 is a flow diagram illustrating aspects of operations that may be performed at a machine learning service at which, in response to a detection of a triggering condition, parameters corresponding to one or more features may be pruned from a feature set to reduce memory consumption during training, according to at least some embodiments. As shown in element 5401, an indication of a data source from which unprocessed or raw observation records of a training data set that is to be used to develop a linear predictive model may be received at a machine learning service. In at least some embodiments, the data source may be indicated by a client via an MLS programmatic interface such as an API, a web-based console, a standalone GUI or a command line tool. The linear predictive model may, for example, be expected to make predictions based at least in part on weighted sums of feature values derived from the training data via one or more feature processing transformations (FPTs) of the types described earlier. In some implementations, a job object for generating/training the model may be created in response to the invocation of the API by the client and placed in a job queue such as queue 142 of FIG. 1. The job may be scheduled, e.g., asynchronously, on a selected training server (or a set of training servers) of the MLS server pool(s) 185.

The process of training the model may be initiated (e.g., when the queued job is scheduled). An empty feature set may be initialized (element 5404) and one or more parameters to be used during the training phase of the model may be determined—e.g., the threshold condition that is to be used to trigger feature set pruning may be identified, the fraction of features that is to be pruned each time such a threshold condition is detected may be identified, and so on. The threshold may be based on a variety of factors in different implementations, such as the number of features included in the feature set, the memory capacity of the MLS server(s) used for training the model, and/or goals indicated by the client. Client-provided goals from which the threshold may be derived may include, for example, limits on various types of resources that can be consumed during training and/or during post-training runs of the model, including memory, CPU, network bandwidth, disk space and the like. In some embodiments, a client may specify a budget goal for the training and/or for prediction runs, and the budget may be translated into corresponding resource limits at a component of the MLS.

A model generator or trainer may then begin implementing one or more learning iterations in the depicted embodiment. A set of one or more observation records may be identified for the next learning iteration (element 5407). Depending on the nature of the observation records, some preliminary data type transformations and/or normalization operations may have to be performed (element 5410). For example, some model generators may require that categorical independent variables be converted into numerical or Boolean variables, and/or that numerical variable values be mapped to real numbers in the range −1 to 1. One or more new features for which parameters such as weights are to be added to the feature set may be identified (element 5413). In some cases, a feature that was pruned earlier may be re-inserted into the feature set. A key-value structure such as a hash map or hash table may be used to store the parameter values (e.g., with feature identifiers as the keys) in some implementations. In some embodiments, one or more previously-generated parameter values may also be updated at this stage, e.g., using a stochastic gradient descent technique.

If the model generator determines that the threshold condition (identified in operations corresponding to element 5404) for triggering a round of pruning has been met (element 5416), one or more features may be identified as pruning victims (element 5419). In the depicted embodiment, the features that contribute the least to the models' predictions, e.g. by virtue of having the smallest absolute weights, may be selected as pruning victims. The manner in which the relative contributions of different features are determined or estimated, and the manner in which the features expected to provide the smallest contributions are identified, may differ in various embodiments. In some embodiments in which each feature is assigned a respective real number as a weight, an efficient estimation technique that does not require sorting or copying of the weights and can estimate a quantile boundary value among the weights in a single in-memory pass over the feature set may be used. After the quantile boundary (e.g., the weight representing the estimated $10^{th}$ percentile or the estimated $20^{th}$ percentile among the range of absolute values of the weights assigned to features of the feature set) is identified, entries for features with lower weights may be removed from the feature set. The memory consumed by the feature set may be reduced by the removal of the parameters assigned to the pruning victims (element 5422).

If the learning iterations have been completed (as detected in element 5425), the trained model may be used for generating predictions on production data, test data, and/or on other post-training-phase data sets (element 5428). Learning iterations may be deemed to be complete if, for example, all the observation records expected to be available have been examined, or if the accuracy of the predictions that can be made by the model on the basis of the learning iterations performed thus far meets an acceptance criteria. If additional learning iterations are to be performed (as also detected in element 5425), operations corresponding to elements 5407 onwards may be repeated—e.g., a new set of one or more observation records may be identified, the raw data may be transformed as needed, new features may be added to the feature set, and so on.

Figure 55:
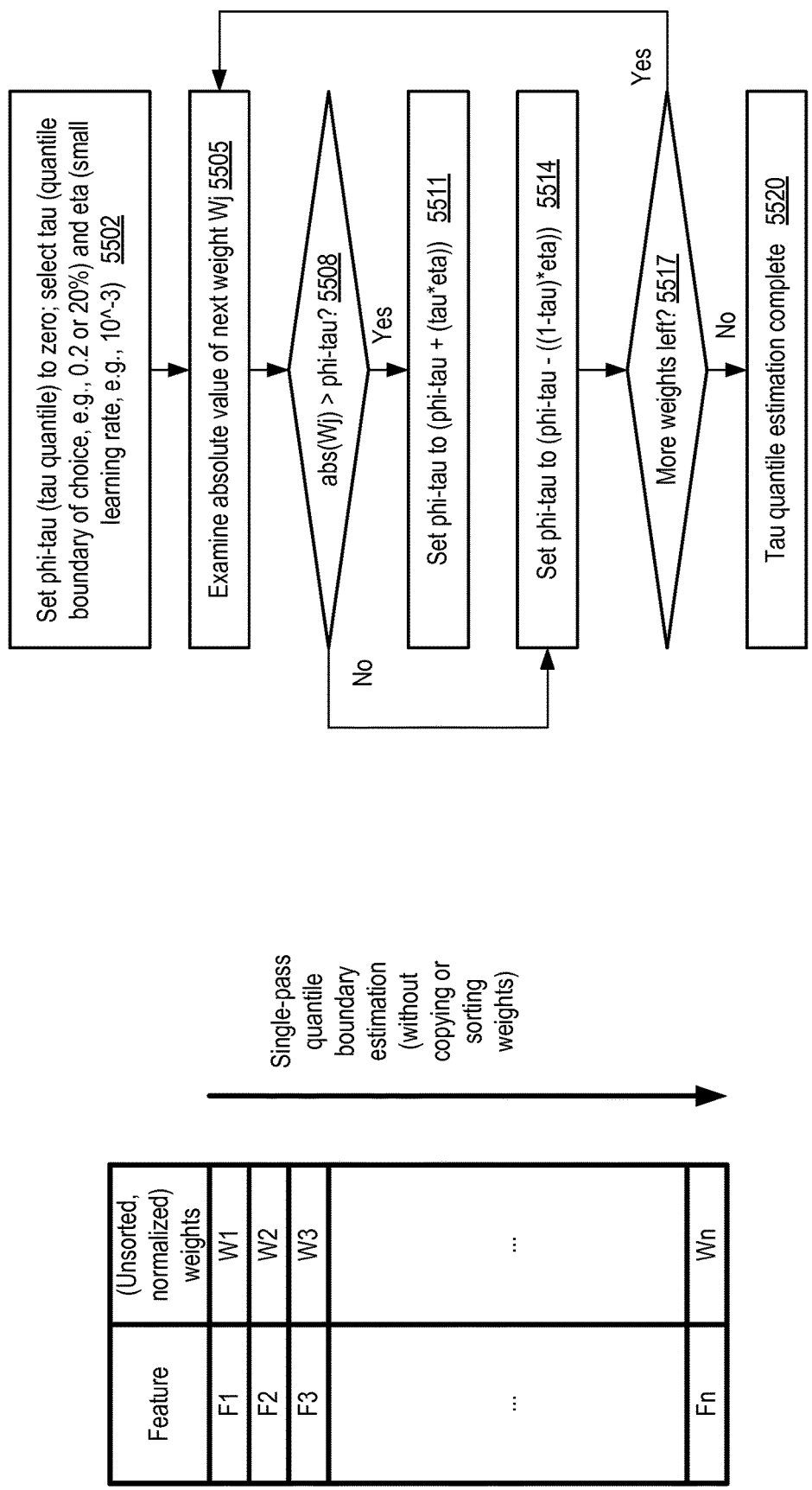
FIG. 55 illustrates a single-pass technique that may be used to obtain quantile boundary estimates of weights assigned to features, according to at least some embodiments.

As mentioned earlier, pruning victims may be selected from a feature set based on an analysis of the relative contribution or relative significance of the individual features with respect to predictions made using the feature set. FIG. 55 illustrates a single-pass technique that may be used to determine quantile boundary estimates of weights assigned to features, according to at least some embodiments. A set of normalized weights W1, W2, . . . Wn (e.g., real numbers in the range −1 to 1, which may be stored as double precision values in some implementations) corresponding to respective features F1, F2, . . . , Fn may be examined in order in memory, e.g., without copying the weights and without explicitly sorting the weights. In the depicted embodiment, the quantile for which a boundary value is to be obtained is referred to as "tau". Thus, for example, if the boundary between the lowest 20% of the weights and the remaining 80% of the weights is to be identified, tau may be set to 0.2. The boundary itself is referred to as "phi-tau". Initially, as shown in element 5502, tau and another parameter "eta" (representing a learning rate to be used to determine phi-tau) may be determined and phi-tau may be set to zero. Then, the next weight Wj may be examined and its absolute value abs(Wj) may be obtained (element 5505). If abs(Wj) is greater than phi-tau, as determined in element 5508, phi-tau may be increased by adding (tau*eta), the product of tau and eta. If abs(Wj) is not greater than phi-tau, phi-tau may be reduced by subtracting (1−tau)*eta (element 5511). If more weights remain to be examined (as detected in element 5517), the operations corresponding to elements 5505 onwards may be repeated. Otherwise, after all the weights have been examined, the estimation of the quantile boundary phi-tau may be complete (element 5520). The value of phi-tau at the end of the procedure illustrated in FIG. 55 may then be used to select the pruning victims—e.g., features with weights less than phi-tau may be chosen as victims, while features with weights no less than phi-tau may be retained in the feature set.

Concurrent Binning

It is noted that in the context of the following discussion of quantile binning, the term "feature identifier" may refer to a unique identifier for a property derived from observation records of a data set to be used to train a model. The term "feature set" may refer to a set of feature identifiers for which (a) feature values are observable while training the model and (b) feature parameters are known or inferred from the training data. The term "feature" may refer to a value (e.g., either a single numerical, categorical, or binary value, or an array of such values) of a property of an observation record indexed by a feature identifier. The term "binned feature", for example, may refer to a particular binary indicator value (e.g., a "0" or a "1") of an array of binary indicator values obtained from a quantile binning transformation applied to one or more input variables of a set of observation records. The term "feature vector" may refer to a set of pairs or tuples of (feature identifiers, feature values), which may, for example, be stored in a key-value structure (such as a hash map) or a compressed vector. The term "feature parameter" or "parameter" may refer to a value of a parameter corresponding to a property indexed by the feature identifier. A real number representing a weight is one example of a parameter that may be used in some embodiments, although for some types of machine learning techniques more complex parameters (e.g., parameters that comprise multiple numerical values) may be used. The term "parameter vector" may refer to a set of pair or tuples (feature identifier, feature parameter), which may also be stored in a key-value structure such as a hash map or a compressed vector. Although key-value structures may be used for parameter vectors and/or feature vectors in some embodiments, other types of representations of parameter vectors and/or feature vectors may be employed in various embodiments.

While generalized linear models are popular for many types of machine learning problems, in at least some cases the relationship between an input variable of a data set and the target or output variable(s) to be predicted may be non-linear. For example, the distribution of the observed values of a given numerical input variable may be unbalanced to a considerable extent, such that specific (and often small) sub-ranges contain a large number of observations. Such densely-spaced observations may at least in some cases represent strong relationships which should ideally be accurately represented in the weights or parameters assigned to the features that are eventually used for generating predictions. Outlying sub-ranges may contain relatively few observations, but in many cases capturing the relationships of such outliers to the target variables may also be important for generating high quality predictions. In at least some such scenarios, quantile binning transformations may be used for at least some input variables. In such a transformation, for a given set of training observation records, the values of a raw or unprocessed input variable may each be mapped to one of a selected number of quantile bins, such that each of the bins is at least approximately equal in population to the others. A set of binary indicator variables (variables that can either be set to "0" or "1") may then be generated, with each such binary indicator variable representing a respective "binned feature" derived from the raw input variable. For a given observation record, one of the indicator variables (the one corresponding to the particular bin to which the value of the raw variable is mapped) is set to "1", and the remaining indicator variables are set to "0". Because the different bins are roughly equal in population, this means that more bins would be generated for highly-populated sub-ranges of the unprocessed variable's values, and fewer bins would be generated for sparsely-populated sub-ranges. Accordingly, as a result of using quantile binning, the probability of capturing non-linear relationships between the raw input variables and the target variables may increase. Examples of quantile binning transformations are shown in FIG. 56 and described below in further detail.

One challenge with quantile binning is that it may not be straightforward to select, in advance, the bin counts (i.e., the number of bins to which a given input variable's raw values should be mapped) that will eventually lead to the most accurate and most general predictions from the model being trained or generated. Consider an example scenario in which a model generator has a choice of a bin count of 10, or a bin count of 1000, for a given input variable. With a bin count of 10, approximately 10 percent of the observation records would be mapped to each of the 10 bins, while with a bin count of 1000, only roughly 0.1% of the observation records would be mapped to each bin. In one approach to determining which bin count is the superior choice, two versions of the model may have to be fully trained separately and then evaluated. A first version M1 of the model may be trained with features obtained from the 10-bin transformation (as well as other features, if any are identified by the model generator), and a second version M2 may be trained using features obtained from the 1000-bin transformation (as well as the other features). M1's predictions on test data may be compared to M2's predictions on the same test data to determine which approach is better. Such an approach, in which different bin counts are used for training respective versions of a model, may be less than optimal for a number of reasons. First, training multiple models with respective groups of binned features may be expensive even for a single input variable. When several different binnable variables have to be considered for the same model, as is usually the case, the number of possible combinations to try may become extremely large. Second, it may not be possible to capture subtle non-linear relationships with any single bin-count setting (even for one input variable) in some cases—e.g., features obtained using several different bin-counts for the same variable may be useful for some predictions, depending on the nature of the nonlinear relationships. Thus, in some scenarios, for at least some variables, any single bin count may not necessarily produce predictions that are as accurate as could be produced using multiple bin counts.

In some embodiments, a machine learning service may implement a concurrent binning technique, in which several different feature transformations with respective bin counts may be applied to a given input variable during a single training phase or training session of a model. Using such an approach, initial weights (or more complex parameters) may be assigned to all the binned features derived from multiple bin counts. A large number of binned features may be generated, with corresponding parameters or weights stored in a parameter vector. At least some of the parameters corresponding to binned features may later be removed, e.g., based on the examination of additional observation records, a re-examination of some observation records, and/or the results of training-phase predictions during successive learning iterations. The initial weights or parameters may be adjusted using selected optimization techniques such as L1 or L2 regularization in some embodiments, and features whose absolute weight values fall below a threshold value may be eliminated from the parameter vector. The efficient pruning technique described above (e.g., in conjunction with the descriptions of FIG. 51-FIG. 55) may also or instead be applied to reduce the resources consumed for the parameters of the binned features in some embodiments. Using concurrent binning followed by parameter pruning, parameter vectors that allow a model to make accurate post-training-phase predictions with respect to non-linear relationships of the kinds described above may be obtained very efficiently in some embodiments, e.g., without incurring the costs of repeatedly training a model from scratch.

Figure 56:
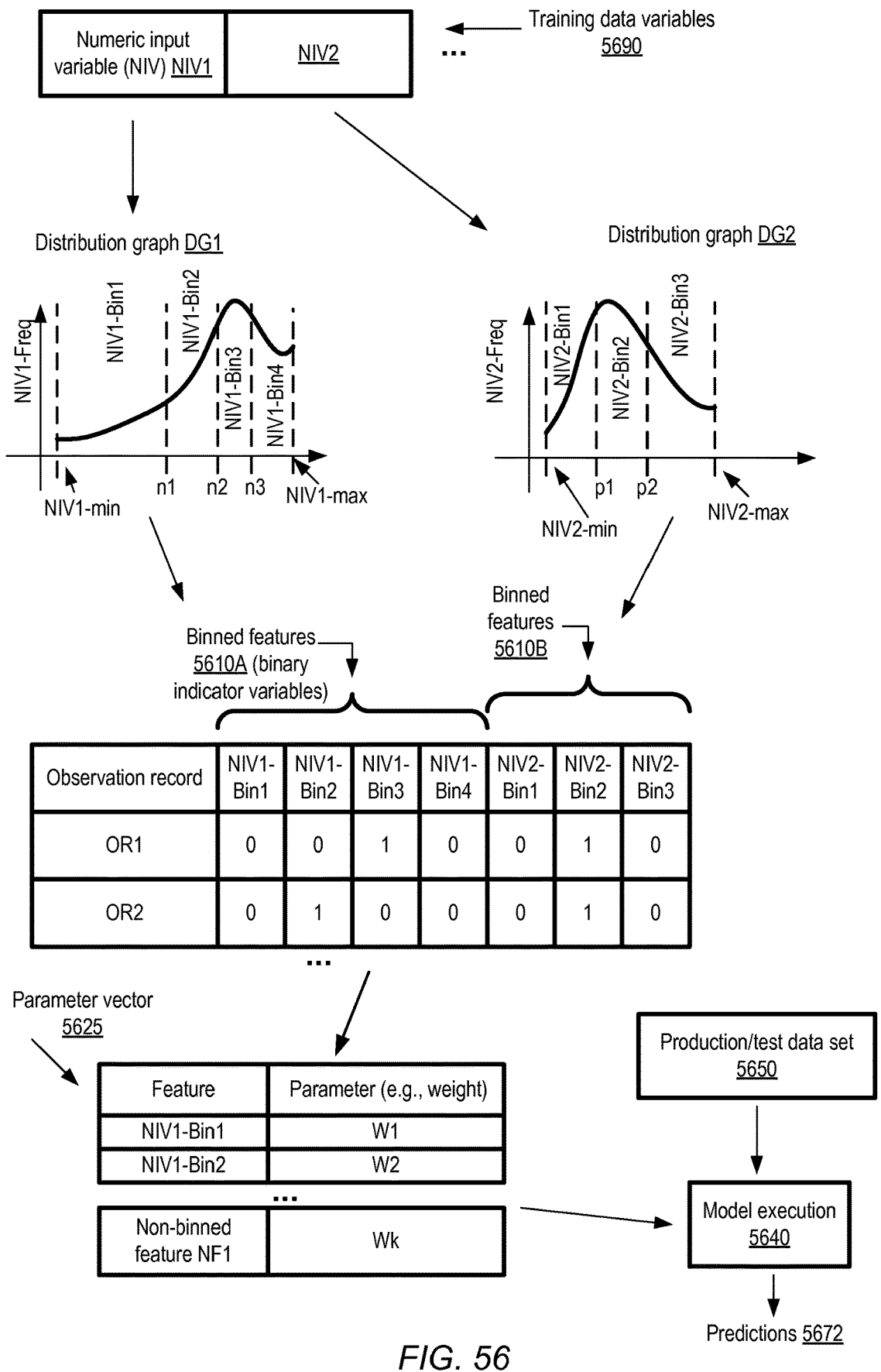
FIG. 56 illustrates examples of using quantile binning transformations to capture non-linear relationships between raw input variables and prediction target variables of a machine learning model, according to at least some embodiments.

FIG. 56 illustrates examples of using quantile binning transformations to capture non-linear relationships between raw input variables and prediction target variables of a machine learning model, according to at least some embodiments. As shown, training data variables 5690 included in observation records obtained from a data source to be used to generate a model at a machine learning service may include a number of numeric input variables (NIVs), such as NIV1 and NIV2. Distribution graphs DG1 and DG2 respectively illustrate the statistical distribution of the values of NIV1 and NIV2 of a set of observation records. The values of NIV1 lie in the range NIV1-min to NIV1-max, with the highest density of observations in the sub-range between n2 and n3. The values of NIV2 lie in the range NIV2-min to NIV2-max, with a peak density between p1 and p2.

In the depicted example, the values of NIV1 have been mapped to 4 bins labeled NIV1-Bin1 through NIV1-Bin4. The names of the bins correspond to feature identifiers of the corresponding binned features in FIG. 56. That is, a quantile binning transformation with a bin count of 4 has been used to generate four binned features 5610A derived from the single variable NIV1, with one indicator variable corresponding to each of the bins. The value of NIV1 in observation record OR1 falls in bin NIV1-Bin3; accordingly, for OR1, the indicator variable for NIV1-Bin3 has been set to 1 and the remaining NIV1-related indicator variables NIV1-Bin1, NIV1-Bin2, and NIV1-Bin4 have been set to zero. In the case of observation record OR2, the value of NIV1 falls within N1V1-Bin2, and the corresponding indicator variable has been set to 1 with the remaining set to zero. The values of NIV2 have been mapped to three bins NIV2-Bin1 through NIV2-Bin3 via a quantile binning transformation with a bin count of 3. In both OR1 and OR2, the value of NIV1 falls within NIV2-Bin2. Accordingly, for both OR1 and OR2, indicator variable NIV2-Bin2 has been set to 1, and the remaining NIV2-related indicator variables have been set to 0. The number of binned features or binary indicator variables for a given variable corresponds to the bin count in the depicted embodiment. The example transformations illustrated in FIG. 56 may be referred to as single-variable non-concurrent binning transformations herein. The transformations may be designated as single-variable in that the values of only one variable are used to derive a given binned feature, and non-concurrent because only a single bin count is used for binning each of the variables.

In addition to the binned features produced by the quantile binning transformations, other feature transformations may be performed on other raw input variables of the training data in the embodiment depicted in FIG. 56. A parameter vector 5625 comprising parameters for the combination of binned features (such as NIV1-Bin1 and NIV1-Bin2) and non-binned features (such as NF1) may be generated for the training data. In some implementations, the parameters may comprise weights, such as respective real numbers for each feature. The parameter vector may grow and shrink in some embodiments, e.g., as the kinds of pruning techniques described above are used iteratively. In at least some implementations, the bin boundaries may also shift as more observation records are examined or previously-examined observation records are re-analyzed. At some point, the model's training phase may be deemed complete (or at least sufficiently complete to be used for a prediction on some non-training data set), and the current version of the parameter vector 5625 may be used during an execution 5640 of the model to generate predictions 5672 for a test or production data set 5650.

In the example scenario illustrated in FIG. 56, a single bin count (four) is used for binning NIV1 values, and a single bin count (three) is used for binning NIV2. As discussed above, if such single bin counts are used, the binned features generated may not necessarily lead to the highest-quality predictions. This may be the case, for example, because the particular bin count selected for a given raw input variable at the start of the training/learning process may not be able to represent the non-linear relationship between the raw input variable values and the target variables as well as the relationship may have been represented using a different bin count. In at least some cases, the bin count may have been chosen somewhat arbitrarily, without any quantifiable justification. Fully training a model using several different bin counts for each binnable input variable, and then comparing the results to select the best bin count for each such variable, may be an expensive and time-consuming process. Accordingly, in some embodiments, the machine learning service may concurrently implement quantile binning using several different bin counts for at least one raw input variable of the training set.

Figure 57:
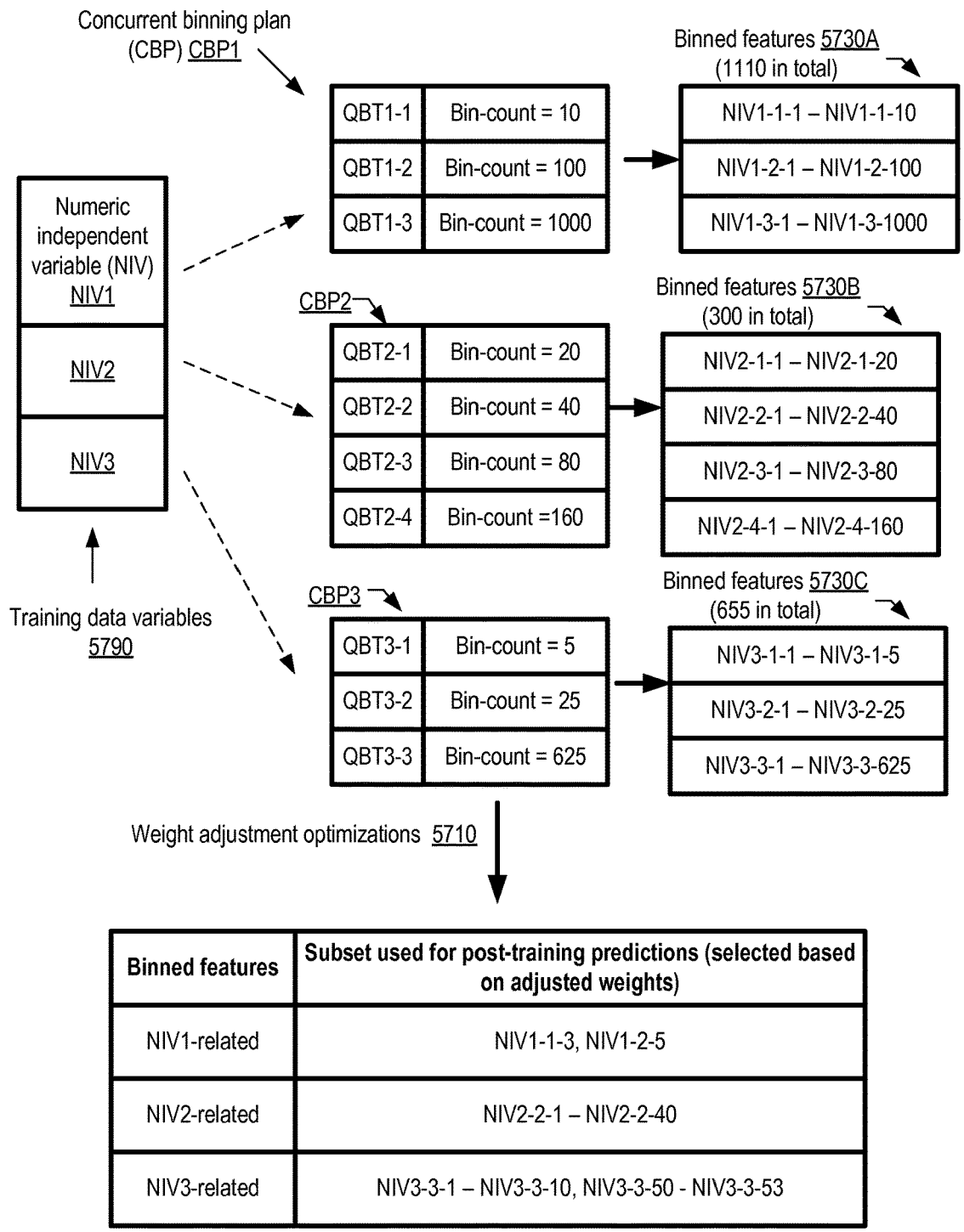
FIG. 57 illustrates examples of concurrent binning plans that may be generated during a training phase of a model at a machine learning service, according to at least some embodiments.

FIG. 57 illustrates examples of concurrent binning plans that may be generated during a training phase of a model at a machine learning service, according to at least some embodiments. In the depicted embodiment, the set of training data variables 5790 includes numerical input variables NIV1, NIV2, and NIV3 that have been selected as candidates for concurrent quantile binning. For each variable, a respective concurrent binning plan (CBP) may be generated and implemented during the training phase of the model. For example, in accordance with CBP1, three quantile binning transformations QBT1-1, QBT1-2 and QBT1-3 may be applied within the training phase to the values of NIV1, with respective bin counts of 10, 100 and 1000. A total of 1110 binned features 5730A may be produced as a result of implementing CBP1: 10 features (labeled NIV1-1-1 through NIV1-1-10) from QBT1-1, 100 features (NIV1-2-1 through NIV1-2-100) from QBT1-2, and 1000 features (NIV1-3-1 through NIV1-3-1000) from QBT1-3. Initial weights (or other types of parameters to be used to represent the relative contributions of the respective features to the model's predictions) may be assigned to each of the binned features 5730A. Similarly, in according with concurrent binning plan CBP2, four quantile binning transformations may be applied to NIV2 concurrently within the same training phase, with bin counts of 20, 40, 80 and 160 respectively, resulting in 300 binned features 5730B. In accordance with concurrent binning plan CBP3, three quantile binning transformations may be applied to NIV3, with bin counts of 5, 25 and 625 respectively, resulting in 655 binned features 5730C. Respective initial weights/parameters may be assigned to all the binned features.

A model generator or another component of the machine learning service may select the different bin counts (e.g., 10, 100, 1000 in the case of NIV1, or 20, 40, 80, 160 in the case of NIV2) to be used for concurrent binning of a given variable based on any of a variety of factors in different embodiments. In some embodiments, for example, a small sample of the observation records available may be obtained, and the distribution of the values of a numerical input variable (such as NIV1, NIV2 or NIV3) in the sample may be determined. The distribution may then be used to select the different bin counts. The range and granularity of the numeric variables' values may influence the selection of bin counts as well: for example, if a particular numeric variable takes only integer values between 1 and 1000, the maximum number of bins for that variable may be limited to 1000. In other embodiments, a knowledge base of the machine learning service (e.g. KB 122 shown in FIG. 1) may be consulted to determine the best concurrent-binning-related practices for the particular problem domain for which the model is being generated. In one embodiment, a default set of N bin counts (e.g., 10, 100, 1000, with N=3) may be used for all the variables selected as candidates.

It is noted that while all the quantile binning transformations of a given set of CBPs (e.g., CBP1, CBP2, and CBP3 in the example shown in FIG. 57) may be implemented during a single training phase or training session of the model in at least some embodiments, the computations involved in the transformations need not be performed simultaneously or in parallel at the hardware level. For example, in one implementation, for a given set of observation records, values for the indicator variables of a given quantile binning transformation such as QBT1 may typically be produced using at least one thread of execution of a model generator. Thus, to implement the 10 transformations (QBT1-1, QBT1-2, . . . , QBT3-3) of CBP1, CBP2 and CBP3, ten threads of execution may be required. However, this does not mean that 10 processors or cores are necessarily used-instead, for example, a single 4-core MLS server may be used for all 10 binning transformations, with different subsets of the necessary computations being run in parallel or sequentially at any given point in time during a training phase of the model. Thus, in the depicted embodiment, the use of the term "concurrent" to describe the set of quantile binning transformations refers to concurrent computations within the context of a training phase, and does not require hardware-level concurrency. Of course, in some cases, the number of cores or CPUs available may be sufficient to perform all the computations required for the different CBPs in parallel during the training phase.

In many cases, the number of candidate variables for binning transformations may be quite large, and as a result the number of binned features produced as a result of implementing the concurrent binning plans may also become very large. As discussed earlier, as the number of features represented in a parameter vector increases, the memory required at an MLS server at which the model is being generated or trained also increases. In order to limit the amount of memory consumed, one or more weight adjustment optimizations 5710 may be performed in the depicted embodiment. Such optimizations may include, for example, a regularization technique in which the weights of at least some of the binned features (and/or some non-binned features) are reduced over successive learning iterations, as the model generator is able to learn more about the relative contributions of the various features to prediction accuracy. As a result of regularization, the weights associated with some features may become small enough that at least the parameters corresponding to such features may be removed or pruned from the parameter vector in at least one embodiment. It is noted that regularization may also help to reduce over-fitting in at least some embodiments; that is, reduction of parameter vector size may not be the only (or even the primary) reason for using regularization. In some embodiments, in response to a triggering condition, a quantile boundary for the different weights assigned to the features may be estimated (e.g., using a technique similar to that shown in FIG. 55), and a selected set of weights that fall in the lowest X % of the range of absolute values of weights may be removed from the model's parameter vector. Both regularization and quantile-boundary-based pruning may be used in some embodiments to eliminate parameters from the parameter vector during training. In other embodiments, optimizations other than regularization and quantile-boundary-based pruning may be used.

The initial weights assigned to the different binned features obtained in accordance with CBP1-CBP3 may be adjusted in accordance with the selected optimization strategy or strategies in the embodiment depicted in FIG. 57. If the adjusted weight for a given binned feature falls below a rejection threshold, the entry for that feature may be removed from the parameter vector, and may not be used for post-training-phase predictions (unless it is re-introduced later as more learning iterations are completed). In the illustrated example, corresponding to each of the input variables for which concurrent binning transformations were applied, only a subset are used for post-training-phase predictions as their adjusted weights are above the rejection threshold. For example, from among the 1110 NIV1-related binned features, only NIV1-1-3 and NIV1-2-5 are used. From among the 300 NIV2-related binned features, NIV2-2-1 through NIV2-2-40 are used, and from among the 655 NIV3-related binned features, NIV3-3-1 through NIV3-3-10 and NIV3-3-50 through NIV3-3-53 are used for post-training predictions. The parameters for the remaining binned features may be removed from the parameter vector. Although only binned features produced as a result of the implementation of concurrent binning plans CBP1-CBP3 are shown in FIG. 57, parameters for non-binned features may also be added to and removed from the parameter vector during the training phase.

In the example illustrated in FIG. 57, two binned features ( ) (NIV1-1-3 and NIV1-2-5) corresponding to different quantile binning transformations of a single input variable (NIV1) have been retained for post-training-phase predictions. This may indicate that the two different bin counts (10 for NIV1-1-3 and 100 for NIV1-2-5) may each capture different aspects of the non-linear relationship between NIV1 and the target variables whose values are to be predicted. As a result of using a concurrent binning technique similar to that illustrated in FIG. 57, the prediction accuracy of the trained model may in many cases be higher, and the overall training time required may in many cases be lower, than if single bin counts were used for each variable for which quantile binning is performed.

Figure 58:
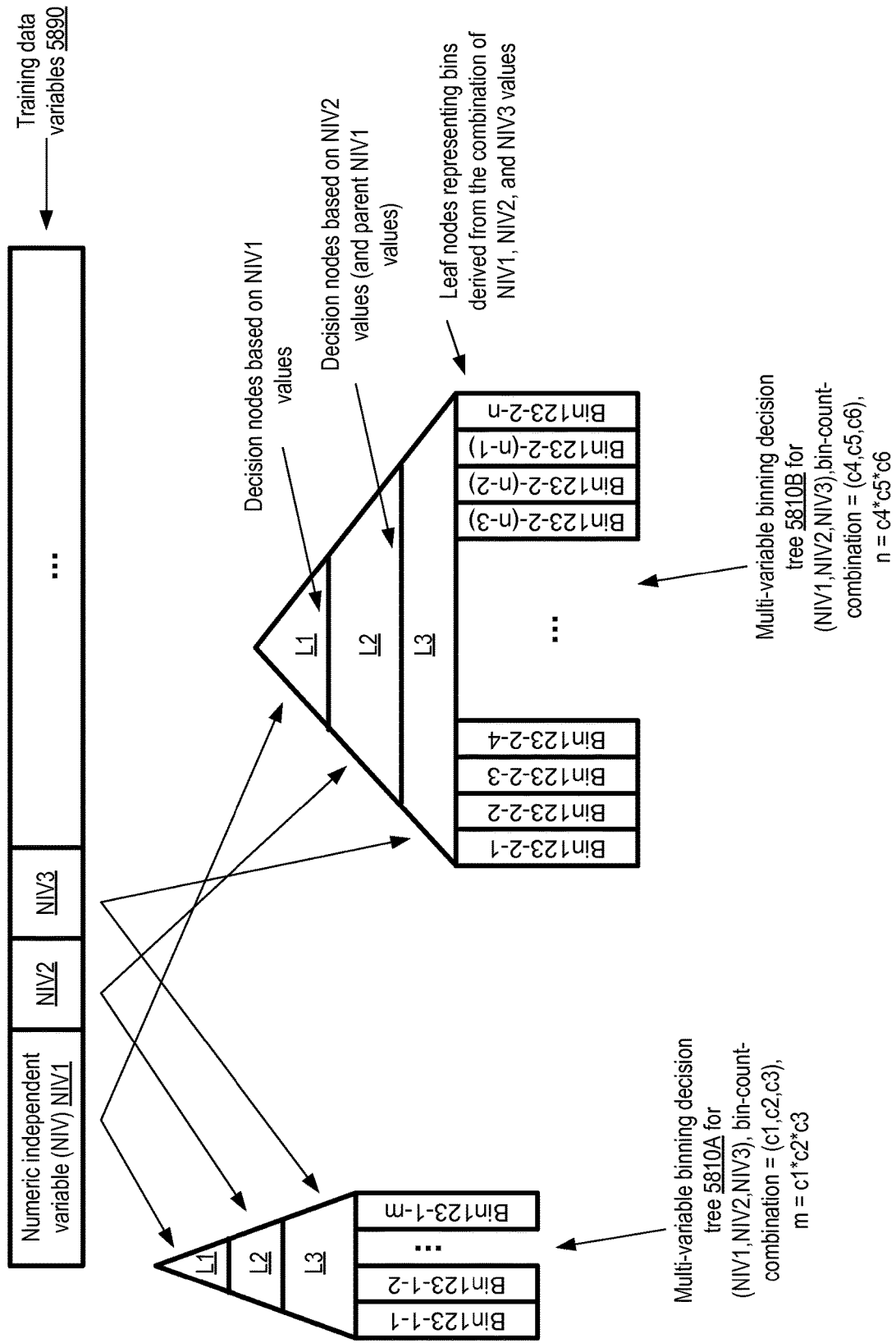
FIG. 58 illustrates examples of concurrent multi-variable quantile binning transformations that may be implemented at a machine learning service, according to at least some embodiments.

In FIG. 57, even though multiple binning transformations with respective bin counts are used, each binning transformation itself is applied to a single variable. In some embodiments, the values of more than one input variable may be used together to map a given observation record to a single bin. Such bins may be referred to herein as multi-variable bins, and the corresponding feature transformations may be referred to herein as multi-variable quantile binning transformations. For each group of input variables to be binned together, different combinations of bin counts may be assigned to each of the input variables to produce multi-variable binned features concurrently during a model's training phase. FIG. 58 illustrates examples of concurrent multi-variable quantile binning transformations that may be implemented at a machine learning service, according to at least some embodiments. From a plurality of training data variables 5890, three numerical input variables NIV1, NIV2 and NIV3 are identified as candidates to be grouped together for concurrent multi-variable binning in the depicted embodiment. Respective decision trees 5810A and 5810B may be generated for binning decisions for the combination of the three variables, with respective bin-count combinations.

Decision tree 5810A represents the bin-count combination (c1, c2, c3) for the variables (NIV1, NIV2, NIV3) respectively. Given an observation record, the decision tree may be navigated based on the values of the three variables, with each level comprising decision nodes at which a particular one of the variables is checked to decide which node should be traversed next. Leaf nodes of the tree may correspond to the bins derived from the combination of all the grouped variables. For example, level L1 of tree 5810A may comprise c1 decision nodes, each representing one quantile subset of the values of NIV1. For each node at level L1, c2 decision nodes for values of NIV2 may be generated at level L2, each representing a combination of NIV1-based binning and NIV2-based binning. Similarly, for each node at level L2, c3 leaf nodes may be generated, each representing a multi-variable bin and a corresponding binned feature. Thus, in the case of tree 5810, a total of (c1*c2*c3) bins may be generated with corresponding binary indicator variables. In FIG. 58, the leaf nodes of tree 5810A are labeled Bin123-1-1 through Bin123-1-m, where m is the product of c1, c2 and c3. (In the bin naming convention "Bin<string1>-<string2>-<string3>" shown, string1 represents the different input variables grouped together for binning, string2 is an identifier of a particular decision tree, and string3 is an indicator of the position of the bin among the collection of leaf nodes. Thus, Bin123-k-q would represent the qth leaf node for the kth tree used for binning variables NIV1, NIV2 and NIV3.) Any given observation record may be mapped to a particular one of the leaf nodes, based on the values of NIV1, NIV2 and NIV3 in that observation record. The binary indicator variable for that leaf node may be set to 1 for the observation record, while other indicator variables may all be set to zero.

Just as single-variable binning may be performed concurrently using different bin counts in some embodiments, multi-variable binning may also be performed concurrently with different combinations of bin counts for a given variable set. For example, using a different combination of bin counts (c4, c5, c6), a second decision tree 5810B may be generated concurrently for the (NIV1, NIV2, NIV3) combination. Once again, the number of bins/features at the leaf nodes is equal to the product of the bin counts: thus, in FIG. 58, the leaf nodes of tree 5810B are labeled Bin123-2-1 through Bin123-2-n, where n is (c4*c5*c6). Any desired number of decision trees for respective multi-variable concurrent binning transformations may be used in various embodiments. For at least some training data sets, the use of multiple variables for grouped quantile binning as shown in FIG. 58 may allow a wider variety of non-linear relationships to be captured than may be possible using single-variable binning Similar kinds of approaches to limiting the parameter vector size may be used with multi-variable concurrent quantile binning as were discussed above with reference to single-variable binning in various embodiments. For example, regularization and/or techniques involving quantile-boundary estimation for the weights assigned to the binned features may be employed in at least some embodiments.

In at least some embodiments, multi-variable concurrent binning transformations as well as single-variable concurrent binning transformations may be used within a given training phase of a model. Single-variable concurrent binning of the type illustrated in FIG. 57 may be considered one variant of the more general multi-variable binning technique, with a simple decision tree comprising only leaf nodes (plus a root node representing the start of the binning decision procedure). Generally speaking, from among the input variables of any given training data set, some number of groups of variables may be selected for concurrent binning Some of the groups may comprise just one variable, while other groups may comprise multiple variables.

FIG. 59 illustrates examples of recipes that may be used for representing concurrent binning operations at a machine learning service, according to at least some embodiments. As described earlier, e.g., with reference to FIG. 11-FIG. 17, the machine learning service may support a recipe language in which a wide variety of feature transformation operations may be indicated in user-friendly syntax, and such recipes may be re-used for different data sets as needed. Recipes corresponding to concurrent quantile binning transformations, such as the single-variable concurrent binning illustrated in FIG. 57, as well as the multi-variable concurrent binning illustrated in FIG. 58, may be generated and stored within the MLS repository in the embodiment depicted in FIG. 59.

The outputs section of recipe 5902A corresponds to the concurrent binning transformations of FIG. 58, with the name of the input variable and the bin count indicated for each transformation. Thus, concurrent single-variable quantile binning transformations with bin counts of 10, 100, and 1000 are to be performed for NIV1, with bin counts of 20, 40, 80 and 160 for NIV2, and with bin counts of 5, 25 and 625 for NIV3.

The outputs section of recipe 5902B indicates concurrent multi-variable quantile binning transformations (with the "MV" in the token "MV_quantile_bin" standing for "multiple variable") to be performed on specified groups of variables. The first such transformation is to be applied to NIV1 and NIV2 together, with NIV1 values mapped to 10 bins and NIV2 values also mapped to 10 bins (as indicated by the "10×10"), thereby creating 100 bins for the combination. A second multi-variable binning transformation is to be performed concurrently for NIV1 and NIV2, with bin counts of 100 for NIV1 and 100 for NIV2, resulting in 10000 bins overall. A third multi-variable binning transformation is to be performed on NIV1 and NIV3 together, with respective bin counts of 100 for NIV1 and 20 for NIV3. Single-variable quantile binning transformations may also be indicated using the MV_quantile_bin token in some embodiments, specifying a group that has just one variable. In at least some implementations, the "quantile_bin" token shown in recipe 5902A may be used for both single-variable and multi-variable binning transformations, and the parameters associated with the token may be used to determine whether single-variable or multi-variable binning is to be performed.

Recipes similar to 5902A or 5902B may be produced by a model generator in some embodiments, and stored in an MLS artifact repository for possible re-use on similar types of machine learning problems. In some embodiments, a client of the machine learning service may explicitly request concurrent quantile binning, and may provide recipes that specify the attributes or properties of such transformations (e.g., the groups of one or more variables to be binned concurrently, the number of concurrent binning transformations for each group, the bin counts, etc.).

Figure 60:
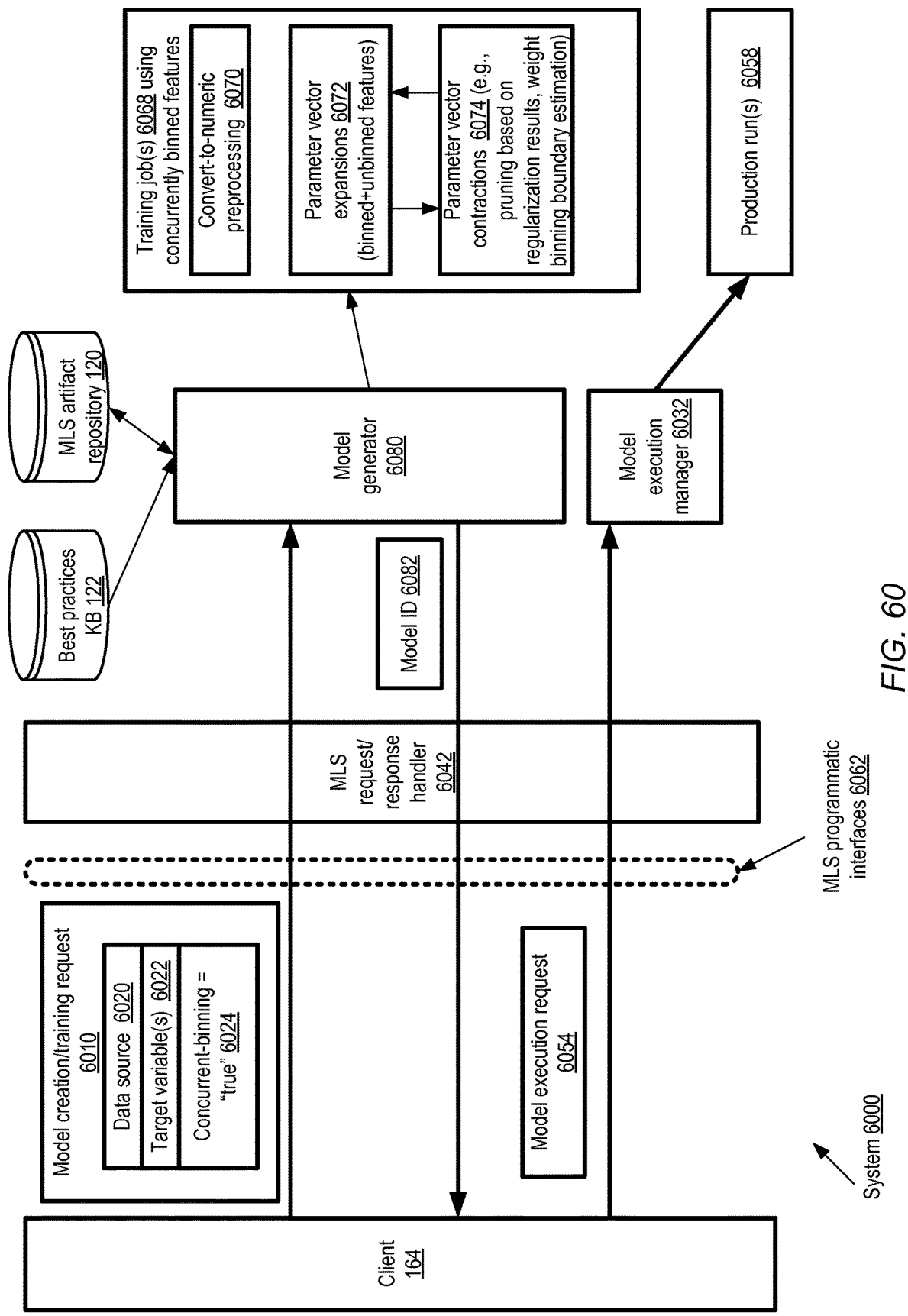
FIG. 60 illustrates an example of a system in which clients may utilize programmatic interfaces of a machine learning service to indicate their preferences regarding the use of concurrent quantile binning, according to at least some embodiments.

In at least some embodiments, the process of generating or training a model may be initiated at the MLS in response to a programmatic request from a client, e.g., via an API or a web-based console. FIG. 60 illustrates an example of a system in which clients may utilize programmatic interfaces of a machine learning service to indicate their preferences regarding the use of concurrent quantile binning, according to at least some embodiments. As shown, in system 6000, a client 164 may submit a model creation or training request 6010 via a programmatic interface 6062. The client request may indicate a data source 6020 whose observation records are to be used to train a model to predict values of one or more target variables 6022 indicated in the request. The request may include a "concurrent binning" parameter 6024, which may be set to "true" if the use of concurrent quantile binning is acceptable to the client. Clients that do not want concurrent quantile binning to be used may set such a parameter to "false" in such embodiments. In at least one embodiment, the default setting for concurrent binning may be "true", so that the MLS may implement concurrent quantile binning for selected input variables that are identified as suitable candidates even if the client does not indicate a preference. In one embodiment, instead of or in addition to setting a value for the concurrent binning parameter, clients may indicate or include a recipe that includes concurrent binning transformations in their model creation request 6010.

The client request 6010 may be received by a request/response handler 6042 of the machine learning service, and a corresponding internal request may be transmitted to a model generator 6080. The model generator may also be referred to herein as a model trainer, a feature processing manager, or a feature transformation manager. Model generator 6080 may identify one or more candidate variables of the observation records for which concurrent quantile binning is to be performed. In some embodiments, the model generator 6080 may consult the MLS best practices knowledge base 122 to determine the attributes to be used for concurrent binning—e.g., if/how multiple variables should be grouped for multi-variable quantile binning, the bin counts that should be used, and so on. Best practices that have been identified earlier for the same problem domain, or for similar types of machine learning problems, may help guide the selection of the concurrent binning attributes. In some embodiments, the model generator 6080 may be able to identify earlier-generated recipes (e.g., in the knowledge base or in the MLS artifact repository 120) which include concurrent quantile binning transformations that were used successfully for similar models to the one whose creation is requested by the client. Such pre-existing recipes may be used to select the concurrent binning transformations to be applied in response to request 6010. In at least one embodiment, a k-dimensional tree (k-d tree) representation of a set of observation records may be generated, e.g., with the k dimensions representing a selected set of variables. The attributes of the concurrent binning transformations to be applied to one or more of the selected set of variables may be based at least in part on an examination of such a k-d tree in such embodiments.

In the embodiment depicted in FIG. 60, one or more training jobs 6068 that include the use of concurrent quantile binning may be generated and scheduled. Depending on the kinds of raw data included in the unprocessed observation records of data source 6020, a training job 6068 may include preprocessing tasks 6070 that convert raw input variables into numeric values that can then be used for binning Such pre-processing conversions may, for example, include mapping of one or more selected categorical variables to real numbers, and/or domain-specific transformations (e.g., transformations that map raw audio data, graphics data, or video data into real numbers suitable for binning) In some cases, an iterative learning procedure may be used to train the model, with alternating phases of expanding the model's parameter vector (e.g., by adding parameters for more binned features as well as un-binned features as more learning iterations are completed) and contracting the parameter vector (e.g., using the pruning technique described earlier). Depending on the attributes selected for concurrent binning, and the number of concurrent binning transformations selected for the training data, parameter vector expansions 6072 may result in a rapid growth in the amount of memory needed, and an aggressive approach to pruning may therefore be required during parameter vector contractions 6072. Attributes of the optimization technique(s) (such as regularization) used for pruning may be adjusted accordingly, e.g., so that the weights for features that are identified as less significant to model predictions are reduced more quickly. In some embodiments in which the quantile boundary estimation technique described earlier is employed, the fraction of parameters that are eliminated or pruned during any particular iteration may be increased to implement more aggressive parameter vector size reductions, the triggering conditions for pruning may be modified so that pruning is performed more frequently, and so on. It is noted that although parameters may be removed from the parameter vector in many scenarios, at least in some embodiments it may be sometimes be the case that no parameters are eliminated from the parameter vector during the training phase. Thus, the use of concurrent quantile binning transformations of the kind described herein does not require the pruning of parameters.

After the selected concurrent binning transformations have been applied and the model's training phase is completed, a representation of the model may be stored in the artifact repository 120 and an identifier 6082 of the trained model may be provided to the client via the programmatic interface 6062. In some cases, an indication (such as a recipe) of the concurrent quantile binning transformations performed may also be provided to the client 164. The client may eventually submit a model execution request 6054, and post-training-phase production runs 6058 of the model may be scheduled by a model execution manager 6032.

Figure 61:
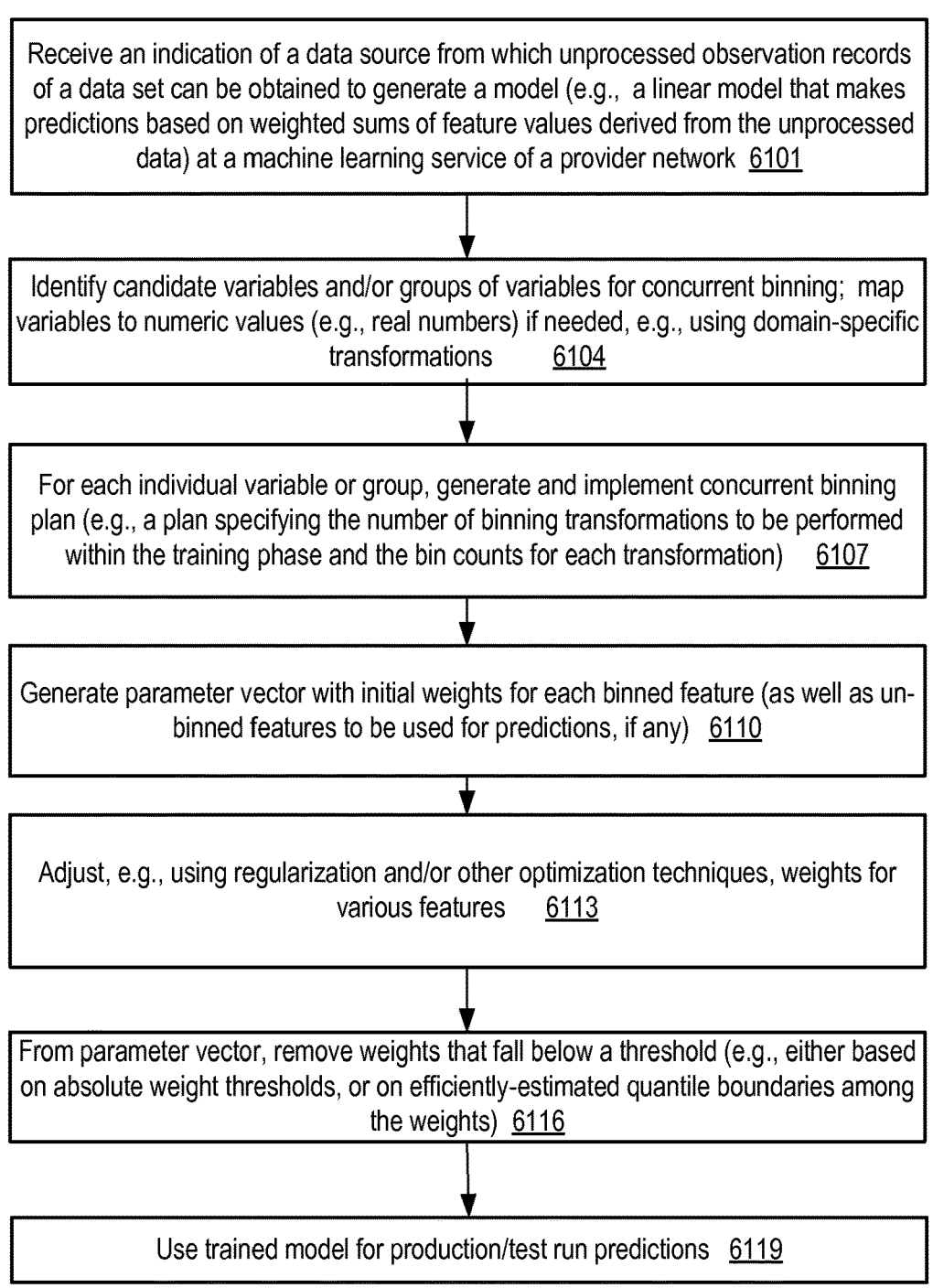
FIG. 61 is a flow diagram illustrating aspects of operations that may be performed at a machine learning service at which concurrent quantile binning transformations are implemented, according to at least some embodiments.

FIG. 61 is a flow diagram illustrating aspects of operations that may be performed at a machine learning service at which concurrent quantile binning transformations are implemented, according to at least some embodiments. As shown in element 6101, an indication of a data source from which unprocessed observation records are to be obtained to generate a model may be received at a machine learning service of a provider network, e.g., via a client request submitted via a programmatic interface. In at least some embodiments the machine learning service may determine that a linear model whose predictions are to be based on real-valued weights (and/or linear combinations of more complex parameters) assigned to features derived from raw values of the observation records' variables is to be generated.

A component of the machine learning service such as a model generator may identify one or more unprocessed variables as candidates for concurrent quantile binning transformations (element 6104). The candidates may be identified based on any of a number of different factors in different embodiments, such as an analysis of the distributions of the variables' raw values in a sample of observation records, a default strategy for performing concurrent binning, and so on. In at least some cases, one or more groups of candidates may be identified for multi-variable concurrent binning transformations. In some cases, raw values of one or more variables of the observation records may be mapped to real numbers in a pre-processing step. For example, variable comprising audio, video, or graphics content may be mapped to real numbers using domain-specific mapping algorithms, or some types of categorical variables or text tokens may be mapped to real numbers.

Corresponding to each individual variable or group of variables for which concurrent binning transformations are to be performed, a concurrent binning plan may be generated in the depicted embodiment (element 6107). The attributes or properties of such plans may include, for example, the number of distinct quantile binning transformations to be implemented during a single training phase and the bin counts selected for each such transformation. For multi-variable binning transformations, the sequence in which the variable values are to be checked (e.g., which variable is to be examined at successive levels of the decision trees to be used for binning, similar to the trees illustrated in FIG. 58) may be included in the plan attributes. The model generator may utilize a knowledge base of best practices to help generate the concurrent binning plans in some embodiments, e.g., by looking up recipes that were used successfully in the past for the same problem domain (or similar problem domains) as the model being generated.

In addition to concurrent binning, various other types of feature transformations may be identified for training the model in some cases. Initial weights for the features obtained at least in part as a result of implementing the concurrent binning plans (element 6110) may be stored in a parameter vector in the depicted embodiment. The weights may subsequently be adjusted, e.g., using L1 or L2 regularization or other optimization techniques (element 6113). At least some of the parameter vector entries may be removed based on the adjusted weights in some embodiments (element 6116). For example, entries whose weights fall below a rejection threshold may be removed. In some embodiments, an efficient quantile boundary estimation technique similar to that discussed in the context of FIG. 52 and FIG. 54 may be applied to the absolute values of the feature weights, and parameter vector entries whose weights fall in the lowest X % may be removed. In some embodiments, an iterative approach may be used, in which the parameter vector size may grow as more concurrent quantile binning transformations are identified, and shrink as some of the parameters are pruned. After the training phase is completed, the trained model may be used to generate predictions on production data and/or test data (element 6119). That is, the parameters or weights assigned to the retained features (e.g., some number of binned features and/or some number of non-binned features that have not been pruned) may be used to obtain the predictions.

Concurrent quantile binning may be used for a wide variety of supervised learning problems, including problems that can be addressed using various types of generalized linear models in different embodiments. Concurrent quantile binning transformations similar to those described above may also be used for unsupervised learning, e.g., in addition to or instead of being used for supervised learning in various embodiments. In one embodiment, for example, at least some of the variables of an unlabeled data set may be binned concurrently as part of a clustering technique.

Interactive Graphical Interfaces for Exploring Evaluation Results

As discussed above, a wide variety of models may be trained, evaluated and then deployed for production predictions using the machine learning service in different embodiments, including for example classification models, regression models and the like. For some non-expert users of the MLS, interpreting model execution results may not always be straightforward, especially if the results are presented simply in text format, e.g., as one or more tables of numbers. In particular, using text versions of model output, it may be relatively hard for some users to understand the relationships between different quality-related metrics (such as accuracy, false positive rate, false negative rate and the like), and how changing various interpretation-related settings (such as cutoff values or boundaries between classes in the case of classification models) may impact the ultimate business decisions that are made using the model. To help bridge the gaps that may exist between the back-end computational and inference capabilities of the MLS resources on the one hand, and the ability of users of the MLS to interpret model results and make the best possible tradeoffs between possibly conflicting quality goals, in at least some embodiments the MLS may provide support for an interactive graphical interface. Such an interactive graphical interface, which may for example be implemented via a collection of web sites or web pages (e.g., pages of a web-based MLS console), or via standalone graphical user interface (GUI) tools, may enable users of the MLS to browse or explore visualizations of results of various model executions (such as various post-training phase evaluation runs, or post-evaluation production runs). The interface may allow users to change one or more interpretation-related settings dynamically, learn about various quality metrics and their inter-relationships, and prioritize among a variety of goals in various embodiments.

In at least some embodiments, the interface may comprise a number of control elements (e.g., sliders, knobs, and the like) that can be used by MLS clients to change the values of one or more prediction-related settings, and to observe the consequences of such changes in real time. In some implementations, continuous-variation control elements such as sliders that emulate smooth changes to underlying variables or settings may be used, with in other implementations, discrete-variation control elements such as knobs that allow one of a small set of values to be selected may be used. For example, for a binary classification model, it may be possible for a client to change the cutoff value (the boundary value of an output variable that is used to place observation records in one class or the other) and dynamically observe how such a change would impact the number of false positive, false negatives and the like for a given evaluation run. In some embodiments, the interface may allow clients to "reverse-engineer" the impact of certain types of prediction-related choices: for example, a client may use a slider control to indicate a desired change a prediction quality result metric (e.g., the false positive rate for a particular evaluation run of a binary classification model) and view, in real time, the cutoff value that could be used to obtain the desired value of the result metric. Clients may also be presented with visual evidence of the relationships between different prediction quality metrics and thresholds—e.g., as a client changes the sensitivity level for a given evaluation run, the impact of that change on other metrics such as precision or specificity may be shown. Using such interfaces that enable "what-if" explorations of various changes, it may become easier for a user of the MLS to select settings such as classification cutoffs, the ranges of variable values to which a model's predictions should be restricted in subsequent runs of the model, and the like, to meet that user's particular business objectives (e.g., to keep false positives low, or to keep accuracy high). During a given interaction session, a user may vary a number of different settings or metrics and observe the resulting trends, without affecting any of the saved results of the evaluation run. The user may submit a request via the interactive interface in some embodiments to save a respective target value of one or more prediction-related settings that are to be used for subsequent runs of the model.

The dynamic display of the effects of various possible settings changes may be made possible in various embodiments by efficient communications between the back-end components of the MLS (e.g., various MLS servers where the model execution results are obtained and stored, and where the impacts of the changes are rapidly quantified) and the front-end or client-side devices (e.g., web browsers or GUIs being executed at laptops, desktops, smart phones and the like) at which the execution results are displayed and the interactions of the clients with various control elements of the interface are first captured. As a client changes a setting via the interface, an indication of the change may be transmitted rapidly to a back-end server of the MLS in some embodiments. The back-end server may compute the results of the change on the data set to be displayed quickly, and transmit the data necessary to update the display back to the front-end device. When a continuous-variation control such as a slider is used by a client to transition from one value to another, multiple such interactions between the front-end device and the back-end server may occur within a short time in some implementations (e.g., updates may be computed and displayed several times a second) to simulate continuous changes to the display. In at least some embodiments, the logic required for calculating at least some of the impacts of client-indicated changes may be incorporated into the interactive interface itself, or at other subcomponents the client-side device used for the graphical displays.

Figure 62:
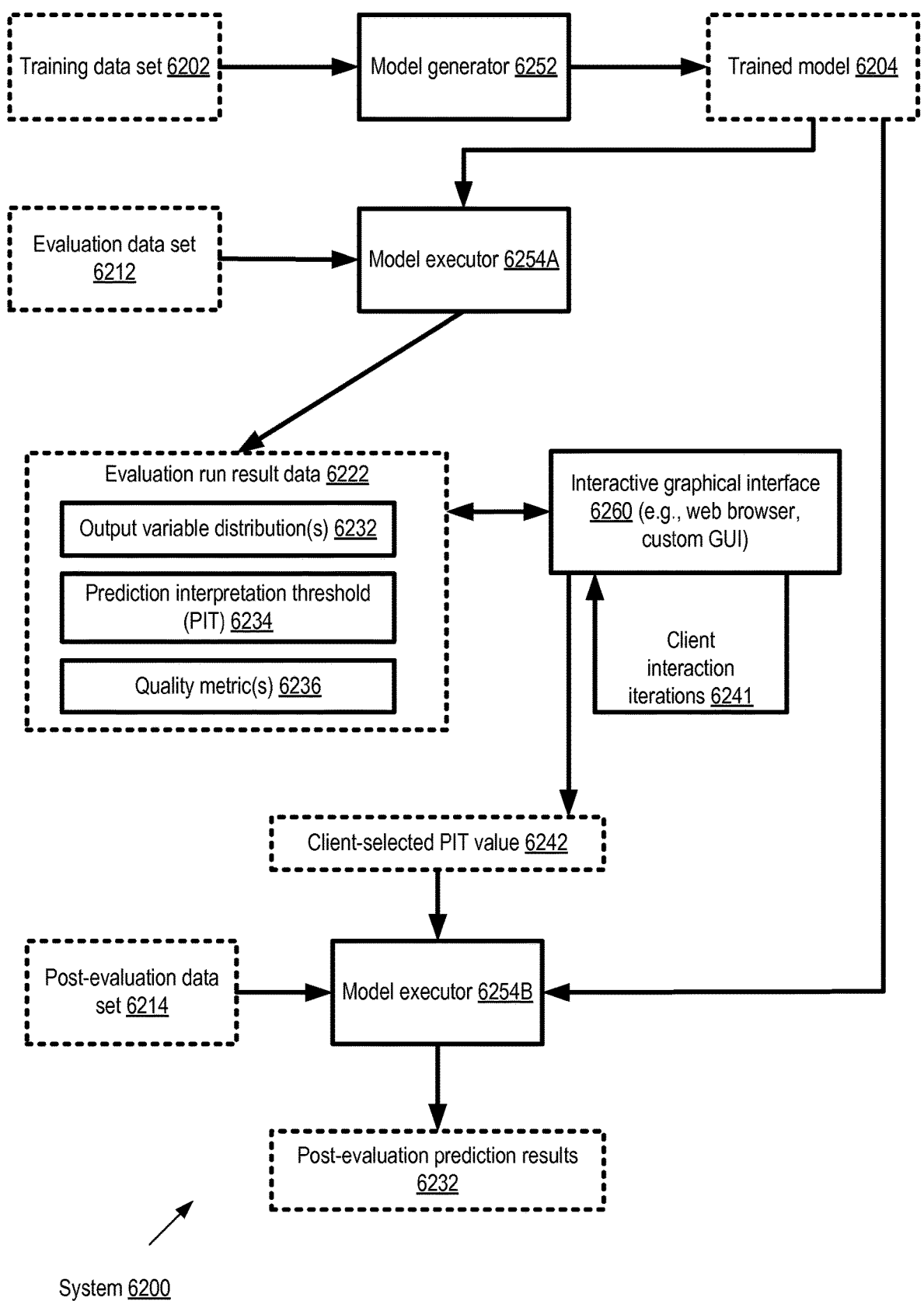
FIG. 62 illustrates an example system environment in which a machine learning service implements an interactive graphical interface enabling clients to explore tradeoffs between various prediction quality metric goals, and to modify settings that can be used for interpreting model execution results, according to at least some embodiments.

FIG. 62 illustrates an example system environment in which a machine learning service implements an interactive graphical interface enabling clients to explore tradeoffs between various prediction quality metric goals, and to modify settings that can be used for interpreting model execution results, according to at least some embodiments. In system 6200, one or more training data sets 6202 to be used for a model may be identified, e.g., in a training request or a model generation request submitted by a client of the MLS. Model generator 6252 may use the training data sets 6202 to train a model 6204 to predict values of one or more output variables for an observation record, based on the values of various input variables (including, for example, results of applying feature transformations of the kinds described earlier to raw input data).

After the model 6204 has been trained to a sufficient extent, one or more evaluation runs may be performed in the depicted embodiment using observation records (which were not used to train the model) for which the values of the output variable(s) are known, e.g., to determine how good the model's predictions are on observations that it has not examined during training Evaluation data set 6212 may comprise such observation records in system 6200. The trained model 6204 may be provided the evaluation data set 6212 as input by model executor 6254A (e.g., a process running at one of the MLS servers of server pools 185 shown in FIG. 1). Respective jobs (similar to the jobs illustrated in FIG. 4) may be scheduled for training the model and for evaluating the model in at least some embodiments.

At least some of the results of the evaluation may be packaged for display to the client or user on whose behalf the evaluation was conducted in the depicted embodiment. For example, a set of evaluation run result data 6222 may be formatted and transmitted for an interactive graphical interface 6260 (e.g., a web browser, or a custom GUI tool that may have been installed on a client computing device). The result data set 6222 may include, for example, some combination of the following: statistical distributions 6232 of one or more output variables of the evaluation run, one or more currently selected or MLS-proposed values of prediction interpretation thresholds (PITs) 6234 (e.g., cutoffs for binary classification), and/or values of one or more quality metrics 6236 (e.g., accuracy, false positive rate, etc.) pertaining to the evaluation run. In some embodiments, depending for example on the type of graphical interface being used, instructions or guidelines on how the result data is to be displayed (e.g., web page layout details) may also be transmitted from a back-end MLS server to the device at which the graphical view of the data is to be generated. The interactive graphical interface 6260 may include various controls allowing clients to view the results of the evaluation during a given interaction session, experiment with various prediction settings such as classification cutoffs and the like, and observe the tradeoffs associated with making changes to such settings. Examples of components of the interactive graphical display, as well as various controls that may be used in different embodiments are shown in FIG. 63-FIG. 69.

The client to whom the evaluation result data is displayed may use one or more of the controls to indicate desired or target values for one or more settings. The selection of target values may involve several client interaction iterations 6241 during a given session, in which for example, a client may make one change, observe the impact of that change, undo that change, then make another change and view its impact, and so on. Ultimately, in at least some cases, the client may select a particular setting such as a target value for a prediction interpretation threshold (PIT) 6242. The target value selected may differ from the PIT value 6234 that may have been initially proposed by the MLS in at least some scenarios, although the client may in some cases decide not to change the proposed PIT value. In at least one implementation, the client-selected PIT value 6242 may be stored in a repository of the MLS, e.g., artifact repository 120 of FIG. 1. The saved PIT value 6242 may be used for generating results of one or more subsequent runs of trained model 6204, e.g., runs that may be performed using a model executor 6254A on post-evaluation or production data set 6214. It is noted that the same model executor 6254A (e.g., the same back-end MLS server) may be used for both the evaluation run and the post-evaluation runs of the trained model in at least some embodiments.

Figure 63:
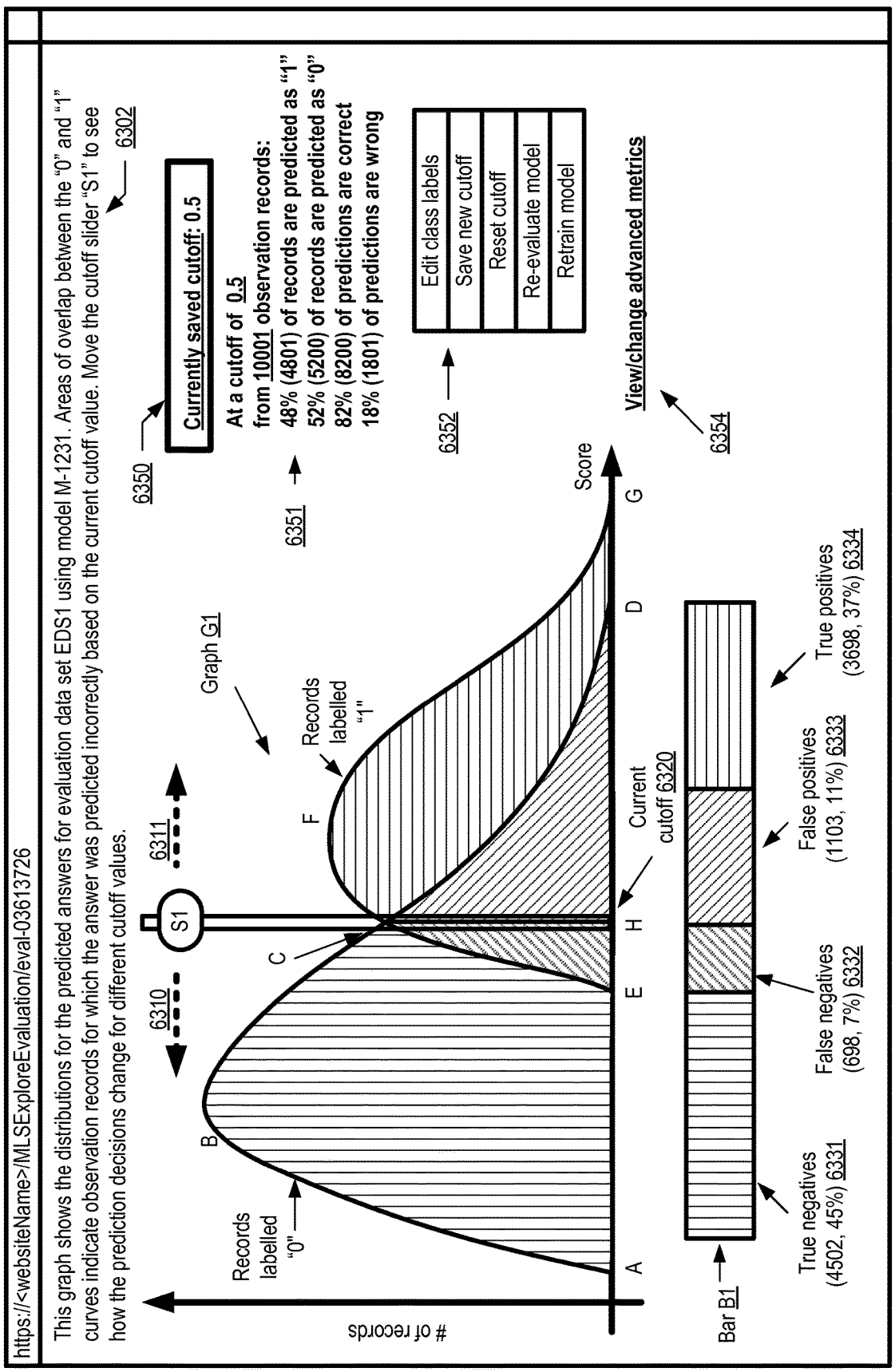
FIG. 63 illustrates an example view of results of an evaluation run of a binary classification model that may be provided via an interactive graphical interface, according to at least some embodiments.

FIG. 63 illustrates an example view of results of an evaluation run of a binary classification model that may be provided via an interactive graphical interface, according to at least some embodiments. In the depicted embodiment, the results may be displayed in a web page 6300 that forms part of a browser-based console for interactions with the machine learning service. In other embodiments, a similar view with interactive controls may be provided using a standalone GUI (e.g., a thin client program or a thick client program executing at a customer's computing device such as a laptop, desktop, tablet, or smart phone) which does not require the use of a web browser.

Message area 6302 of web page 6300 indicates that the data being displayed corresponds to a particular evaluation run of a model ("M-1231") in which a particular data set "EDS1" was used as input to the model. M-1231 is a binary classification model in the depicted example—i.e., a model whose goal is to classify observation records of the evaluation data set EDS1 into one of two classes, such as classes simply labeled "0" and "1". The message area also includes explanatory text pertaining to graph G1 and the use of the slider control S1.

Graph G1 illustrates the distribution of an output variable labeled "Score": that is, the X axis represents values of Score while the Y-axis indicates the number of observation records of the evaluation data set EDS1. Each of the observation records is placed in one of the two classes "0" and "1" based on the Score values and a class boundary called a "cutoff". For example, if the Score values are real numbers within the range 0 and 1, and the cutoff value is set to 0.5, an observation record of EDS with a Score of 0.49 would be placed in the "0" class, while an observation record with a Score of 0.51 would be placed in the "1" class in the depicted scenario. The cutoff value for a binary classification represents one example of a prediction interpretation threshold (PIT); other prediction interpretation thresholds may be used in various types of machine learning problems. For example, in some types of regression problems, the boundaries of the sub-range of an output variable that represent predictions within an acceptable mean-squared error range (e.g., mean-squared-error values between X and Y) may serve as prediction interpretation thresholds. For n-way classification, the boundary values for one or more output variables that are used to decide which of N classes a particular observation record is to be placed in (or whether the observation record should be considered unclassified) may represent the prediction interpretation thresholds.

Each of the observation records in EDS may include a label "0" or "1" in the illustrated example, indicating the "ground truth" regarding the observation record. These labels are used to divide the observation records for plotting graph G1—e.g., records whose label is "0" are indicated using the curve "Records labeled "0"", while the remaining records are indicated using the curve "Records labeled "1"". Within each of the two groups, given a value of 0.5 for the cutoff (as indicated in element 6350 of page 6300), some observation records are placed in the correct class, while others are placed in the incorrect class. If the ground truth value is "0" for a given observation record, and the Score is less than the cutoff, a correct classification result called a "true negative" results—that is, the correct value of the label is "0", and the class selected using the cutoff matches the correct value. If the ground truth value is "1" and the Score is higher than the cutoff, a correct classification called a "true positive" results. If the ground truth value is "0" and the Score is higher than the cutoff, an incorrect classification called a "false positive" results. Finally, if the ground truth value is "1" and the Score is lower than the cutoff, the observation record is placed in the "0" class, and an incorrect classification called a "false negative" results. The four types of decisions that are possible for a given observation record in a binary classification problem (true positive, true negative, false positive and false negative) may be referred to as respective "prediction interpretation decisions" herein. Other types of prediction interpretation decisions may be made when other types of machine learning models.

In graph G1, the area bounded by the curves ABCEA represents the true negatives, and the area bounded by the curves CFGD represents the true positives. The region of intersection between the curves representing "0" and "1" labels represents erroneous classification decisions. False positives are represented by the intersection area HCD to the right of the current cutoff value 6320, while false negatives are represented by the intersection area CHE to the left of current cutoff value 6320. The relative numbers of decisions of the four types—true negatives 6331, true positives 6334, false negatives 6332 and false positives 6333, are also shown in bar B1 below graph G1. In at least some embodiments, the percentages and/or the actual counts of the observation records in the evaluation data set corresponding to the four types of prediction interpretation decisions may be shown in web page 6300. For example, in FIG. 63, 4502 or 45% of the observation records of EDS1 correspond to true negatives, 698 or 7% are false negatives, 1103 or 11% are false positives, and the remaining 3698 records of EDS1, or 37%, are true positives.

In addition to displaying the results of the evaluation run using graphs such as G1 and bars such as B1, web page 6300 may also indicate at least some metrics in a tabular form in the depicted embodiment. For example region 6351 of the web page may indicate the total number of observation records of EDS1, the cutoff value, the number/percentage of records placed in the "1" class (the sum of the false positives and the true positives) and in the "0" class (the sum of the true negatives and the false negatives), the number/percentage of records for which the classification decision was made correctly (the sum of the true negatives and true positives) and the number/percentage of records for which an incorrect decision was made (the sum of the false positives and the false negatives). Other metrics may be displayed in some embodiments.

Figure 64A:
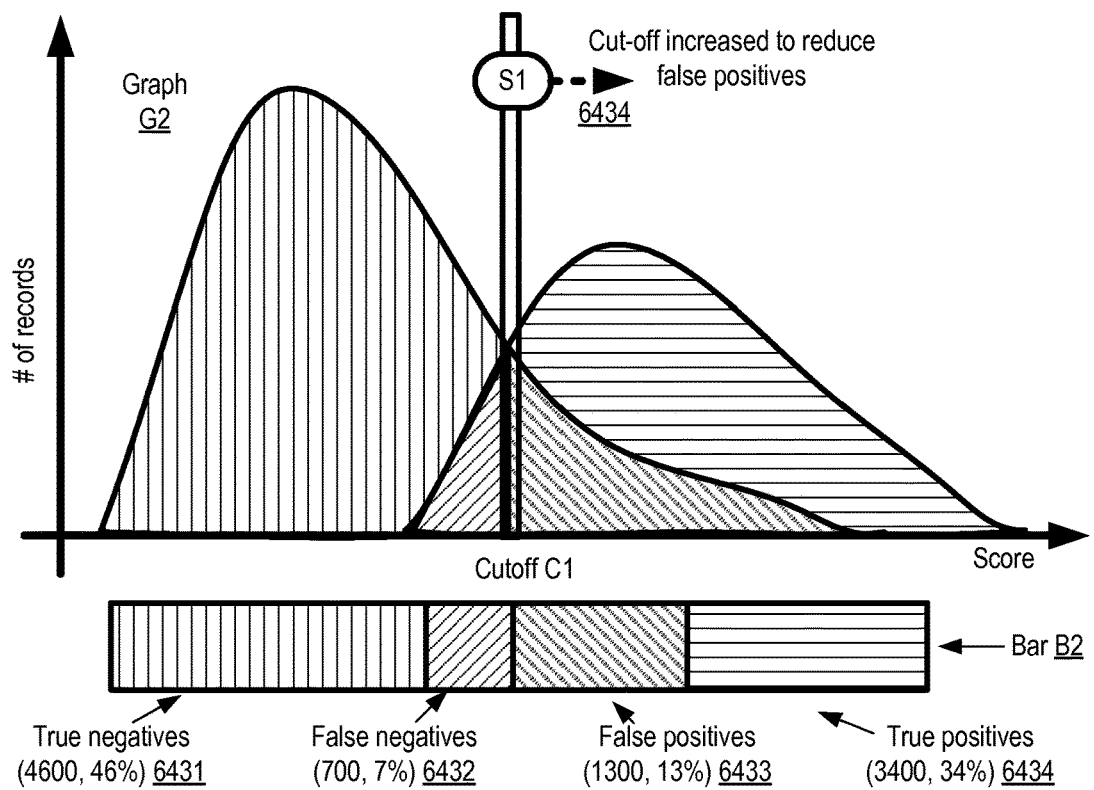
FIGS. 64*a* and 64*b* collectively illustrate an impact of a change to a prediction interpretation threshold value, indicated by a client via a particular control of an interactive graphical interface, on a set of model quality metrics, according to at least some embodiments.
Figure 64B:
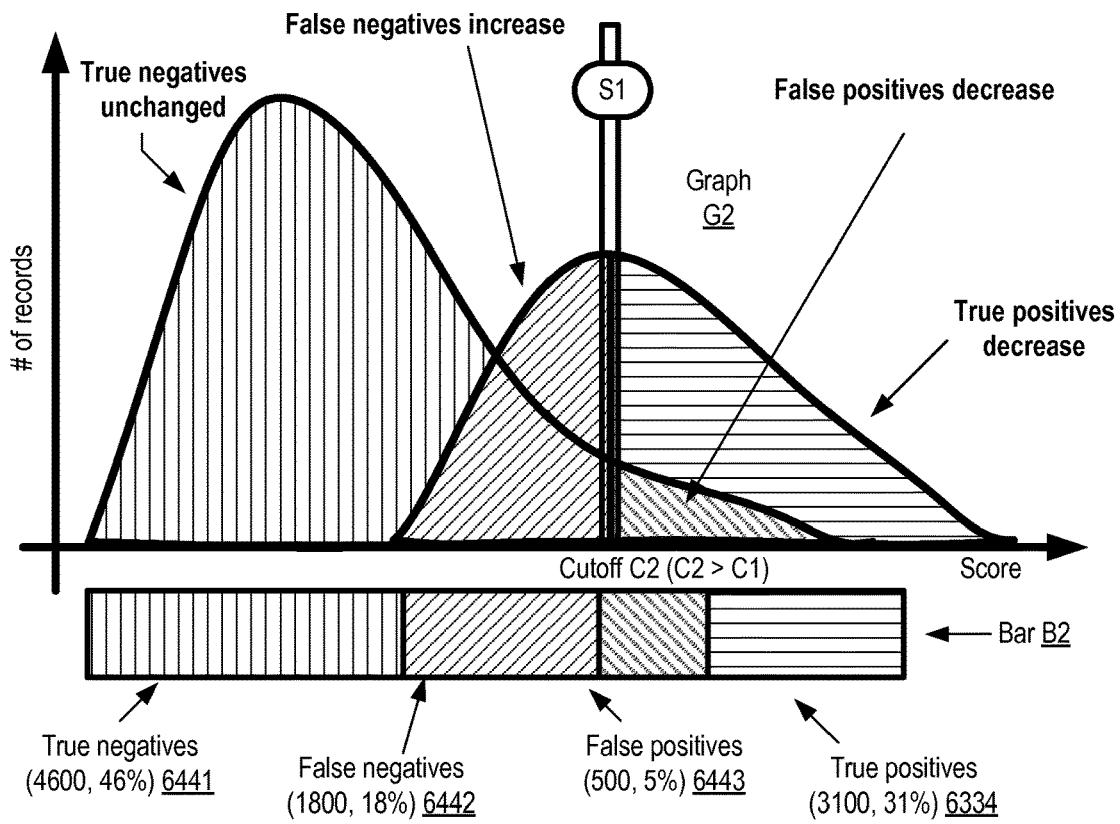

In web page 6300, a number of the graphic and/or text elements may be dynamically re-drawn or updated in response to user interaction. Thus, for example, a user granted the appropriate permissions may use a mouse (or, in the case of touch-screen interfaces, a stylus or a finger) to manipulate the slider control S1. S1 may be moved to the left (as indicated by arrow 6310) to decrease the cutoff value, or to the right (as indicated by the arrow 6311) to increase the cutoff value. As the cutoff value is changed, the number of observation records that fall into some or all of the four decision groups may change (as illustrated in FIG. 64*a* and FIG. 64*b* and discussed in further detail below), and such changes may be updated in real time on web page 6300. In addition, the values of the metrics shown in region 6351 may also be dynamically updated as the cutoff value is changed. Such dynamic updates may provide a user an easy-to-understand view of the impact of changing the cutoff value on the metrics that are of interest to the user. In some embodiments, users may be able to change the set of metrics whose values are displayed and updated dynamically, e.g., either the metrics whose values are shown by default or "advanced" metrics that are displayed as a result of clicking on link 6354. In some implementations, other visual cues such as color coding, lines of varying thickness, varying fonts etc. may be used to distinguish among the various parts of Graph G1, Bar B1, region 6351 etc.

In at least some embodiments, the machine learning service may save a cutoff value (or other prediction interpretation threshold values) currently associated with a given model in a repository. In one embodiment, the initial proposed value of the cutoff may be selected by the MLS itself, and this value (e.g., 0.5 in the example scenario shown in FIG. 63) may be stored as the default. An authorized user may use an interface such as web page 6300 to explore the impact of changing the cutoff, and then decide that a new value of the cutoff should be used for one or more subsequent runs (e.g., either additional evaluation runs, or post-evaluation production runs) of the model. The MLS may be instructed to save a new value of the cutoff for future runs using the "Save new cutoff" button of button control set 6352 of web page 6300. As discussed below in further detail, in some embodiments users may be able to change the class labels (such as "0" and "1") to more meaningful strings, e.g., using the "Edit class labels" button control. The cutoff may be re-set to its default value using the "Reset cutoff" button control. In at least some embodiments, a user who is dissatisfied with the evaluation results being displayed may submit a request to re-evaluate the model or re-train the model via web page 6300, e.g., using button controls "Re-evaluate model" or "Re-train model" shown in button control set 6352. Some of the requests may require further interaction with the client for the MLS back-end to determine additional parameters (e.g., a new evaluation data set may be specified for a re-evaluation). A different web page may be displayed in response to a client's click on one of the buttons 6352 in the depicted embodiment to enable the indication of the additional parameters. Other types of controls than those shown in FIG. 63 may be implemented in various embodiments to achieve similar types of functions for various model types. In some embodiments, continuous-variation controls elements may be implemented to enable clients to change settings such as cutoff values smoothly, while in other embodiments, discrete-variation control elements may be used that allow users to choose from among a few discrete pre-d values.

FIGS. 64a and 64b collectively illustrate an impact of a change to a prediction interpretation threshold value, indicated by a client via a particular control of an interactive graphical interface, on a set of model quality metrics, according to at least some embodiments. FIG. 64a illustrates the results of an evaluation run of a binary classification model with the cutoff set to a value C1. With this cutoff value, as indicated in graph G2 and bar B2, true negative decisions are made for 4600 observation records of an example evaluation data set (46% of the total), while true positive decisions are made for 3400 observation records. 700 decisions are false negatives, and 1300 are false positives.

Depending on the application, a client may assign different priorities or different importance levels to various quality metrics pertaining to a model. For example, if the negative business consequences of false positive classifications are much higher than the negative business consequences of false negatives, the client may decide that the interpretation threshold(s) for the model should be changed in a direction such that, in general, fewer false positive decisions would be likely to occur. Consider a scenario in which a binary classification model is being used to determine whether a particular customer of an on-line business has attempted a fraudulent transaction (by using someone else's credit card, for example). If an observation record is classified as a "1", the corresponding customer may be contacted and informed that their transaction is suspected to be a fraudulent transaction. This means that, if a false positive decision is made, a client may be falsely accused of fraudulent behavior. In such a scenario, the e-business operator may decide that if a tradeoff is to be made between false negatives and false positives, they would prefer more false negatives than false positives. The opposite tradeoff may be preferable in scenarios in which the real-world consequences of false negatives are much higher—e.g., in tumor detection applications in which treatment for a possible tumor may be denied to a patient whose observation is incorrectly classified as a false negative.

For the particular machine learning problem being addressed in the example scenario of FIG. 64a, the client has determined that the rate of false positives is too high, and has therefore decided to increase the cutoff value from C1 to C2 using slider S1, as indicated by arrow 6434. The impact of the increase is illustrated in FIG. 64b. As the slider is moved towards the right, the visual properties (e.g., shadings, colors etc.) of several sub-areas of the graph G2 that would be affected by the changed cutoff may be changed in real time. For example, the number of false positives decreases as intended, falling from 1300 (in FIG. 64a) to 500 (in FIG. 64b). While the number of true negatives remains unchanged at 4600, the number of false negatives increases substantially, from 700 to 1800. The number of true positives decreases somewhat as well, from 3400 to 3100. The dynamic visualization of the effects of changing the cutoff may help the MLS client make more informed decisions in various embodiments than may have been possible if only text representations of the various metrics were provided. In addition, providing only text representations may make it harder to decide on a particular target for a cutoff or other similar prediction interpretation threshold, because it may be much harder in the text-only scenario to understand the rates of change of the various metrics around specific values of the threshold. For example, small changes to the cutoff value may have much larger impacts on the false positive rates or false negative rates in some sub-ranges of the Score values than others, and such higher-order effects may be hard to appreciate without dynamically updated graphs such as those shown in FIGS. 64a and 64b.

Figure 65:
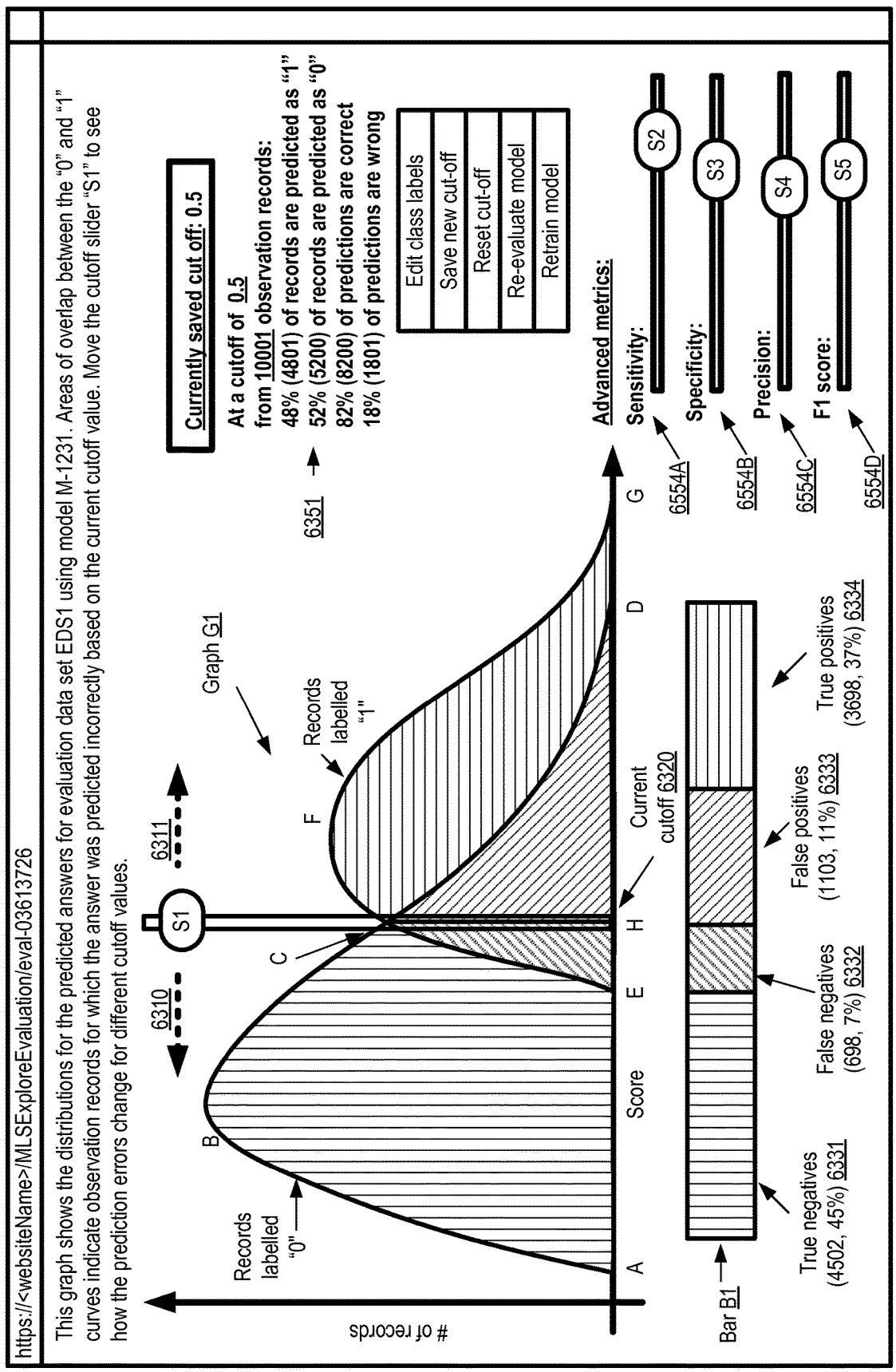
FIG. 65 illustrates examples of advanced metrics pertaining to an evaluation run of a machine learning model for which respective controls may be included in an interactive graphical interface, according to at least some embodiments.

As indicated in FIG. 63, a number of different prediction quality metrics may be shown either in tabular form (as in region 6351) or using graphical elements in various embodiments. FIG. 65 illustrates examples of advanced metrics pertaining to an evaluation run of a machine learning model for which respective controls may be included in an interactive graphical interface, according to at least some embodiments. Much of the content displayed in FIG. 63 is identical to the content of web page 6300 of FIG. 63. The main difference between FIG. 63 and FIG. 65 is that as a result of the user clicking on link 6354 of web page 6300, additional metrics (beyond those shown in region 6351) are now being displayed. In the depicted example, respective horizontal slider controls 6554 are shown for prediction quality metrics sensitivity (slider 6554A), specificity (slider 6554B), precision (slider 6554C) and F1 score (slider 6554D). In at least some embodiments, clients may be able to decide which metrics they wish to view and/or modify, either as part of the region 6351 displaying a default or core group of metrics, or in an advanced metrics region. The metrics available for display and/or manipulation may vary depending on the type of model in various embodiments, and may include, among others: an accuracy metric, a recall metric, a sensitivity metric, a true positive rate, a specificity metric, a true negative rate, a precision metric, a false positive rate, a false negative rate, an F1 score, a coverage metric, an absolute percentage error metric, a squared error metric, or an AUC (area under a curve) metric. In some embodiments, clients may be able to use the interface to move metrics between the core metrics group and the advanced metrics group, and/or to define additional metrics to be included in one or both groups.

In the embodiment illustrated in FIG. 65, the combination of the sliders 6554A-6554D and slider S1 may be used by a client to visually explore the relationships between different metrics. For example, changing the cutoff using slider S1 may result in dynamic updates to the positions of sliders 6554A-6554D (as well as updates to the bar B1 and to region 6351), visually indicating how the cutoff value influences sensitivity, specificity, precision and the F1 score. Changing the position of any one of the sliders 6554A-6554D may result in corresponding real-time changes to S1, bar B1, and the remaining sliders 6554. In some embodiments, clients may be able to change the layout of the various regions displayed in the interactive interface, e.g., by choosing the particular types of controls (sliders, knobs, etc.) to be used for different metrics, which metrics are to be directly modifiable using graphical controls and which metrics are to be shown in text format.

Figure 66:
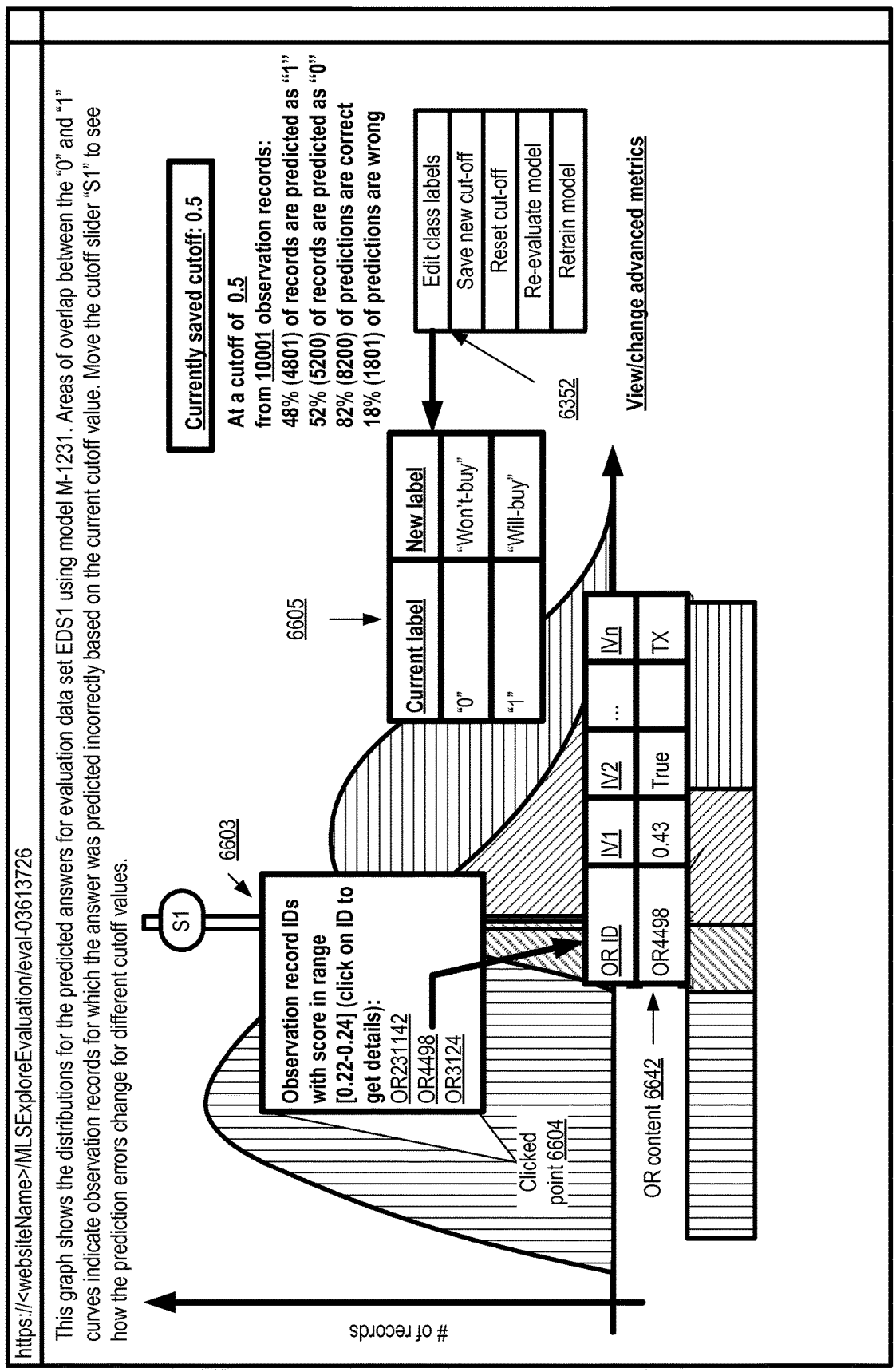
FIG. 66 illustrates examples of elements of an interactive graphical interface that may be used to modify classification labels and to view details of observation records selected based on output variable values, according to at least some embodiments.

FIG. 66 illustrates examples of elements of an interactive graphical interface that may be used to modify classification labels and to view details of observation records selected based on output variable values, according to at least some embodiments. In the depicted embodiment, the MLS (or the client on whose behalf the model is trained and evaluated) may have initially selected the default names "0" and "1" for the classes into which observation records are to be placed. Later, the client may decide that more user-friendly names should be used for the classes. Accordingly, in the depicted embodiment, the "Edit class labels" button may be clicked, and a smaller pop-up window 6605 may be displayed. In window 6605, the user may enter new names for the labels, such as "Won't buy" (replacing the label "0") and "Will-buy" (replacing the label "1") indicating that the model is classifying shoppers based on predictions about the likelihood that the shoppers will make a purchase (the "1" class) or will not make a purchase (the "0" class).

A number of other controls may be provided to users of the interactive graphical interface of the MLS in various embodiments. In some embodiments, for example, clients may wish to examine the details of observation records for which a particular Score was computed by the model. In the embodiment illustrated in FIG. 66, a user may mouse click at various points within graph G1 (e.g., at point 6604, corresponding to a Score of approximately 0.23), and the interface may respond by displaying a list 6603 of observation records with Score values close to that indicated by the clicked-at point. Other types of interfaces, such as a fingertip or a stylus, may be used in other implementations. When the client clicks at point 6604, in the depicted example, a list 6603 of three observation records OR231142, OR4498 and OR3124 with corresponding links may be shown. If and when the client clicks on one of the identifiers of the observation records of the list, the values of various variables of that observation record may be displayed in another window or panel, such as OR content panel 6642 in the depicted example. The values of input variables IV1, IV2, . . . , IVn of observation record OR4498 may be shown as a result of a click on the corresponding link of list 6603 in the example illustrated in FIG. 66.

Figure 67:
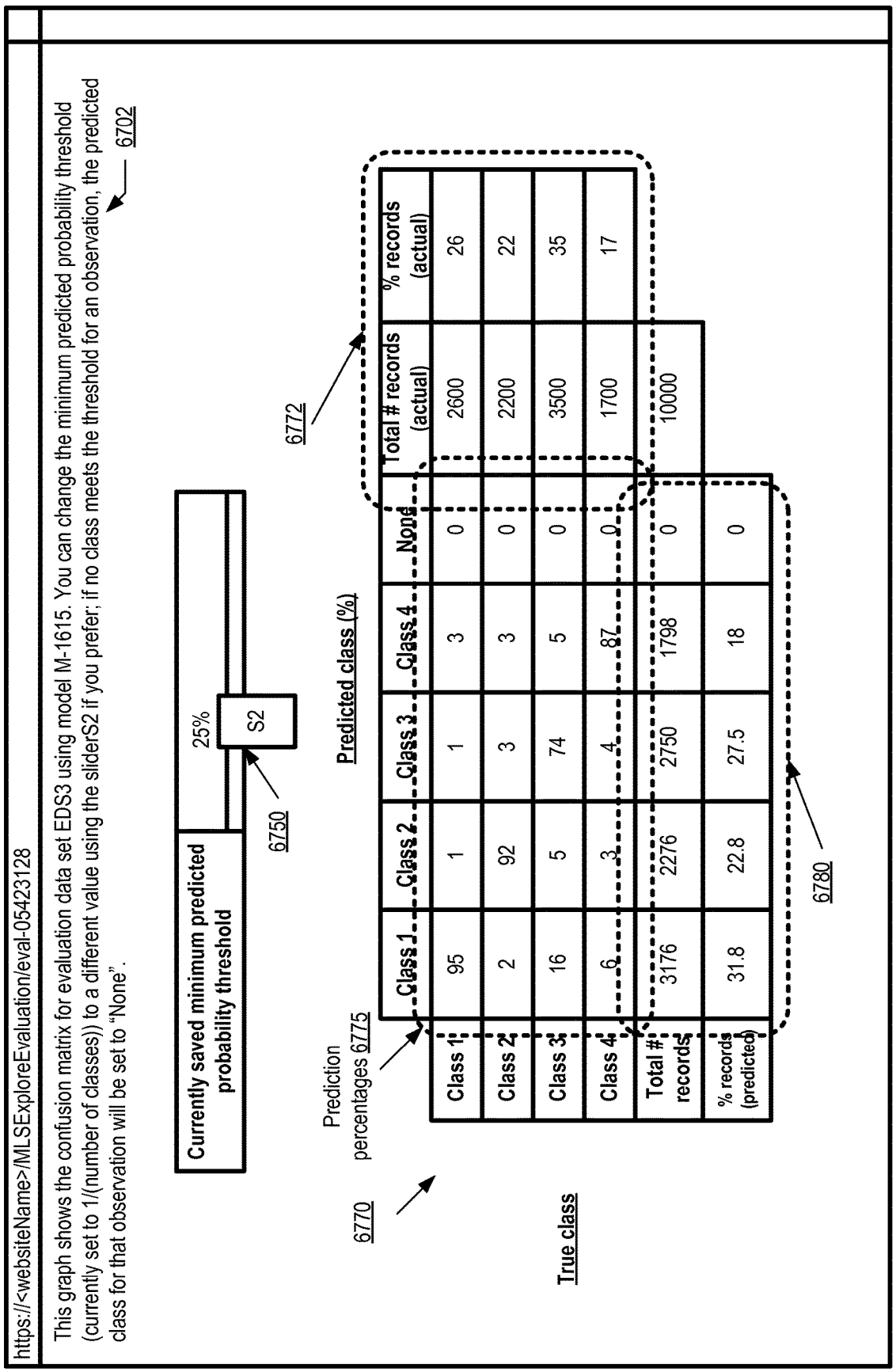
FIG. 67 illustrates an example view of results of an evaluation run of a multi-way classification model that may be provided via an interactive graphical interface, according to at least some embodiments.

In FIG. 63-FIG. 66, display views and interactions pertaining to evaluations of binary classification models were illustrated. Similar displays allowing MLS clients to explore and interact with evaluation results for other types of models may be supported in at least some embodiments. FIG. 67 illustrates an example view of results of an evaluation run of a multi-way classification model that may be provided via an interactive graphical interface, according to at least some embodiments. As shown, web page 6700 includes a message area 6702 indicating that the data being displayed corresponds to a particular evaluation run of a model ("M-1615") in which a particular data set "EDS3" was used as input to the model. An enhanced confusion matrix 6770 for a 4-way classification is shown for the evaluation run. For four classes, "Class 1" through "Class 4", the actual or true populations (and corresponding actual percentages) are shown in the columns labeled 6772. These four classes may collectively be referred to herein as "non-default classes".

The model "M-1615" categorizes observation records into five classes (the four non-default classes "Class 1" through "Class 4" as well as a default class labeled "None") based on at least two factors in the depicted embodiment: (a) predicted probabilities that any given observation record belongs to any of the four non-default classes and (b) a minimum predicted probability threshold (MPPT) for placing a record into a non-default class instead of the default class. For each observation record of the evaluation data set EDS3, respective probabilities of that record belonging to each of the non-default classes may be computed. If any one of the four predicted probabilities exceeds the MPPT, the record may be placed into the corresponding category. For example, consider a scenario in which the MPPT is set to 25%, and the model predicts that the probability that a given record OR1 belongs to the four non-default classes is 67% ("Class 1"), 35% ("Class 2"), 2% ("Class 3") and 6% ("Class 4"). In this case, OR1 would be placed in "Class 1" since 67% exceeds the MPPT value 25%. If the MPPT was changed, for example to 70% using the slider 6750, OR1 would be placed in the "None" class instead because 67% is less than 70%, and the user would be able to view the changes dynamically being updated in matrix 6770. In at least some embodiments, the default or proposed MPPT value may be set by the MLS to (1/(the number of non-default classes)) (e.g., for four non-default classes, the model would propose ¼ or 25% as the MPPT). The MPPT may thus be considered an example of a prediction interpretation threshold (PIT) for multi-way classification models.

The percentages of observations of each class that were placed in each of the five categories are shown in the 4×5 predicted percentages matrix 6775. In the depicted example, as indicated in columns 6772, out of 10000 total observations, 2600 observation records were actually in "Class 1", while the model predicted that a total of 3176 observation records belonged to "Class 1" as indicated in region 6780. Out of the 2600 observations that actually belonged to "Class 1", 95% were correctly predicted as belonging to "Class 1", 1% were incorrectly predicted as belonging to "Class 2," 1% to "Class 3", 3% to "Class 4", and 0% to "None" with the current value of MPPT. In addition to the matrix elements shown in FIG. 67, other metrics (such as the overall accuracy of the predictions) may be indicated using similar techniques as those illustrated in FIG. 63—e.g., a set of core metrics pertaining to multi-way classification or a link to view advanced metrics may be provided in various embodiments. In some embodiments, users may be able to specify respective MPPTs for different classes and may be able to view the effects of those changes dynamically. In at least one embodiment, the matrix elements may be color coded—e.g., as a percentage gets closer to 100%, the corresponding element's color or background may be set closer to dark green, and as a percentage gets closer to 0%, the corresponding element's color or background may be set closer to bright red.

Figure 68:
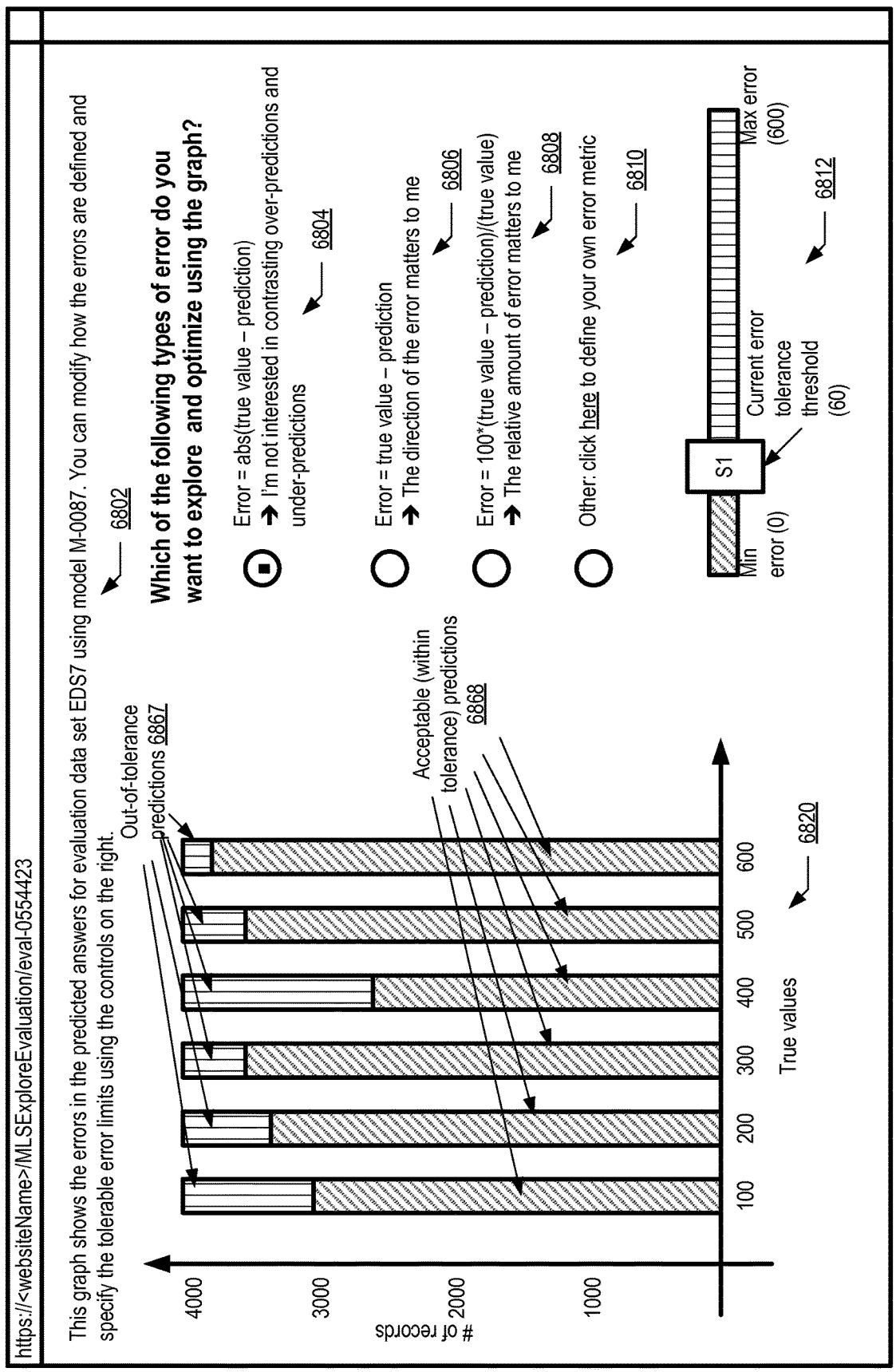
FIG. 68 illustrates an example view of results of an evaluation run of a regression model that may be provided via an interactive graphical interface, according to at least some embodiments.

In some embodiments, the MLS may provide an interactive graphical display to enable users to define or select exactly how prediction errors for regression models are to be defined, and/or to explore the distribution of the prediction errors for selected error tolerance thresholds. FIG. 68 illustrates an example view of results of an evaluation run of a regression model that may be provided via an interactive graphical interface, according to at least some embodiments. As shown, web page 6800 includes a message area 6802 indicating that the data being displayed corresponds to a particular evaluation run of a model ("M-0087") in which a particular data set "EDS7" was used as input to the model. On the right side of page 6800, the client is provided several different options to select the error definition of most interest, and a slider S1 in region 6812 is provided to indicate the error tolerance threshold to be used for displaying error distributions in graph 6800. The absolute value of the difference between the predicted value of the output variable and the true value has currently been selected as the error definition (as indicated by the selected radio button control in region 6804). The slider S1 is currently positioned to indicate that errors with values no greater than 60 (out of a maximum possible error of 600 in view of the current error definition of region 6804) are tolerable. In graph 6820, the distribution of the acceptable predictions (i.e., predictions within the tolerance limit currently indicated by slider S1) and the out-of-tolerance predictions for different ranges of the true values is shown. As the slider S1 is moved to the left or the right, the boundaries between the acceptable predictions 6868 and the out-of-tolerance predictions 6867 may change. If the client wishes to use a different definition of error, several choices are available. For example, by selecting the radio button in region 6806 instead of the button in region 6804, the client could define error as the (non-absolute) arithmetic difference between the true value and the predicted value, indicating that the direction of the predicted error is important to the client. Using the radio button in region 6808, both the direction of the error and its value relative to the true value may be included in the error definition. Some users may wish to indicate their own definitions of error, which may be done by selecting the radio button in region 6810 and clicking on the provided link. When the client changes the definition of the error, the maximum error in the error tolerance slider scale of region 6812 may also be changed accordingly in at least some embodiments. Using the kinds of interactive controls shown in FIG. 68, MLS clients may be able to select the most appropriate definitions of error for their particular regression problem, and also to determine (based on their error tolerance levels) the ranges of output values for which the largest and smallest amounts of error were predicted. Other types of interactive visualizations for regression models may also or instead be displayed in some embodiments.

Figure 69:
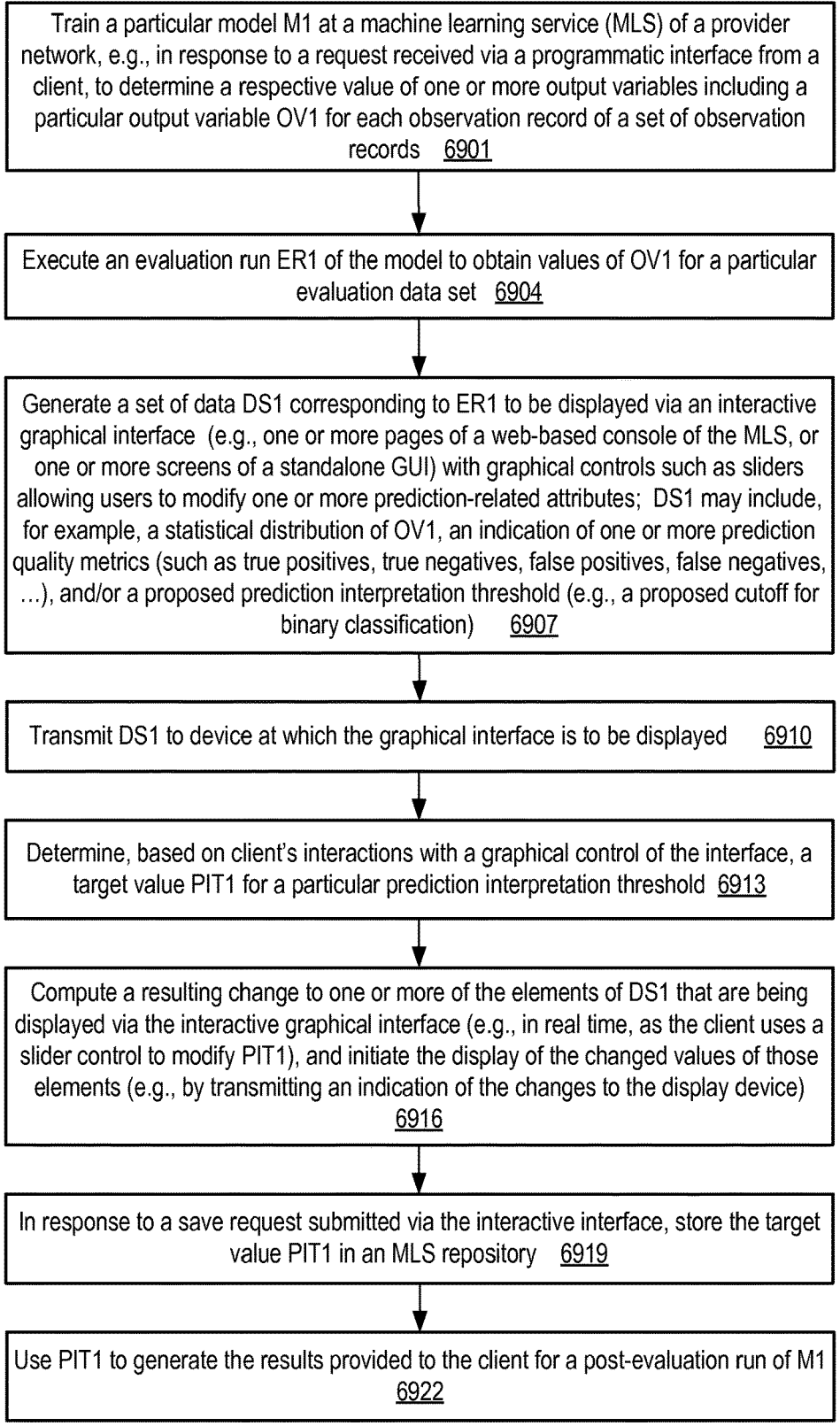
FIG. 69 is a flow diagram illustrating aspects of operations that may be performed at a machine learning service that implements interactive graphical interfaces enabling clients to modify prediction interpretation settings based on exploring evaluation results, according to at least some embodiments.

FIG. 69 is a flow diagram illustrating aspects of operations that may be performed at a machine learning service that implements interactive graphical interfaces enabling clients to modify prediction interpretation settings based on exploring evaluation results, according to at least some embodiments. As shown in element 6901, a particular model M1 may be trained at a machine learning service, e.g., in response to a request received via a programmatic interface from a client. The model may compute values of one or more output variables such as OV1 for each observation record of a given set of observation records. As shown in element 6904, an evaluation run ER1 may be conducted to obtain a respective OV1 value for each record of a given evaluation data set.

A data set DS1 representing at least a selected subset of results of the evaluation run ER1 may be generated for display via an interactive graphical display (element 6907). The interactive display for which DS1 is obtained may include various control elements such as continuous-variation slider elements and/or discrete-variation elements that can be used to vary one or more prediction-related settings, such as classification cutoffs and/or various other types of prediction interpretation thresholds. Any of a number of different data elements corresponding to ER1 may be included in data set DS1 for display, such as statistical distributions of OV1 or other output or input variables, one or more prediction quality metrics such as (in the case of a binary classification model evaluation) the number and/or percentage of true positives, false positives, true negatives and false negatives, as well as at least one proposed or default value of a prediction interpretation threshold. The data set DS1 may be transmitted to a device (e.g., a client-owned computing device with a web browser or a standalone GUI tool installed) on which the graphical interface is to be displayed (element 6910) in the depicted embodiment.

Based on the manipulations of one or more interactive controls of the graphical interface by a user, a target value for a particular prediction interpretation threshold (PIT1) such as a cutoff value for binary classification (element 6913) may be determined. The manipulations of the controls (which may be performed using a mouse, stylus, or a fingertip, for example) may be detected at the computing device where the graphics are being displayed, and may be communicated back to one or more other components (such as back-end servers) of the MLS in some embodiments, e.g., using invocations of one or more APIs similar to those described earlier. In other embodiments, indications of the manipulation of the controls need not be transmitted to back-end MLS servers; instead, some or all of the computations required to update the display may be performed on the device at which the graphical interface is displayed. A change to one or more other elements of DS1, resulting from the manipulation of the control, may be computed (element 6916), and the corresponding changes to the display may be initiated in real time as the user moves the control element. In one implementation, the changes to the position of a graphical control element such as a slider may be tracked as they are performed, and corresponding updated values of various metrics may be transmitted to the display device as quickly as possible, to give the user the impression of an instantaneous or near-instantaneous response to the manipulation of the graphical control element. If and when a user indicates that a particular target value of PIT1 is to be saved, e.g., for use during subsequent runs of the model, the target value may be stored in an MLS repository in the depicted embodiment (element 6919). In some embodiments, different PIT1 values may be saved for different combinations of models, users, evaluation data sets, and/or use cases—e.g., a repository record containing a selected PIT value may be indexed using some combination of a tuple (model ID, evaluation data set ID, user/client ID, use case ID).

Results of one or more post-evaluation model executions may be generated using the saved PIT1 value and provided to the interested clients (element 6922). In some embodiments, the saved PIT1 value may be used for other evaluations as well as or instead of being used for post-evaluation runs. In one embodiment, the initial request to train the model (or requests to retrain/re-evaluate the model) may also be received via elements of the interactive graphical interface. In some embodiments, the graphical interface may also display alerts or informational messages pertaining to model evaluations and/or other activities performed on behalf of a client, such as a list of anomalies or unusual results detected during a given evaluation run. The MLS may, for example, check how much the statistical distribution of an input variable of an evaluation data set differs from the statistical distribution of the same variable in the training data set in one embodiment, and display an alert if the distributions are found to be substantially different. In at least some embodiments, results of several different evaluation runs may be displayed in a single view of the interface (e.g., by emulating a 3-dimensional display in which results for different evaluation runs are shown at different "depths", or by computing the average results from the different evaluation runs).

In at least some embodiments, instead of or in addition to the kinds of web pages illustrated in FIG. 63-68, other types of interactive interfaces, such as command-line tools or application programming interfaces (APIs) may be used for accomplishing similar objectives. Thus, for example, an MLS client may submit one or more requests via a command-line tool or an API invocation to receive an indication of the distribution of prediction results of an evaluation run of various types of models, including classification and/or regression models. The client may interact with the interface (e.g., submit a new command, or invoke a different API) to indicate changes to prediction interpretation threshold values, and the corresponding changes to various metrics may be displayed accordingly (e.g., in text format). Similarly, the client may use the API or command line indicate that a particular interpretation threshold value is to be saved for use in subsequent runs of the model. In some embodiments, approximations of at least some of the graphical displays illustrated in FIGS. 63-68 may be provided using text symbols—e.g., a relatively crude version of a graph may be displayed using combinations of ASCII characters. Voice and/or gesture-based MLS interfaces may be used in some embodiments.

Detecting Duplicate Observation Records

For several types of machine learning problems, as discussed earlier, a collection of observation records may be split into several types of data sets for respective phases of model development and use. For example, some observations may be included in a training data set used to generate a model, and others may be included in one or more test or evaluation data sets to be used to determine the quality of the model's predictions. (For the following discussion regarding duplicate detection, the terms "test data set" and "evaluation data set" may be used synonymously herein; similarly, the process of determining the quality or accuracy of a model's predictions may be referred to either as "evaluation" or "testing" of the model.) One of the primary goals of using test data sets subsequent to training a model is to determine how well the trained model is able to generalize beyond the training data: that is, how accurately the trained model can predict output variable values for "new" observations that were not included in the training data set. If a test data set happens to include many observations that were also in the training data set, the accuracy of the predictions made using the test data set may appear to be high largely due to the duplication of the observation records between the training and test data sets, and not because of the model's superior generalization capability.

At a large-scale machine learning service (MLS) of the kind described herein, each of these data sets may potentially comprise millions of observation records, and it may sometimes be the case that at least some observation records may "leak" from a training data set to a corresponding test data set—e.g., due to errors in splitting the data between training and test data sets, or due to inadvertent use of similar or overlapping data files for training and testing phases. The probability of such data leakage may be even greater when the training and evaluation phases of a model are separated in time (e.g., by hours, days or weeks) and/or performed on different sets of MLS servers, as may be the case given the sizes of the training data sets and the distributed and parallel architecture of the MLS. In order to avoid scenarios in which an MLS customer wastes considerable amounts of time and/or money by inadvertently using overlapping or identical sets of data for training and evaluation, in at least some embodiments the MLS may provide support for efficient detection of observation records that are (or at least are likely to be) duplicates across data sets. In the absence of such support, the customer may wait until the end of a test or evaluation run, examine the results of the run, and only then be able to make a subjective judgment (e.g., if the results seem unexpectedly accurate) as to whether the test data included training data observation records. Using the duplicate detection capabilities as described below, MLS customers may be informed relatively early during the processing of a given data set DS1 (such as a test data set for a model) whether DS1 has a high probability of containing records that were also in a second data set DS2 (such as the training data set for the model), and may thereby be able to avoid wasting resources. In at least one implementation, such duplicate detection may be performed by default for at least some data sets, without requiring explicit client requests.

Figure 70:
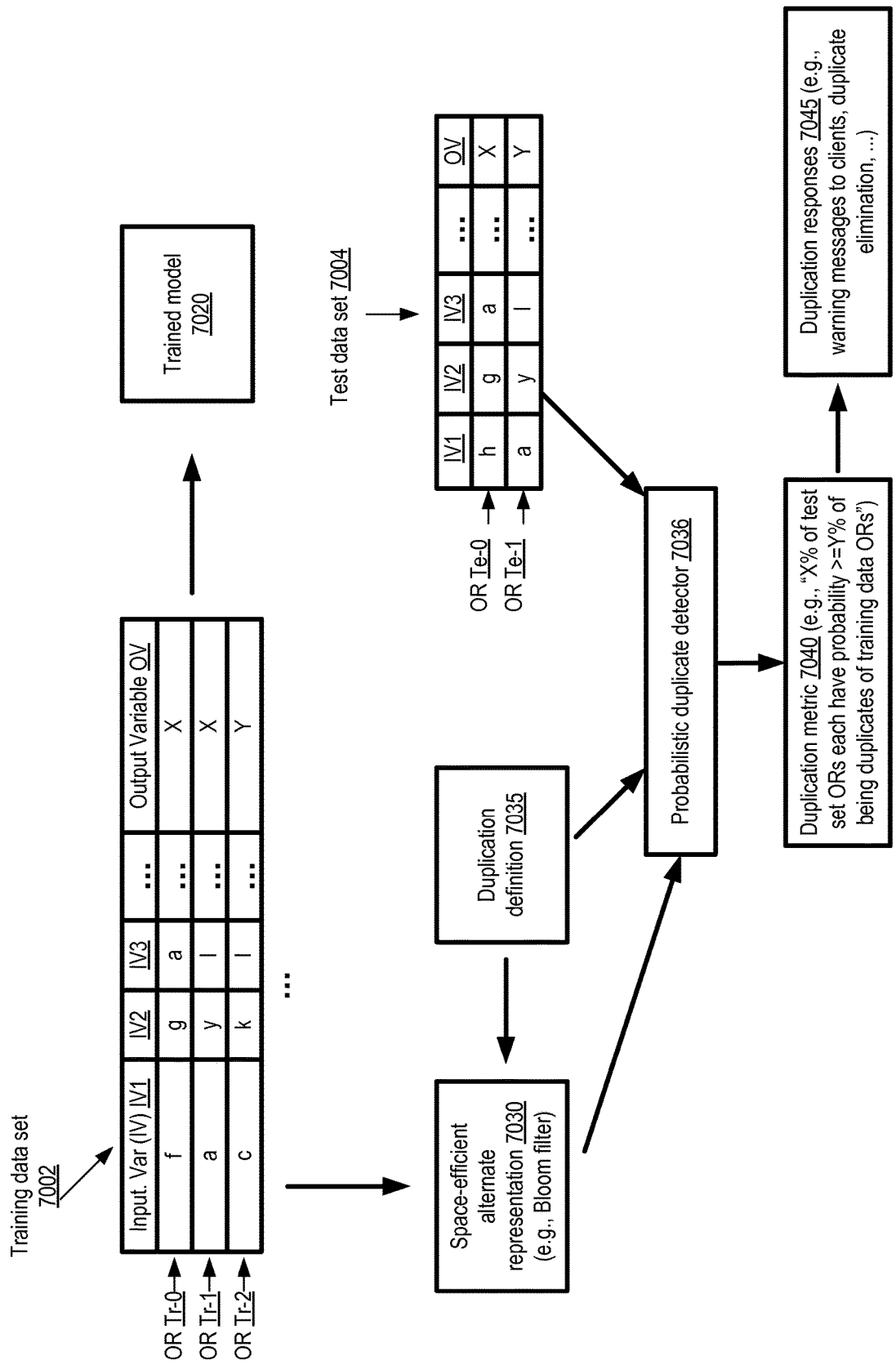
FIG. 70 illustrates an example duplicate detector that may utilize space-efficient representations of machine learning data sets to determine whether one data set is likely to include duplicate observation records of another data set at a machine learning service, according to at least some embodiments.

FIG. 70 illustrates an example duplicate detector that may utilize space-efficient representations of machine learning data sets to determine whether one data set is likely to include duplicate observation records of another data set at a machine learning service, according to at least some embodiments. A training data set 7002 to be used to train a particular machine learning model 7020 may be identified at the MLS in the depicted embodiment, e.g., as a result of a client's invocation of a programmatic interface of the MLS such as the "createModel" interface described earlier. Later, the client on whose behalf the model was trained may wish to have the quality of the model 7020 evaluated using a test data set 7004, or the MLS itself may identify the test data set 7004 to be used for the evaluation. Each of the data sets 7002 and 7004 may include some number of observation records (ORs), such as ORs Tr-0, Tr-1, and Tr-2 of training data set 7002, and ORs Te-0 and, Te-1 of the test data set 7004. Individual ones of the ORs of either data set may comprise respective values for some number of input variable (IVs) such as IV1, IV2, and so on, as well as one or more output variables OV. Not all of the ORs of either data set may necessarily contain values for all the IVs in at least some embodiments—e.g., the values of some input variables may be missing in some observation records. In at least some cases, a test data set 7004 may not necessarily have been identified at the time that the model 7020 is trained using training data set 7002.

In the depicted embodiment, at least one space-efficient alternate representation 7030 of the training data set which may be used for duplicate detection, such as a Bloom filter, may be constructed. In some embodiments, other types of alternate representations may be constructed, such as skip lists or quotient filters. In order to construct a given space-efficient representation 7030, a corresponding definition 7035 of duplication may be used in some embodiments, such as a definition that indicates whether all the variables of the observation records are to be considered when designating an OR as a duplicate of another, or whether some subset of the variables are to be considered. Examples of different duplication definitions 7035 that may be applicable to a given data set are provided in FIG. 72 and discussed below in further detail. In some embodiments, the alternate representation may be generated and stored in parallel with the training of the model, so that, for example, only a single pass through the training data set 7002 may be needed for both (a) training the model and (b) creating and storing the alternate representation 7030. The alternate representation may require much less (e.g., orders of magnitude less) storage or memory than is occupied by the training data set itself in some implementations.

In the depicted embodiment, a probabilistic duplicate detector 7036 of the MLS may use the alternate representation 7030 to make one of the following determinations regarding a given OR Te-k of the test data set 7004: either (a) Te-k is not a duplicate of any of the ORs of the training data set or (b) Te-k has a non-zero probability of being a duplicate of an OR of the training data set. That is, while it may not be possible for the probabilistic duplicate detector 7036 to provide 100% certainty regarding the existence of duplicates, the detector may be able to determine with 100% certainty that a given test data set OR is not a duplicate. In some embodiments the probabilistic duplicate detector 7036 may be able to estimate or compute a confidence level or certainty level associated with a labeling of a given OR as a duplicate.

The duplicate detector 7036 may examine some number of ORs of the test data set 7004 and obtain one or more duplication metrics 7040 for the examined ORs. Depending on the number or fraction of ORs that have been identified as possible or likely duplicates, the duplication metric may itself be probabilistic in nature in some embodiments. For example, it may represent the logical equivalent of the statement "X % of the test set observation records have respective probabilities greater than or equal to Y % of being duplicates". In at least one embodiment, the client may be provided with an indication of a confidence level as to whether one or more of the observation records are duplicates. Of course, if none of the examined test set ORs are found to have non-zero probabilities of being duplicates, the metric 7040 may indicate with 100% certainty that the examined test data is duplicate-free. When obtaining the duplication metric, in some embodiments the duplicate detector 7036 may also take into account an expected rate of false-positive duplicate detection associated with the particular alternate representation being used. For example, if a Bloom filter being used as the alternate representation 7030 has an 8% expected rate of false positives, and the fraction of duplicates detected is also 8% (or less), the duplication metric may simply indicate that the number of possible duplicates identified is within an acceptable range. In at least some embodiments, various parameters used in the generation of the alternate representation (e.g., the number of bits used for a Bloom filter, and/or the number and types of hash functions used for generating the Bloom filter) may be selected based on factors such as the size of the training data set, the desired false positive rate of the alternate representation's duplicate predictions, and so on.

In at least some embodiments, if the duplication metric 7040 meets a threshold criterion, e.g., if more than k % of the test data has a non-zero probability of being duplicate, one or more duplication responses 7045 may be implemented by the MLS. Any of a number of different responsive actions may be undertaken in different embodiments—e.g., clients may be sent warning messages indicating the possibility of duplicates, likely duplicates may be removed or deleted from the test data set 7004, a machine learning job that involves the use of the test data may be suspended, canceled or abandoned, and so on. In at least some embodiments, the responsive action taken by the MLS may be dependent on the duplication metric 7040. For example, if a large fraction of the test data set is found to be duplicate-free, a warning message indicating the (small) fraction of potential duplicates may be transmitted to the client, while if a large fraction of the test data set is found to be potentially duplicate, the evaluation of the model 7020 may be suspended or stopped until the client has addressed the problem. In some embodiments, the duplication analysis may be performed in parallel with the evaluation of the model 7020 using the test data set 7004, so that only a single pass through the test data set may be needed. In one embodiment, the client may indicate (e.g., via the MLS's programmatic interfaces) one or more parameters (or other forms of guidance) to be used by the MLS to determine whether a threshold criterion requiring a responsive action has been met. For example, a client could indicate that if the probability that a randomly selected observation record of the test data set is a duplicate exceeds P1, a particular responsive action should be taken. The MLS may then translate such high-level guidance into the specific numerical threshold values to be used for the test data set (e.g., that a responsive action is to be taken only if at least X out of the Y test data set records available have been identified as duplicates). In such scenarios the clients would not necessarily have to be aware of low-level details such as the total number of the test data set records or the actual number of duplicates that are to trigger the responses. In some embodiments, clients may programmatically specify the responses that are to be implemented for one or more duplication metric thresholds, and/or low-level details of the thresholds themselves.

In at least one embodiment, the duplicate detector 7036 may not wait to process the entire test data set 7004 before initiating a generation of a response 7045—e.g., if more than 80 of the first 100 observation records that are examined from a test data set with a million ORs have non-zero probabilities of being duplicates, a response may be generated without waiting to examine the remaining ORs. As described below, in some embodiments, the techniques illustrated in FIG. 72 may be used for identifying possible duplicates within a given data set (e.g., within the training data set itself, within the test data set itself, or within a pre-split data set that is to be divided into training and test data sets), or across any desired pairing of data sets. Thus, in such embodiments, the use of the techniques may not be limited just to checking whether test data sets may contain duplicates of training data observation records. It is noted that in one embodiment, at least for some data sets, an alternate representation used for duplicate detection need not necessarily utilize less storage (or less memory) than the original representation of the data set.

FIGS. 71a and 71b collectively illustrate an example of a use of a Bloom filter for probabilistic detection of duplicate observation records at a machine learning service, according to at least some embodiments. A Bloom filter 7104 comprising 16 bits (Bit0 through Bit15) is shown being constructed from a training data set comprising ORs 7110A and 7110B in the depicted scenario. To construct the Bloom filter, a given OR 7110 may be provided as input to each of a set of hash functions H0, H1 and H2 in the depicted embodiment. The output of each hash function may then be mapped, e.g., using a modulo function, to one of the 16 bits of the filter 7104, and that bit may be set to 1. For example, with respect to OR 7110A, bit2 of the Bloom filter is set to 1 using hash function H0, bit6 is set to 1 using hash function H1, and bit9 is set to 1 using hash function H2. With respect to OR 7110B, bit4, bit9 (which was already set to 1), and bit13 are set to 1. As in the case of bit9, to which both OR 7110A and 7110B are mapped, the presence of a 1 at a given location within the Bloom filter may result from hash values generated for different ORs (or even from hash values generated for the same OR using different hash functions). As such, the presence of 1s at any given set of bit locations of the filter may not uniquely or necessarily imply the existence of a corresponding OR in the data set use to construct the filter. The size of the Bloom filter 7104 may be much smaller than the data set used to build the filter—for example, a filter of 512 bits may be used as an alternate representation of several megabytes of data.

As indicated in FIG. 71b, the same hash functions may be applied to the test data set ORs 7150 (e.g., 7150A and 7150B) to detect possible duplicates with respect to the training data set. If a particular test data set OR 7150 maps to a set of bits that contains at least one zero, the duplicate detector may determine with certainty that the OR is not a duplicate. Thus, OR 7150A is mapped to bit3, bit6 and bit10 (using hash functions H0, H1 and H2 respectively), two of which (bit3 and bit10) happen to contain zeroes in the Bloom filter 7104 after the filter has been fully populated using the entire training data set. In the result 7190 of the duplicate detection analysis, therefore, OR 7150 is indicated as not being a duplicate. In contrast, OR 7150B is mapped to bit4, bit9 and bit13, all of which happen to contain is in the fully-populated Bloom filter. Thus, in result 7190, OR 7150 may be indicated as a probable duplicate, with some underlying false positive rate of FP 1. The false positive rate FP1 may be a function of the size of the Bloom filter (the number of bits used, 16 in this case), the number and/or type of hash functions used, and/or the number of observation records used to build the filter. In some embodiments, the filter size and the number and type of hash functions used may be selected via tunable parameters 7144 of the Bloom filter generation process. Different parameter values may be selected, for example, based on the estimated or expected number of observation records of the training data set, the estimated or expected sizes of the observation records, and so on. Other similar parameters may govern the false positive rates expected from other types of alternate representations of data sets such as quotient filters or skip lists. It is noted that the size of the illustrated Bloom filter 7104 (16 bits) is not intended to represent a preferred or required size; any desired number of bits may be used, and any desired number of hash functions of any preferred type may be employed in different embodiments. For example, some implementations may use a MurmurHash function, while others may use a Jenkins hash function, a Fowler-Noll-Vo hash function, a CityHash function, or any desired combination of such hash functions.

In some embodiments, parameters such as the size of the filter and/or the number and types of hash functions used may be selected at the MLS based on factors such as the estimated or actual size of the training data set, the desired false positive rate, the computation requirements of the different hash functions, the randomizing capabilities of different hash functions, and so on. In at least one embodiment in which different ORs may take up different amounts of space, the MLS may estimate the number of observation records in the training data set by examining the first few records, and dividing the file size of the training data set file by the average size of the first few records. This approach may enable the MLS to generate the Bloom filter 7104 in a single pass through the training data set, e.g., while the model is also being trained, instead of requiring one pass to determine the exact number of ORs and then another pass to construct the filter.

Different levels of uncertainty with respect to duplication may be achievable using different mathematical techniques for duplicate detection in at least some embodiments. For example, in one embodiment, a cryptographic-strength hash function may be used to generate signatures of each of the test data set ORs, and the signatures generated using the same hash function on the test data may be used to detect duplicates with a very high rate of accuracy. Of course, using cryptographic hash functions may be computationally expensive compared to weaker hash functions that may be used to generate Bloom filters, and the space efficiency achieved using the cryptographic hashes may not be as great as is achievable using Bloom filters. In general, the MLS may be able to trade off the accuracy of duplicate detection with the resource usage or cost associated with the duplicate detection technique selected—e.g., as the accuracy rises, the resource needs of the technique may also typically rise. It is noted that at least in some embodiments and/or for some data set sizes, a deterministic duplicate detection technique rather than a probabilistic technique may be selected—e.g., a test data OR being tested for possible duplication may be compared to the original ORs of the training data set instead of using a space-efficient representation.

Figure 72:
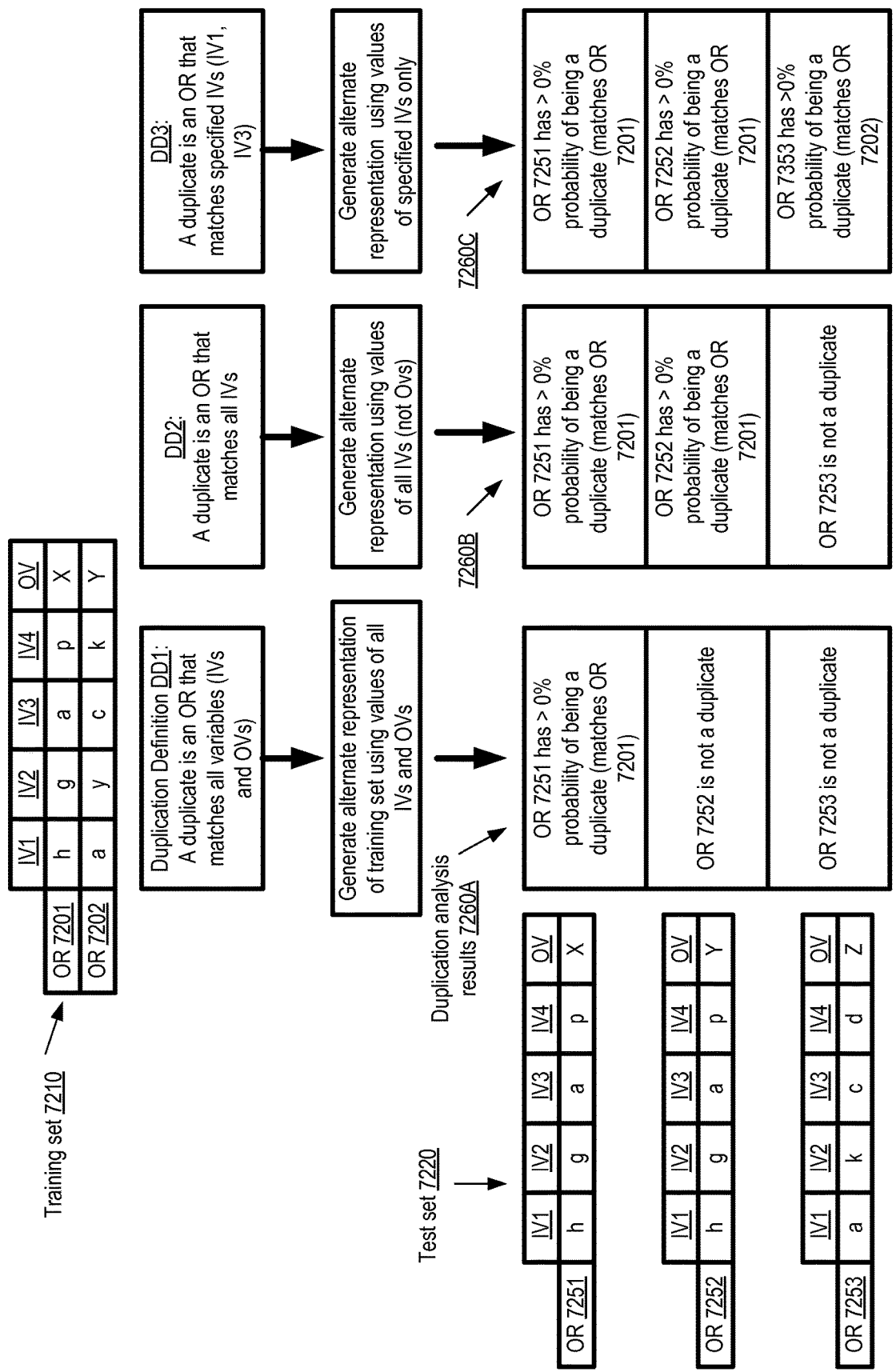
FIG. 72 illustrates examples of alternative duplicate definitions that may be used at a duplicate detector of a machine learning service, according to at least some embodiments.

Before generating the alternate representations of a data set, such as the Bloom filter illustrated in FIG. 71a and FIG. 71b, in some embodiments the MLS may determine a definition of duplication that is to be applied—i.e., exactly what properties of an OR O1 should be considered when declaring O1 a probable or actual duplicate of a different OR O2. FIG. 72 illustrates examples of alternative duplicate definitions that may be used at a duplicate detector of a machine learning service, according to at least some embodiments. In the depicted embodiment, three example duplicate definitions DD1, DD2 and DD3 are shown. According to DD1, all the input variables and output variables that are included in any OR of the training data set 7210 are to be considered when deciding whether a given OR is a duplicate of another. According to DD2, all the input variables, but none of the output variables, are to be considered. According to DD3, only a strict subset of the input variables (e.g., IV1 and IV3 in the illustrated scenario) needs to match for an OR to be considered a duplicate. These and other definitions of duplication may be selected by an MLS client in some embodiments, e.g., based on the semantics of their machine learning problem and/or on their understanding of the relative importance of different variables. For example, consider a scenario in which one of the input variables IV-k included in the training data set 7210 is sparsely populated, so that a large fraction of the ORs do not even contain values for the variable IV-k. In such a scenario, the client may wish to exclude IV-k from the set of variables to be used to determine duplication. In another scenario, clients may not wish to include the output variables when considering duplicates, since the predictions of the models are based entirely on the input variables.

In the depicted embodiment, different alternate representations of the training set may be created based on the duplication definition selected. For training data set 7210 in which observation records include input variables IV1, IV2, IV3 and IV4, and output variable OV, all five variable may be used (e.g., as combined input to a set of hash functions) if definition DD1 is used. If DD2 is used, IV1, IV2, IV3 and IV4 may be used to generate the alternate representation, and OV may be excluded. If DD3 is used, only IV1 and IV3 may be used for the alternate representation. In some embodiments, the MLS may decide to use multiple duplication definitions concurrently, e.g., respective alternate representations of the training data set 7210 may be created in accordance with each definition used, and duplication metrics corresponding to each of the definitions may be obtained.

Duplication analysis results 7260A, 7260B and/or 7260C may be generated based on the definition and alternate representation used. OR 7251 of test data set 7220 happens to match OR 7201 in all five variables. All three results 7260A, 7260B and 7260C may therefore identify OR 7250A as a probable duplicate with some non-zero probability. OR 7252 matches OR 7201 in all the input variables, but not in the output variable. As a result, OR 7250B may be classified as a probable duplicate if DD2 or DD3 are used, but not if DD1 is used. Finally, OR 7253, which has the same values of IV1 and IV3 as OR 7202 of the training set, but differs in all other variables, may be classified as a possible duplicate only if DD3 is used, and may be declared a non-duplicate if either of the other definitions are used.

Figure 73:
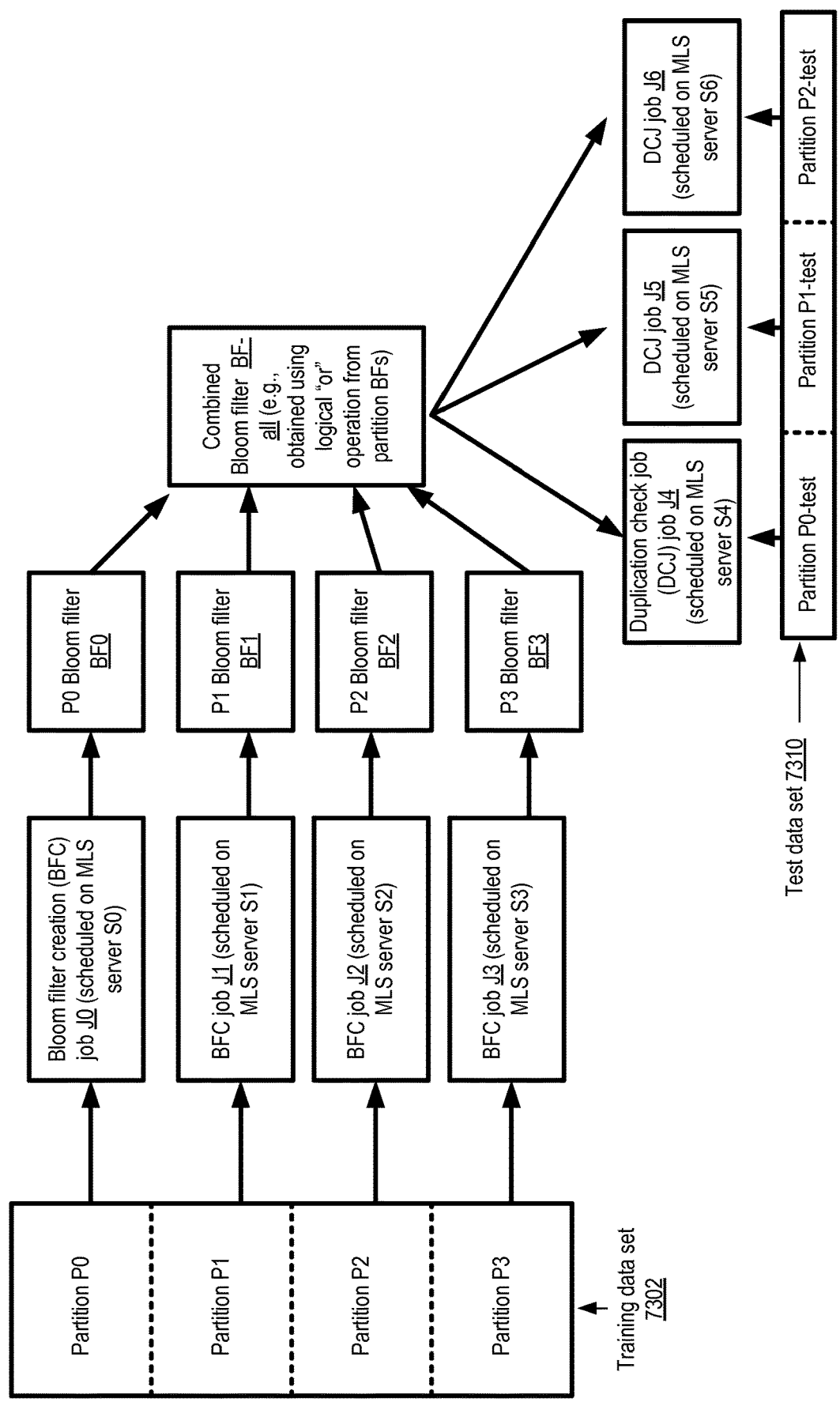
FIG. 73 illustrates an example of a parallelized approach towards duplicate detection for large data sets at a machine learning service, according to at least some embodiments.

As discussed earlier, the MLS may include a number of different servers on which machine learning jobs may be scheduled in parallel in some embodiments. FIG. 73 illustrates an example of a parallelized approach towards duplicate detection for large data sets at a machine learning service, according to at least some embodiments. In the depicted embodiment, training data set 7302 may be divided into four partitions P0, P1, P2 and P3, and a respective Bloom filter creation (BFC) job may be generated and scheduled corresponding to each partition. BFC jobs J0 through J3 may be scheduled for the partitions P0 through P3, respectively. The jobs J0 through J3 may also be used for other tasks as well, such as training the model, and need not necessarily be limited to creating Bloom filters or other alternate representations in various embodiments. In at least some embodiments, the creation of Bloom filters or other alternate representations may be considered one example of a feature processing transformation, and a recipe language similar to that described earlier may be used to request the generation of the representations. Each of the BFC jobs may produce a partition-level Bloom filter such as BF0, BF1, BF2 or BF3 in the depicted example scenario. The partition level filters may then be logically combined or aggregated, e.g., using simple Boolean "or" operations, to produce a complete Bloom filter BF-all.

BF-all may then be used for parallelized duplicate detection in the depicted embodiment—e.g., by scheduling three duplicate checking jobs J4, J5 and J6 for respective partitions P0-test, P1-test and P2-test of a training data set 7310. In some embodiments, different MLS servers (such as S0 through S7) may be used for at least some of the jobs J0-J6. As in the example shown in FIG. 73, where four jobs are scheduled for Bloom filter generation and three jobs are scheduled for duplicate checking, in some cases the degree of parallelism (e.g., the number of different jobs that are scheduled, and/or the number of different servers that are used) of the Bloom filter generation operations may differ from the degree of parallelism of the duplicate checking phase. Similar parallelization approaches may be used with other types of duplicate detection algorithms, e.g., for techniques that do not necessarily employ Bloom filters.

Figure 74:
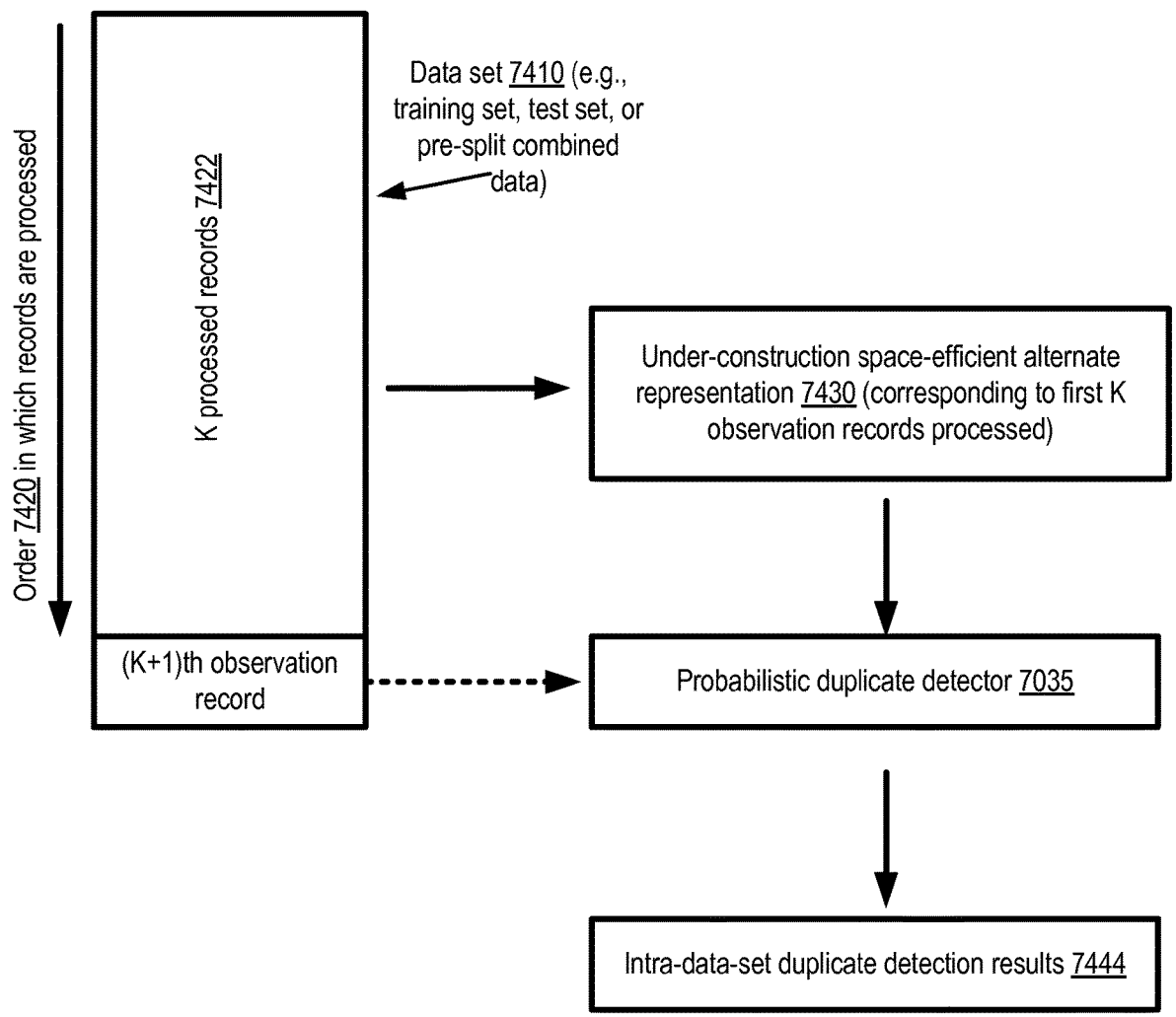
FIG. 74 illustrates an example of probabilistic duplicate detection within a given machine learning data set, according to at least some embodiments.

In most of the example duplicate detection scenarios discussed thus far, two data sets have been considered—a first data set (such as a training set) for which an alternate representation such as a Bloom filter is first fully populated, and a second data set (such as a test data set) which is examined for duplicates. A similar approach may be used to check for duplicates within a given data set in some embodiments. FIG. 74 illustrates an example of probabilistic duplicate detection within a given machine learning data set, according to at least some embodiments. As shown, during a particular pass of processing or analyzing a data set 7410 (which may for example be a training data set, a test data set, or a combined data set from which training and test data sets are to be derived), a space-efficient representation 7430 of the data set may gradually be populated. After K records of the data set 7410 have been processed, e.g., in the order indicated by arrow 7420, the under-construction alternate representation 7430 may contain entries corresponding to the K processed records 7422.

When the (K+1)th observation record of the data set is encountered, the probabilistic duplicate detector 7035 may use the alternate representation 7430 to determine whether the record represents a duplicate of an already-processed observation record of the same data set 7410. The newly encountered OR may be classified as a possible duplicate, or as a confirmed non-duplicate, using the kinds of techniques described earlier. In some embodiments, the duplicate detector may keep track of the ORs that are classified as having non-zero probabilities of being duplicates, and may include the list in intra-data-set duplicate detection results 7444 provided to the client on whose behalf the data set 7210 is being processed. In other embodiments, the duplicate detector may take other actions, such as simply notifying the client regarding the number of probably duplicates, or the duplicate detector may initiate the removal of the probable duplicates from the data set 7210.

Figure 75:
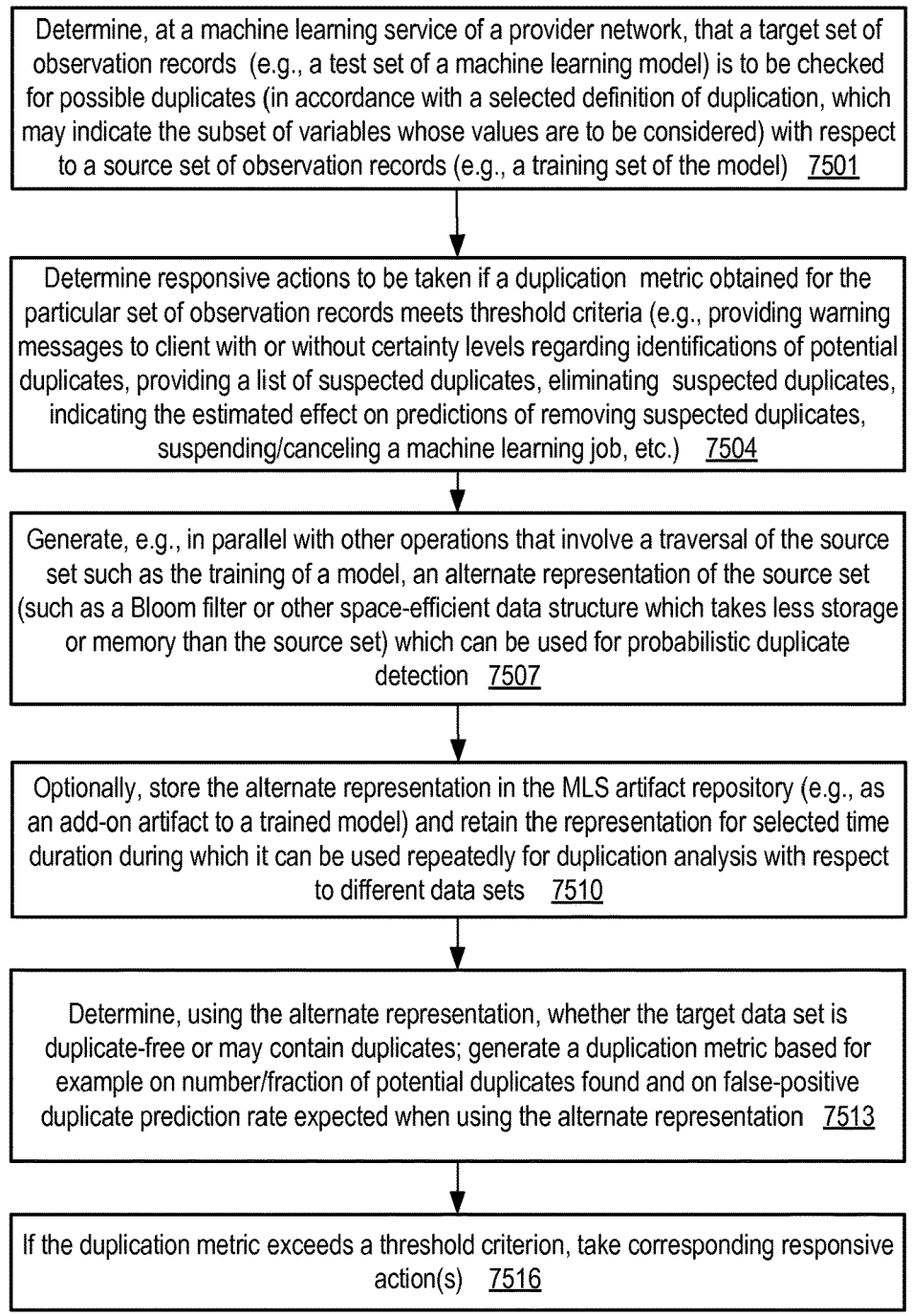
FIG. 75 is a flow diagram illustrating aspects of operations that may be performed at a machine learning service that implements duplicate detection of observation records, according to at least some embodiments.

FIG. 75 is a flow diagram illustrating aspects of operations that may be performed at a machine learning service that implements duplicate detection of observation records, according to at least some embodiments. As shown in element 7501, the MLS may determine that a first or target set of observation records (e.g., a test data set) is to be checked for duplicates with respect to a second or source set of observation records (e.g., a corresponding training data set) in accordance with some selected definition of duplication. In some embodiments, a default duplication definition may require the MLS to consider the values of all the input and output variables of observation records of the source set when identifying possible duplicates. Other duplication definitions may be used in some embodiments, in which one or more output variables and/or one or more input variables are to be excluded when determining duplicates. In some embodiments, clients of the MLS may indicate whether they want duplicate detection to be performed on specified data sets, or the particular definition of duplication to be used, e.g., using programmatic interfaces implemented by the MLS.

The MLS may also determine respective responsive actions to be taken if various levels of duplication are identified (element 7504) in the depicted embodiment. Examples of such actions may include transmitting warning or alert messages to the client that simply indicate the number or fraction of potential duplicate records (i.e., those observation records of the target data set for which the probability of being duplicates is non-zero), providing a list of the suspected duplicates, or providing estimates of the certainty levels or confidence levels associated with the designations of the records as duplicates. In one implementation, respective confidence levels associated with individual observation records suspected to being duplicates may be provided. In some embodiments, the responsive actions may include removing the probable duplicates from the target data set and/or providing statistical estimates of the impact of removing the duplicates on prediction errors of the associated model. In at least one embodiment, in response to the identification of potential or likely duplicates within a data set, the MLS may suspend, abandon or cancel a machine learning job which involves the use of the data set or is otherwise associated with the data set. Different responses may be selected for respective duplication levels in some embodiments—e.g., a warning may be generated if the fraction of duplicates is estimated to be no between 5% and 10%, while duplicates may simply be discarded if they are collectively less than 2% of the target data set. MLS clients may specify the types of actions they want taken for different extents of possible duplication in some embodiments.

As indicated in element 7507, one or more MLS components may generate, e.g., in parallel with other operations that involve a traversal of the source set such as the training of a model, an alternate representation of the source set that can be used for probabilistic duplicate detection (element 7507). A Bloom filter, a quotient filter, a skip list, a list of cryptographic signatures of the source records, or some other space-efficient structure may be used in various embodiments as the alternate representation. In order to generate the alternate representation, in at least one embodiment the MLS may first reformat at least some of the source data set's observation records—e.g., before feeding an observation record to a hash function used for generating a Bloom filter, the set of variable separators may be checked for consistency, trailing and leading blanks may be removed from text variables, numerical variables may be formatted in a uniform manner, and so on.

The alternate representation may optionally be stored in an MLS artifact repository (such as repository 120 shown in FIG. 1) in some embodiments (element 7510), e.g., as an add-on artifact associated with the model that was trained during the same pass through the source data set. In some embodiments in which a given model may be used for hours, weeks or months after it is trained, the alternate representation may be retained for a selected duration in the repository. In at least one embodiment, the MLS may keep track of when the alternate representation was last used for duplicate detection, and it may be discarded if it has not been for some threshold time interval.

Using the alternate representation, a duplicate detector of the MLS may determine whether the target data set is entirely duplicate-free, or whether at least some of the records of the target data set have non-zero probabilities of being duplicates (element 7513). A duplication metric may be generated, indicating for example the number or fraction of suspected duplicates and the associated non-zero probabilities. The duplication metric may take into account the baseline false positive duplicate prediction rate associated with the alternate representation. For example, for a Bloom filter, the false positive rate may depend on the size (number of bits) of the Bloom filter, the number and/or types of hash functions used, and/or the number of observation records used to populate the filter. In one embodiment, the duplication metric may be based at least in part on the difference between Num_Probable_Duplicates_Found (the number of observation records identified as possible duplicates) and Num_Expected_False_Positives (the number of observation records that are expected to be classified falsely as duplicates), for example. In at least some embodiments, either the generation of the alternate representation, the checking of the test data set for potential duplicates, or both these tasks may be performed in a parallelized or distributed fashion using a plurality of MLS jobs as illustrated in FIG. 73. If the duplication metric exceeds a threshold, a corresponding responsive action (e.g., one or more of the actions identified in operations corresponding to element 7504) may be performed in the depicted embodiment (element 7516).

It is noted that in various embodiments, operations other than those illustrated in the flow diagrams of FIGS. 9a, 9b, 10a, 10b, 17, 25, 32, 39, 48, 54, 55, 61, 69 and 75 may be used to implement at least some of the techniques of a machine learning service described above. Some of the operations shown may not be implemented in some embodiments, may be implemented in a different order, or in parallel rather than sequentially. For example, with respect to FIG. 9b, a check as to whether the client's resource quota has been exhausted may be performed subsequent to determining the workload strategy in some embodiments, instead of being performed before the strategy is determined.

Use Cases

The techniques described above, of providing a network-accessible, scalable machine learning service that is geared towards users with a wide range of expertise levels in machine learning tools and methodologies may be beneficial for a wide variety of applications. Almost every business organization or government entity is capable of collecting data on various aspects its operations today, and the discovery of meaningful statistical and/or causal relationships between different components of the collected data and the organization's objectives may be facilitated by such a service. Users of the MLS may not have to concern themselves with the details of provisioning the specific resources needed for various tasks of machine learning workflows, such as data cleansing, input filtering, transformations of cleansed data into a format that can be fed into models, the detection of duplicate observations, or model execution. Best practices developed over years of experience with different data cleansing approaches, transformation types, parameter settings for transformations as well as models may be incorporated into the programmatic interfaces (such as easy-to-learn and easy-to-use APIs) of the MLS, e.g., in the form of default settings that users need not even specify. Users of the MLS may submit requests for various machine learning tasks or operations, some of which may depend on the completion of other tasks, without having to manually manage the scheduling or monitor the progress of the tasks (some of which may take hours or days, depending on the nature of the task or the size of the data set involved). Users may be provided interactive graphical displays of model evaluations and other executions in some embodiments, enabling the users to make informed decisions regarding interpretation-related settings such as classification cutoffs. The detection of potential duplicates between a test or evaluation data set and the corresponding training data may be performed by default in some embodiments, enabling clients of the MLS to avoid wasting resources on evaluations based on data that is not likely to provide insights into a model's generalization capabilities.

A logically centralized repository of machine learning objects corresponding to numerous types of entities (such as models, data sources, or recipes) may enable multiple users or collaborators to share and re-use feature-processing recipes on a variety of data sets. Expert users or model developers may add to the core functionality of the MLS by registering third-party or custom libraries and functions. The MLS may support isolated execution of certain types of operations for which enhanced security is required. The MLS may be used for, and may incorporate techniques optimized for, a variety of problem domains covering both supervised and unsupervised learning, such as, fraud detection, financial asset price predictions, insurance analysis, weather prediction, geophysical analysis, image/video processing, audio processing, natural language processing, medicine and bioinformatics and so on. Specific optimization techniques such as pruning of depth-first decision trees, limiting the size of linear models by efficiently pruning feature weights, or performing concurrent quantile binning, may be implemented by default in some cases without the MLS clients even being aware of the use of the techniques. For other types of optimizations, such as optimizations between training-time resource usage and prediction-time resource usage, clients may interact with the machine learning service to decide upon a mutually acceptable feature processing proposal.

Illustrative Computer System

Figure 76:
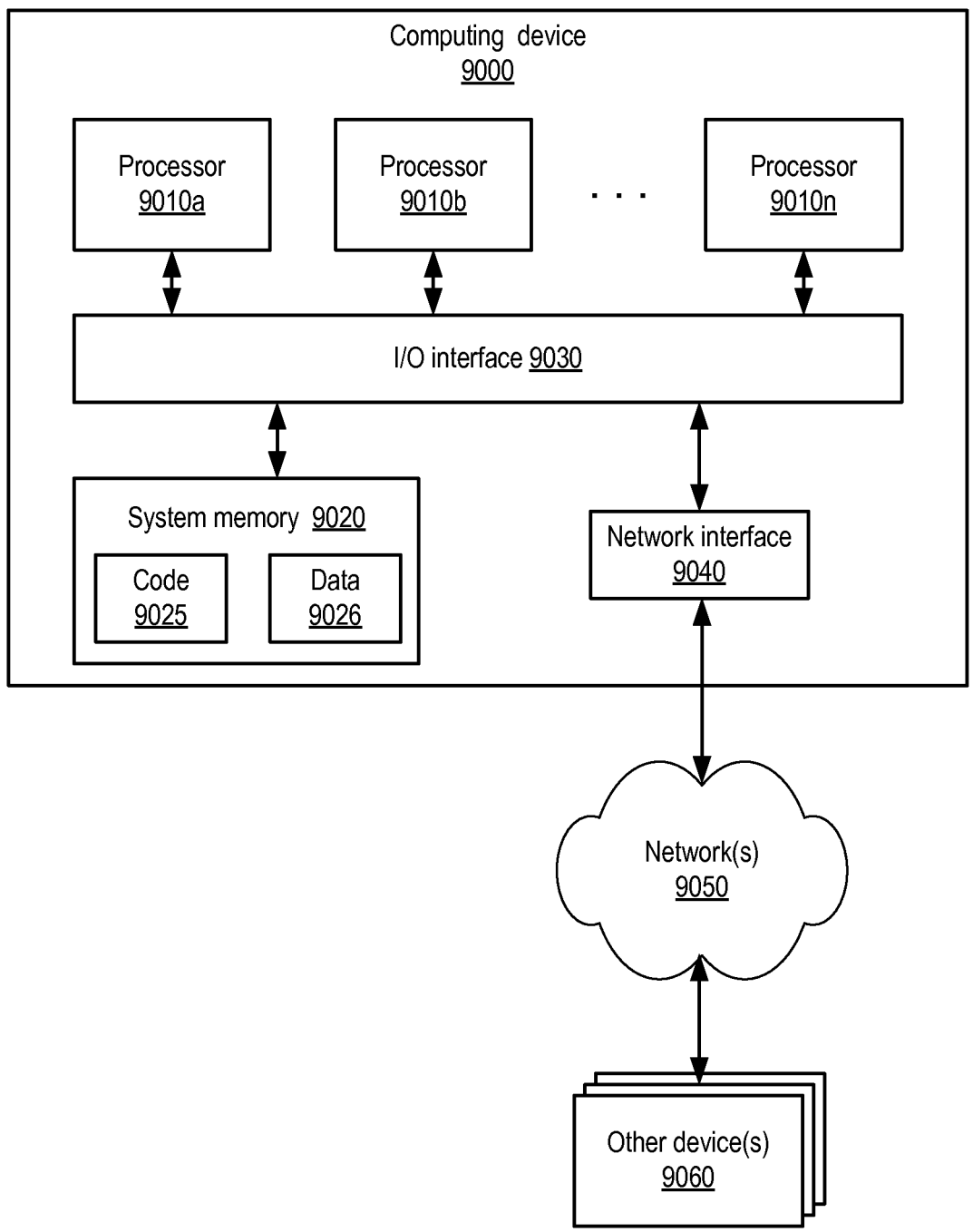
FIG. 76 is a block diagram illustrating an example computing device that may be used in at least some embodiments.

In at least some embodiments, a server that implements one or more of the components of a machine learning service (including control-plane components such as API request handlers, input record handlers, recipe validators and recipe run-time managers, feature processing managers, plan generators, job schedulers, artifact repositories, and the like, as well as data plane components such as MLS servers used for model generation/training, implementing decision tree optimizations, model pruning and/or category-based sampling, generating and/or displaying evaluation results graphically, and so on) may include a general-purpose computer system that includes or is configured to access one or more computer-accessible media. FIG. 76 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 75, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 75 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 76 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Embodiments of the disclosure can be described in view of the following clauses:

1. A system, comprising:
   one or more computing devices configured to:
      receive, via a particular programmatic interface of a set of programmatic interfaces implemented at a network-accessible machine learning service of a provider network, a first request from a client to perform a particular operation associated with an instance of an entity type, wherein the entity type comprises one or more of: (a) a data source to be used for a machine learning model, (b) a set of statistics to be computed from a particular data source, (c) a set of feature processing transformation operations to be performed on a specified data set, (d) a machine learning model employing a selected algorithm, (e) an alias associated with a machine learning model, or (f) a result of a particular machine learning model;

insert a job object corresponding to the first request in a job queue of the machine learning service;

provide an indication to the client that the first request has been accepted for execution;

determine, in accordance with a first workload distribution strategy identified for the first request, a first set of provider network resources to be used to perform the particular operation;

receive, prior to a completion of the particular operation indicated in the first request, a second request from the client to perform a second operation dependent on a result of the particular operation;

insert a second job object corresponding to the second request in the job queue, wherein the second job object includes an indication of a dependency of the second operation on a result of the particular operation;

prior to initiating execution of the second operation, provide a second indication to the client that the second request has been accepted for execution; and in response to a determination that the particular operation has been completed successfully, schedule the second operation on a second set of provider network resources.

2. The system as recited in clause 1, wherein the particular operation comprises one or more of: (a) a creation of the instance, (b) a read operation to obtain respective values of one or more attributes of the instance, (c) a modification of an attribute of the instance, (d) a deletion of the instance, (e) a search operation, or (f) an execute operation.

3. The system as recited in any of clauses 1-2, wherein the particular operation comprises assignment of an alias usable by a designated group of users of the machine learning service to execute a particular machine learning model, wherein the alias comprises a pointer to the particular machine learning model, wherein at least some users of the designated group of users are not permitted to modify the pointer.

4. The system as recited in any of clauses 1-3, wherein the set of programmatic interfaces comprises a representational state transfer application programming interface.

5. The system as recited in any of clauses 1-4, wherein the particular operation comprises a creation of a particular data source, wherein the one or more computing devices are further configured to:

generate a particular set of statistics on one or more variables of data records of the particular data source, without receiving a request from the client for the particular set of statistics; and provide, to the client, an indication of the particular set of statistics.

6. A method, comprising:

performing, by one or more computing devices:

receiving, via a particular programmatic interface of a set of programmatic interfaces implemented at a machine learning service, a first request from a client to perform a particular operation associated with an instance of an entity type, wherein the entity type comprises one or more of: (a) a data source to be used for generating a machine learning model, (b) a set of feature processing transformation operations to be performed on a specified data set, (c) a machine learning model employing a selected algorithm, or (d) an alias associated with a machine learning model;

inserting a job corresponding to the first request in a job queue of the machine learning service;

receiving, prior to a completion of the particular operation indicated in the first request, a second request from the client to perform a second operation dependent on a result of the particular operation;

inserting a second job object corresponding to the second request in the job queue, wherein the second job object includes an indication of a dependency of the second operation on a result of the particular operation; and in response to determining that the particular operation has been completed successfully, scheduling the second operation.

7. The method as recited in clause 6, wherein the particular operation comprises one or more of: (a) a creation of the instance, (b) a read operation to obtain respective values of one or more attributes of the instance, (c) a modification of an attribute of the instance, (d) a deletion of the instance, (e) a search operation, or (f) an execute operation.

8. The method as recited in any of clauses 6-7, wherein the particular operation comprises assignment of an alias usable by a designated group of users of the machine learning service to execute a particular machine learning model, wherein the alias comprises a pointer to the particular machine learning model, wherein at least some users of the designated group of users are not permitted to modify the pointer.

9. The method as recited in any of clauses 6-8, wherein the particular operation comprises a creation of a particular data source, further comprising performing, by the one or more computing devices:

generating a particular set of statistics on one or more variables of data records of the particular data source, without receiving a request from the client for the particular set of statistics; and providing, to the client, an indication of the particular set of statistics.

10. The method as recited in clause 9, further comprising performing, by the one or more computing devices:

selecting a subset of the data records of the particular data source to be used to generate the particular set of statistics.

11. The method as recited in any of clauses 6-9, further comprising performing, by the one or more computing devices:

identifying a workload distribution strategy for the first request, wherein said identifying comprises one or more of: (a) determining a number of passes of processing a data set of the particular operation (b) determining a parallelization level for processing a data set of the particular operation, (c) determining a convergence criterion to be used to terminate the particular operation, (d) determining a target durability level for intermediate data produced during the particular operation, or (e) determining a resource capacity limit for implementing the particular operation.

12. The method as recited in clause 11, further comprising performing, by the one or more computing devices:

selecting a particular set of provider network resources to implement the first workload strategy.

13. The method as recited in any of clauses 6-9 or 11, further comprising performing, by the one or more computing devices:

in response to determining that performing the particular operation includes an execution of a module developed by an entity external to the provider network, identifying a particular security container from which to select at least one resource to be used for the particular operation.

14. The method as recited in any of clauses 6-9, 11 or 13, further comprising performing, by the one or more computing devices:
providing, to the client, an executable version of a particular machine learning model for execution at a platform outside the provider network.

15. The method as recited in any of clauses 6-9, 11, or 13-14, further comprising performing, by the one or more computing devices:
verifying, prior to scheduling the particular operation, that a resource quota of the client has not been exhausted.

16. A non-transitory computer-accessible storage medium storing program instructions that when executed on one or more processors:
receive, via a particular programmatic interface of a set of programmatic interfaces implemented at a network-accessible machine learning service of a provider network, a first request from a client to perform a particular operation associated with an instance of an entity type, wherein the entity type comprises one or more of: (a) a data source to be used for generating a machine learning model, (b) a set of statistics to be computed from a particular data source, (c) a machine learning model employing a selected algorithm, or (d) an alias associated with a machine learning model;
insert a job corresponding to the first request in a job queue of the machine learning service;
receive, prior to a completion of the particular operation indicated in the first request, a second request from the client to perform a second operation dependent on a result of the particular operation; and
insert a second job object corresponding to the second request in the job queue, wherein the second job object includes an indication of a dependency of the second operation on a result of the particular operation.

17. The non-transitory computer-accessible storage medium as recited in clause 16, wherein the particular operation comprises assignment of an alias usable by a designated group of users of the machine learning service to execute a particular machine learning model, wherein the alias comprises a pointer to the particular machine learning model, wherein at least some users of the designated group of users are not permitted to modify the pointer.

18. The non-transitory computer-accessible storage medium as recited in any of clauses 16-17, wherein the particular operation comprises a creation of a particular data source, wherein the instructions when executed at the one or more processors:
generate a particular set of statistics on one or more variables of data records of the particular data source, without receiving a request from the client for the particular set of statistics; and
provide, to the client, an indication of the particular set of statistics.

19. The non-transitory computer-accessible storage medium as recited in clause 18, wherein one or more variables comprise a plurality of variables, and wherein the instructions when executed on the one or more processors:
identify, based at least in part on a correlation analysis of the plurality of variables, a first set of candidate variables to be used in preference to a second set of variables as inputs to a machine learning model; and
provide an indication of the first set of variables to the client.

20. The non-transitory computer-accessible storage medium as recited in any of clauses 16-18, wherein the particular operation comprises an instantiated of a particular machine learning model in online mode, wherein the instructions when executed on the one or more processors:
select a set of provider network resources to be used for the particular machine learning model in online mode based at least in part on an expected workload level indicated by the client.

21. The non-transitory computer-accessible storage medium as recited in any of clauses 16-18 or 20, wherein the instructions when executed on the one or more processors:
receive, from the client of the service, credentials to be used to decrypt one or more data records of a particular data source to perform the particular operation.

22. The non-transitory computer-accessible storage medium as recited in any of clauses 16-18 or 20-21, wherein the instructions when executed on the one or more processors:
receive a third request from the client via an idempotent programmatic interface of the set of programmatic interfaces to perform a third operation;
determine, based on one or more of: (a) an instance identifier indicated in the third request, (b) an identifier of the client, or (c) a representation of input parameters of the third request, whether the third request is a duplicate of an earlier-submitted request; and
in response to a determination that the third request is a duplicate of an earlier-submitted request, provide an indication of success of the third request to the client, without inserting an additional job object corresponding to the third request in the job queue.

Embodiments of the disclosure can also be described in view of the following clauses:

1. A system, comprising:
one or more computing devices configured to:
receive, at a network-accessible machine learning service of a provider network, a text representation of a recipe comprising one or more of: (a) a group definitions section indicating one or more groups of variables, wherein individual ones of the one or more groups comprise a plurality of variables on which at least one common transformation operation is to be applied, (b) an assignment section defining one or more intermediate variables, (c) a dependency section indicating respective references to one or more machine learning artifacts stored in a repository, or (d) an output section indicating one or more transformation operations to be applied to at least one entity indicated in the group definitions section, the assignment section, or the dependency section;
validate, in accordance with (a) a set of syntax rules defined by the machine learning service and (b) a set of library function definitions for transformation operation types supported by the machine learning service, the text representation of the recipe;
generate an executable representation of the recipe;
store the executable representation in the repository;
determine that the recipe is to be applied to a particular data set;
verify that the particular data set meets a run-time acceptance criterion of the recipe; and apply, using one or more selected provider network resources, a particular transformation operation of the one or more transformation operations to the particular data set.

2. The system as recited in clause 1, wherein the one or more computing devices are further configured to:
receive a request to apply the recipe to a different data set;
verify that the different data set meets the run-time acceptance criterion of the recipe; and
apply the particular transformation operation to the different data set.

3. The system as recited in any of clauses 1-2, wherein the one or more computing devices are further configured to:
provide, to a client via a programmatic interface, an indication of a respective set of one or more recipes applicable to individual ones of a plurality of machine learning problem domains.

4. The system as recited in any of clauses 1-3, wherein the text representation comprises an indication of a particular machine learning model to be executed using a result of the particular transformation operation.

5. The system as recited in any of clauses 1-4, wherein the one or more computing devices are further configured to:
determine, in response to an indication that automated parameter tuning is to be performed for the recipe, a plurality of parameter value options applicable to a different transformation operation of the one or more transformation operations;
generate, by the machine learning service, respective results of the different transformation operation using individual ones of the plurality of parameter value options; and
provide, by the machine learning service based on an analysis of the respective results, an indication of at least one candidate parameter value of the plurality of parameter value options that meets a parameter acceptance criterion.

6. A method, comprising:
performing, by one or more computing devices:
receiving, at a network-accessible machine learning service, a first representation of a recipe comprising one or more of: (a) a group definitions section indicating one or more groups of variables, wherein individual ones of the one or more groups comprise a plurality of data set variables on which at least one common transformation operation is to be applied and (b) an output section indicating one or more transformation operations to be applied to at least one entity indicated in one or more of: (i) the group definitions section or (ii) an input data set;
validating, in accordance with at least a set of library function definitions for transformation operation types supported by the machine learning service, the first representation of the recipe;
generating an executable representation of the recipe;
determining that the recipe is to be applied to a particular data set;
verifying that the particular data set meets a run-time acceptance criterion; and
applying, using one or more selected provider network resources, a particular transformation operation of the one or more transformation operations to the particular data set.

7. The method as recited in clause 6, wherein the first representation is a text representation or a binary representation.

8. The method as recited in any of clauses 6-7, wherein the first representation is generated by a client of the machine learning service using a tool obtained from the machine learning service.

9. The method as recited in any of clauses 6-8, wherein a data type of at least one variable of an input data record of the particular data set comprises one or more of: (a) text, (b) a numeric data type, (c) Boolean, (d) a binary data type, (d) a categorical data type, (e) an image processing data type, (f) an audio processing data type, (g) a bioinformatics data type, or (h) a structured data type.

10. The method as recited in clause 9, wherein the data type comprises a particular structured data type, further comprising performing, by the one or more computing devices:
selecting, based at least in part on the particular structured data type, a particular library function to be used for the particular transformation operation.

11. The method as recited in any of clauses 6-9, wherein the first representation comprises an assignment section defining an intermediate variable in terms of one or more of: (a) an input data set variable or (b) an entity defined in the group definitions section, wherein the intermediate variable is referenced in the output section.

12. The method as recited in any of clauses 6-9 or 11, wherein the first representation comprises a dependency section indicating a reference to a particular artifact stored in a repository of the machine learning service, wherein the particular transformation operation consumes an output of the particular artifact as an input.

13. The method as recited in clause 12, wherein the particular artifact comprises one or more of: (a) a machine learning model, (b) a different recipe, (c) a statistics set or (d) an alias that includes a reference to a machine learning model.

14. The method as recited in any of clauses 6-9 or 11-12, wherein the particular transformation operation utilizes a user-defined function, further comprising performing, by the one or more computing devices:
receiving, at the machine learning service from a client prior to said receiving the first representation, an indication of a module implementing the user-defined function, wherein the module is in a text format or a binary format.

15. The method as recited in any of clauses 6-9, 11-12 or 14, further comprising performing, by the one or more computing devices:
validating the first representation in accordance with a set of syntax rules defined by the machine learning service.

16. The method as recited in any of clauses 6-9, 11-12, or 14-15, further comprising performing, by the one or more computing devices:
receiving a request to apply the recipe to a different data set;
verifying that the different data set meets the run-time acceptance criterion of the recipe; and
applying the particular transformation operation to the different data set.

17. The method as recited in any of clauses 6-9, 11-12, or 14-16, further comprising performing, by the one or more computing devices:
providing, to a client via a programmatic interface, an indication of a respective set of one or more recipes applicable to individual ones of a plurality of machine learning problem domains.

18. The method as recited in any of clauses 6-9, 11-12, or 14-17, wherein the first representation comprises an indication of a particular machine learning model to be executed using a result of the particular transformation operation.

19. The method as recited in any of clauses 6-9, 11-12, or 14-18, further comprising performing, by the one or more computing devices:
 determining, by the machine learning service in response to an indication that automated parameter tuning is to be performed for the recipe, a plurality of parameter value options applicable to a different transformation operation of the one or more transformation operations;
 generating, by the machine learning service, respective results of the different transformation operation using individual ones of the plurality of parameter value options.

20. The method as recited in clause 19, further comprising performing, by the one or more computing devices:
 selecting, by the machine learning service, a particular parameter value of the plurality of parameter value options as an acceptable value based at least in part on a particular result set corresponding to the particular parameter value.

21. The method as recited in any of clauses 19-20, further comprising performing, by the one or more computing devices:
 indicating, by the machine learning service to a client, at least a subset of the plurality of parameter value options as candidate values based on an analysis of the respective results; and
 receiving, at the machine learning service from the client, an indication of a particular parameter value of the subset to be used for the different transformation operation.

22. The method as recited in any of clauses 19-21, wherein the plurality of parameter value options comprise one or more of: (a) respective lengths of n-grams to be derived from a language processing data set, (b) respective quantile bin boundaries for a particular variable, (c) image processing parameter values, (d) a number of clusters into which a data set is to be classified, (e) values for a cluster boundary threshold, or (f) dimensionality values for a vector representation of a text document.

23. A non-transitory computer-accessible storage medium storing program instructions that when executed on one or more processors:
 determine, at a machine learning service, a first representation of a recipe comprising one or more of: (a) a group definitions section indicating one or more groups of variables, wherein individual ones of the one or more groups comprise a plurality of data set variables on which at least one common transformation operation is to be applied, or (b) an output section indicating one or more transformation operations to be applied to at least one entity indicated in one or more of (i) the group definitions section or (ii) an input data set of the recipe;
 validate, in accordance with at least a set of library function definitions for transformation operation types supported by the machine learning service, the first representation of the recipe;
 generate an executable representation of the recipe; and
 in response to a determination that the recipe is to be applied to a particular data set, use one or more selected provider network resources to implement a particular transformation operation of the one or more transformation operations to the particular data set.

24. The non-transitory computer-accessible storage medium as recited in clause 23, wherein the first representation comprises an assignment section defining an intermediate variable in terms of one or more of: (a) an input data set variable or (b) an entity defined in the group definitions section, wherein the intermediate variable is referenced in the output section.

25. The non-transitory computer-accessible storage medium as recited in any of clauses 23-24, wherein the first representation comprises a dependency section indicating a reference to a particular artifact stored in a repository of the machine learning service, wherein the particular transformation operation consumes an output of the particular artifact as an input.

26. The non-transitory computer-accessible storage medium as recited in any of clauses 23-25, wherein the particular artifact comprises one or more of: (a) a machine learning model, (b) a different recipe, (c) an alias or (d) a set of statistics.

27. The non-transitory computer-accessible storage medium as recited in any of clauses 23-26, wherein the set of library function definitions comprise one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, or (j) a natural language processing function.

Embodiments of the disclosure can also be described in view of the following clauses:

1. A system, comprising:
 one or more computing devices configured to:
  receive, via a programmatic interface of a machine learning service of a provider network, a request to extract observation records of a particular data set from one or more file sources, wherein a size of the particular data set exceeds a size of a first memory portion available for the particular data set at a first server of the machine learning service;
  map the particular data set to a plurality of contiguous chunks, including a particular contiguous chunk whose size does not exceed the first memory portion;
  generate, based at least in part on a filtering descriptor indicated in the request, a filtering plan to perform a sequence of chunk-level filtering operations on the plurality of contiguous chunks, wherein an operation type of individual ones of the sequence of filtering operations comprises one or more of: (a) sampling, (b) shuffling, (c) splitting, or (d) partitioning for parallel computation, and wherein the filtering plan includes a first chunk-level filtering operation followed by a second chunk-level filtering operation;
  execute, to implement the first chunk-level filtering operation, at least a set of reads directed to one or more persistent storage devices at which at least a subset of the plurality of contiguous chunks are stored, wherein, subsequent to the set of reads, the first memory portion comprises at least the particular contiguous chunk;
  implement the second chunk-level filtering operation on an in-memory result set of the first chunk-level filtering operation, without re-reading from the one or more persistent storage devices, and without copying the particular contiguous chunk; and
  extract a plurality of observation records from an output of the sequence of chunk-level filtering operations.

2. The system as recited in clause 1, wherein the one or more computing devices are further configured to:

implement an intra-chunk filtering operation on a set of observation records identified within the particular contiguous chunk.

3. The system as recited in any of clauses 1-2, wherein the one or more computing devices are further configured to:
de-compress contents of the particular contiguous chunk in accordance with one or more de-compression parameters indicated in the request.

4. The system as recited in any of clauses 1-3, wherein the one or more computing devices are further configured to:
decrypt contents of the particular contiguous chunk in accordance with one or more decryption parameters indicated in the request.

5. The system as recited in any of clauses 1-4, wherein the one or more computing devices are further configured to:
provide a plurality of observation records obtained from the sequence as input for an execution of one or more of: (a) a feature processing recipe or (b) a machine learning model.

6. A method, comprising:
performing, on one or more computing devices:
receiving, at a machine learning service, a request to extract observation records of a particular data set from one or more data sources;
mapping the particular data set to a plurality of chunks including a particular chunk;
generating a filtering plan to perform a sequence of chunk-level filtering operations on the plurality of chunks, wherein an operation type of individual ones of the sequence of filtering operations comprises one or more of: (a) sampling, (b) shuffling, (c) splitting, or (d) partitioning for parallel computation, and wherein the filtering plan includes a first chunk-level filtering operation followed by a second chunk-level filtering operation;
initiating, to implement the first chunk-level filtering operation, a set of data transfers directed to one or more persistent storage devices at which at least a subset of the plurality of chunks is stored, wherein, subsequent to the set of data transfers, the first memory portion comprises at least the particular chunk;
implementing the second chunk-level filtering operation on an in-memory result set of the first chunk-level filtering operation; and
extracting a plurality of observation records from an output of the sequence of chunk-level filtering operations.

7. The method as recited in clause 6, wherein the one or more data sources comprise one or more storage objects including a particular storage object, wherein said mapping the particular data set into the plurality of chunks comprises determining, based at least in part on a chunk size parameter, a candidate offset within the particular storage object as a candidate ending boundary of the particular chunk, further comprising performing, by the one or more computing devices:
selecting, as an ending boundary of the particular chunk, a particular delimiter representing an ending boundary of a particular observation record within the particular storage object, wherein the particular delimiter is located at a different offset than the candidate offset.

8. The method as recited in clause 7, wherein said selecting, as the ending boundary, the particular delimiter comprises:
identifying, in a sequential read of the particular storage object in order of increasing offsets, the first delimiter with an offset higher than the candidate offset as the ending boundary of the particular chunk.

9. The method as recited in any of clauses 6-7, wherein the one or more data sources comprise one or more of: (a) a single-host file system, (b) a distributed file system, (c) a storage object accessible via a web service interface from a network-accessible storage service, (d) a storage volume presenting a block-level device interface, or (e) a database.

10. The method as recited in any of clauses 6-7 or 9, wherein the request is formatted in accordance with an application programming interface of the machine learning service.

11. The method as recited in any of clauses 6-7 or 9-10, further comprising performing, by the one or more computing devices:
de-compressing contents of the particular chunk in accordance with one or more de-compression parameters indicated in the request.

12. The method as recited in any of clauses 6-7 or 9-11, further comprising performing, by the one or more computing devices:
decrypting contents of the particular chunk in accordance with one or more decryption parameters indicated in the request.

13. The method as recited in any of clauses 6-7 or 9-12, wherein the plurality of observation records comprises a first observation record of a first record length, and a second observation record of a different record length.

14. The method as recited in any of clauses 6-7 or 9-13, further comprising performing, by the one or more computing devices:
implementing an intra-chunk filtering operation on a set of observation records identified within the particular chunk.

15. The method as recited in any of clauses 6-7 or 9-14, further comprising performing, by the one or more computing devices:
inserting a first job object representing the first chunk-level filtering operation in a collection of jobs to be scheduled at the machine learning service; and
inserting a second job object representing the second chunk-level filtering operation in the collection, prior to a completion of the first chunk-level filtering operation.

16. The method as recited in any of clauses 6-7 or 9-15, further comprising performing, by the one or more computing devices:
providing the plurality of observation records extracted from the output of the sequence as input for an execution of one or more of: (a) a feature processing recipe or (b) a machine learning model.

17. A non-transitory computer-accessible storage medium storing program instructions that when executed on one or more processors:
generate in response to receiving a request to extract observation records of a particular data set from one or more data sources at a machine learning service, a plan to perform one or more chunk-level operations including a first chunk-level operation on a plurality of chunks of the particular data set, wherein an operation type of the first chunk-level operation comprises one or more of: (a) sampling, (b) shuffling, (c) splitting, or (d) partitioning for parallel computation;
initiate, to implement the first chunk-level operation, a set of data transfers directed to one or more persistent storage devices at which at least a subset of the plurality of chunks is stored, wherein, subsequent to the set of data transfers, a first memory portion of a particular server of the machine learning service comprises at least a particular chunk of the plurality of chunks; and implement a second operation on a result set of the first chunk-level operation, wherein the second operation comprises one or more of: (a) another filtering operation, (b) a feature processing operation or (c) an aggregation operation.

18. The non-transitory computer-accessible storage medium as recited in clause 17, wherein the particular data set comprises contents of one or more of: (a) a single-host file system, (b) a distributed file system, (c) a storage object accessible via a web service interface from a network-accessible storage service, (d) a storage volume presenting a block-level device interface, or (e) a database.

19. The non-transitory computer-accessible storage medium as recited in any of clauses 17-18, wherein the second operation comprises an intra-chunk filtering operation.

20. The non-transitory computer-accessible storage medium as recited in any of clauses 17-19, wherein the second operation comprises a cross-chunk filtering operation performed on a plurality of observation records including a first observation record identified within the particular chunk and a second observation record identified within a different chunk of the plurality of chunks.

21. The non-transitory computer-accessible storage medium as recited in any of clauses 17-20, wherein the second operation is an in-memory operation performed without copying the particular chunk to a different persistent storage device and without re-reading contents of the particular chunk from the one or more persistent storage devices.

22. The non-transitory computer-accessible storage medium as recited in any of clauses 17-21, wherein the operation type of the first chunk-level operation is partitioning for a parallel computation, wherein the first chunk-level operation includes a plurality of model training operations including a first training operation and a second training operation, wherein an execution duration of the first training operation overlaps at least in part with an execution duration of the second training operation.

Embodiments of the disclosure can also be described in view of the following clauses:

1. A system, comprising:
one or more computing devices configured to:
generate consistency metadata to be used for one or more training-and-evaluation iterations of a machine learning model, wherein the consistency metadata comprises at least a particular initialization parameter value for a pseudo-random number source;
sub-divide an address space of a particular data set of the machine learning model into a plurality of chunks, including a first chunk comprising a first plurality of observation records, and a second chunk comprising a second plurality of observation records;
retrieve, from one or more persistent storage devices, observation records of the first chunk into a memory of a first server, and observation records of the second chunk into a memory of a second server;
select, using a first set of pseudo-random numbers, a first training set from the plurality of chunks, wherein the first training set includes at least a portion of the first chunk, wherein observation records of the first training set are used to train the machine learning model during a first training-and-evaluation iteration of the one or more training-and-evaluation iterations, and wherein the first set of pseudo-random numbers is obtained using the consistency metadata; and
select, using a second set of pseudo-random numbers, a first test set from the plurality of chunks, wherein the first test set includes at least a portion of the second chunk, wherein observation records of the first test set are used to evaluate the machine learning model during the first training-and-evaluation iteration, and wherein the second set of pseudo-random numbers is obtained using the consistency metadata.

2. The system as recited in clause 1, wherein the one or more computing devices are further configured to:
insert a first job corresponding to the selection of the first training set in a collection of jobs to be scheduled at of a machine learning service, and a second job corresponding to the selection of the first test set in the collection; and
schedule the second job for execution asynchronously with respect to the first job.

3. The system as recited in any of clauses 1-2, wherein the one or more computing devices are configured to:
receive, from a client of a machine learning service, a request for the one or more training-and-evaluation iterations, wherein the request indicates at least a portion of the consistency metadata.

4. The system as recited in any of clauses 1-3, wherein the consistency metadata is based at least in part on an identifier of a data object in which one or more observation records of the particular data set are stored.

5. The system as recited in any of clauses 1-4, wherein the one or more computing devices are further configured to:
reorder observation records of the first chunk prior to presenting the observation records of the first training set as input to the machine learning model.

6. A method, comprising:
one or more computing devices configured to:
determining consistency metadata to be used for one or more training-and-evaluation iterations of a machine learning model, wherein the consistency metadata comprises at least a particular parameter value for a pseudo-random number source;
sub-dividing an address space of a particular data set of the machine learning model into a plurality of chunks, including a first chunk comprising a first plurality of observation records, and a second chunk comprising a second plurality of observation records;
selecting, using the consistency metadata, a first training set from the plurality of chunks, wherein the first training set includes at least a portion of the first chunk, and wherein observation records of the first training set are used to train the machine learning model during a first training-and-evaluation iteration of the one or more training-and-evaluation iterations; and
selecting, using the consistency metadata, a first test set from the plurality of chunks, wherein the first test set includes at least a portion of the second chunk, and wherein observation records of the first test set are used to evaluate the machine learning model during the first training-and-evaluation iteration.

7. The method as recited in clause 6, further comprising performing, by the one or more computing devices:
retrieving, from a persistent storage device into a memory of a first server, at least the first chunk prior to training the machine learning model during the first training-and-evaluation iteration; and selecting, for a different training-and-evaluation iteration of the one or more training-and-evaluation iterations, (a) a different training set and (b) a different test set, without copying the first chunk from the memory of the first server to a different location.

8. The method as recited in any of clauses 6-7, further comprising performing, by the one or more computing devices:

receiving, from a client of a machine learning service, a request for the one or more training-and-evaluation iterations, wherein the request indicates at least a portion of the consistency metadata.

9. The method as recited in clause 8, wherein the request is formatted in accordance with a particular programmatic interface implemented by a machine learning service of a provider network.

10. The method as recited in any of clauses 6-8, wherein the consistency metadata is based at least in part on an identifier of a data object in which one or more observation records of the particular data set are stored.

11. The method as recited in any of clauses 6-8 or 10, wherein the first training set comprises at least one observation record of a third chunk of the plurality of chunks, and wherein the first test set comprises at least one observation record of the third chunk.

12. The method as recited in any of clauses 6-8 or 10-11, further comprising performing, by the one or more computing devices:

shuffling observation records of the first chunk prior to presenting the observation records of the first training set as input to the machine learning model.

13. The method as recited in any of clauses 6-8 or 10-12, further comprising performing, by the one or more computing devices:

determining a number of chunks into which the address space is to be sub-divided based at least in part on one or more of: (a) a size of available memory at a particular server or (b) a client request.

14. The method as recited in any of clauses 6-8 or 10-13, wherein the particular data set is stored in a plurality of data objects, further comprising:

determining an order in which the plurality of data objects are to be combined prior to sub-dividing the address space.

15. The method as recited in any of clauses 6-8 or 10-14, wherein the one or more training-and-evaluation iterations are cross-validation iterations of the machine learning model.

16. A non-transitory computer-accessible storage medium storing program instructions that when executed on one or more processors:

determine consistency metadata to be used for one or more training-and-evaluation iterations of a machine learning model, wherein the consistency metadata comprises at least a particular parameter value for a pseudo-random number source;

select, using the consistency metadata, a first training set from a plurality of chunks of a particular data set, wherein individual ones of the plurality of chunks comprise one or more observation records, wherein the first training set includes at least a portion of a first chunk of the plurality of chunks, and wherein observation records of the first training set are used to train the machine learning model during a first training-and-evaluation iteration of the one or more training-and-evaluation iterations; and select, using the consistency metadata, a first test set from the plurality of chunks, wherein the first test set includes at least a portion of a second chunk of the plurality of chunks, and wherein observation records of the first test set are used to evaluate the machine learning model during the first training-and-evaluation iteration.

17. The non-transitory computer-accessible storage medium as recited in clause 16, wherein the instructions when executed on the one or more processors:

initiate a retrieval, from a persistent storage device into a memory of a first server, of at least the first chunk prior to training the machine learning model during the first training-and-evaluation iteration; and select, for a different training-and-evaluation iteration of the one or more training-and-evaluation iterations, (a) a different training set and (b) a different test set, without copying the first chunk from the memory of the first server to a different location.

18. The non-transitory computer-accessible storage medium as recited in any of clauses 16-17, wherein the instructions when executed on the one or more processors:

receive, from a client of a machine learning service, a request for the one or more training-and-evaluation iterations, wherein the request indicates at least a portion of the consistency metadata.

19. The non-transitory computer-accessible storage medium as recited in any of clauses 16-18, wherein the consistency metadata is based at least in part on an identifier of a data object in which one or more observation records of the particular data set are stored.

20. The non-transitory computer-accessible storage medium as recited in in any of clauses 16-19, wherein the instructions when executed on the one or more processors:

shuffle observation records of the first chunk prior to presenting the observation records of the first training set as input to the machine learning model.

Embodiments of the disclosure can also be described in view of the following clauses:

1. A system, comprising:

one or more computing devices configured to:

identify one or more run-time optimization goals for a decision-tree based machine learning model to be trained using a data set, including at least a goal for a memory footprint of an execution of the machine learning model subsequent to a training phase of the machine learning model;

store, in a depth-first order at one or more persistent storage devices during a tree-construction pass of the training phase, respective representations of a plurality of nodes generated for a particular decision tree using at least a portion of the data set;

determine, for one or more nodes of the particular decision tree during the tree-construction pass, a respective value of a predictive utility metric (PUM), wherein a particular PUM value associated with a particular node of the one or more nodes is a measure of an expected contribution of the particular node to a prediction generated using the machine learning model;

generate, during a tree-pruning pass of the training phase, a modified version of the particular decision tree, wherein to generate the modified version, at least the particular node is removed from the particular decision tree, wherein the particular node is selected for removal based at least in part on the one or more run-time optimization goals and based at least in part on the particular PUM value;

store a representation of the modified version of the particular decision tree; and subsequent to the training phase, execute the machine learning model using at least the modified version of the particular decision tree to obtain a particular prediction.

2. The system as recited in clause 1, wherein the PUM comprises one or more of: (a) an indication of a Gini impurity, (b) an information gain metric, or (c) an entropy metric.

3. The system as recited in any of clauses 1-2, wherein the one or more run-time optimization goals include one or more of: (a) a prediction time goal, (b) a processor utilization goal, or (c) a budget goal.

4. The system as recited in any of clauses 1-3, wherein the one or more computing devices are further configured to:

generate a representation of a distribution of values of the PUM among the one or more nodes; and select the particular node for removal based at least in part on the distribution.

5. The system as recited in any of clauses 1-4, wherein the machine learning model comprises one or more of: (a) a Random Forest model, (b) a classification and regression tree (CART) model, or (c) an adaptive boosting model.

6. A method, comprising:

performing, by one or more computing devices:

storing, in a depth-first order at one or more persistent storage devices during a tree-construction pass of a training phase of a machine learning model, respective representations of a plurality of nodes generated for a particular decision tree;

determining, for one or more nodes of the particular decision tree, a respective value of a predictive utility metric (PUM), wherein a particular PUM value associated with a particular node of the one or more nodes is a measure of an expected contribution of the particular node to a prediction generated using the machine learning model;

generating, during a tree-pruning pass of the training phase, a modified version of the particular decision tree, wherein said generating comprises removing at least the particular node from the particular decision tree, wherein the particular node is selected for removal based at least in part on the particular PUM value; and executing the machine learning model using at least the modified version of the particular decision tree to obtain a particular prediction.

7. The method as recited in clause 6, wherein the particular node is selected for removal based at least in part on one or more run-time optimization goals for an execution of the model, including one or more of: (a) a memory-footprint goal (b) a prediction time goal, (c) a processor utilization goal, or (d) a budget goal.

8. The method as recited in any of clauses 6-7, wherein the PUM comprises one or more of: (a) an indication of a Gini impurity, (b) an information gain metric, or (c) an entropy metric.

9. The method as recited in any of clauses 6-8, further comprising performing, by the one or more computing devices:

determining a distribution of values of the PUM among the one or more nodes; and selecting the particular node for removal based at least in part on the distribution.

10. The method as recited in any of clauses 6-9, further comprising performing, by the one or more computing devices:

accumulating, during the tree-pruning pass, values of the PUM for a plurality of nodes of the particular decision tree in a top-down traversal of the particular decision tree; and selecting the particular node for removal based at least in part on a result of said accumulating.

11. The method as recited in any of clauses 6-10, further comprising performing, by the one or more computing devices:

examining, during the tree-pruning pass, values of the PUM for a plurality of nodes of the particular decision tree in a bottom-up traversal of the particular decision tree; and selecting the particular node for removal based at least in part on a result of said examining.

12. The method as recited in any of clauses 6-11, wherein the machine learning model comprises one or more of: (a) a Random Forest model, (b) a classification and regression tree (CART) model, or (c) an adaptive boosting model.

13. The method as recited in any of clauses 6-12, wherein the machine learning model is configured to utilize a plurality of decision trees including the particular decision tree, wherein the particular decision tree is generated at a particular thread of execution of a plurality of threads of execution of a machine learning service, further comprising performing, by the one or more computing devices:

generating a second decision tree of the plurality of decision trees at a different thread of execution of the plurality of threads of execution.

14 The method as recited in any of clauses 6-13, wherein the machine learning model is configured to utilize a plurality of decision trees including the particular decision tree, wherein the modified version of the particular decision tree is generated at a particular thread of execution of a plurality of threads of execution of a machine learning service, further comprising performing, by the one or more computing devices:

generating a modified version of a second decision tree of the plurality of decision trees at a different thread of execution of the plurality of threads of execution.

15. The method as recited in any of clauses 6-14, wherein the machine learning model is configured to utilize a plurality of decision trees including the particular decision tree, wherein the particular prediction is obtained at a particular thread of execution of a plurality of threads of execution of a machine learning service, further comprising:

obtaining a second prediction using a modified version of a second decision tree of the plurality of decision trees at a different thread of execution of the plurality of threads of execution.

16. A non-transitory computer-accessible storage medium storing program instructions that when executed on one or more processors:

store, in a depth-first order at one or more persistent storage devices during a first tree-construction period of one or more tree-construction periods of a training phase of a machine learning model, respective representations of a plurality of nodes generated for a particular decision tree;

determine, for one or more nodes of the particular decision tree, a respective value of a predictive utility metric (PUM), wherein a particular PUM value associated with a particular node of the one or more nodes is a measure of an expected contribution of the particular node to a prediction generated using the machine learning model;

select, during a first tree-pruning period of one or more tree-pruning periods of the training phase, the particular node for removal from the particular decision tree based at least in part on the particular PUM value; and store a modified version of the particular decision tree, wherein the modified version excludes the particular node.

17. The non-transitory computer-accessible storage medium as recited in clause 16, wherein the particular node is selected for removal based at least in part on one or more run-time optimization goals for an execution of the machine learning model, including one or more of: (a) a memory-footprint goal (b) a prediction time goal, (c) a processor utilization goal, or (d) a budget goal.

18. The non-transitory computer-accessible storage medium as recited in any of clauses 16-17, wherein the particular node is selected for removal based at least in part on one or more goals specified by a client on whose behalf the machine learning model is created.

19. The non-transitory computer-accessible storage medium as recited in any of clauses 16-18, wherein the instructions when executed at the one or more processors:

store a representation of a distribution of values of the PUM among the one or more nodes; and select the particular node for removal based at least in part on the distribution.

20. The non-transitory computer-accessible storage medium as recited in any of clauses 16-19, wherein the plurality of nodes of the particular decision tree is generated in response to an invocation of a programmatic interface of a machine learning service implemented at a provider network.

21. The non-transitory computer-accessible storage medium as recited in any of clauses 16-20, wherein the one or more tree-construction periods comprise a second tree-construction period performed after the first tree-pruning period, wherein the one or more tree-pruning periods comprise a second tree-pruning period performed after the second tree-construction period, and wherein the instructions when executed on the one or more processors:

store, during the second tree-construction period, a second node of the particular decision tree; and determine, during the second tree-pruning period, whether to remove the second node from the particular decision tree based at least in part on a PUM value associated with the second node.

Embodiments of the disclosure can also be described in view of the following clauses:

1. A system, comprising:
one or more computing devices configured to:
determine, via one or more programmatic interactions with a client of a machine learning service of a provider network, (a) one or more target variables to be predicted using a specified training data set, (b) one or more prediction quality metrics including a particular prediction quality metric, and (c) one or more prediction run-time goals including a particular prediction run-time goal;

identify a set of candidate feature processing transformations to derive a first set of processed variables from one or more input variables of the specified data set, wherein at least a subset of the first set of processed variables is usable to train a machine learning model to predict the one or more target variables, and wherein the set of candidate feature processing transformations includes a particular feature processing transformation;

determine (a) a quality estimate indicative of an effect, on the particular prediction quality metric, of implementing the particular candidate feature processing transformation, and (b) a cost estimate indicative of an effect, on a particular run-time performance metric associated with the particular prediction run-time goal, of implementing the particular candidate feature processing transformation;

generate, based at least in part on the quality estimate and at least in part on the cost estimate, a feature processing proposal to be provided to the client for approval, wherein the feature processing proposal includes a recommendation to implement the particular feature processing transformation; and in response to an indication of approval from the client, execute a machine learning model trained using a particular processed variable obtained from the particular feature processing transformation.

2. The system as recited in clause 1, wherein to determine the quality estimate, the one or more computing devices implement a plurality of evaluation runs of the machine learning model, including a first evaluation run in which a first set of values of the particular processed variable are provided as input to the machine learning model, and a second evaluation run in which a different set of values of the particular processed variable are provided as input to the machine learning model.

3. The system as recited in any of clauses 1-2, wherein to determine the cost estimate, the one or more computing devices implement respective evaluation runs of a first variant of the machine learning model and a second variant of the machine learning model, wherein the first variant is trained using a first training set that includes the particular processed variable, and the second variant is trained using a second training set that excludes the particular processed variable.

4. The system as recited in any of clauses 1-3, wherein the particular prediction quality metric comprises one or more of: (a) an AUC (area under curve) metric, (b) an accuracy metric, (c) a recall metric, (d) a sensitivity metric, (e) a true positive rate, (f) a specificity metric, (g) a true negative rate, (h) a precision metric, (i) a false positive rate, (j) a false negative rate, (k) an F1 score, (l) a coverage metric, (m) an absolute percentage error metric, or (n) a squared error metric.

5. The system as recited in any of clauses 1-4, wherein the particular feature processing transformation comprises a use of one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, or (j) a natural language processing function.

6. A method, comprising:
performing, by one or more computing devices:
identifying, at a machine learning service, a set of candidate input variables usable to train a machine learning model to predict one or more target variables, wherein the set of candidate input variables includes at least a particular processed variable generated by a particular feature processing transformation applicable to one or more input variables of a training data set;

determining (a) a quality estimate indicative of an effect, on a particular prediction quality metric, of implementing the particular feature processing transformation, and (b) a cost estimate indicative of an effect, on a performance metric associated with a particular prediction goal, of implementing the particular feature processing transformation; and implementing, based at least in part on the quality estimate and at least in part on the cost estimate, a feature processing plan that includes the particular feature processing transformation.

7. The method as recited in clause 6, further comprising performing, by the one or more computing devices:

generating one or more feature processing proposals, including a particular feature processing proposal recommending the particular feature processing transformation, based at least in part on an analysis of respective quality estimates and respective cost estimates corresponding to a plurality of candidate feature processing transformations; and providing an indication of the one or more feature processing proposals to a client.

8. The method as recited in any of clauses 6-7, wherein said implementing the feature processing plan is responsive to obtaining, from the client, an indication of approval of the particular feature processing proposal.

9. The method as recited in any of clauses 6-7, further comprising performing, by the one or more computing devices:

receiving, via one or more programmatic interfaces of the machine learning service, a model creation request comprising respective indications of one or more of: (a) the one or more target variables, (b) one or more prediction quality metrics including the particular prediction quality metric, (c) one or more prediction goals including the particular prediction goal, or (d) one or more constraints including a particular constraint identifying a mandatory feature processing transformation.

10. The method as recited in any of clauses 6-7 or 9, wherein further comprising performing, by the one or more computing devices:

in response to determining that one or more feature processing proposals based at least in part on the model creation request are unacceptable to a client of the machine learning service, transmitting a requirement reconsideration request to the client; and receiving an indication from the client of a relative priority assigned to one or more of: (a) the particular prediction quality metric, or (b) the particular prediction goal.

11. The method as recited in any of clauses 6-7 or 9-10, wherein the particular prediction quality metric comprises one or more of: (a) an AUC (area under curve) metric, (b) an accuracy metric, (c) a recall metric, (d) a sensitivity metric, (e) a true positive rate, (f) a specificity metric, (g) a true negative rate, (h) a precision metric, (i) a false positive rate, (j) a false negative rate, (k) an F1 score, (l) a coverage metric, (m) an absolute percentage error metric, or (n) a squared error metric.

12. The method as recited in any of clauses 6-7 or 9-11, wherein the particular feature processing transformation comprises a use of one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, or (j) a natural language processing function.

13. The method as recited in any of clauses 6-7 or 9-12, wherein the particular prediction goal comprises one or more of: (a) a model execution time goal, (b) a memory usage goal, (c) a processor usage goal, (d) a storage usage goal, (e) a network usage goal, or (f) a budget.

14. The method as recited in any of clauses 6-7 or 9-13, further comprising performing, by the one or more computing devices:

providing a programmatic interface enabling a client of the machine learning service to determine an extent to which the particular prediction goal is met by a particular execution of the machine learning model.

15. The method as recited in any of clauses 6-7 or 9-14, wherein said determining the quality estimate comprises implementing a plurality of evaluation runs of the machine learning model, including a first evaluation run in which a first set of values of the particular processed variable are provided as input to the machine learning model, and a second evaluation run in which a different set of values of the particular processed variable are provided as input to the machine learning model.

16. The method as recited in any of clauses 6-7 or 9-15, wherein said determining the cost estimate comprises implementing respective evaluation runs of a first variant of the machine learning model and a second variant of the machine learning model, wherein the first variant is trained using a first set of input variables that includes the particular processed variable, and the second variant is trained using a second set of input variables that excludes the particular processed variable.

17. The method as recited in any of clauses 6-7 or 9-16, further comprising performing, by the one or more computing devices:

receiving, from a client, an indication of a recipe indicating one or more feature processing transformations requested by the client on the input variables of the training data set, wherein the particular feature processing transformation is not included in the recipe; and providing, to the client, a proposed modification to the recipe, wherein the proposed modification includes an indication of the particular feature processing transformation.

18. A non-transitory computer-accessible storage medium storing program instructions that when executed on one or more processors:

identify, at a machine learning service, a set of candidate input variables usable to train a machine learning model to predict one or more target variables, wherein the set of candidate input variables includes at least a particular processed variable resulting from a particular feature processing transformation applicable to one or more input variables of a training data set;

determine a cost estimate indicative of an effect, on a performance metric associated with a particular prediction goal, of implementing the particular feature processing transformation; and implement, based at least in part on the cost estimate, a feature processing proposal that excludes the particular feature processing transformation.

19. The non-transitory computer-accessible storage medium as recited in clause 18, wherein the instructions when executed on the one or more processors:

determine a quality estimate indicative of an effect, on a particular prediction quality metric, of implementing the particular feature processing transformation;
wherein the feature processing proposal is implemented based at least in part on the quality estimate.

20. The non-transitory computer-accessible storage medium as recited in any of clauses 18-19, wherein the machine learning model comprises one or more of: (a) a classification model, (b) a regression model, (c) a natural language processing (NLP) model, or (d) a clustering model.

21. The non-transitory computer-accessible storage medium as recited in any of clauses 18-20, wherein the particular feature processing transformation comprises a use of one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, or (j) a natural language processing function.

Embodiments of the disclosure can also be described in view of the following clauses:

1. A system, comprising:
one or more computing devices configured to:
receive, at a machine learning service of a provider network, an indication of a data source to be used for generating a linear prediction model, wherein, to generate a prediction, the linear prediction model is to utilize respective weights assigned to individual ones of a plurality of features derived from observation records of the data source, wherein the respective weights are stored in a parameter vector of the linear prediction model;
determine, based at least in part on examination of a particular set of observation records of the data source, respective weights for one or more features to be added to the parameter vector during a particular learning iteration of a plurality of learning iterations of a training phase of the linear prediction model;
in response to a determination that a triggering condition has been met during the training phase,
identify one or more pruning victims from a set of features whose weights are included in the parameter vector, based at least in part on a quantile analysis of the weights, wherein the quantile analysis is performed without a sort operation; and
remove at least a particular weight corresponding to a particular pruning victim of the one or more pruning victims from the parameter vector; and
generate, during a post-training-phase prediction run of the linear prediction model, a prediction using at least one feature for which a weight is determined after the particular weight of the particular pruning victim is removed from the parameter vector.

2. The system as recited in clause 1, wherein the triggering condition is based at least in part on a population of the parameter vector.

3. The system as recited in any of clauses 1-2, wherein the triggering condition is based at least in part on a goal indicated by a client.

4. The system as recited in any of clauses 1-3, wherein the one or more computing devices are further configured to:
during a subsequent learning iteration of the plurality of learning iterations, performed after the particular learning iteration,
determine that a weight for the particular pruning victim is to be re-added to the parameter vector; and
add the weight corresponding to the particular pruning victim to the parameter vector.

5. The system as recited in any of clauses 1-4, wherein a first feature of the one or more features whose weights are to be added to the parameter vector during the particular learning iteration is derived from one or more variables of the observation records of the data source via a transformation that comprises a use of one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, (j) a natural language processing function or (k) a video processing function.

6. A method, comprising:
performing, by one or more computing devices:
receiving an indication of a data source to be used for training a machine learning model, wherein, to generate a prediction, the machine learning model is to utilize respective parameters assigned to individual ones of a plurality of features derived from observation records of the data source, wherein the respective parameters are stored in a parameter vector of the machine learning model;
identifying one or more features for which respective parameters are to be added to the parameter vector during a particular learning iteration of a plurality of learning iterations of a training phase of the machine learning model;
in response to determining that a triggering condition has been met in the training phase, removing respective parameters of one or more pruning victim features from the parameter vector, wherein the one or more pruning victim features are selected based at least in part on an analysis of relative contributions of features whose parameters are included in the parameter vector to predictions made using the machine learning model; and
generating, during a post-training-phase prediction run of the machine learning model, a particular prediction using at least one feature for which a parameter is determined after the one or more pruning victim features are selected.

7. The method as recited in clause 6, wherein the analysis of relative contributions comprises a quantile analysis of weights included in the parameter vector.

8. The method as recited in any of clauses 6-7, wherein the analysis of relative contributions (a) does not comprise a sort operation and (b) does not comprise copying values of the parameters included in the parameter vector.

9. The method as recited in any of clauses 6-8, wherein said determining that the triggering condition has been met comprises determining that a population of the parameter vector exceeds a threshold.

10. The method as recited in any of clauses 6-9, wherein the triggering condition is based at least in part on a resource capacity constraint of a server of a machine learning service.

11. The method as recited in any of clauses 6-10, wherein the triggering condition is based at least in part on a goal indicated by a client.

12. The method as recited in any of clauses 6-11, further comprising performing, by the one or more computing devices:
during a subsequent learning iteration of the plurality of learning iterations, performed after the particular learning iteration, determining that a parameter for a particular feature which was previously selected as a pruning victim feature is to be re-added to the parameter vector; and adding the parameter for the particular feature to the parameter vector.

13. The method as recited in any of clauses 6-12, wherein a first feature of the one or more features for which respective parameters are to be added to the parameter vector during the particular learning iteration is determined from one or more variables of observation records of the data source via a transformation that comprises a use of one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, (j) a natural language processing function, or (k) a video processing function.

14. The method as recited in any of clauses 6-13, further comprising performing, by the one or more computing devices:

implementing a stochastic gradient descent technique to update, during the particular learning iteration, one or more previously-generated parameters included in the parameter vector.

15. The method as recited in any of clauses 6-14, wherein the machine learning model comprises a generalized linear model.

16. The method as recited in any of clauses 6-15, further comprising performing, by the one or more computing devices:

receiving, via a programmatic interface of a machine learning service implemented at a provider network, wherein the machine learning service comprises a plurality of training servers at one or more data centers, a client request indicating the data source; and assigning, to a particular training server of the plurality of training servers by a job scheduler of the machine learning service, asynchronously with respect to said receiving the client request, a job comprising the plurality of learning iterations.

17. A non-transitory computer-accessible storage medium storing program instructions that when executed on one or more processors implements a model generator of a machine learning service, wherein the model generator is configured to:

determine a data source to be used for generating a model, wherein, to generate a prediction, the model is to utilize respective parameters assigned to individual ones of a plurality of features derived from observation records of the data source, wherein the respective parameters are stored in a parameter vector of the model;

identify one or more features for which parameters are to be added to the parameter vector during a particular learning iteration of a plurality of learning iterations of a training phase of the model;

in response to a determination that a triggering condition has been met, remove respective parameters assigned to one or more pruning victim features from the parameter vector, wherein the one or more pruning victim features are selected based at least in part on an analysis of relative contributions of features whose parameters are included in the parameter vector to predictions made using the model; and add, subsequent to a removal from the parameter vector of at least one parameter assigned to a pruning victim feature, at least one parameter to the parameter vector.

18. The non-transitory computer-accessible storage medium as recited in clause 17, wherein the analysis of relative contributions comprises a determination of a deviation of a particular parameter value included in the parameter vector from an a priori parameter value.

19. The non-transitory computer-accessible storage medium as recited in any of clauses 17-18, wherein the particular parameter value comprises a probability distribution, and wherein the determination of the deviation comprises an estimation of a Kullback-Leibler (KL) divergence.

20. The non-transitory computer-accessible storage medium as recited in any of clauses 17-19, wherein to determine whether the triggering condition has been met, the model generator is configured to determine whether a population of the parameter vector exceeds a threshold.

21. The non-transitory computer-accessible storage medium as recited in any of clauses 17-20, wherein the data source comprises a source of a stream of observation records transmitted to a network endpoint of a machine learning service.

Embodiments of the disclosure can also be described in view of the following clauses:

1. A system, comprising:
one or more computing devices configured to:
receive, at a machine learning service of a provider network, an indication of a data source comprising observation records to be used to generate a model;

identify one or more variables of the observation records as candidates for quantile binning transformations;

determine a particular concurrent binning plan for at least a particular variable of the one or more variables, wherein, in accordance with the particular concurrent binning plan, a plurality of quantile binning transformations are applied to the particular variable during a training phase of the model, wherein the plurality of quantile binning transformations include a first quantile binning transformation with a first bin count and a second quantile binning transformation with a different bin count;

generate, during the training phase, a parameter vector comprising respective initial weight values corresponding to a plurality of binned features obtained as a result of an implementation of the particular concurrent binning plan, including a first binned feature obtained using the first quantile binning transformation and a second binned feature obtained using the second quantile binning transformation;

reduce, during the training phase, at least one weight value corresponding to a particular binned feature of the plurality of binned features in accordance with a selected optimization strategy; and obtain, during a post-training-phase prediction run of the model, a particular prediction using at least one of: the first binned feature or the second binned feature.

2. The system as recited in clause 1, wherein the one or more variables identified as candidates comprise a plurality of variables, wherein the one or more computing devices are further configured to:

in accordance with a second concurrent binning plan for a group of variables of the plurality of variables, wherein the group includes a first variable and a second variable, apply a first multi-variable quantile binning transformation to at least the first variable and the second variable, wherein in accordance with the first multi-variable quantile binning transformation, a particular observation record is placed in a first bin based at least in part on a first combination of bin counts selected for the first and second variables; and apply a second multi-variable quantile binning transformation to at least the first variable and the second variable, wherein in accordance with the second multi-variable quantile binning transformation, the particular observation record is placed in a second bin based at least in part on a different combination of bin counts selected for the first and second variables.

3. The system as recited in any of clauses 1-2, wherein the selected optimization strategy comprises regularization.

4. The system as recited in any of clauses 1-3, wherein the one or more computing devices are further configured to:
select a particular binned feature for removal from the parameter vector based at least in part on an estimate of a quantile boundary for weights assigned to a plurality of features of the model, wherein the estimate is obtained without sorting the weights.

5. The system as recited in any of clauses 1-4, wherein the one or more computing devices are further configured to:
store, in an artifact repository of the machine learning service, a particular recipe formatted in accordance with a recipe language for feature transformations implemented at the machine learning service, wherein the particular recipe comprises an indication of the first quantile binning transformation and an indication of the second quantile binning transformation.

6. A method, comprising:
performing, by one or more computing devices:
implementing a respective concurrent binning plan for one or more variables of observation records to be used to generate a machine learning model, wherein, in accordance with a particular concurrent binning plan, a plurality of quantile binning transformations are applied to at least a particular variable of the one or more variables, wherein the plurality of quantile binning transformations include a first quantile binning transformation with a first bin count and a second quantile binning transformation with a different bin count;
determining respective parameter values associated with a plurality of binned features, including a first binned feature obtained using the first quantile binning transformation and a second binned feature obtained using the second quantile binning transformation; and
generating, during a post-training-phase prediction run of the machine learning model, a particular prediction using a parameter value corresponding to at least one of: the first binned feature or the second binned feature.

7. The method as recited in clause 6, further comprising performing, by the one or more computing devices:
in accordance with a second concurrent binning plan generated for a group of variables of the observation records, wherein the group includes a first variable and a second variable,
applying a first multi-variable quantile binning transformation to at least the first variable and the second variable, wherein in accordance with the first multi-variable quantile binning transformation, a particular observation record is placed in a first bin based at least in part on a first combination of bin counts selected for the first and second variables; and applying a second multi-variable quantile binning transformation to at least the first variable and the second variable, wherein in accordance with the second multi-variable quantile binning transformation, the particular observation record is placed in a second bin based at least in part on a different combination of bin counts selected for the first and second variables.

8. The method as recited in any of clauses 6-7, further comprising performing, by the one or more computing devices:
generating a k-dimensional tree (k-d tree) representation of at least a subset of the observation records, based at least in part on respective values of a selected group of variables of the observation records; and
determining one or more attributes of a concurrent quantile binning transformation to be applied to at least one variable of the one or more variables, based at least in part on an analysis of the k-dimensional tree.

9. The method as recited in any of clauses 6-8, further comprising performing, by the one or more computing devices:
removing, subsequent to said determining the respective parameter values and prior to said post-training-phase prediction run, a parameter corresponding to at least one binned feature from a parameter vector generated for the machine learning model.

10. The method as recited in clause 9, wherein the parameter vector comprises a respective weight corresponding to one or more individual features of a plurality of features identified for the machine learning model, further comprising performing, by the one or more computing devices:
utilizing regularization to adjust a value of a particular weight assigned to a particular binned feature; and
selecting the particular binned feature as a pruning target whose weight is to be removed from the parameter vector based at least in part on a determination that an adjusted value of the particular weight is below a threshold.

11. The method as recited in clause 9, further comprising performing, by the one or more computing devices:
selecting a particular binned feature as a pruning target whose weight is to be removed from the parameter vector based at least in part on determining an estimate of a quantile boundary for weights included in the parameter vector, wherein said determining the estimate is performed without sorting the weights.

12. The method as recited in any of clauses 6-9, further comprising performing, by the one or more computing devices:
determining at least one of: (a) the first bin count or (b) the different bin count based at least in part on a problem domain of the machine learning model.

13. The method as recited in any of clauses 6-9 or 12, wherein said implementing the respective concurrent binning plan is performed in response to receiving a model generation request via a programmatic interface of a machine learning service implemented at a provider network.

14. The method as recited in any of clauses 6-9 or 12-13, further comprising performing, by the one or more computing devices:
storing, in an artifact repository of a machine learning service implemented at a provider network, a particular recipe formatted in accordance with a recipe language implemented at the machine learning service, wherein the particular recipe comprises an indication of the first quantile binning transformation and an indication of the second quantile binning transformation.

15. The method as recited in any of clauses 6-9 or 12-14, wherein the machine learning model comprises one or more of: a supervised learning model, or an unsupervised learning model.

16. A non-transitory computer-accessible storage medium storing program instructions that when executed on one or more processors implements a model generator of a machine learning service, wherein the model generator is configured to:
  identify one or more variables of observation records to be used to generate a machine learning model as candidates for quantile binning transformations;
  determine a respective concurrent binning plan for the one or more variables, wherein, in accordance with a particular concurrent binning plan for at least a particular variable, a plurality of quantile binning transformations are applied to the particular variable, wherein the plurality of quantile binning transformations include a first quantile binning transformation with a first bin count and a second quantile binning transformation with a different bin count; and
  include, within a parameter vector of the machine learning model, respective parameters for a plurality of binned features, including a first parameter for a first binned feature obtained from the first quantile binning transformation and a second parameter for a second binned feature obtained from the first quantile binning feature, wherein at least one binned feature of the first and second binned features is used to generate a prediction in a post-training-phase execution of the machine learning model.

17. The non-transitory computer-accessible storage medium as recited in clause 16, wherein the model generator is further configured to:
  in accordance with a second concurrent binning plan for a group of variables of the observation records, wherein the group includes a first variable and a second variable,
    apply a first multi-variable quantile binning transformation to at least the first variable and the second variable, wherein in accordance with the first multi-variable quantile binning transformation, a particular observation record is placed in a first bin based at least in part on a first combination of bin counts selected for the first and second variables; and
    apply a second multi-variable quantile binning transformation to at least the first variable and the second variable, wherein in accordance with the second multi-variable quantile binning transformation, the particular observation record is placed in a second bin based at least in part on a different combination of bin counts selected for the first and second variables.

18. The non-transitory computer-accessible storage medium as recited in any of clauses 16-17, wherein the model generator is further configured to:
  adjust a value of a particular weight assigned to the first binned feature; and
  select the first binned feature for removal from the parameter vector based at least in part on a determination that an adjusted value of the particular weight is below a threshold.

19. The non-transitory computer-accessible storage medium as recited in any of clauses 16-18, wherein the model generator is further configured to:
  select the first binned feature for removal from the parameter vector based at least in part on an estimate of a quantile boundary for weights assigned to a plurality of features identified for the machine learning model, wherein the estimate is obtained without sorting the weights.

20. The non-transitory computer-accessible storage medium as recited in any of clauses 16-19, wherein the machine learning model comprises a generalized linear model.

Embodiments of the disclosure can also be described in view of the following clauses:

1. A system, comprising:
  one or more computing devices configured to:
    train a machine learning model to generate values of one or more output variables corresponding to respective observation records at a machine learning service of a provider network, wherein the one or more output variables include a particular output variable;
    generate, corresponding to one or more evaluation runs of the machine learning model performed using respective evaluation data sets, a first set of data to be displayed via an interactive graphical interface, wherein the first set of data comprises at least (a) a statistical distribution of the particular output variable, and (b) a first prediction quality metric of the machine learning model, wherein the interactive graphical interface includes a first graphical control to modify a first prediction interpretation threshold associated with the machine learning model;
    determine, based at least in part on a detection of a particular client's use of the first graphical control, a target value of the first prediction interpretation threshold;
    initiate a display, via the interactive graphical interface, of a change to the first prediction quality metric resulting from a selection of the target value;
    in response to a request transmitted by a client via the interactive graphical interface, save the target value in a persistent repository of the machine learning service; and
    utilize the saved target value to generate one or more results of a subsequent run of the machine learning model.

2. The system as recited in clause 1, wherein the machine learning model is a binary classification model that is to be used to classify observation records into a first category and a second category, and wherein the first prediction interpretation threshold indicates a cutoff boundary between the first and second categories.

3. The system as recited in any of clauses 1-2, wherein the first prediction quality metric comprises one or more of: an accuracy metric, a recall metric, a sensitivity metric, a true positive rate, a specificity metric, a true negative rate, a precision metric, a false positive rate, a false negative rate, an F1 score, a coverage metric, an absolute percentage error metric, a squared error metric, or an AUC (area under a curve) metric.

4. The system as recited in any of clauses 1-3, wherein the first graphical control comprises a continuous-variation control element enabling the particular client to indicate a transition between a first value of the first prediction interpretation threshold and a second value of the first prediction interpretation threshold, wherein the one or more computing devices are further configured to:

initiate an update, in real time, as the particular client indicates a transition from the first value to the second value, of a portion of the interactive graphical interface indicating a corresponding change to the first prediction quality metric.

5. The system as recited in any of clauses 1-4, wherein the interactive graphical interface comprises respective additional controls for indicating target values of a plurality of prediction quality metrics including the first prediction quality metric and a second prediction quality metric, wherein the one or more computing devices are further configured to:

in response to a change, indicated using a first additional control, of a target value of the first prediction quality metric, initiate an update of a display of a second additional control corresponding to the second prediction quality metric, indicating an impact of the change of the target value of the first prediction quality metric on the second prediction quality metric.

6. A method, comprising:
performing, by one or more computing devices:

training a machine learning model to generate respective values of one or more output variables corresponding to respective observation records, wherein the one or more output variables include a particular output variable;

generating, corresponding to one or more evaluation runs of the machine learning model, a first set of data to be displayed via an interactive graphical interface, wherein the first set of data includes at least a first prediction quality metric of the machine learning model, and wherein the interactive graphical interface includes a first graphical control to modify a first prediction interpretation threshold associated with the machine learning model;

determining, based at least in part on a detection of a particular client's interaction with the first graphical control, a target value of the first prediction interpretation threshold;

initiating a display, via the interactive graphical interface, of a change to the first prediction quality metric resulting from a selection of the target value; and obtaining, using the target value, one or more results of a subsequent run of the machine learning model.

7. The method as recited in clause 6, wherein the machine learning model is a binary classification model that is to be used to classify observation records into a first category and a second category, and wherein the first prediction interpretation threshold indicates a cutoff boundary between the first and second categories.

8. The method as recited in any of clauses 6-7, wherein the first prediction quality metric comprises one or more of: an accuracy metric, a recall metric, a sensitivity metric, a true positive rate, a specificity metric, a true negative rate, a precision metric, a false positive rate, a false negative rate, an F1 score, a coverage metric, an absolute percentage error metric, a squared error metric, or an AUC (area under a curve) metric.

9. The method as recited in any of clauses 6-8, wherein the first graphical control comprises a continuous-variation control element enabling the particular client to indicate a transition between a first value of the first prediction interpretation threshold and a second value of the first prediction interpretation threshold, further comprising performing, by the one or more computing devices:

initiating an update, in real time, as the particular client indicates a transition from the first value to the second value, of a portion of the interactive graphical interface indicating a corresponding change to the first prediction quality metric.

10. The method as recited in any of clauses 6-9, wherein the interactive graphical interface comprises respective additional controls for indicating target values of a plurality of prediction quality metrics including the first prediction quality metric and a second prediction quality metric, further comprising performing, by the one or more computing devices:

in response to a change, indicated using a first additional control, of a target value of the first prediction quality metric, initiating an update of a display of a second additional control corresponding to the second prediction quality metric, indicating an impact of the change of the target value of the first prediction quality metric on the second prediction quality metric.

11. The method as recited in clause 10, further comprising performing, by the one or more computing devices:

in response to the change, indicated using a first additional control, of the target value of the first prediction quality metric, initiating a display of a change of the first prediction interpretation threshold.

12. The method as recited in any of clauses 6-10, wherein the machine learning model is one of: (a) an n-way classification model or (b) a regression model.

13. The method as recited in any of clauses 6-10 or 12, wherein the interactive graphical interface includes a region displaying a statistical distribution of values of the particular output variable, further comprising performing, by the one or more computing devices:

initiating a display, in response to a particular client interaction with the region, wherein the particular client interaction indicates a first value of the particular output variable, of values of one or more input variables of an observation record for which the particular output variable has the first value.

14. The method as recited in any of clauses 6-10 or 12-13, further comprising performing, by the one or more computing devices:

generating, for display via the interactive graphical interface, an alert message indicating an anomaly detected during an execution of the machine learning model.

15. The method as recited in any of clauses 6-10 or 12-14, further comprising performing, by the one or more computing devices:

receiving, in response to a use of a different control of the interactive graphical interface by the particular client subsequent to a display of the first prediction quality metric, a request to perform one or more of: (a) a re-evaluation of the machine learning model or (b) a re-training of the machine learning model.

16. The method as recited in any of clauses 6-10 or 12-15, further comprising performing, by the one or more computing devices:

saving, in a repository of a machine learning service implemented at a provider network, a record indicating the target value.

17. A non-transitory computer-accessible storage medium storing program instructions that when executed on one or more processors:

generate, corresponding to an evaluation run of a machine learning model, a first set of data to be displayed via an interactive graphical interface, wherein the first set of data includes at least a first prediction quality metric of the machine learning model, and wherein the interactive graphical interface includes a first graphical control to modify a first interpretation threshold associated with the machine learning model;

determine, based on a detection of a particular client's interaction with the first graphical control, a target value of the first interpretation threshold; and initiate a display, via the interactive graphical interface, of a change to the first prediction quality metric resulting from a selection of the target value.

18. The non-transitory computer-accessible storage medium as recited in clause 17, wherein the machine learning model is a binary classification model that is to be used to classify observation records into a first category and a second category, and wherein the first interpretation threshold indicates a cutoff boundary between the first and second categories.

19. The non-transitory computer-accessible storage medium as recited in any of clauses 17-18, wherein the first prediction quality metric comprises one or more of: an accuracy metric, a recall metric, a sensitivity metric, a true positive rate, a specificity metric, a true negative rate, a precision metric, a false positive rate, a false negative rate, an F1 score, a coverage metric, an absolute percentage error metric, a squared error metric, or an AUC (area under a curve) metric.

20. The non-transitory computer-accessible storage medium as recited in any of clauses 17-19, wherein the first graphical control comprises a continuous-variation control element enabling the particular client to indicate a transition between a first value of the first interpretation threshold and a second value of the first interpretation threshold, wherein the instructions when executed on one or more processors:

initiate an update, in real time, as the particular user indicates a transition from the first value to the second value, of a portion of the interactive graphical interface indicating a corresponding change to the first prediction quality metric.

21. A non-transitory computer-accessible storage medium storing program instructions that when executed on one or more processors:

display, corresponding to an evaluation run of a machine learning model, a first set of data via an interactive interface during a particular interaction session with a customer, wherein the first set of data includes at least a first prediction quality metric associated with the evaluation run;

transmit, to a server of a machine learning service during the particular interaction session, based on a detection of a particular interaction of the customer with the interactive interface, a target value of the first interpretation threshold;

receive, from the server, an indication of a change to the first prediction quality metric resulting from a selection of the target value; and indicate, via the interactive interface, the change to the first prediction quality metric during the particular interaction session.

22. The non-transitory computer-accessible storage medium as recited in clause 21, wherein the interactive interface comprises a graphical interface, and wherein the particular interaction comprises a manipulation of a first graphical control included in the graphical interface.

23. The non-transitory computer-accessible storage medium as recited in clause 21, wherein the interactive interface comprises a command-line interface.

24. The non-transitory computer-accessible storage medium as recited in clause 22, wherein the interactive interface comprises an API (application programming interface).

Embodiments of the disclosure can also be described in view of the following clauses:

1. A system, comprising:
one or more computing devices configured to:
generate, at a machine learning service of a provider network, one or more space-efficient representations of a first set of observation records associated with a machine learning model, wherein individual ones of the space-efficient representations utilize less storage than the first set of observation records, and wherein at least a subset of observation records of the first set include respective values of a first group of one or more variables;

receive an indication that a second set of observation records is to be examined for the presence of duplicates of observation records of the first set in accordance with a probabilistic duplicate detection technique, wherein at least a subset of observation records of the second set include respective values of the first group of one or more variables;

obtain, using at least one space-efficient representation of the one or more space-efficient representations, a duplication metric corresponding to at least a portion of the second set, indicative of a non-zero probability that one or more observation records of the second set are duplicates of one or more observation records of the first set with respect to at least the first group of one or more variables; and in response to a determination that the duplication metric meets a threshold criterion, implement one or more responsive actions including a notification of a detection of potential duplicate observation records to the client.

2. The system as recited in clause 1, wherein a particular space-efficient representation of the one or more space-efficient representations includes one or more of: (a) a Bloom filter, (b) a quotient filter, or (c) a skip list.

3. The system as recited in any of clauses 1-2, wherein the first set of one or more observation records comprises a training data set of the machine learning model, and wherein the second set of one or more observation records comprises a test data set of the machine learning model.

4. The system as recited in any of clauses 1-3, wherein a particular space-efficient representation of the one or more space-efficient representations includes a Bloom filter, wherein the one or more computing devices are further configured to:

estimate, prior to generating the Bloom filter, (a) an approximate count of observation records included in the first set and (b) an approximate size of individual observation records of the first set; and determine, based at least in part on the approximate count or the approximate size, one or more parameters to be used to generate the Bloom filter, including one or more of: (a) a number of bits to be included in the Bloom filter (b) a number of hash functions to be used to generate the Bloom filter, or (c) a particular type of hash function to be used to generate the Bloom filter.

5. The system as recited in any of clauses 1-4, wherein the one or more responsive actions include one or more of: (a) a transmission of an indication, to the client, of a particular observation record of the second set which has been identified as having a non-zero probability of being a duplicate, (b) a removal, from the second set, of a particular observation record which has been identified as having a non-zero probability of being a duplicate, prior to performing a particular machine learning task using the second set, (c) a transmission, to the client, of an indication of a potential prediction error associated with removing, from the second set, one or more observation records which have been identified as having non-zero probabilities of being duplicates, or (d) a cancellation of a machine learning job associated with the second set.

6. A method, comprising:
  performing, by one or more computing devices:
    generating, at a machine learning service, one or more alternate representations of a first set of observation records, wherein at least one alternate representation occupies a different amount of space than the first set of observation records;
    obtaining, using at least one alternate representation of the one or more alternate representations, a duplication metric corresponding to at least a portion of a second set of observation records, indicative of a non-zero probability that one or more observation records of the second set are duplicates of respective observation records of the first set, with respect to one or more variables for which respective values are included in at least some observation records of the first set; and
    in response to determining that the duplication metric meets a threshold criterion, implementing one or more responsive actions.

7. The method as recited in clause 6, wherein a particular alternate representation of the one or more alternate representations includes one or more of: (a) a Bloom filter, (b) a quotient filter, or (c) a skip list.

8. The method as recited in any of clauses 6-7, wherein the first set of one or more observation records comprises a training data set of a particular machine learning model, and wherein the second set of one or more observation records comprises a test data set of the particular machine learning model.

9. The method as recited in any of clauses 6-8, wherein a particular alternate representation of the one or more alternate representations includes a Bloom filter, further comprising performing, by the one or more computing devices:
  estimating, prior to generating the Bloom filter, (a) an approximate count of observation records included in the first set and (b) an approximate size of individual observation records of the first set; and
  determining, based at least in part on the approximate count or the approximate size, one or more parameters to be used to generate the Bloom filter, including one or more of: (a) a number of bits to be included in the Bloom filter (b) a number of hash functions to be used to generate the Bloom filter, or (c) a particular type of hash function to be used to generate the Bloom filter.

10. The method as recited in any of clauses 6-9, wherein the one or more response actions include one or more of: (a) notifying a client of a detection of potential duplicate observation records, (b) providing an indication of a particular observation record of the second set which has been identified as having a non-zero probability of being a duplicate, (c) removing, from the second set, a particular observation record which has been identified as having a non-zero probability of being a duplicate, prior to performing a particular machine learning task using the second set, (d) providing, to a client, an indication of a potential prediction error associated with removing, from the second data set, one or more observation records which have been identified as having non-zero probabilities of being duplicates, or (e) abandoning a machine learning job associated with the second set.

11. The method as recited in any of clauses 6-10, wherein a particular responsive action of the one or more responsive actions comprises providing an indication of a confidence level that a particular observation record of the second set is a duplicate.

12. The method as recited in any of clauses 6-11, wherein the group of one or more variables excludes an output variable whose value is to be predicted by a machine learning model.

13. The method as recited in any of clauses 6-12, wherein said determining that the duplication metric meets a threshold criterion comprises one or more of: (a) determining that the number of observation records of the second set which have been identified as having non-zero probabilities of being duplicates exceeds a first threshold or (b) determining that the fraction of the observation records of the second set that have been identified as having non-zero probabilities of being duplicates exceeds a second threshold.

14. The method as recited in any of clauses 6-13, wherein said generating the one or more alternate representations of the first set of observation records comprises:
  subdividing the first set of observation records into a plurality of partitions;
  generating, at respective servers of the machine learning service, a respective Bloom filter corresponding to individual ones of the plurality of partitions; and
  combining the Bloom filters generated at the respective servers into a consolidated Bloom filter.

15. The method as recited in any of clauses 6-14, further comprising performing, by the one or more computing devices:
  receiving, via a programmatic interface, an indication from the client of one or more of (a) a parameter to be used by the machine learning service to determine whether the threshold criterion has been met, or (b) the one or more responsive actions.

16. The method as recited in any of clauses 6-15, wherein the first set of observation records and the second set of observation records are respective subsets of one of: (a) a training data set of a particular machine learning model, (b) a test data set of a particular machine learning model, or (c) a source data set from which a training data set of a particular machine learning model and a test data set of the particular machine learning model are to be obtained.

17. A non-transitory computer-accessible storage medium storing program instructions that when executed on one or more processors:
  determine, at a machine learning service, that an analysis to detect whether at least a portion of contents of one or more observation records of a first set of observation records are duplicated in a second set of observation records is to be performed;
  obtain a duplication metric corresponding to at least a portion of a second set of observation records, indicative of a non-zero probability that one or more observation records of the second set are duplicates of respective observation records of the first set, with respect to one or more variables for which respective values are included in at least some observation records of the first set; and
  in response to a determination that the duplication metric meets a threshold criterion, implement one or more responsive actions.

18. The non-transitory computer-accessible storage medium as recited in clause 17, wherein to obtain the alternate metric, the instructions when executed on the one or more processors generate an alternate representation of the first set of observation records, wherein the alternate representation includes one or more of: (a) a Bloom filter, (b) a quotient filter, or (c) a skip list.

19. The non-transitory computer-accessible storage medium as recited in any of clauses 17-18, wherein the first set of one or more observation records comprises a training data set of a particular machine learning model, and wherein the second set of one or more observation records comprises a test data set of the particular machine learning model.

20. The non-transitory computer-accessible storage medium as recited in any of clauses 17-19, wherein a particular responsive action of the one or more responsive actions comprises providing an indication of a confidence level that a particular observation record of the second set is a duplicate.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
receive a plurality of jobs to be executed at a machine learning service, including a training job to train a machine learning model using a first set of observation records, and an evaluation job to evaluate the machine learning model after training using a second set of observation records;
initiate the training job at the machine learning service to train the machine learning model using the first set of observation records;
initiate the evaluation job at the machine learning service to evaluate the machine learning model using the second set of observation records;
receive a duplication definition to use to determine duplicates between the first set of observation records and the second set of observation records, wherein individual observation records in the first set includes a plurality of variables, and the duplication definition specifies a subset of the plurality of variables to use to determine duplicates;
generate, at the machine learning service and according to the duplication definition, one or more space-efficient representations of the first set of observation records for the training job, wherein at least a subset of observation records of the first set include respective values of the subset of variables;
receive an indication that the second set of observation records for the evaluation job is to be examined for duplicates of observation records of the first set in accordance with a probabilistic duplicate detection technique, wherein at least a subset of observation records of the second set include respective values of the subset of variables;
determine, using at least one space-efficient representation of the one or more space-efficient representations, a duplication metric corresponding to at least a portion of the second set, wherein the duplication metric indicates a number or fraction of observation records of the second set that are non-zero probability duplicates of one or more observation records of the first set with respect to at least the subset of variables; and
in response to a determination that the duplication metric meets a threshold criterion, perform one or more responsive actions including one or more of:
removing from the second set one or more observation records indicated as non-zero probability duplicates,
suspending the training or evaluation job, or
canceling the training or evaluation job.

2. The system as recited in claim 1, wherein the at least one space-efficient representation of the first set of observation records is a particular space-efficient representation of the one or more representations that utilize less storage than the first set of observation records and includes one or more of: (a) a Bloom filter, (b) a quotient filter, or (c) a skip list.

3. The system as recited in claim 2, wherein the particular space-efficient representation of the one or more space-efficient representations includes a Bloom filter, wherein the one or more computing devices are further configured to:
estimate, prior to generating the Bloom filter, (a) an approximate count of observation records included in the first set and (b) an approximate size of individual observation records of the first set; and
determine, based at least in part on the approximate count or the approximate size, one or more parameters to be used to generate the Bloom filter, including one or more of: (a) a number of bits to be included in the Bloom filter (b) a number of hash functions to be used to generate the Bloom filter, or (c) a particular type of hash function to be used to generate the Bloom filter.

4. The system as recited in claim 1, wherein the duplication definition excludes one or more variables from determination of the duplication metric based at least in part on a sparseness criterion.

5. The system as recited in claim 1, wherein the one or more responsive actions include one or more of: (a) a transmission of an indication, to the client, of a particular observation record of the second set which has been identified as having a non-zero probability of being a duplicate, or (b) a transmission, to the client, of an indication of a potential prediction error associated with removing, from the second set, one or more observation records which have been identified as having non-zero probabilities of being duplicates.

6. A method, comprising:
performing, by one or more computing devices:
initiating, at a machine learning service, a first machine learning job to train a machine learning model using a first set of observation records;
initiating, at the machine learning service, a second machine learning job to evaluate the machine learning model using a second set of observation records;
receiving, at the machine learning service, a duplication definition to use to determine duplicates between the first set of observation records and the second set of observation records, wherein individual observation records in the first set includes a plurality of variables, and the duplication definition specifies a subset of the plurality of variables to use to determine duplicates;
generating, at the machine learning service and based on the subset of variables specified by the duplication definition, one or more space-efficient representations of the first set of observation records;
determining, using at least one space-efficient representation of the one or more space-efficient representations, a duplication metric corresponding to at least a portion of the second set of observation records, wherein the duplication metric indicates a number or fraction of observation records of the second set that are non-zero probability duplicates of respective observation records of the first set with respect to the subset of variables; and
in response to determining that the duplication metric meets a threshold criterion, performing one or more responsive actions including one or more of:
removing from the second set one or more observation records indicated as non-zero probability duplicates,
suspending the first machine learning job or the second machine learning job, or
canceling the first machine learning job or the second machine learning job.

7. The method as recited in claim 6, wherein a particular space-efficient representation of the one or more space-efficient representations occupies a different amount of space than the first set of observation records and includes one or more of: (a) a Bloom filter, (b) a quotient filter, or (c) a skip list.

8. The method as recited in claim 6, wherein the duplication definition excludes one or more variables from determination of the duplication metric based at least in part on a sparseness criterion.

9. The method as recited in claim 6, wherein a particular space-efficient representation of the one or more space-efficient representations includes a Bloom filter, further comprising performing, by the one or more computing devices:
estimating, prior to generating the Bloom filter, (a) an approximate count of observation records included in the first set and (b) an approximate size of individual observation records of the first set; and
determining, based at least in part on the approximate count or the approximate size, one or more parameters to be used to generate the Bloom filter, including one or more of: (a) a number of bits to be included in the Bloom filter (b) a number of hash functions to be used to generate the Bloom filter, or (c) a particular type of hash function to be used to generate the Bloom filter.

10. The method as recited in claim 6, wherein the one or more response actions include one or more of: (a) notifying a client of a detection of potential duplicate observation records, (b) providing an indication of a particular observation record of the second set which has been identified as having a non-zero probability of being a duplicate, or (c) providing, to a client, an indication of a potential prediction error associated with removing, from the second data set, one or more observation records which have been identified as having non-zero probabilities of being duplicates.

11. The method as recited in claim 6, wherein a particular responsive action of the one or more responsive actions comprises providing an indication of a confidence level that a particular observation record of the second set is a duplicate.

12. The method as recited in claim 6, wherein the group of one or more variables excludes an output variable whose value is to be predicted by a machine learning model.

13. The method as recited in claim 6, wherein said determining that the duplication metric meets a threshold criterion comprises one or more of: (a) determining that the number of observation records of the second set which have been identified as having non-zero probabilities of being duplicates exceeds a first threshold or (b) determining that the fraction of the observation records of the second set that have been identified as having non-zero probabilities of being duplicates exceeds a second threshold.

14. The method as recited in claim 6, wherein said generating the one or more space-efficient representations of the first set of observation records comprises:
subdividing the first set of observation records into a plurality of partitions;
generating, at respective servers of the machine learning service, a respective Bloom filter corresponding to individual ones of the plurality of partitions; and
combining the Bloom filters generated at the respective servers into a consolidated Bloom filter.

15. The method as recited in claim 6, further comprising performing, by the one or more computing devices:
receiving, via a programmatic interface, an indication from the client of one or more of (a) a parameter to be used by the machine learning service to determine whether the threshold criterion has been met, or (b) the one or more responsive actions.

16. The method as recited in claim 6, wherein the first set of observation records and the second set of observation records are respective subsets of one of a source data set from which a training data set of the machine learning model and a test data set of the machine learning model are to be obtained.

17. A non-transitory computer-accessible storage medium storing program instructions that when executed on one or more processors cause the one or more processors to:
initiate, at a machine learning service, a first machine learning job to train a machine learning model using a first set of observation records;
initiate, at the machine learning service, a second machine learning job to evaluate the machine learning model using a second set of observation records;
determine, at the machine learning service, that an analysis is to be performed to detect whether at least a portion of contents of one or more observation records of the first set of observation records for training the machine learning model are duplicated in the second set of observation records for evaluating the machine learning model;
receive, at the machine learning service, a duplication definition to use to determine duplicates between the first set of observation records and the second set of observation records, wherein individual observation records in the first set includes a plurality of variables, and the duplication definition specifies a subset of the plurality of variables to use to determine duplicates;

determine a duplication metric corresponding to at least a portion of the second set of observation records, wherein the duplication metric indicates number or fraction of observation records of the second set that are non-zero probability duplicates of respective observation records of the first set with respect to the subset of variables;

in response to a determination that the duplication metric and meets a threshold criterion, perform one or more responsive actions including one or more of:
  removing from the second set one or more observation records indicated as non-zero probability duplicates,
  suspending the first machine learning job or the second machine learning job, or
  canceling the first machine learning job or the second machine learning job.

18. The non-transitory computer-accessible storage medium as recited in claim 17, wherein to obtain the duplication metric, the instructions when executed on the one or more processors cause the one or more processors to obtain the duplication metric based at least in part on a space-efficient representation of the first set of observation records, wherein the space-efficient representation includes one or more of: (a) a Bloom filter, (b) a quotient filter, or (c) a skip list.

19. The non-transitory computer-accessible storage medium as recited in claim 17, wherein the duplication definition excludes one or more variables from determination of the duplication metric based at least in part on a sparseness criterion.

20. The non-transitory computer-accessible storage medium as recited in claim 17, wherein a particular responsive action of the one or more responsive actions comprises providing an indication of a confidence level that a particular observation record of the second set is a duplicate.

* * * * *